(12) United States Patent
Aifuwa et al.

(10) Patent No.: US 12,444,491 B2
(45) Date of Patent: Oct. 14, 2025

(54) MACHINE LEARNING METHODS FOR CLASSIFYING CELLS

(71) Applicant: Juno Therapeutics, Inc., Seattle, WA (US)

(72) Inventors: Ivie Aifuwa, Seattle, WA (US); Jon Charles Gunther, Seattle, WA (US); Keith Rawson, Seattle, WA (US); Vanessa Hasle, Summit, NJ (US); David Reiss, Summit, NJ (US)

(73) Assignee: Juno Therapeutics, Inc., Seattle, WA (US)

( * ) Notice: Subject to any disclaimer, the term of this patent is extended or adjusted under 35 U.S.C. 154(b) by 615 days.

(21) Appl. No.: 17/638,789

(22) PCT Filed: Aug. 28, 2020

(86) PCT No.: PCT/US2020/048642
§ 371 (c)(1),
(2) Date: Feb. 25, 2022

(87) PCT Pub. No.: WO2021/041994
PCT Pub. Date: Mar. 4, 2021

(65) Prior Publication Data
US 2022/0392613 A1   Dec. 8, 2022

Related U.S. Application Data

(60) Provisional application No. 62/894,463, filed on Aug. 30, 2019.

(51) Int. Cl.
*G06N 3/045* (2023.01)
*G06F 18/214* (2023.01)
(Continued)

(52) U.S. Cl.
CPC ............................ *G16H 30/20* (2018.01)

(58) Field of Classification Search
CPC ........ G16H 30/20; G16H 30/40; G06N 3/045; G06N 3/08; G06N 5/01; G06N 20/10;
(Continued)

(56) References Cited

U.S. PATENT DOCUMENTS 4,452,773 A   6/1984   Molday
4,795,698 A   1/1989   Owen
(Continued)

FOREIGN PATENT DOCUMENTS

EP   452342     11/1994
EP   1631788     3/2006
(Continued)

OTHER PUBLICATIONS

US 8,252,592 B2, 08/2012, Jensen (withdrawn)
(Continued)

*Primary Examiner* — Vu Le
*Assistant Examiner* — Lei Zhao
(74) *Attorney, Agent, or Firm* — Morrison & Foerster LLP

(57) ABSTRACT

Provided are methods for classifying cells, such as T cells, using machine learning methods. The methods can be used to classify different subsets or types of cells in a mixed population of cells.

16 Claims, 14 Drawing Sheets

Specification includes a Sequence Listing.

(51) Int. Cl.

| | |
|---|---|
| *G06F 18/2411* | (2023.01) |
| *G06N 3/08* | (2023.01) |
| *G06N 5/01* | (2023.01) |
| *G06N 20/10* | (2019.01) |
| *G06N 20/20* | (2019.01) |
| *G16B 40/00* | (2019.01) |
| *G16H 30/20* | (2018.01) |
| *G16H 30/40* | (2018.01) |

(58) Field of Classification Search
CPC ..... G06N 20/20; G06T 7/0012; G06F 18/214; G06F 18/2411; G06F 18/24323; G16B 40/00

See application file for complete search history.

(56) References Cited

U.S. PATENT DOCUMENTS

| | | |
|---|---|---|
| 5,200,084 A | 4/1993 | Liberti |
| 5,219,740 A | 6/1993 | Miller et al. |
| 5,994,136 A | 11/1999 | Naldini et al. |
| 6,013,516 A | 1/2000 | Verma et al. |
| 6,040,177 A | 3/2000 | Riddell |
| 6,103,493 A | 8/2000 | Skerra et al. |
| 6,123,655 A | 9/2000 | Fell |
| 6,207,453 B1 | 3/2001 | Maass et al. |
| 6,410,319 B1 | 6/2002 | Raubitschek et al. |
| 6,451,995 B1 | 9/2002 | Cheung et al. |
| 6,733,433 B1 | 5/2004 | Fell et al. |
| 7,070,995 B2 | 7/2006 | Jensen |
| 7,265,209 B2 | 9/2007 | Jensen |
| 7,354,762 B2 | 4/2008 | Jensen |
| 7,362,449 B2 | 4/2008 | Dubois et al. |
| 7,446,179 B2 | 11/2008 | Jensen et al. |
| 7,446,190 B2 | 11/2008 | Sadelain et al. |
| 7,446,191 B2 | 11/2008 | Jensen |
| 7,482,000 B2 | 1/2009 | DeVaux et al. |
| 7,776,562 B2 | 8/2010 | Busch et al. |
| 8,324,353 B2 | 12/2012 | Jensen |
| 8,339,645 B2 | 12/2012 | Nakawaki |
| 8,389,282 B2 | 3/2013 | Sadelain et al. |
| 8,479,118 B2 | 7/2013 | Lyndersay et al. |
| 8,802,374 B2 | 8/2014 | Jensen |
| 9,675,974 B2 | 6/2017 | Jooris et al. |
| 9,684,281 B2 | 6/2017 | Mathuis et al. |
| 9,846,151 B2 | 12/2017 | Magniette |
| 9,904,248 B2 | 2/2018 | Mathuis et al. |
| 9,984,199 B2 | 5/2018 | Sood et al. |
| 10,025,271 B2 | 7/2018 | Mathuis et al. |
| 10,060,905 B2 | 8/2018 | Magniette |
| 10,282,588 B2 | 5/2019 | Comaniciu et al. |
| 10,578,541 B2 | 3/2020 | Jooris et al. |
| 11,067,379 B2 | 7/2021 | Mathuis et al. |
| 2002/0131960 A1 | 9/2002 | Sadelain et al. |
| 2004/0082012 A1 | 4/2004 | Busch et al. |
| 2007/0116690 A1 | 5/2007 | Yang et al. |
| 2008/0171951 A1 | 7/2008 | Fell et al. |
| 2011/0003380 A1 | 1/2011 | Miltenyi |
| 2013/0149337 A1 | 6/2013 | Cooper et al. |
| 2013/0287748 A1 | 10/2013 | June et al. |
| 2014/0093911 A1 | 4/2014 | Sun et al. |
| 2014/0193850 A1* | 7/2014 | Jooris ............... G03H 1/0866 435/29 |
| 2014/0195568 A1 | 7/2014 | Mathuis et al. |
| 2015/0024411 A1 | 1/2015 | Stadler |
| 2017/0037369 A1 | 2/2017 | Ramsborg et al. |
| 2019/0350978 A1* | 11/2019 | Beauchesne ......... C12N 5/0636 |
| 2021/0142472 A1 | 5/2021 | Mathuis et al. |
| 2022/0412954 A1 | 12/2022 | Hause et al. |
| 2023/0178239 A1 | 6/2023 | Hause et al. |

FOREIGN PATENT DOCUMENTS

| | | |
|---|---|---|
| EP | 2537416 | 11/2014 |
| WO | WO1992008796 | 5/1992 |
| WO | WO1994/028143 | 12/1994 |
| WO | WO 2000/014257 | 3/2000 |
| WO | WO 2000/038762 | 7/2000 |
| WO | WO 2002/054065 | 7/2002 |
| WO | WO 2006/123137 | 11/2006 |
| WO | WO-2006123137 A1 * | 11/2006 ......... G06K 9/00127 |
| WO | WO 2009/072003 | 6/2009 |
| WO | WO 2012/062805 | 5/2012 |
| WO | WO 2012/129514 | 9/2012 |
| WO | WO 2013/010595 | 1/2013 |
| WO | WO 2013/011000 | 1/2013 |
| WO | WO 2013/011001 | 1/2013 |
| WO | WO 2013/011004 | 1/2013 |
| WO | WO 2013/071154 | 5/2013 |
| WO | WO 2013/076082 | 5/2013 |
| WO | WO 2013/076089 | 5/2013 |
| WO | WO 2013/120886 | 8/2013 |
| WO | WO 2013/123061 | 8/2013 |
| WO | WO 2013/126726 | 8/2013 |
| WO | WO 2013/166321 | 11/2013 |
| WO | WO 2014/031687 | 2/2014 |
| WO | WO 2014/044823 | 3/2014 |
| WO | WO 2014/055668 | 4/2014 |
| WO | WO 2014/076277 | 5/2014 |
| WO | WO 2015/014858 | 2/2015 |
| WO | 2015/065697 | 5/2015 |
| WO | WO 2015/164675 | 10/2015 |
| WO | WO 2016/073602 | 5/2016 |
| WO | WO 2016/168595 | 10/2016 |
| WO | WO 2019/051335 | 3/2019 |
| WO | WO 2019/095017 | 5/2019 |
| WO | 2019/113557 | 6/2019 |
| WO | WO 2019/175386 | 9/2019 |
| WO | WO 2019/204057 | 10/2019 |
| WO | WO 2019/210153 | 10/2019 |
| WO | WO 2020/056346 | 3/2020 |
| WO | WO-2020112723 A1 * | 6/2020 ......... G06F 18/2413 |
| WO | WO 2021/092097 | 5/2021 |
| WO | WO 2021/231657 | 11/2021 |

OTHER PUBLICATIONS

Akogo, End-to-End Learning via a Convolutional Neural Network for Cancer Cell Line Classification, ARXIV ID: 1807.10638, Publication Date: Jul. 25, 2018 (Year: 2018).*

U.S. Appl. No. 17/774,464, filed May 4, 2022, by Hause Jr., et al.

Alm et al. Cells and Holograms—Holograms and Digital Holographic Microscopy as a Tool to Study the Morphology of Living Cells. In (Ed.), Holography—Basic Principles and Contemporary Applications. IntechOpen. (2013).

Alonso-Camino et al., "CARbodies: Human Antibodies Against Cell Surface Tumor Antigens Selected From Repertoires Displayed on T Cell Chimeric Antigen Receptors," Mol Ther Nucleic Acids (2013) 2(5):e93.

Andreyev et al., "Label-free recognition of non non-activated and activated human T cells by Quantative Phase Imaging," Jan. 1, 2019; https://ovizio.com/label-free-recognition-of-non-activated-and-activated-human-t-cells-by-quantitative-phase-imaging/.

Barrett et al., "Chimeric antigen receptor therapy for cancer," Annu Rev Med. (2014);65:333-47.

Bes et al. "Mapping the Paratope of Anti-CD4 Recombinant Fab 13B8.2 by Combining Parallel Peptide Synthesis and Site-directed Mutagenesis", The Journal of Biological Chemistry (2003) 278(16):14266-14273.

Boris-Lawrie et al., "Recent advances in retrovirus vector technology," Cur. Opin. Genet. Develop. (1993) 3:102-109.

Brash et al., "Strontium phosphate transfection of human cells in primary culture: stable expression of the simian virus 40 large-T-antigen gene in primary human bronchial epithelial cells," Mol. Cell Biol. (1987) 7: 2031-2034.

Brentjens et al., "CD19-targeted T cells rapidly induce molecular remissions in adults with chemotherapy-refractory acute lymphoblastic leukemia," Sci Transl Med. (2013) 5(177):177ra38.

Burns et al., "Vesicular stomatitis virus G glycoprotein pseudotyped retroviral vectors: concentration to very high titer and efficient gene

(56) References Cited

OTHER PUBLICATIONS transfer into mammalian and nonmammalian cells," Proc. Natl. Acad. Sci. USA (1993) 90:8033-8037.

Carl et al., "Parameter-optimized digital holographic microscope for high-resolution living-cell analysis," Appl Opt. (2004) 43(36):6536-44.

Carlens et al., "Ex vivo T lymphocyte expansion for retroviral transduction: influence of serum-free media on variations in cell expansion rates and lymphocyte subset distribution," Exp Hematol (2000) 28(10): 1137-46.

Carrillo et al., "The Multiple Sequence Alignment Problem in Biology," SIAM J Appl Math (1988) 48(5):1073-1082.

Cavalieri et al., "Human T lymphocytes transduced by lentiviral vectors in the absence of TCR activation maintain an intact immune competence," Blood (2003) 102(2): 497-505.

Cheadle et al., "Chimeric antigen receptors for T-cell based therapy," Methods Mol Biol. (2012); 907:645-66.

Chicaybam et al., "An efficient low cost method for gene transfer to T lymphocytes," PLoS One (2013) 8(3): e60298.

Cohen et al., "Recognition of fresh human tumor by human peripheral blood lymphocytes transduced with a bicistronic retroviral vector encoding a murine anti-p53 TCR," J Immunol. (2005) 175:5799-5808.

Cooper et al., "T-cell clones can be rendered specific for CD19: toward the selective augmentation of the graft-versus-B-lineage leukemia effect," Blood (2003) 101:1637-1644.

Davila et al., "CD19 CAR-targeted T cells induce long-term remission and B Cell Aplasia in an immunocompetent mouse model of B cell acute lymphoblastic leukemia," PLoS One (2013) 8(4):e61338.

De Felipe, "Skipping the co-expression problem: the new 2A "CHYSEL" technology," Genet Vaccines Ther (2004) Sep. 13;2(1):13.

De Felipe, "Targeting of proteins derived from self-processing polyproteins containing multiple signal sequences," Traffic (2004) 5(8):616-626.

Dull et al. "A Third-Generation Lentivirus Vector with a Conditional Packaging System," J. Viral. (1998) 72:8463-8471.

Fedorov et al., "PD-1- and CTLA-4-based inhibitory chimeric antigen receptors (iCARs) divert off-target immunotherapy responses," Sci Transl Med. (2013) 5(215):215ra172.

Godinez et al. A multi-scale convolutional neural network for phenotyping high-content cellular images. Bioinformatics (2017) 33(13):2010-2019.

Haddock et al. Manufacturing Cell Therapies: The Paradigm Shift in Health Care of this Century. NAM Perspectives. Discussion Paper. National Academy of Medicine, Washington, DC. (2017). 13 pages.

Hu et al. "Robust prediction of clinical outcomes using cytometry data," Bioinformatics (2019) 35(7):1197-1203.

Huang et al., "DNA transposons for modification of human primary T lymphocytes," Methods Mol Biol (2009) 506: 115-126.

Hudecek et al., "Receptor affinity and extracellular domain modifications affect tumor recognition by ROR1-specific chimeric antigen receptor T cells," Clin Cancer Res. (2013) Jun. 15;19(12):3153-3164.

Jiang et al., "Statistical Learning Approaches for Predicting Lisocabtagene Maraleucel (liso-cel) Drug Product Composition from Donor-Selected Material Composition," Blood (2019) 134 (Supplement_1): 591.

Johnston, "Biolistic transformation: microbes to mice," Nature (1990) 346:776-777.

Kaiser et al. "Towards a commercial process for the manufacture of genetically modified T cells for therapy," Cancer Gene Ther. (2015) 22(2):72-8.

Kim et al., "Predicting clinical benefit of immunotherapy by antigenic or functional mutations affecting tumour immunogenicity," Nat Commun. 2020 11(1):951.

Kochenderfer et al., "Treating B-cell cancer with T cells expressing anti-CD19 chimeric antigen receptors," Nature Reviews Clinical Oncology (2013) 10, 267-276.

Koste et al., "T-cell receptor transfer into human T cells with ecotropic retroviral vectors," Gene Therapy (2014) 21: 533-538.

Kuhn et al. "Label-free cytotoxicity screening assay by digital holographic microscopy," Assay Drug Dev Technol. (2013) 11(2):101-7.

Li et al., "Directed evolution of human T-cell receptors with picomolar affinities by phage display," Nat Biotechnol. (2005) 23:349-354.

Liu et al., "Inclusion of Strep-tag II in design of antigen receptors for T-cell immunotherapy," Nat Biotechnol (2016) 34(4):430-434.

Lupton et al., "Dominant positive and negative selection using a hygromycin phosphotransferase-thymidine kinase fusion gene," Mol and Cell Biol (1991) 11(6):3374-3378.

Manuri et al., "piggyBac transposon/transposase system to generate CD19-specific T cells for the treatment of B-lineage malignancies," Hum Gene Ther (2010) 21(4): 427-437.

Marquet et al., "Digital holographic microscopy: a noninvasive contrast imaging technique allowing quantitative visualization of living cells with subwavelength axial accuracy," Optics Letters (2005) 30(5):468-470.

Miller et al., "Improved retroviral vectors for gene transfer and expression," Biotechniques (1989) 7(9):980-982.

Miller et al., "Retrovirus packaging cells," Human Gene Therapy (1990) 1:5-14.

Naldini et al., Efficient transfer, integration, and sustained long-term expression of the transgene in adult rat brains injected with a lentiviral vector, Proc Natl Acad Sci U S A. (1996) 93(21): 11382-11388.

Naldini et al., "In vivo gene delivery and stable transduction of nondividing cells by a lentiviral vector," Science. (1996) 272(5259): 263-267.

Naldini et al. "Lentiviruses as gene transfer agents for delivery to non-dividing cells." Current opinion in biotechnology 9.5 (1998): 457-463.

Ning et al. "Toward automatic phenotyping of developing embryos from videos," IEEE Transactions on Image Processing (2005) 14(9):1360-1371.

OVISIO Imaging Systems. "Continuous suspension cell culture monitoring in bioreactors using quantitative phase imaging," (2017) Poster; https://cellculturedish.com/continuous-suspension-cell-culture-monitoring-in-bioreactors-using-quantitative-phase-imaging/.

Pais et al. "Holographic Imaging of Insect Cell Cultures: Online Non-Invasive Monitoring of Adeno-Associated Virus Production and Cell Concentration," Processes. (2020) 8:487.

Park et al., "Treating cancer with genetically engineered T cells," Trends Biotechnol. (2011) 29(11): 550-557.

Parkhurst et al., "Characterization of genetically modified T-cell receptors that recognize the CEA:691-699 peptide in the context of HLA-A2.1 on human colorectal cancer cells," Clin Cancer Res. (2009) 15:169-180.

Patel et al., "Real-Time Monitoring of CHO Culture With an In-Line Microscope," Presented at the Aug. 2017 Bioprocess International Summit in Boston, MA.

Pavillon et al. "Noninvasive detection of macrophage activation with single-cell resolution through machine learning," PNAS (2018) 115(12):E2676-E2685.

Perlman et al. "Multidimensional drug profiling by automated microscopy," Science (2004) 306(5699):1194-8.

Phillip et al. "Biophysical and biomolecular determination of cellular age in humans," Nat Biomed Eng. (2017) 1(7):0093.

Rappaz et al. "Digital holographic microscopy: a quantitative label-free microscopy technique for phenotypic screening," Comb Chem High Throughput Screen. (2014) 17(1):80-8.

Riddell et al., "Phase I study of cellular adoptive immunotherapy using genetically modified CD8+ HIV-specific T cells for HIV seropositive patients undergoing allogeneic bone marrow transplant," Human Gene Therapy (1992) 3:319-338.

Rostam et al., "Image based Machine Learning for identification of macrophage subsets," Sci Rep (2017) 7:3521.

Sadelain et al., "The basic principles of chimeric antigen receptor design," Cancer Discov. (2013) 3(4): 388-398.

(56) References Cited

OTHER PUBLICATIONS

Sakellaropoulos et al., "A Deep Learning Framework for Predicting Response to Therapy in Cancer," Cell Rep. 2019 29(11):3367-3373.e4.

Scarpa et al., "Characterization of recombinant helper retroviruses from Moloneybased vectors in ecotropic and amphotropic packaging cell lines," Virology (1991) 180:849-852.

Sharma et al., "Efficient sleeping beauty DNA transposition from DNA minicircles," Molec Ther Nucl Acids (2013) 2:e74.

Stemberger et al. "Novel Serial Positive Enrichment Technology Enables Clinical Multiparameter Cell Sorting," PLoS One (2012) 7(4):e35798 (11 pp).

Sugimoto, ""Machine learning-driven label-free cell sorting for CAR-T cell manufacturing"", Cytotherapy, vol. 21, No. 5, May 1, 2019 (May 1, 2019), p. S39, XP055770965, Poster Abstract 107.

Terakura et al., "Generation of CD19-chimeric antigen receptor modified CD8+ T cells derived from virus-specific central memory T cells," Blood. (2012) 119(1):72-82.

Turtle et al., "Engineered T cells for anti-cancer therapy," Curr. Opin. Immunol. (2012) 24(5): 633-639.

Van Tendeloo et al., "High-level transgene expression in primary human T lymphocytes and adult bone marrow CD34+ cells via electroporation-mediated gene delivery," Gene Therapy (2000) 7(16): 1431-1437.

Varela-Rohena et al., "Control of HIV-1 immune escape by CD8 T cells expressing enhanced T-cell receptor," Nat Med. (2008) 14:1390-1395.

Verhoeyen et al., "Lentiviral vector gene transfer into human T cells," Methods Mol Biol. (2009) 506: 97-114.

Wang et al., "Phenotypic and Functional Attributes of Lentivirus Modified CD19-specific Human CD8+ Central Memory T Cells Manufactured at Clinical Scale," J Immunother. (2012) 35(9):689-701.

Wang et al., "Classifying T cell activity in autofluorescence intensity images with convolutional neural networks," bioRxiv. (2015) 29 pgs. Retrieved from: https://www.biorxiv.org/content/10.1101/737346v1. doi: https://doi.org/10.1101/737346.

Wu et al., "Adoptive T-cell therapy using autologous tumor-infiltrating lymphocytes for metastatic melanoma: current status and future outlook," Cancer (2012) 18(2): 160-175.

Wu et al., "Evolution of cellular morpho-phenotypes in cancer metastasis," Sci Rep. (2016) 5:18437.

Zetsche et al., "Imaging-in-Flow: Digital holographic microscopy as a novel tool to detect and classify nanoplanktonic organisms," Limnol. Oceanogr., Methods (2014) 42(12): 757-775.

Zetsche et al., "Digital holographic microscopy: a novel tool to study the morphology, physiology and ecology of diatoms," Diatom Research (2016) 31(1):1-16.

Zufferey et al., "Multiply attenuated lentiviral vector achieves efficient gene delivery in vivo," Nat Biotechnol. Sep. 1997;15(9):871-875.

Hauwermeiren, "Automated, In-Line Cell Culture Monitoring of CAR-T Cells in a Closed Loop System," Ovizio Imaging Sytems, Webinar Presentation (Aug. 22, 2018), 38 pages.

Sibley et al., "Simultaneous segmentation and classification of multichannel immuno-fluorescently labeled confocal microscopy images using deep convolutional neural networks," Proceedings of SPIE (Mar. 2018), Medical Imaging 2018: Digital Pathology, vol. 10581:1058110-1-1058110-7.

\* cited by examiner

MACHINE LEARNING METHODS FOR CLASSIFYING CELLS

CROSS-REFERENCE TO RELATED APPLICATIONS

This application is a National Stage application under 35 U.S.C. § 371 of International Application No. PCT/US2020/048642, filed on Aug. 28, 2020, which claims the benefit of priority to U.S. provisional patent application 62/894,463, entitled "MACHINE LEARNING METHODS FOR CLASSIFYING CELLS" filed on Aug. 30, 2019, the contents of which are incorporated by reference in their entirety.

INCORPORATION BY REFERENCE OF SEQUENCE LISTING

The present application is being filed along with a Sequence Listing in electronic format. The Sequence Listing is provided as a file entitled 735042012300SEQLIST.TXT, created Aug. 11, 2022, which is 22,938 bytes in size. The information in the electronic format of the Sequence Listing is incorporated by reference in its entirety.

FIELD

The present disclosure relates in some aspects to methods for classifying cells, such as T cells, using machine learning methods. The methods can be used to classify different subsets or types of cells in a mixed population of cells.

BACKGROUND

Adoptive cell therapy, including therapy with genetically engineered immune cells, such as T cells (e.g., CD4+ T cells and/or CD8+ T cells) engineered to express a recombinant receptor, such as a chimeric antigen receptor (CAR), is commonly being used to treat various diseases and conditions. Existing methods for characterizing cells, for example during ex vivo manufacturing or prior to administration of a cell therapy, typically rely on methods that directly handle or manipulate the cells such as by incubation with reagents, e.g. magnetic beads or other immunoaffinity-based reagents, that may interfere with the quality or function of the cells. Such methods may be time consuming and also may risk contamination of a therapeutic cell composition. Improved methods for efficiently classifying or characterizing cells, including in connection with cell therapy, are needed. Provided herein are methods and apparatus that meet such needs.

SUMMARY

Provided herein are methods of classifying T cells, the methods including: receiving image data associated with a first T cell of a population of cells containing T cells; determining, from the image data, one or more input features, said one or more input features including a morphological feature of the image data, an optical feature of the image data, an intensity feature of the image data, a phase feature of the image data, a system feature of the image data, or any combination thereof, applying the one or more input features as input to a process configured to classify, based on the one or more input features, the first T cell as belonging to a first group or a second group.

Provided herein are methods including receiving image data associated with a first T cell of a population of cells containing T cells; determining a classification of the first T cell as belonging to a first group or a second group; determining, from the image data, one or more input features, said one or more input features including a morphological feature of the image data, an optical feature of the image data, an intensity feature of the image data, a phase feature of the image data, a system feature of the image data, or any combination thereof, and generating a feature map having one or more dimensions, wherein each dimension of the one or more dimensions is associated with one or more of the morphological feature of the image data, the optical feature of the image data, the intensity feature of the image data, the phase feature of the image data, the system feature of the image data, or any combination thereof, training a convolutional neural network based on the feature map and the determined classification.

In some embodiments, the process includes applying a convolutional neural network trained using methods described herein, and applying the one or more input features determined from the image data associated with the first T cell as input to the process includes applying the one or more input features to the convolutional neural network.

Provided herein are methods of classifying T cells, the methods including: receiving image data associated with a first T cell of a population of cells containing T cells; determining, from the image data, one or more input features, said one or more input features including a morphological feature of the image data, an optical feature of the image data, an intensity feature of the image data, a phase feature of the image data, a system feature of the image data, or any combination thereof, applying the one or more input features as input to a process, the process including a convolutional neural network trained on one or more input features determined from image data associated with T cells known to belong to a first group and T cells known to belong to a second group, said one or more input features including a morphological feature of the image data, an optical feature of the image data, an intensity feature of the image data, a phase feature of the image data, a system feature of the image data, or any combination thereof, to classify the first T cell as belonging to the first group or the second group.

Provided herein are methods including receiving image data associated with a first T cell of a population of cells containing T cells; determining a classification of the first T cell as belonging to a first group or a second group; determining, from the image data, one or more input features, said one or more input features including a morphological feature of the image data, an optical feature of the image data, an intensity feature of the image data, a phase feature of the image data, a system feature of the image data, or any combination thereof; training a neural network on the input features and the determined classification.

In some embodiments, the process includes applying a neural network trained according to the methods described herein, and applying the one or more input features determined from the image data associated with the first T cell as input to the process includes applying the one or more input features to the neural network.

Provided herein are methods of classifying T cells, the methods including: receiving image data associated with a first T cell of a population of cells containing T cells; determining, from the image data, one or more input features, said one or more input features including a morphological feature of the image data, an optical feature of the image data, an intensity feature of the image data, a phase feature of the image data, a system feature of the image data, or any combination thereof, applying the one or more input features as input to a process, the process including a neural network trained on one or more input features determined from image data associated with T cells known to belong to a first group and T cells known to belong to a second group, said one or more input features including a morphological feature of the image data, an optical feature of the image data, an intensity feature of the image data, a phase feature of the image data, a system feature of the image data, or any combination thereof, to classify the first T cell as belonging to the first group or the second group.

Provided herein are methods including receiving image data associated with a first T cell of a population of cells containing T cells; determining a classification of the first T cell as belonging to a first group or a second group; and determining a hyperplane for a support vector machine, the hyperplane indicating a decision boundary between the first group and the second group, wherein the hyperplane is determined based on one or more input features determined from the image data, said one or more input features comprising a morphological feature of the image data, an optical feature of the image data, an intensity feature of the image data, a phase feature of the image data, a system feature of the image data, or any combination thereof.

In some embodiments, the process includes applying a support vector machine using a hyperplane determined using a method described herein; and applying the one or more input features determined from the image data associated with the first T cell as input to the process includes applying the one or more input features to the support vector machine.

Provided herein are methods of classifying T cells, the methods including: receiving image data associated with a first T cell of a population of cells containing T cells; determining, from the image data, one or more input features, said one or more input features including a morphological feature of the image data, an optical feature of the image data, an intensity feature of the image data, a phase feature of the image data, a system feature of the image data, or any combination thereof, applying the one or more input features as input to a process, the process including a support vector machine trained on one or more input features determined from image data associated with T cells known to belong to a first group and T cells known to belong to a second group, said one or more input features comprising a morphological feature of the image data, an optical feature of the image data, an intensity feature of the image data, a phase feature of the image data, a system feature of the image data, or any combination thereof, to classify the first T cell as belonging to the first group or the second group.

Provided here in are methods including receiving image data associated with a first T cell of a population of cells containing T cells; determining a classification of the first T cell as belonging to a first group or a second group; and determining a random forest for a classification process, the random forest including one or more decision trees, the classification process relating one or more input features determined from the image data associated with the first T cell to the classification of the first T cell as belonging to the first group or belonging to the second group, wherein a decision tree of the one or more decision tress is determined based on one or more input features, said one or more input features including a morphological feature of the image data, an optical feature of the image data, an intensity feature of the image data, a phase feature of the image data, a system feature of the image data, or any combination thereof.

In some embodiments, the process includes a random forest determined using the methods described herein; and applying the one or more input features determined from the image data associated with the image of the first T cell as input to the process includes applying the one or more input features to the random forest.

Provided herein are methods of classifying T cells, the methods including: receiving image data associated with a first T cell of a population of cells containing T cells; determining, from the image data, one or more input features, said one or more input features including a morphological feature of the image data, an optical feature of the image data, an intensity feature of the image data, a phase feature of the image data, a system feature of the image data, or any combination thereof, applying the one or more input features as input to a process, the process including a random forest classification process relating one or more input features determined from image data associated with T cells known to belong to a first group and T cells known to belong to a second group, said one or more input features including a morphological feature of the image data, an optical feature of the image data, an intensity feature of the image data, a phase feature of the image data, a system feature of the image data, or any combination thereof, to classify the first T cell as belonging to the first group or the second group.

Provided herein are methods including: receiving image data associated with a first T cell of a population of cells containing T cells, the image data including one or more of phase image data, intensity image data, and superposition image data; determining a classification of the first T cell as belonging to a first group or a second group; generating, from the image data, a feature map having one or more dimensions; training a convolutional neural network based on the feature map and the determined classification.

Provided herein are methods of classifying T cells, the methods including: receiving image data associated with a first T cell of a population of cells containing T cells, wherein the image data includes one or more of phase image data, intensity image data, and superposition image data; applying the image data as input to a process, the process including a convolutional neural network trained on image data associated with T cells known to belong to a first group and T cells known to belong to a second group, wherein the images include image data including one or more of phase image data, intensity image data, and superposition image data, to classify the first T cell as belonging to the first group or the second group.

Provided herein are methods of classifying T cells, the methods including: receiving image data associated with each cell of a plurality of T cells of a population of cells includes T cells, wherein the image data includes one or more of phase image data, intensity image data, and superposition image data; applying the image data from each cell of the plurality of T cells as input to a process, the process including a convolutional neural network trained on image data associated with T cells known to belong to a first group and T cells known to belong to a second group, wherein the image data includes one or more of phase image data, intensity image data, and superposition image data, to classify each cell of the plurality of T cells as belonging to the first group or the second group.

Provided herein are methods for classifying T cells, the methods including: receiving image data associated with each cell of a plurality of T cells of a population of cells including T cells, wherein the image data includes one or more of phase image data, intensity image data, and superposition image data; applying the image data from each cell of the plurality of T cells as input to a process, the process configured to classify, based on the image data, each cell of the plurality of T cells as belonging to a first group or a second group.

Provided herein are methods method including: receiving image data associated with each cell of a plurality of T cells of a population of cells including T cells, the image data comprising one or more of phase image data, intensity image data, and superposition image data; determining a classification of each cell of the plurality of T cells as belonging to a first group or a second group; training a convolutional neural network based on the image data and the determined classification.

In some embodiments, the process the process includes applying a convolutional neural network trained using the methods described herein; and applying the image data associated with each cell of the plurality of T cells as input to the process includes applying the image data to the convolutional neural network.

In some embodiments, the convolutional neural network is further trained on image data associated with T cells known to belong to the first group and T cells known to belong to the second group, wherein the image data has been manipulated by zooming, skewing, and/or rotating the image data.

In some embodiments, the process, such as a process described herein, is configured to classify about or at least 70, 75, 80, 85, 90, 91, 92, 93, 94, 95, 96, 97, 98, 99, or 100% of T cells in the population of cells containing T cells as belonging to the first group or belonging to the second group. In some embodiments, each cell of the T cells in the population of cells containing T cells is classified by the process. In some embodiments, each cell of a plurality of T cells in the population of cells containing T cells is classified by the process. In some embodiments, the plurality of T cells includes about or at least 70, 75, 80, 85, 90, 91, 92, 93, 94, 95, 96, 97, 98, 99, or 100% of T cells in the population of cells comprising T cells.

Provided herein are methods of generating a cellular dataset for training a machine learning model, the methods including: (a) providing a mixed population of cells containing at least a first and second different cell type, wherein at least the first cell type expresses at least one surface molecule not expressed by other cell types in the mixed population of cells; (b) contacting the mixed population of cells with a first multimerization reagent reversibly bound to a plurality of first binding agents, each of said first binding agent comprising a monovalent binding site able to bind the surface molecule expressed by the first cell type; and (c) isolating one or more cells of the first cell type that are bound to the first binding agent by immunoaffinity-based chromatography, thereby obtaining a first cellular dataset, wherein the isolating is carried out under conditions to reversibly dissociate the first multimerization reagent from the first binding agent; wherein the first cellular dataset is substantially free of the first multimerization reagent and the first binding agent. In some embodiments, the at least one first cell type expresses a recombinant surface molecule. In some embodiments, the recombinant surface molecule is a recombinant receptor. In some embodiments, the recombinant receptor is a chimeric antigen receptor or a T cell receptor. In some embodiments, prior to (c) the method produces a second population of cells not bound to the first binding agent, said second population of cells containing cells that do not express the surface molecule expressed by the first cell type, thereby obtaining a second cellular dataset. In some embodiments, each of the first and second cell type expresses at least one surface molecule not expressed by other cell types in the mixed population of cells.

In some embodiments, the method further includes (d) contacting the mixed population of cells with a second multimerization reagent reversibly bound to a plurality of second binding agents, each of said second binding agent including a monovalent binding site able to bind the surface molecule expressed by the second cell type; and (e) isolating one or more cells of the second cell type that are bound to the second binding agent by immunoaffinity-based chromatography, thereby obtaining a second cellular dataset, wherein the isolating is carried out under conditions to reversibly dissociate the second multimerization reagent from the second binding agent; wherein the second cellular dataset is substantially free of the second multimerization reagent and the second binding agent. In some embodiments, the mixed population of cells further includes a third cell type that expresses at least one surface molecule not expressed by other cell types in the mixed population of cells, and the method further includes: (f) contacting the mixed population of cells with a third multimerization reagent reversibly bound to a plurality of third binding agents, each of said third binding agent including a monovalent binding site able to bind the surface molecule expressed by the third cell type; and (e) isolating one or more cells of the third cell type that are bound to the third binding agent by immunoaffinity-based chromatography, thereby obtaining a third cellular dataset, wherein the isolating is carried out under conditions to reversibly dissociate the third multimerization reagent from the third binding agent; wherein the third cellular dataset is substantially free of the third multimerization reagent and the third binding agent. In some embodiments, this is repeated for one or more additional different cell type.

In some embodiments, prior to (c) the method produces a second population of cells not bound to the first binding agent, said second population of cells containing cells that do not express the surface molecule expressed by the first cell type, and the method further includes: (d) contacting the second population of cells with a second multimerization reagent reversibly bound to a plurality of second binding agents, each of said second binding agent includes a monovalent binding site able to bind the surface molecule expressed by the second cell type; and (e) isolating one or more cells of the second cell type that are bound to the second binding agent by immunoaffinity-based chromatography, thereby obtaining a second cellular dataset, wherein the isolating is carried out under conditions to reversibly dissociate the second multimerization reagent from the second binding agent; wherein the second cellular dataset is substantially free of the second multimerization reagent and the second binding agent. In some embodiments, prior to (e) the method produces a third population of cells not bound to the second binding agent, said third population of cells comprising cells that do not express the surface molecule expressed by the first cell type and the second cell type, and the method further includes: (d) contacting the third population of cells with a third multimerization reagent reversibly bound to a plurality of third binding agents, each of said third binding agent including a monovalent binding site able to bind the surface molecule expressed by the third cell type; and (e) isolating one or more cells of the third cell type that are bound to the third binding agent by immunoaffinity-based chromatography, thereby obtaining a third cellular dataset, wherein the isolating is carried out under conditions to reversibly dissociate the third multimerization reagent from the third binding agent; wherein the third cellular dataset is substantially free of the third multimerization reagent and the third binding agent. In some embodiments, this is repeated for one or more different cell type.

In some embodiments, the first and second cell type is one of (i) CD4+ T cells and (ii) CD8+ T cells and the second cell type is the other of (i) CD4+ T cells and (ii) CD8+ T cells.

In some embodiments, the contacting is carried out by adding the cells to a chromatography column including a stationary phase to which is immobilized the multimerization reagent reversibly bound to the binding agent (e.g. the first multimerization reagent reversibly bound to the first binding agent, the second multimerization reagent reversibly bound to the second binding agent, or the third multimerization reagent reversibly bound to the third binding agent). In some embodiments, the isolating includes eluting the cells from the chromatography column.

In some embodiments, the first binding agent further includes a binding partner capable of forming a reversible bond with the first multimerization reagent, wherein: the binding partner includes a sequence of amino acids set forth in SEQ ID NO:6, 7, 8, 9, or 10; and the first multimerization reagent includes streptavidin, a streptavidin mutein, avidin, or an avidin mutein. In some embodiments, the second binding agent further includes a binding partner capable of forming a reversible bond with the second multimerization reagent, wherein: the binding partner includes a sequence of amino acids set forth in SEQ ID NO:6, 7, 8, 9, or 10; and the second multimerization reagent includes streptavidin, a streptavidin mutein, avidin, or an avidin mutein. In some embodiments, the third binding agent further includes a binding partner capable of forming a reversible bond with the third multimerization reagent, wherein: the binding partner includes a sequence of amino acids set forth in SEQ ID NO:6, 7, 8, 9, or 10; and the third multimerization reagent includes streptavidin, a streptavidin mutein, avidin, or an avidin mutein. In some embodiments, the streptavidin mutein includes the sequence of amino acids set forth in SEQ ID NO: 12, 13, 15 or 16. In some embodiments, the reversible bond has a dissociation constant ($K_D$) in the range of about $10^{-2}$ to about $10^{-1}$ M. In some embodiments, the monovalent binding site is a Fab fragment, a sdAb, a Fv fragment or a single chain Fv fragment. In some embodiments, the bond between the monovalent binding site and the surface molecule has a dissociation constant ($K_D$) in the range of about $10^{-3}$ to about $10^{-7}$ M. In some embodiments, the bond between the monovalent binding site and the surface molecule has a dissociation rate constant of about $3\times10^{-5}$ $sec^{-1}$ or greater. In some embodiments, the reversible dissociation includes addition of a competition reagent. In some embodiments, the competition reagent is biotin or a biotin analog.

In some embodiments, the method further includes receiving image data associated with the cells of the first cellular dataset, the image data comprising one or more of phase image data, intensity image data, and superposition image data. In some embodiments, receiving image data associated with the cells of the second cellular dataset, the image data includes one or more of phase image data, intensity image data, and superposition image data. In some embodiments, the method further includes receiving image data associated with the cells of the third cellular dataset, the image data comprising one or more of phase image data, intensity image data, and superposition image data. In some embodiments, the method further includes receiving image data associated with cells of the first cellular dataset; determining, from the image data, one or more input features, said one or more input features comprising a morphological feature of the image data, an optical feature of the image data, an intensity feature of the image data, a phase feature of the image data, a system feature of the image data, or any combination thereof. In some embodiments, the method further includes receiving image data associated with cells of the second cellular dataset, determining, from the image data, one or more input features, said one or more input features including a morphological feature of the image data, an optical feature of the image data, an intensity feature of the image data, a phase feature of the image data, a system feature of the image data, or any combination thereof. In some embodiments, the method further includes receiving image data associated with cells of the third cellular dataset; determining, from the image data, one or more input features, said one or more input features including a morphological feature of the image data, an optical feature of the image data, an intensity feature of the image data, a phase feature of the image data, a system feature of the image data, or any combination thereof.

In some embodiments, the method further includes generating from the image data a feature map having one or more dimensions, training a convolutional neural network based on the feature map. In some embodiments, the method further includes training a neural network on the input features. In some embodiments, the method further includes determining a hyperplane associated with a support vector machine, the determining based on the one or more input features. In some embodiments, the method further includes determining one or more decision trees of a random forest, the determining based on the one or more input features.

In some embodiments, image data is received from about or at least 70, 75, 80, 85, 90, 91, 92, 93, 94, 95, 96, 97, 98, 99, or 100% of the T cells of the population of cells containing T cells. In some embodiments, the image data includes one or more of phase image data, intensity image data, and superposition image data. In some embodiments, the image data is obtained using differential digital holographic microscopy (DDHM). In some embodiments, the image data is obtained using an objective of about 20×. In some embodiments, the image data is obtained using a CCD camera.

In some embodiments, the image data associated with the T cell is used to determine one or more input features, said one or more input features including a morphological feature of the image data, an optical feature of the image data, an intensity feature of the image data, a phase feature of the image data, a system feature of the image data, or any combination thereof. In some embodiments, the one or more input features include one or more of an aspect ratio of the cell, a cell depth, an area of a cell, a cell descriptor, a cell identifier, an image identifier, an object identifier, a center of mass along an X axis, a center of mass along a Y axis, a circularity of the cell, a compactness of the cell, a normalized aspect ratio, an elongation of the cell, a diameter of the cell, a peak diameter, a hu moment invariant 1, a hu moment invariant 2, a hu moment invariant 3, a hu moment invariant 4, a hu moment invariant 5, a hu moment invariant 6, a hu moment invariant 7, an average intensity contrast, an average entropy, an average intensity, an average intensity uniformity, an intensity contrast of an image of the cell, an intensity correlation of an image of the cell, an intensity entropy of an image of the cell, an intensity homogeneity of an image of the cell, a maximum intensity of the cell, a mean intensity of the cell, a minimum intensity of the cell an intensity skewness of an image of the cell, an intensity smoothness of an image of the cell, an intensity variance of an image of the cell, an intensity uniformity of an image of the cell, a plane where the intensity of the cell is maximum, an indication a cell lies along border of a field of view, an indication a refractive peak lies along a border of a field of view, a mass eccentricity of the cell, a maximum optical height of the cell in radians, a maximum optical height of the cell in microns, a mean optical height of the cell in radians, a mean optical height of the cell in microns, a normalized optical height of the cell, a minimum optical height of the cell in radians, a minimum optical height of the cell in microns, a variance in optical height of a phase of an image of the cell in radians, a variance in optical height of a phase of an image of the cell in microns, an optical volume of the cell, an area of a refractive peak of the cell, a refractive peak area normalized by an area of the cell, a number of refractive peaks of the cell, an intensity of a refractive peak of the cell, a normalized refractive peak height of the cell, a perimeter, an average intensity contrast of a phase image of the cell, an average entropy of a phase image of the cell, an average phase of the cell, an average phase uniformity of the cell, a phase intensity contrast of the cell, a phase correlation of the cell, a phase entropy feature of the cell, a phase homogeneity of the cell, a phase skewness of the cell, a phase smoothness of the cell, a phase uniformity of the cell, a mean of a radius of the cell, a variance of a radius of the cell, and a normalized radius variance of the cell. In some embodiments, the input features include about or at least 70, 65, 60, 55, 50, 45, 40, 35, 30, 25, 20, 15, 10, 9, 8, 7, 6, 5, 4, 3, 2, or 1 input features. In some embodiments, the input features include about 1 to about 70, about 1 to about 60, about 1 to about 50, about 1 to about 40, about 1 to about 30, about 1 to about 20, about 1 to about 15, about 1 to about 10, or about 1 to about 5 input features. In some embodiments, the input features include less than or less than about 70, 65, 60, 55, 50, 45, 40, 35, 30, 25, 20, 15, 10, or 5 input features. In some embodiments, the input features include less than or less than about 20, 15, 10, or 5 input features.

In some embodiments, the one or more input features is a morphological feature of the image data selected from one or more of an aspect ratio of the cell, an area of the cell, a circularity of the cell, a compactness of the cell, a normalized aspect ratio, an elongation of the cell, a diameter of the cell, a hu moment invariant 1, a hu moment invariant 2, a hu moment invariant 3, a hu moment invariant 4, a hu moment invariant 5, a hu moment invariant 6, a hu moment invariant 7, a perimeter, a mean of a radius of the cell, a variance of a radius of the cell, and a normalized radius variance. In some embodiments, the one or more input features is an area of the cell. In some embodiments, the one or more input features is an optical feature of the image data selected from one or more of a diameter of the cell, a maximum intensity of the cell, a mean intensity of the cell, a minimum intensity of the cell, a mass eccentricity of the cell, a maximum optical height of the cell in radians, a maximum optical height of the cell in microns, a mean optical height of the cell in radians, a mean optical height of the cell in microns, a normalized optical height of the cell, a minimum optical height of the cell in radians, a minimum optical height of the cell in microns, an optical volume of the cell, an area of a refractive peak of the cell, a refractive peak area normalized by an area of the cell, a number of refractive peaks of the cell, an intensity of a refractive peak of a cell, and a normalized refractive peak height of the cell. In some embodiments, the one or more of the input features is an intensity feature of the image data selected from one or more of an average intensity contrast, an average entropy, an average intensity, an average intensity uniformity, an intensity contrast of an image of the cell, an intensity correlation of an image of the cell, an intensity entropy of an image of the cell, an intensity homogeneity of an image of the cell, an intensity skewness of an image of the cell, an intensity smoothness of an image of the cell, an intensity variance of an image of the cell, a plane where the intensity of the cell is maximum, and an intensity uniformity of an image of the cell. In some embodiments, the one or more input features is a phase feature of the image data selected from one or more of a variance in optical height of a phase of an image of the cell in radians, a variance in optical height of a phase of an image of the cell in microns, an average intensity contrast of a phase image of the cell, an average entropy of a phase image of the cell, an average phase of the cell, an average phase uniformity of the cell, a phase intensity contrast of the cell, a phase correlation of the cell, a phase entropy feature of the cell, a phase homogeneity of the cell, a phase skewness of a cell, a phase smoothness of a cell, and a phase uniformity of the cell. In some embodiments, the one or more input features is or includes a phase correlation of the cell. In some embodiments, the one or more inputs is a system feature of the image data selected from one or more of a cell depth, a cell identified, an image identifier, a cell descriptor, a center of mass along an X axis, a center of mass along a Y axis, an object identifier, an indication a cell lies along border of a field of view, and an indication a refractive peak lies along a border of a field of view. In some embodiments, the one or more input features is or includes a cell depth.

In some embodiments, the first group and second group are defined by one or more cellular attributes selected from live, dead, CD4+, CD8+, recombinant receptor positive, or recombinant receptor negative, wherein the first group and second group comprise at least one different attribute. In some embodiments, one of the first or second group includes the attribute live and the other group comprises the attribute dead. In some embodiments, the attribute dead includes non-viable cells and debris. In some embodiments, the attribute live includes single viable cells or clusters of viable cells. In some embodiments, the one or more input features includes a phase correlation of the cell, an area of the cell, a number of refractive peaks of the cell, a phase skewness of a cell, a peak diameter, a refractive peak area normalized by an area of the cell, a variance of a radius of the cell, an intensity uniformity of an image of the cell, a compactness of the cell, a phase intensity contrast of the cell, a normalized radius variance, and a circularity of the cell. In some embodiments, the one or more input features includes a phase correlation of the cell. In some embodiments, the one or more input features includes an area of the cell.

In some embodiments, one of the first or second group includes the attribute CD4+ and the other group comprises the attribute CD8+. In some embodiments, the one or more input features includes an average phase uniformity of the cell, the peak diameter, a normalized refractive peak height of the cell, an average phase of the cell, a refractive peak area normalized by an area of the cell, a minimum optical height of the cell in microns, a compactness of the cell, a circularity of the cell, a phase smoothness of a cell, an intensity homogeneity of an image of the cell, a plane where the intensity of the cell is maximum, an area of a refractive peak of the cell, a phase correlation of the cell, a cell depth, an intensity contrast of an image of the cell, an intensity uniformity of an image of the cell, a normalized radius variance, an intensity smoothness of an image of the cell, a phase intensity contrast of the cell, a maximum optical height of the cell, an average intensity contrast of the cell, an average intensity uniformity of the cell, an intensity skewness of an image of the cell, a hu moment invariant 1, an intensity variance of an image of the cell, an average entropy, and an intensity correlation of an image of the cell. In some embodiments, the one or more input features include a cell depth, an intensity contrast of an image of the cell, an intensity uniformity of an image of the cell, a normalized radius variance, an intensity smoothness of an image of the cell, a phase intensity contrast of the cell, a maximum optical height of the cell in microns, an average intensity contrast of the cell, an average intensity uniformity of the cell, an intensity skewness of an image of the cell, a hu moment invariant 1, an intensity variance of an image of the cell, an average entropy, and an intensity correlation of an image of the cell. In some embodiments, the one or more input features includes a cell depth. In some embodiments, the one or more input features includes an average phase uniformity of the cell, a peak diameter, a normalized refractive peak height of the cell, an average phase of the cell, a refractive peak area normalized by an area of the cell, a minimum optical height of the in microns, a compactness of the cell, a circularity of the cell, a phase smoothness of a cell, an intensity homogeneity of an image of the cell, a plane where the intensity of the cell is maximum, an area of a refractive peak of the cell, and a phase correlation of the cell.

In some embodiments, one of the first or second group includes the attribute recombinant receptor positive and the other group comprises the attribute recombinant receptor negative.

In some embodiments, the population of cells containing T cells includes a population of T cells enriched or purified from a biological sample or a population of mixed T cell subtypes. In some embodiments, the enriched or purified population is obtained by mixing T cell populations enriched or purified from a biological sample. In some embodiments, the biological sample includes a whole blood sample, a buffy coat sample, a peripheral blood mononuclear cell (PBMC) sample, an unfractionated T cell sample, a lymphocyte sample, a white blood cell sample, an apheresis product, or a leukapheresis product. In some embodiments, the population of cells containing T cells includes primary cells obtained from a subject. In some embodiments, the population of cells containing T cells includes a population of T cells transduced with a vector including a recombinant receptor. In some embodiments, the population of T cells from which one or more T cell is classified includes a population of T cells undergoing manufacturing to generate a therapeutic T cell composition. In some embodiments, the manufacturing includes an incubation step following transduction of the T cell population with a vector including a recombinant receptor. In some embodiments, the recombinant receptor is a chimeric antigen receptor (CAR).

In some embodiments, the T cells known to belong to a first group and T cells known to belong to a second group are or comprise T cells undergoing manufacturing to generate a therapeutic T cell composition. In some embodiments, the manufacturing of the T cells known to belong to a first group and T cells known to belong to a second group is identical or nearly identical to the manufacturing of the population of T cells from which one or more T cell is classified.

In some embodiments, the one or more T cells of a population of cells containing T cells are classified at different time points during the incubation step. In some embodiments, the one or more T cells of a population of cells containing T cells are classified continuously over the duration of the incubation period. In some embodiments, classifying the one or more T cells of a population of cells containing T cells takes place in a closed system. In some embodiments, the closed system is sterile. In some embodiments, the closed system is automated.

BRIEF DESCRIPTION OF THE DRAWINGS

FIG. 5A shows the accuracy of gradient-boosted random forest classifier relative to the alternative viability prediction model to predict "alive"/ "dead" classification as a function of inoculation time. FIG. 5B shows a comparison of overall "alive" percentage over time, "Actual": prediction made by the alternative viability prediction model; "Predicted": percentage predicted by the gradient-boosted random forest classifier. FIG. 5C shows the relative difference between the alternative viability prediction model predictions and predictions made by the gradient-boosted random forest classifier.

DETAILED DESCRIPTION

Figure 1A:
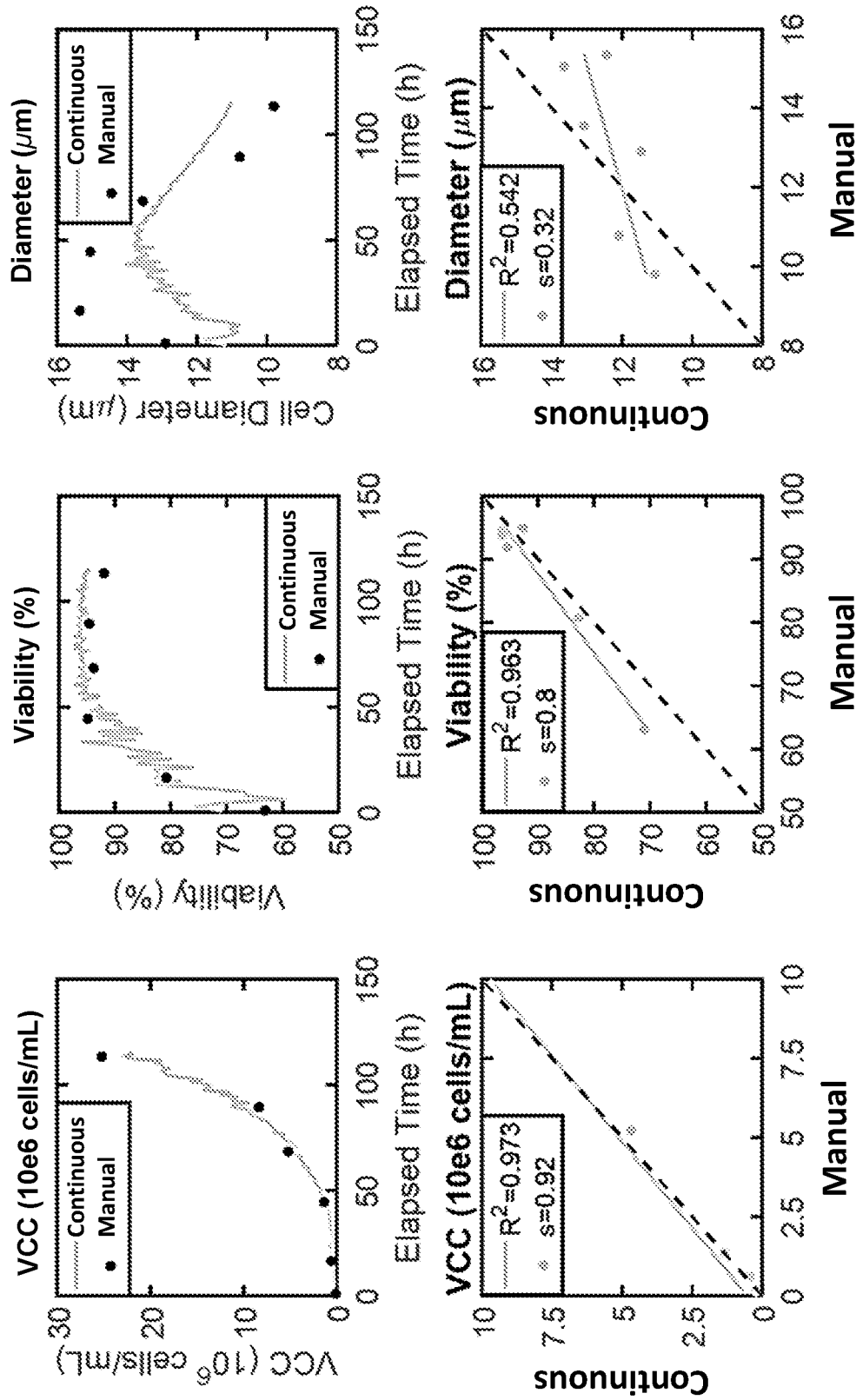
FIGS. 1A and 1B depict viable cell count (VCC; $\times 10^6$ cells/mL), cell viability (%), and cell diameter (μm) assessed using continuous monitoring by differential DHM ("continuous", line) or manual sampling ("manual", dots), in experimental Run 1 (FIG. 1A) and Run 2 (FIG. 1B). Top panels depict the measurements for each, bottom panels depict linear regression analysis and the $R^2$ and slope (s), for comparing the continuous monitoring and manual sampling.

Provided herein are methods for classifying (e.g., predicting) individual cells (e.g., T cells) in a population of cells (e.g., a population of cells comprising T cells) using classification processes including machine learning models. In particular embodiments, the methods include using a machine learning model trained to classify individual cells (e.g., T cells) in a population of cells (e.g., a population of cells comprising T cells) as belonging to a group, where the group is defined by one or more cellular attributes. Cellular attributes include, but are not limited to, cell health (e.g., viable (live), dead), cell cycle status, differentiation status, activation status, cell subtype (CD4+, CD8+ T cell), and/or engineering status (e.g., whether a T cell expresses a recombinant receptor (e.g., a chimeric antigen receptor (CAR), T cell receptor (TCR)). In some embodiments, the machine learning model is trained to classify (e.g., predict) cell subtype identity (e.g., CD4+, CD8+). In some embodiments, the machine learning model is trained to classify (e.g., predict) whether the cell is healthy (e.g. is viable or non-apoptotic). In some embodiments, the machine learning model is trained to classify (e.g., predict) whether the cell is activated. In some embodiments, the machine learning model is trained to classify (e.g., predict) whether the cell is differentiated. In some embodiments, the machine learning model is trained to classify (e.g., predict) whether the cell has entered or is in the cell cycle. In some embodiments, the machine learning model is trained to classify (e.g., predict) whether the cell expresses a recombinant molecule (e.g., CAR, TCR).

Existing methods for determining or identifying whether a cell (e.g. T cell) belongs to a certain group may be identified using techniques such as immunohistochemistry, immunocytochemistry, or cell sorting techniques such as FACS, MACS, or chromatography. These methods, however, may damage or destroy the cell of interest. This can be problematic if the cells are for use, for example, in a therapeutic cell product. Repeated sampling of the product, for example during manufacturing, in which damaging or destructive methods are used to classify cells can deplete the total therapeutic cell population and inadvertently increase the duration of manufacturing, as well as increase the potential for contamination.

The provided methods relate to methods in which a cell (e.g. T cell) can be classified as belonging to a certain group without the need for processing of the cell, e.g., by immunohistochemistry, immunocytochemistry, cell sorting. The provided methods are based on determining or identifying differences of a cell (e.g., T cell) from an image (e.g., an optical image) captured of a cell, such as a cell among a population of cells (e.g., a T cell among a population of cells containing T cells), without the need for additional processing of the cell, e.g., by immunohistochemistry, immunocytochemistry, cell sorting. Accordingly, in some embodiments, a population of cells may be imaged (e.g., via microscopy techniques, such as described below), and image data output by the imaging process can be used as input to a classification process (e.g., machine learning model) such as described herein.

The provided methods offer advantages to other methods of classifying cells. In the methods for classifying cells provided herein, including embodiments thereof, cells of a population of cells (e.g., T cells of a population of cells containing T cells) may be classified using non-destructive, non-damaging methods. For example, in some embodiments, the imaged cells are returned to the cell population (e.g., a therapeutic cell product) in an undamaged state and/or under sterile conditions. The provided methods also can offer an objective and unbiased approach for classifying cells. This is different from many available methods, including those that involve purely manual (e.g., human) assessment of image data or input features to classify cells, that can be both arduous, subjective, and subject to human error. Machine learning models have been shown to be useful for objectively classifying data.

In aspects of the provided methods, the cell population to be assessed is a mixed population of cells containing cells having various cellular attributes and features. In particular embodiments, the population of cells is a T cell population. In some embodiments, the cell population, such as a T cell population, is a mixed population that includes cells of various subtypes (e.g. CD4+ and CD8+ T cells), at various differentiation states (e.g. naïve or memory), at different activation steps (resting or non-activated and activated), that are viable or not viable, that are apoptotic or not apoptotic, that express (e.g. via transduction or transfection) or do not express a recombinant molecule, or any combination of any of the foregoing. In some embodiments, the mixed population includes CD4+ and CD8+ T cells, wherein some of the cells in the mixed population also express (e.g. via transduction) a recombinant molecule (e.g. a CAR). In some embodiments, the mixed population includes a single T cell subtype (e.g., CD4+ or CD8+), wherein some of the cells express (e.g. via transduction) a recombinant molecule (e.g. a CAR). In such embodiments, the methods can be used when it is desired to know or determine such particular attributes present in a cell composition containing a population of cells.

In some embodiments, the methods provided herein are used in connection with a manufacturing process, for example a process as described herein, for generating therapeutic cell populations (e.g., therapeutic cell product) useful for cell therapy. The classification processes provided herein may be used, for example, to optimize the manufacturing process and/or assess product quality. For example, the classification methods provided herein may be used to determine the total number of viable cells and/or the identity of cells in the population, including the ratio of subtypes and/or successfully engineered cells (e.g., CAR-expressing cells) of the population, which can inform the duration and/or conditions of manufacturing steps to ensure a useful therapeutic cell product. Using classification processes incorporating machine learning models to predict such values provides an objective means of optimizing therapeutic cell product manufacturing and improving product consistency.

In some embodiments, the group to which a cell (e.g. T cell) may be classified is defined by one cellular attribute (e.g., live). In some embodiments, the group is defined by at least two cellular attributes (e.g., live and CD4+; live, CD4+, and CAR+). In some embodiments, the group is a first group defined by one or more cellular attributes. In some embodiments, the group is a second group which is defined by one or more cellular attributes, where at least one attribute is different from the one or more attributes that define the first group. In some embodiments, three or more or a plurality of groups are defined by one or more cellular attributes, wherein at least one attribute in each of the three or more or plurality of groups is different from each of the other three or more or plurality of groups.

In some embodiments, the classification results (e.g., predictions) can be used to determine characteristics of the cell population. For example, the ratio of a first subtype (e.g. CD4+) to a second subtype (CD8+) in the cell population, the proportion of cells engineered with a recombinant molecule, such as a recombinant receptor, such as a CAR (e.g., ratio of CAR+ to CAR− cells, including cell identity (e.g., CD4+CAR+, CD4+CAR−, CD8+CAR+, CD8+CAR−)), and/or the total number of viable cells in the sampled population can be determined. By way of example, a first group may be defined by the cellular attribute of being CD4+ and a second group may be defined by the cellular attribute of being CD8+, and a cell (e.g., T cell) having unknown attributes may be assessed by a trained machine learning model to classify the cell of unknown attributes as belonging to the first group or the second group.

In the provided methods the machine learning model is trained using image data from cells, such as T cells. In some embodiments, the image data involves imaging of cells, such as by using microscopy techniques. In some embodiments, the microscopy technique is differential digital holographic microscopy (DDHM). In some embodiments, the microscopy technique produces image data associated with cells (e.g., T cells) that includes phase data, intensity data, and/or superposition data. In some embodiments, the machine learning model is trained using phase image data, intensity image data, and/or superposition image data associated with cells. In some embodiments, the machine learning model is trained using phase image data and intensity image data associated with cells. In particular embodiments of the provided methods, the cells are T cells.

In some embodiments, the machine learning model is trained using one or more input features determined from image data associated with cells (e.g., T cells). In some embodiments, the one or more input features include morphological (e.g. related to size or shape of a cell), optical (e.g. optical property of a cell image, such as related to refraction of a cell), intensity (e.g. an intensity property, for example an RGB or grayscale value of an image), phase (e.g. a property of a phase image, such as a mean or variance or optical height), and/or system features (e.g. a property of a display or readout of the image, such as a position of the cell along a depth axis). In some embodiments, the input features correlate with cell attributes. In some embodiments, the machine learning model is trained on one or more input features. In some embodiments, the machine learning model is trained using one or more morphological, optical, intensity, phase, and/or system features, such as described herein.

In some embodiments, the machine learning model is trained using supervised, semi-supervised, or unsupervised methods. In some embodiments, the training method is supervised. For example, the image data that the machine learning model is trained on is labeled, e.g., the image data is associated with a cell (e.g., T cell) that is known to belong to a group based on knowledge that the cell has one or more cellular attributes that define the group.

Training data, for example image data (e.g., phase, intensity, superposition) and/or input features determined from the image data associated with cells of the cellular dataset can be used as input to train the machine learning models. In some embodiments, a cellular dataset is a pure population of cells in which substantially all of the cells of the population, such as greater than 85%, 86%, 87%, 88%, 89%, 90%, 91%, 92%, 93%, 94%, 95%, 96%, 97%, 98%, 99% or more, exhibit the same cellular attribute or attributes (e.g. subtype, such as CD4+ or CD8+). In some cases, a pure population of cells having desired cellular attributes can be separated from a sample (e.g., apheresis, leukapheresis, blood, PBMC sample). In this way, the cells of the cellular dataset containing the pure population are known to belong to a particular group, where the group is defined by one or more cellular attributes. In some embodiments, training data can be obtained directly from the cellular dataset containing the pure population, and the training data can be used to train a machine learning model to classify cells having the one or more cellular attribute (e.g., belong to the particular group). Thus, when the machine learning model receives input, e.g., image data, input features, associated with cells of unknown cellular attributes, the machine learning model can classify the cells. In some embodiments, the pure population can undergo additional processing, for example manufacturing procedures as described herein. In some embodiments, the cellular dataset containing cells of a pure population of cells is processed in an identical or substantially identical manner as the cells to be classified (e.g., cells having unknown cellular attributes).

Provided herein are methods for generating cellular datasets which can be used for training machine learning models. The provided methods for generating cellular datasets are based on observations herein that, in some cases, use of certain pure populations of cells as a cellular dataset for training to classify cells in a mixed population of cells may not accurately predict attributes in the mixed population of cells (e.g. Example 6). It is believed that, unlike cellular datasets generated entirely from a pure populations of cells, mixed cell populations are subject to cell signaling and/or other environmental affects that may occur under conditions where multiple cell types are present (e.g. such as due to presence of cytokines or growth factors produced from one cell type that may impact an attribute of another cell type in the mixed population of cells). However, unlike with cellular datasets from pure populations, mixed populations cannot be used directly to obtain training data because the mixed population contains cells belonging to multiple groups (e.g., cells of the mixed population do not all share the same one or more cellular attributes). In aspects of the provided methods for generating a cellular dataset for training, the cellular dataset is generated by separating, based on cellular attributes, cells from a mixed population of cells to provide a substantially pure population of cells for training. For example, a mixed population of cells may contain CD4+ and CD8+ cells, and/or CD4+ and CD8+ cells transduced or transfected to express a recombinant molecule (e.g., CAR, TCR), and the methods include selecting one of the CD4+ or CD8+ cells (or one of the CD4+ or CD8+ cells transduced or transfected to express a recombinant molecule). Thus, in some embodiments, to generate a cellular dataset from a mixed population, cells with desired attributes are separated from the mixed population. By separating cells, cellular datasets containing cells with known cellular attributes (e.g., belonging to a particular group) can be generated.

In embodiments for generating a cellular dataset, the methods are carried out to select a cell type from a mixed population of cells for one or more desired attributes in which the selection method is carried out under conditions so that the resulting obtained cell population is substantially free of reagents used in the selection process without unduly manipulating or processing the cells to remove the reagents. Such methods are provided to ensure that the cellular data used for training is as close to a representation of the cells present in the mixed population as possible, since certain manipulations of cells and/or presence of reagents could risk loss of cells in the cellular dataset for training or could alter their phenotype or function and thereby alter the underlying input features of the cells. As an example, the use of magnetic beads for selection of cells can require the use of a magnet to remove the beads from the cells, which may result in extra incubations or processing that could impact cell phenotype or function, could result in loss of cells due to incomplete release of the magnetic field and/or could result in residual beads being present in the final selected cell population thereby potentially interfering with the machine learning methods. As another advantage of the provided methods, methods of selecting or separating cells from the mixed population of cells does not require subjecting the cellular dataset to any additional processing to match the cellular processing of the mixed population of cells. Rather, the cells of the cellular dataset are cells that have been treated, processed or handled in an identical or substantially identical manner as the cells to be classified (e.g. cells having unknown cellular attributes).

In particular embodiments, the cellular dataset is generated by separating or selecting cells of the mixed population using a reversible affinity-based selection, such as by immunoaffinity chromatography, in which the affinity reagents used for selection can be efficiently dissociated from the cells. Reversible immunoaffinity chromatography methods include, in some aspects, methods as described in U.S. Published Patent Appl. No. US2015/0024411 and US2017/0037369, both of which are incorporated herein by reference in their entirety. In some embodiments, the methods employ a separation matrix to which is immobilized a streptavidin mutein reversibly bound to a monovalent antibody (e.g. Fab) that is specific for a marker (e.g. surface molecule) of a desired cellular attribute, such as cell subtype (e.g. CD4+ or CD8+).

In some embodiments, the cellular dataset is generated using positive selection. In some embodiments, the cellular dataset is generated using negative selection. In view of the presence of more than one cell type in the mixed population, in some embodiments, two or more or a plurality of cellular datasets are generated by separating cells of the mixed population. Thus, in some aspects, multiple separation steps may be performed to isolate cells having particular cellular attributes, thereby generating cellular datasets. In some embodiments, further separation steps are performed on negative fractions (e.g., cells not selected by the affinity-based method). In some embodiments, further separation steps are performed on positive fractions (e.g., cells selected by the affinity-based method). It is contemplated that any number of separation steps may be used to generate a cellular dataset for training a machine learning model.

In some embodiments, the cellular datasets containing subsets of cells (e.g., belonging to a particular group) from the mixed population can be used to obtain training data to train a machine learning model to classify cells having the one or more cellular attribute (e.g., belonging to the particular group). Thus, when the machine learning model receives input, e.g., image data, input features, associated with cells of unknown cellular attributes, the machine learning model can classify the cells. In some embodiments, the mixed cell population can undergo additional processing, for example manufacturing procedures as described herein. In some embodiments, the mixed population of cells from which the cellular datasets are generated is processed in an identical or substantially identical manner as the cells to be classified (e.g., cells having unknown cellular attributes).

In some embodiments, the method of classifying cells includes testing the trained machine learning model for accuracy. In some embodiments, the methods include validating the trained machine learning model. In some embodiments, cross-validation is used to validate the model.

In some embodiments, the method of classifying cells of a population of cells includes receiving image data from cells of the population, e.g., by using DDHM, and applying one or more of phase image data, intensity image data, and/or superposition image data of the image data to a machine learning model trained on one or more of phase image data, intensity image data, and/or superposition image data of the image data from cells known to belong to a first group and cells known to belong to a second group, to classify the cells of the population as belonging to the first or second group. In some embodiments, the method of classifying cells of a population of cells includes receiving image data from cells of the population, e.g., by using DDHM, and applying phase image data and intensity image data of the image data to a machine learning model trained on phase image data and intensity image data of image data from cells known to belong to a first group and cells known to belong to a second group, to classify the cells of the population as belonging to the first or second group. In some embodiments, there may be more than two groups to which the T cells may be classified. For example, the machine learning model may be trained to distinguish between more than three or a plurality of groups. In some embodiments, the machine learning model is a deep learning model. In some embodiments, the machine learning model is an artificial neural network. In some embodiments, the machine learning model is a convolutional neural network. Convolutional neural networks are particularly well-suited to handling image data. An advantage of convolutional neural networks is that they reduce the number of parameters in deep neural networks with many units without compromising model quality. Thus, convolutional neural networks are computationally efficient. Additional advantages of convolutional neural networks include their ability to automatically detect important features for classification without human supervision and to detect features that may not be detectable, e.g., by humans.

In some embodiments, the method of classifying cells of a population of cells includes receiving image data from cells of the population, e.g., by using DDHM, determining from the image data, one or more input features, said one or more input features including a morphological feature of the image data, an optical feature of the image data, an intensity feature of the image data, a phase feature of the image data, and/or a system feature of the image data, and applying the one or more input features as input to a machine learning model trained on one or more input features determined from image data associated with cells known to belong to a first group and cells known to belong to a second group, the one or more input features including a morphological feature of the image data, an optical feature of the image data, an intensity feature of the image data, a phase feature of the image data, and a system feature of the image data, to classify the cells of the population as belonging to the first group or the second group. In some embodiments, the method of classifying cells of a population of cells comprising T cells includes receiving image data from cells of the population, e.g., by using DDHM, determining from the image data, one or more input features, said one or more input features including a morphological feature of the image data, an optical feature of the image data, an intensity feature of the image data, and/or a phase feature of the image data, and applying the one or more input features as input to a machine learning model trained one or more input features determined from image data associated with cells known to belong to a first group and cells known to belong to a second group, the one or more input features including a morphological feature of the image data, an optical feature of the image data, an intensity feature of the image data, and/or a phase feature of the image data, to classify the cells of the population as belonging to the first group or the second group. In some embodiments, there may be more than two groups to which the T cells may be classified. In some embodiments, the machine learning model is an artificial neural network. In some embodiments, the machine learning model is a random forest. In some embodiments, the machine learning model is a support vector machine. In some embodiments, the machine learning model is a deep learning model.

In some embodiments, the methods for classifying cells provided herein are used throughout one or more steps or the duration of a process for ex vivo manufacturing or engineering of cells for use as an adoptive cell therapy, for example a process as described herein. In some embodiments, the methods for classifying cells provided herein are used during specific steps of the manufacturing process after the cells have been transduced or transfected with a recombinant molecule, such as a CAR, such as during a step of incubating an engineered T cell population (e.g., Section II-C-3), for example in a process as described herein. In some embodiments, the methods for classifying cells described herein, when used in connection with a manufacturing process, e.g., as described herein, can be used to guide incubation conditions, including one or more of stimulating conditions, engineering conditions, cultivating conditions and harvesting conditions of the manufacturing process. In some embodiments, the methods of classifying cells described herein, when used in connection with a manufacturing process, e.g., as described herein, are useful for determining the need to modify incubation conditions, including stimulating conditions, or can be used to identify when cells are ready to be harvested. For example, identifying cell types, cell health, and viable concentration may be useful for determining perfusion and/or feeding schedules, the need for reducing or adding cytokines during stimulating conditions, detecting a concentration of activated or differentiated T cells, detecting whether the mixed population contains a proper concentration of viable cells and/or viable cell subtypes to be transduced or transfected, detecting concentrations of successfully transduced cells, and/or detecting concentrations of viable cells, viable transduced/transfected cell, viable transduced/transfected cell subtypes to determine the harvesting. In some embodiments, the methods of classifying cells described herein, when used in connection with a manufacturing process, e.g., as described herein, can support a fully automated, e.g., without the need for manual (e.g., human operator) input, cell culturing system. In some embodiments, the fully automated system is a closed-loop system. In some embodiments, the fully automated, closed-loop system efficiently and reliably produces sterile, viable populations of engineered cells, including specific cell types (e.g., CD4+, CD8+, CAR+, TCR+) at specific ratios or total numbers of cells, for cell therapy (e.g., adoptive cell therapy, autologous cell therapy).

In some embodiments, the methods of classifying cells described herein, when used in connection with a manufacturing process, e.g., as described herein, results in a manufacturing process that generates or produces genetically engineered cells that are suitable for cell therapy in a manner that is faster, more efficient, and results in a more consistent product than alternative manufacturing processes. In certain embodiments, the methods of classifying cells provided herein, when used in connection with a manufacturing process, for example as described herein, result in a higher rate of success for generating or producing compositions of engineered cells from a broader population of subjects than what may be possible using alternative processes. In certain embodiments, the engineered cells produced or generated by the provided methods may have greater health, viability, activation, and may have greater expression of the recombinant receptor than cells produced by alternative methods. Thus, in some aspects, the speed and efficiency of the provided methods for generating engineered cells for cell therapy allow for easier planning and coordination of cell therapy treatments, such as autologous therapy, to a broader population of subjects than what may be possible by some alternative methods.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

The section headings used herein are for organizational purposes only and are not to be construed as limiting the subject matter described.

I. Methods of Classifying T Cells

The methods provided herein allow for the classification of cells as belonging to a group, wherein the group is defined by one or more cellular attributes, through the use of a classification process incorporating a machine learning model. In some embodiments, a classification process may incorporate one or more types of machine learning models, for example machine learning models as described below. Cells, including cells having undergone a manufacturing process, for example to genetically engineer the cells, may exhibit differences that can be exploited to classify a cell as belonging to a first group to the exclusion of belonging to a second group. For instance, a morphological feature of a T cell can be used to classify the T cell as a CD4+ subtype, rather than as a CD8+ subtype. In some embodiments, the cell is a T cell. In some embodiments, the T cell is or has been used in a manufacturing process, for example a process as described herein. Group, class, and category may be used herein interchangeably.

Provided herein is a method of classifying cells (e.g. T cells) that includes receiving image data associated with such cell or cells (e.g. first, second or third cell) of a population of cells, such as by using an imaging technique, e.g. digital holography imaging; determining, from the image data, one or more feature that is portrayed, depicted, represented by, or deducible from (e.g., by mathematical means), the image data (also called an "input feature"); and applying the one or more input features as input to a machine learning process configured to classify, based on the one or more input features, the cell as belonging to a first group or a second group. In some embodiments, the one or more feature of image data can be one or more of morphological feature of the image data, an optical feature of the image data, an intensity feature of the image data, a phase feature of the image data, a system feature of the image data, or any combination thereof.

Provided herein is a method of classifying cells (e.g. T cells) that includes receiving image data associated with such cell or cells (e.g. first, second or third cell) of a population of cells, such as by using an imaging technique, e.g. digital holography imaging; and applying the image data as input to a machine learning process configured to classify, based on the one or more input features, the cell as belonging to a first group or a second group. In some embodiments, the image data includes one or more of phase data, intensity data, superposition data, or any combination thereof. In some embodiments, the image data includes phase data and/or intensity data.

In particular embodiments, the provided methods can be used to classify T cells of different groups, such as T cells of different subsets (e.g. CD4+ or CD8+), of different viability or healthy state (e.g. viable or not viable), or of different engineered states (e.g. transduced or not transduced with a recombinant molecule, e.g. a CAR). Features of the provided methods are described in the following subsections.

A. Cell Imaging Techniques

The provided methods include imaging cells of a population of cells. Imaging techniques contemplated for use in connection with the methods of classifying cells provided herein include any and all microscopy techniques capable of imaging cells, for example T cells from a population of cells comprising T cells, that produces image data and/or information determined therefrom (e.g., input features; see, for example, Section I-B) capable of being used as input, e.g., for classification or training purposes, to a classification process (e.g., machine learning model). In some embodiments, the imaging technique includes steps such as image acquisition, image processing (e.g., preprocessing), and/or image segmentation to generate the image data, for example image data associated with a cell. In some embodiments, image processing includes centroid detection. In some embodiments, image processing includes cell detection based on peak intensity when out of focus. In some embodiments, image segmentation includes edge detection. In some embodiments, image segmentation is performed on phase image data. In some embodiments, a computer system is used to interpret the output (e.g., results) of the imaging technique to generate the image data.

The imaging technique may use a digital device to acquire and, for example, record the output (e.g., results) of the imaging process. In some embodiments, the digital device is a charge-coupled device (e.g., a CCD camera). In some embodiments, the digital device is a complementary metal-oxide semiconductor device (e.g., a CMOS camera). Thus, in some embodiments, image data is obtained using a digital device. In some embodiments, the digital device interfaces with a computer to store and/or analyze the results (e.g., output) of the imaging process.

In some embodiments, the imaging technique allows image data from a single cell (e.g., T cell) to be obtained. In some embodiments, the imaging technique allows image data from two or more or a plurality of cells (e.g., T cells) to be obtained simultaneously. For example, the imaging technique may include a field of view that allows a plurality of cells to be imaged at once, and image data associated with each cell (e.g., T cell) can be stored (e.g., on a computer system), analyzed, and/or used independently from image data associated with other cells (e.g., T cells) in the field of view. In some embodiments, image segmentation is used to determine image data associated with each cell of the plurality of cells. In some embodiments, the imaging technique includes a field of view of about 320 µm×320 µm. In some embodiments, the imaging technique includes a horizontal resolution of about 1 µm. In some embodiments, the imaging technique includes a depth of 120 µm.

In some embodiments, the imaging technique produces image data containing phase data. In some embodiments, the imaging technique produces image data containing intensity data. In some embodiments, the imaging technique produces image data containing phase and intensity data. In some embodiments, the imaging technique produces image data containing superposition data. In some embodiments, the imaging technique produces image data containing phase, intensity, and superposition data. In some embodiments, the imaging technique produces a hologram. In some embodiments, imaging technique produces 3 dimensional information. For example, the imaging technique may produce an image that includes x, y, and z coordinate values. In some embodiments, the image data is stored or processed on a computer.

To obtain image data associated with cells (e.g., T cells) in a non-damaging, non-destructive manner, cells may be contained in a liquid, such as a culture media. In some embodiments, the cells (e.g., T cells) may be suspended in a liquid, e.g., a culture media, for imaging. Therefore, in some embodiments, the imaging technique is capable of imaging cells, e.g., T cells, contained and/or suspended in a liquid.

In some embodiments, the imaging technique is bright field microscopy, fluorescence microscopy, differential interference contrast (DIC) microscopy, phase contrast microscopy, digital holographic microscopy (DHM), in-line differential digital holographic microscopy, differential digital holographic microscopy (differential DHM or DDHM), or a combination thereof. In some embodiments, the imaging technique is DDHM.

1. Digital Holographic Microscopy

An exemplary microscopy technique for use in connection with classification methods described herein is digital holographic microscopy (DHM), and more particularly, differential DHM (DDHM). Digital holographic microscopy enables the study of living cells without the need for markers or dyes, and enables quantification of the studied objects. Digital holographic microscopy is a technique which allows a recording of a 3D Sample or object without the need to scan the sample layer-by-layer. In this respect DHM is a superior technique to confocal microscopy. In DHM, a holographic representation is recorded by a digital camera such as a CCD- or a CMOS-camera, which can subsequently be stored or processed on a computer. Different DHM techniques, including DDHM, as well as microscope configurations and elements are described in U.S. 2014/0193850, U.S. Pat. No. 7,362,449, and EP 1631788, which are incorporated herein by reference in their entirety.

To make a holographic representation, or hologram, traditionally a highly coherent light source such as laser-light is used to illuminate the sample. In the most basic set-up, the light from the source is then split into two beams, an object beam and a reference beam. The object beam is sent via an optical system to the sample and interacts with it, thereby altering the phase and amplitude of the light depending on the object's optical properties and 3D shape. The object beam which has been reflected on or transmitted through the sample, is then made (e.g. by set of mirrors and/or beam splitters) to interfere with the reference beam, resulting in an interference pattern that is digitally recorded. Since the hologram is more accurate when object beam and reference beam have comparable amplitude, an absorptive element can be introduced in the reference beam which decreases its amplitude to the level of the object beam, but does not alter the phase of the reference beam or at most changes the phase globally, i.e. not dependent on where and how the reference beam passes through the absorptive element. The recorded interference pattern contains information on the phase and amplitude changes which depend on the object's optical properties and 3D shape.

An alternative way of making a hologram is by using the in-line holographic technique. In-line DHM is similar to the more traditional DHM, but does not split the beam, at least not by a beam splitter or other external optical element. In-line DHM is most preferably used to look at a not-too-dense solution of particles, e.g. cells, in a fluid. Thereby some part of the at least partially coherent light will pass through the sample without interacting with the particles (reference beam) and interfere with light that has interacted with the particles (object beam), giving rise to an interference pattern which is recorded digitally and processed. In-line DHM is used in transmission mode, it needs light with a relatively large coherence length, and cannot be used if the samples are too thick or dense.

Another DHM technique called differential DHM (DDHM) is disclosed in European patent EP 1 631 788, which is incorporated herein by reference in its entirety. DDHM is different to the other techniques in that it does not really make use of reference and object beams. In a preferred set-up of DDHM, the sample is illuminated by illumination means which consist of at least partially coherent light in reflection or in transmission mode. The reflected or transmitted sample beam can be sent through an objective lens and subsequently split in two by a beam splitter and sent along different paths in a differential interferometer, e.g. of the Michelson or Mach-Zehnder type. In one of the paths, a beam-bending element or tilting means is inserted, e.g. a transparent wedge. The two beams are then made to interfere with each other in the focal plane of a focusing lens and the interference pattern in this focal plane is recorded digitally and stored by e.g. a CCD-camera connected to a computer. Hereby, due to the beam-bending element, the two beams are slightly shifted in a controlled way and the interference pattern depends on the amount of shifting. Then the beam-bending element is turned, thereby altering the amount of shifting. The new interference pattern is also recorded. This can be done a number N of times, and from these N interference patterns, the gradient (or spatial derivative) of the phase in the focal plane of the focusing lens can be approximately computed. This is called the phase-stepping method, but other methods of obtaining the phase gradient are also known, such as a Fourier transform data processing technique. The gradient of the phase can be integrated to give the phase as a function of position. The amplitude of the light as a function of position can be computed from the possibly but not necessarily weighted average of the amplitudes of the N recorded interference patterns. Since phase and amplitude are thus known, the same information is obtained as in a direct holographic method (using a reference and an object beam), and a subsequent 3D reconstruction of the object can be performed.

In DDHM, an illumination means may include spatially and temporally partially coherent light. This is in contrast with other DHM methods, which only use highly correlated laser light. Spatially and temporally partially coherent light can be produced by e.g. a LED. A LED is cheaper than a laser and produces light with a spectrum centered around a known wavelength, which is spatially and temporally partially coherent, i.e. not as coherent as laser light, but still coherent enough to produce holographic images of the quality which is necessary for the applications at hand. LEDs also have the advantage of being available for many different wavelengths and are very small in size and easy to use or replace if necessary. Therefore, providing a method which can use spatially and temporally partially coherent light for obtaining holographic images will lead to more cost-effective devices for implementing such a method. In some embodiments, the illumination means is a red LED.

The images may undergo object segmentation and further analysis to obtain a plurality of morphological features that quantitatively describe the imaged objects (e.g., cultivated cells, cellular debris). As such, various features (e.g., cell morphology, cell viability, cell concentration) may be directly assessed or calculated from DDHM using, for example, the steps of image acquisition, image processing, image segmentation, and feature extraction. In some embodiments, a digital recording device is used to record holographic images. In some embodiments, a computer including algorithms for analyzing holographic images may be used. In some embodiments, a monitor and/or computer may be used for displaying the results of the holographic image analysis. In some embodiments, the analysis is automated (i.e., capable of being performed in the absence of user input). An example of a DDHM system includes, but is not limited to, Ovizio iLine F (Ovizio Imaging Systems NV/SA, Brussels, Belgium).

Any type of DHM may be used in accordance with the methods provided herein, including embodiments thereof. In some embodiments, DHM, in-line DHM, or differential DHM is used in combination with other microscopy methods (e.g., fluorescence microscopy). In some embodiments, DDHM is used in connect with the methods provided herein. In some embodiments, DDHM is performed as described above. In some embodiments, the image data is collected from an imaging technique including DDHM.

B. Image Data and Input Features

Image data, such as collected using an imaging technique as described in Section I-A and Section I-A-1 above, can be used as input to a classification process (e.g., machine learning model) for classifying T cells. In some embodiments, one or more features can be determined from the image data. In some embodiments, the one or more features can be used as input to a classification process (e.g., machine learning model) for classifying T cells. Such features may be referred to herein as "input features." Image data can comprise intensity data (e.g., RGB, RGBA, grayscale values corresponding to a pixel), phase data, superposition data, spatial data, or any other suitable data corresponding to the output of an imaging process (e.g., DDHM). Image data can be expressed as an array of values along any suitable number and type of dimensions. For instance, in some examples, image data can be represented as a two-dimensional array with each element holding three 8-bit values, each value representing an RGB intensity of a corresponding pixel (or other image element). Image data can represent a 2D image, a 3D volumetric image, a hologram, or any other suitable image. Image data may, but need not, correspond to a visual image. While image data may correspond to visible light, in some examples, image data can correspond to any suitable source (e.g., infrared or ultraviolet light). Further, any suitable method of imaging can be used.

In some embodiments, image data is collected using DDHM. In some embodiments, image data is received from DDHM. In some embodiments, the image data collected using or received from DDHM is processed to extract features, such as features described below.

In provided methods, the image data itself can be used to train machine learning models, e.g., convolutional neural networks, and image data from cells to be classified can be used as input to the model (e.g., convolutional neural network models). In other provided embodiments, a plurality of input features derived from the image data can be used to train machine learning models, such as by support vector machines (SVM), neural networks, random forests, and input features from cells to be classified can be used as input to the model. In some embodiments, in input features that are determined from the image data can include any one or more of morphological features, optical features, intensity features, phase features, or system features.

In some embodiments, one or more morphological features can be determined from image data corresponding to a cell, for example by applying suitable filters, statistical processing methods, and/or signal processing methods to the image data. Morphological features describe one or more characteristics of the cell's physical shape. Morphological features can include, for example, an aspect ratio of the cell (e.g., a ratio of the length of a first axis of the cell to the length of a second axis of the cell), in some embodiments, the aspect ratio may be normalized; an area of the cell (e.g., a surface area or projected surface area); a circularity of the cell (e.g., a ratio of an area of the cell to a perimeter of the cell); a compactness of the cell (e.g., a ratio of an area of the cell to a variance of an object in an axis of the cell); an elongation of the cell (e.g., a ratio of the width and height of a rectangle enclosing the cell); a diameter of the cell (e.g., a diameter of a circle having the same area as the cell); a Hu moment (e.g., a weighted average (such as one of Hu moment invariants 1-7) of pixel intensities associated with the cell); a perimeter (e.g., a perimeter of the cell); a mean or variance of a radius (e.g., a distance from a center of mass of the cell to a perimeter of the cell), in some embodiments, a normalized radius variance may be determined by dividing the variance of a radius by the diameter. In some examples, morphological features such as described above can be associated with a two-dimensional image of the cell or a three-dimensional image of the cell. The morphological features described above can be applied as input to a classification process for classifying the cell, such as described below.

In some embodiments, one or more optical features can be determined from image data corresponding to a cell, for example by applying suitable filters, statistical processing methods, and/or signal processing methods to the image data. Optical features describe one or more optical properties of an image of the cell. Optical features can include, for example, a peak diameter (e.g., a diameter of a circle having the same area as a refractive peak of the cell); a mass eccentricity of the cell (e.g., a distance (such as in pixels) between a geometric center of the cell and a center of mass of the cell, weighted by an optical height); a minimum, maximum, or average intensity of the cell (e.g., an RGB intensity value); a minimum, maximum, or average optical height of the cell (e.g., a height in microns or radians over a cell surface); a normalized optical height of the cell (e.g., an optical height of the cell (e.g., in microns) divided by the cell diameter); an optical volume of the cell (e.g., a value proportional to a volume of the cell and to its refractive index); an area of a refractive peak of the cell (e.g., in microns); a number of refractive peaks of the cell; a refractive peak area normalized by an area of the cell (e.g., a peak area divided by the product of, e.g., cell area and mean intensity); a normalized refractive peak height of the cell (e.g., an intensity of a refractive peak of the cell divided by the product of, e.g., a surface of the cell and a mean intensity of a cell); and/or an intensity of a refractive peak of the cell. In some examples, optical features such as described above can be associated with a two-dimensional image of the cell or a three-dimensional image of the cell. The optical features described above can be applied as input to a classification process for classifying the cell, such as described below.

In some embodiments, one or more intensity features can be determined from image data corresponding to a cell, for example by applying suitable filters, statistical processing methods, and/or signal processing methods to the image data. Intensity features describe one or more properties of an intensity of the cell. In some examples, an intensity of the cell can comprise an intensity value of an image of the cell (e.g., an RGB value of the image). In some examples, an intensity of the cell can comprise an indicator of presence at a location (e.g., a 1 or 0 value indicating whether the cell is present at the location). Intensity features can include, for example, an intensity value of an image of the cell (e.g., an average intensity); an intensity contrast of an image of the cell (e.g., an intensity difference between a pixel and a neighboring pixel in the image), in some embodiments, the intensity contrast of an image of the cell is an average intensity contrast; an intensity entropy of an image of the cell (e.g., an average entropy); an intensity uniformity of an image of the cell (e.g., a measure of uniformity of the intensity over a cell surface), in some embodiments, the intensity uniformity of an image of the cell is expressed as an average measure of uniformity of the intensity over the cell surface (e.g., an average intensity uniformity); an intensity correlation of an image of the cell (e.g., a correlation between the intensities of a pixel and a neighboring pixel in the image); an intensity homogeneity of an image of the cell (e.g., a spatial closeness of a distribution to a diagonal); an intensity skewness of an image of the cell (e.g., a symmetry of an intensity); an intensity variance of an image of the cell (e.g., variance value of intensity over the cell surface); a plane (e.g., in microns) where the intensity of the cell is maximum; and/or an intensity smoothness of an image of the cell (e.g., an average smoothness). In some examples, intensity features such as described above can be associated with a two-dimensional image of the cell or a three-dimensional image of the cell. The intensity features described above can be applied as input to a classification process for classifying the cell, such as described below.

In some embodiments, one or more phase features can be determined from image data corresponding to a cell, for example by applying suitable filters, statistical processing methods, and/or signal processing methods to the image data. Phase features describe one or more properties of a phase image of the cell. Phase features can include, for example, an optical height of a phase image of the cell (e.g., a mean or variance of the optical height in microns or radians); a phase intensity contrast of the cell (e.g., an average intensity contrast of a phase image of the cell or an intensity contrast of a phase image of the cell, e.g., between pixels across the surface of the cell); a phase entropy of the cell (e.g., an average entropy of a phase image of the cell); an average phase of the cell (e.g., a phase average taken over a cell surface); a phase uniformity of the cell (e.g., a measure of phase uniformity across a cell surface), in some embodiments, a phase uniformity of the cell is an average measure of uniformity of phase over the cell surface (e.g., an average phase uniformity of a cell); a phase correlation of the cell (e.g., a measure of how correlated a pixel is to its neighbor in a phase image of the cell); a phase homogeneity of the cell (e.g., a measure of a spatial closeness of a distribution to a diagonal in a phase image of the cell); a phase skewness of the cell (e.g., a measure of asymmetry in a phase image of the cell); and/or a phase smoothness of the cell (e.g., a measure of smoothness in a phase image of the cell). In some examples, phase features such as described above can be associated with a two-dimensional image of the cell or a three-dimensional image of the cell. The phase features described above can be applied as input to a classification process for classifying the cell, such as described below.

In some embodiments, one or more system features can be determined from image data corresponding to a cell, for example by applying suitable filters, statistical processing methods, and/or signal processing methods to the image data. System features describe a property of a display or readout of an image of a cell, such as one or more positional or statistical properties of an image of the cell. System features can include, for example, a cell depth (e.g., a position of the cell along a depth axis); a cell identifier (e.g., a unique ID number assigned to a cell in an image); an image identifier (e.g., a unique identifier of an image containing objects), an object identifier (e.g., a unique identifier of an object within an image), a cell descriptor (e.g., a categorical description such as being alive, dead, debris, cluster, generic, debris with peak); a center of mass (e.g., a center of mass coordinate along an X or Y axis in an image); and/or a border indication of the cell (e.g., whether the cell, or a refractive peak of the cell, lies along a border in an image). In some examples, system features such as described above can be associated with a two-dimensional image of the cell or a three-dimensional image of the cell. The system features described above can be applied as input to a classification process for classifying the cell, such as described below.

In some embodiments, the input features include one or more or all 70 input features, the input features including an aspect ratio of the cell, a cell depth, an area of a cell, a cell descriptor, a cell identifier, an image identifier, an object identifier, a center of mass along an X axis, a center of mass along a Y axis, a circularity of the cell, a compactness of the cell, a normalized aspect ratio, an elongation of the cell, a diameter of the cell, a peak diameter, a hu moment invariant 1, a hu moment invariant 2, a hu moment invariant 3, a hu moment invariant 4, a hu moment invariant 5, a hu moment invariant 6, a hu moment invariant 7, an average intensity contrast, an average entropy, an average intensity, an average intensity uniformity, an intensity contrast of an image of the cell, an intensity correlation of an image of the cell, an intensity entropy of an image of the cell, an intensity homogeneity of an image of the cell, a maximum intensity of the cell, a mean intensity of the cell, a minimum intensity of the cell an intensity skewness of an image of the cell, an intensity smoothness of an image of the cell, an intensity variance of an image of the cell, an intensity uniformity of an image of the cell, a plane where the intensity of the cell is maximum, an indication a cell lies along border of a field of view, an indication a refractive peak lies along a border of a field of view, a mass eccentricity of the cell, a maximum optical height of the cell in radians, a maximum optical height of the cell in microns, a mean optical height of the cell in radians, a mean optical height of the cell in microns, a normalized optical height of the cell, a minimum optical height of the cell in radians, a minimum optical height of the cell in microns, a variance in optical height of a phase of an image of the cell in radians, a variance in optical height of a phase of an image of the cell in microns, an optical volume of the cell, an area of a refractive peak of the cell, a refractive peak area normalized by an area of the cell, a number of refractive peaks of the cell, an intensity of a refractive peak of the cell, a normalized refractive peak height of the cell, a perimeter, an average intensity contrast of a phase image of the cell, an average entropy of a phase image of the cell, an average phase of the cell, an average phase uniformity of the cell, a phase intensity contrast of the cell, a phase correlation of the cell, a phase entropy feature of the cell, a phase homogeneity of the cell, a phase skewness of the cell, a phase smoothness of the cell, a phase uniformity of the cell, a mean of a radius of the cell, a variance of a radius of the cell, and a normalized radius variance of the cell.

In some embodiments, one or more of the input features may be applied as input to a classification process for classifying a cell, such as described below. In some embodiments, one or more of the input features may be applied as input to a machine learning model trained to classify a cell. In some embodiments, the one or more input features applied as input to a machine learning model trained to classify a cell correspond to the same one or more input features used to train the machine learning model. For example, if the machine learning model is trained using a subset of input features from cells known to belong to a group, the input features applied to the machine learning model for cells to be classified are the same input features as those the model was trained on.

In some instances, it is not necessary to use all of the input features determined from the image data associated with a cell to classify the cell. For example, it is possible to perform an initial statistical test to determine which input features are strongly correlated with a cellular attribute. These input features can then be used as input to the machine learning model. Statistical tests may also be performed to identify highly correlated input features. In addition, statistical tests may be performed to identify input features that display low variance. These input features can be excluded as input to the machine learning model. It should be appreciated that these or similar analyses can be performed on input features used as training data for machine learning models. In some embodiments, the methods described in this paragraph are referred to as data preprocessing. In some cases, a step of data preprocessing in model creation avoids generating models that produce misleading or inaccurate results. In some embodiments, preprocessing prevents out-of-range values, missing values, impossible data combinations, highly correlated variables and the like from being incorporated into the model. In some cases, preprocessing leads to the identification of informative features.

In some embodiments, at least 70, 65, 60, 55, 50, 45, 40, 35, 30, 25, 20, 15, 10, 9, 8, 7, 6, 5, 4, 3, 2, or 1 input features are applied as input to the machine learning model. In some embodiments, about 1 to about 70, about 1 to about 60, about 1 to about 50, about 1 to about 40, about 1 to about 30, about 1 to about 20, about 1 to about 15, about 1 to about 10, or about 1 to about 5 input features are applied as input to the machine learning model. In some embodiments, less than or less than about 70, 65, 60, 55, 50, 45, 40, 35, 30, 25, 20, 15, 10, or 5 input features are applied to the machine learning model. In some embodiments, less than or less than about 20, 15, 10, or 5 input features are applied to the machine learning model.

C. Machine Learning

In some embodiments, image data and/or input features, for example as described in Section I-B, may be used as input to a machine learning model to classify cells (e.g., T cells) of a population of cells (e.g., a population of cells containing T cells). In some embodiments, the each T cell in the population of cells containing T cells can be classified. In some embodiments, a plurality of T cells contained in a cell population containing T cells can be classified. In some embodiments, about or at least 70, 75, 80, 85, 90, 91, 92, 93, 94, 95, 96, 97, 98, 99, or 100% of T cells in the population of cells containing T cells is classified. Classification may be accomplished through a computer running a classification process, such as a classification process incorporating a machine learning model capable of classifying cell types. The machine learning model may include any suitable machine learning model, such as the exemplary models described below.

In some embodiments, classification may comprise identifying a cell as definitively belonging to a first category (e.g., a CD4+ subtype) or a second category (e.g., a CD8+ subtype). In some cases, classification may comprise assigning a probability to a category (e.g., a probability of 70 percent that a T cell belongs to a CD4+ subtype); and/or comparing the probability against a threshold to determine whether a cell belongs to the category with a sufficient probability.

In some embodiments, the machine learning model includes one or more of an artificial neural network (e.g., a convolutional neural network), a regression model, an instance-based model, a regularization model, a decision tree, a random forest, a Bayesian model, a clustering model, an associative model, a deep learning model, a dimensionality reduction model, a support vector machine, and/or an ensemble model (e.g., boosting). However, any suitable machine learning model, or combination of models, can be employed to implement various embodiments.

In some embodiments, an artificial neural network (also referred to here as a neural network or NN) can be utilized to classify a cell as belonging to a first category (e.g., a CD4+ subtype) or a second category (e.g., a CD8+ subtype). A neural network can utilize a network of one or more computational units (e.g., perceptrons) to connect one or more inputs with one or more outputs. For example, the inputs can include image data and/or input features associated with a candidate cell to be classified, and the outputs can include an indication of whether the candidate cell belongs to the first category (e.g., CD4+) or the second category (e.g., CD8+). In some examples, some or all of the input features described above can be presented as input to a neural network. The neural network computes a function of the inputs to arrive at the outputs; the function arrives at the output via computations by the one or more computational units.

The computational units may incorporate intermediate values (weights). Weights can be adjusted via a training process, in which a neural network is adjusted to accurately produce desired outputs from one or more inputs. For example, an untrained neural network may lack any ability to correctly classify a cell as a CD4+ cell or a CD8+ cell. However, by successively applying known inputs corresponding to known outputs (e.g., image data and/or input features belonging to a cell known to be a CD4+ cell or a CD8+ cell), the weights may be changed in such a way as to minimize the error between the neural network's output and the desired output. The neural network is accordingly refined over time to more accurately classify a cell as a CD4+ cell or a CD8+ cell. Following training, the neural network becomes able to accurately classify unknown inputs (e.g., image data and/or input features for a cell not known to be either CD4+ or CD8+). That is, image data and/or input features associated with a candidate cell (e.g., one, some, or all of the optical, morphological, intensity, phase, or system features described above) can be presented to a trained neural network, and the neural network can accurately provide an output corresponding to whether the candidate cell is of type CD4+ or CD8+.

It will be appreciated by one skilled in the art that many types of neural networks, and configurations of those neural networks (e.g., numbers and/or arrangement of perceptrons, such as single-layer or multi-layer) can be utilized without departing from the scope of the invention. Similarly, various methods for training neural networks can be employed without departing from the scope of the invention. For example, in some embodiments, a neural network such as described above can be a convolutional neural network (CNN). In a CNN, a convolutional layer comprises one or more convolutional filters. These convolutional filters can be applied to an input (e.g., image data) to generate one or more feature maps; a training process, such as described below, can be employed to arrive at feature maps that minimize the error between a desired output and a predicted result, and accordingly, improve the ability of a CNN to classify a candidate cell (e.g., T cell). In some examples, a CNN can accept as input image data (e.g., intensity image data, phase image data, superposition image data) associated with a candidate cell to be classified, and output (e.g., predict) whether the candidate cell belongs to a first group (e.g., CD4+) or second group (e.g., CD8+). In some embodiments, the CNN is trained using image data. In some embodiments, the CNN classifies image data associated with cells of unknown type.

In some embodiments, convolutional neural networks may be used to determine cell health in a population of cells. For example, image data associated with cells of a population can be used as input to a convolutional neural network to determine whether a cell of the population is viable (live) or dead, and/or the percentage, total number, and/or concentration of viable (live) and dead cells in the cell population. In some embodiments, the cellular attribute viable includes single viable cells and/or clusters of viable cells. In some embodiments, the cellular attribute dead includes non-viable cells and/or debris. In some embodiments, the convolutional neural network is able to classify single viable cells, clusters of viable cells, non-viable cells, and debris. In some embodiments, the cells to be classified are T cells of a population of cells containing T cells.

In some embodiments, convolutional neural networks may be used to determine cell subtype identity in a population of cells. In some embodiments, image data associated with cells of a population can be used as input to a convolutional neural network to determine the subtype identity of the cell, and/or the percentage, total number, and/or concentration of cell subtypes in the cell population. For example, image data associated with cells of a population can be used as input to a convolutional neural network to determine whether a cell is CD4+ or CD8+, and/or the percentage, concentration, or total number of cells of each subtype in the cell population. In some embodiments, the cells to be classified are T cells of a population of cells containing T cells. In some embodiments, the convolutional neural network is able to classify CD4+ and CD8+ T cells.

In some embodiments, convolutional neural networks may be used to determine whether a cell in a population of cells expresses a recombinant molecule. In some embodiments, the recombinant molecule is a recombinant receptor. In some embodiments, the recombinant receptor is a chimeric antigen receptor (CAR). In some embodiments, the recombinant receptor is a T cell receptor (TCR). In some embodiments, image data associated with cells of a population can be used as input to a convolutional neural network to determine the cell expresses a recombinant molecule, and/or the percentage, total number, and/or concentration of cells expressing the recombinant molecule in the cell population. In some embodiments, the convolutional neural network is able to classify CAR+ and CAR- cells. In some embodiments, the cells to be classified are T cells of a population of cells containing T cells.

In some embodiments, convolutional neural networks may be used to determine whether a cell in a population of cells is in an activated state. In some embodiments, image data associated with cells of a population can be used as input to a convolutional neural network to determine the cell is activated, and/or the percentage, total number, and/or concentration of activated cells in the cell population. In some embodiments, the convolutional neural network is able to classify activated cells and non-activated cells. In some embodiments, the cells to be classified are T cells of a population of cells containing T cells.

In some examples, support vector machines (SVMs) can be utilized (alone or in combination with other techniques) to classify a cell as belonging to a first category (e.g., a CD4+ subtype) or a second category (e.g., a CD8+ subtype). As will be appreciated by those skilled in the art, a SVM can comprise a hyperplane used to linearly separate a data set. By testing a data set comprising cells of an unknown type against a hyperplane configured to separate cells of a first category from cells of a second category, a candidate cell of the data set can be classified as belonging to either the first category or the second category.

A hyperplane of a SVM such as described above can be determined via a training method. Various methods of training a SVM are familiar to those skilled in the art and are within the scope of the disclosure. For example, a training data set can be provided, the training data set comprising inputs corresponding to known outputs (e.g., image data and/or input features belonging to a cell known to be a CD4+ cell or a CD8+ cell). A hyperplane can be determined, using any of various methods familiar to those skilled in the art, which performs a linear classification of the training data set. In some examples, it is preferable to determine a hyperplane such that a geometric margin is maximized. Following training, a SVM can use the hyperplane to classify unknown inputs (e.g., image data and/or input features for a cell not known to be either CD4+ or CD8+). That is, image data and/or input features associated with a candidate cell (e.g., one, some, or all of the optical, morphological, intensity, phase, or system features described above) can be presented to a SVM utilizing the determined hyperplane, and the SVM can accurately provide an output corresponding to whether the candidate cell is of type CD4+ or CD8+.

In some examples, ensemble machine learning methods may be used to classify cells. A random forest is an example of an ensemble learning method that, in some embodiments, can be utilized to classify a cell as belonging to a first category (e.g., a CD4+ subtype) or a second category (e.g., a CD8+ subtype). A random forest can comprise a plurality of decision trees, each of which is applied to one or more inputs to generate one or more corresponding outputs. In some embodiments, each decision tree in the random forest can accept, as input, image data and/or input features associated with a candidate cell (e.g., one, some, or all of the optical, morphological, intensity, phase, or system features described above), and as output, generate a classification of the candidate cell. Preferably, the individual decision trees are sufficiently uncorrelated such that common inputs applied to the plurality of decision trees will result in a diversity of outputs. In embodiments, image data and/or input features (e.g., one, some, or all of the optical, morphological, intensity, phase, or system features described above) is applied to each of the plurality of individual decision trees, and the corresponding outputs are reconciled to generate an output of the random forest. For instance, in some embodiments, the output of a random forest may correspond to a classification output by a majority of the individual decision trees.

Various methods of training a random forest are familiar to those skilled in the art and are within the scope of the disclosure. For example, in some embodiments, a random forest can be trained on a data set (e.g., a set of image data corresponding to cells known to be CD4+ cells or CD8+ cells) by applying randomly sampled input data (e.g., image data, one or more input features) to each individual decision tree of the random forest.

In some cases, a random forest can be trained on a data set (e.g., input features derived from image data corresponding to cells known to be CD4+ cells or CD8+ cells) by applying randomly sampled input data (e.g., one or more input features) to each individual decision tree of the random forest. This training method promotes diversity among the individual decision trees, which can improve the accuracy of the random forest. It will be appreciated by those skilled in the art that many suitable configurations of random forests can be utilized as appropriate; the disclosure is not limited to any type or configuration of random forest, its constituent decision trees, any method of training decision trees, or any method of training any of the above.

Boosting classifiers provide additional examples of ensemble learning methods that, in some embodiments, can be utilized to classify a cell as belonging to a first category (e.g., a CD4+ subtype) or a second category (e.g., a CD8+ subtype). For example, AdaBoost can be described as a boosting classifier that combines the outputs of "weak" classifiers into a weighted sum. In some embodiments, AdaBoost can be used to classify a candidate cell as belonging to a first group or second group, based on image data and/or input features corresponding to the candidate cell. Similarly, AdaBoost can be trained on training data that comprises image data and/or input features corresponding to cells known to have one or more cellular attributes (e.g., cells known to belong to a group defined by one or more cellular attributes). Similarly, other boosting methods, such as XGBoost, can be trained and applied in similar fashion to classify a cell as belonging to a first category (e.g., a CD4+ subtype) or a second category (e.g., a CD8+ subtype). Boosting methods, such as XGBoost can be combined with other machine learning methods. For example, XGBoost can be used in combination with a random forest to classify cells.

In some embodiments, a random forest may be used to determine cell health in a population of cells. For example, input features determined from image data associated with cells of a population can be used as input to a random forest to determine whether a cell of the population is viable (live) or dead, and/or the percentage, total number, and/or concentration of viable (live) and dead cells in the cell population. In some embodiments, the cellular attribute viable includes single viable cells and/or clusters of viable cells. In some embodiments, the cellular attribute dead includes non-viable cells and/or debris. In some embodiments, the random forest is able to classify single viable cells, clusters of viable cells, non-viable cells, and debris. In some embodiments, the cells to be classified are T cells of a population of cells containing T cells.

In some embodiments, one or more input features may be used by the random forest classifier to classify the health of cells in a population of cells, e.g., T cells in a population of cells containing T cells. In some embodiments, the one or more input features include a phase correlation of the cell, an area of the cell, a number of refractive peaks of the cell, a phase skewness of a cell, an a peak diameter, a refractive peak area normalized by an area of the cell, a variance of a radius, an intensity uniformity of an image of the cell, a compactness of the cell, a phase intensity contrast of the cell, a normalized radius variance, and a circularity of the cell. In some embodiments, 1, 2, 3, 4, 5, 6, 7, 8, 9, 10, 11, or 12 input features selected from a phase correlation of the cell, an area of the cell, a number of refractive peaks of the cell, a phase skewness of a cell, an a peak diameter, a refractive peak area normalized by an area of the cell, a variance of a radius, an intensity uniformity of an image of the cell, a compactness of the cell, a phase intensity contrast of the cell, a normalized radius variance, and a circularity of the cell, in any combination, can be used by a machine learning model, such as a random forest classifier, to classify whether a cell is viable or dead. In some embodiments, at least 1, 2, 3, 4, 5, 6, or all input features selected from a phase correlation of the cell, an area of the cell, a number of refractive peaks of the cell, a phase skewness of a cell, an a peak diameter, a refractive peak area normalized by an area of the cell, a variance of a radius, an intensity uniformity of an image of the cell, a compactness of the cell, a phase intensity contrast of the cell, a normalized radius variance, and a circularity of the cell, in any combination, can be used by a machine learning model, such as a random forest classifier, to classify whether a cell is viable or dead. In some embodiments, 1, 2, 3, or 4 features selected from a phase correlation, a cell area, a number of refractive peaks, a phase skewness, and a peak diameter, in any combination, can be used by a machine learning model, such as a random forest classifier, to classify whether a cell is viable or dead. In some embodiments, the one or more input feature includes a phase correlation of the cell. In some embodiments, the one or more input feature includes an area of the cell. In some embodiments, the one or more feature includes a number of refractive peaks of the cell.

In some embodiments, a random forest may be used to determine cell subtype identity in a population of cells. In some embodiments, input features determined from image data associated with cells of a population can be used as input to a random forest to determine the subtype identity of the cell, and/or the percentage, total number, and/or concentration of cell subtypes in the cell population. For example, input features determined from image data associated with cells of a population can be used as input to a random forest to determine whether a cell is CD4+ or CD8+, and/or the percentage, concentration, or total number of cells of each subtype in the cell population. In some embodiments, the cells to be classified are T cells of a population of cells containing T cells. In some embodiments, the random forest is able to classify CD4+ and CD8+ T cells.

In some embodiments, one or more input features may be used by the random forest classifier to classify cell subtypes in a population of cells, e.g., T cells in a population of cells containing T cells. In some embodiments, the one or more input features include an average measure of uniformity of phase over the cell surface (e.g., an average phase uniformity of a cell), a peak diameter, a normalized refractive peak height of the cell, an average phase of the cell, a refractive peak area normalized by an area of the cell, an a minimum optical height of the cell, a compactness of the cell, a circularity of the cell, a phase smoothness of a cell, an intensity homogeneity of an image of the cell, a plane (e.g., in microns) where the intensity of the cell is maximum, an area of a refractive peak of the cell, a phase correlation of the cell, a cell depth, an intensity contrast of an image of the cell, an intensity uniformity of an image of the cell, a normalized radius variance, an intensity smoothness of an image of the cell, a phase intensity contrast of the cell, an a maximum optical height of the cell in microns, an average intensity contrast of the cell, an average intensity uniformity of the cell, an intensity skewness of an image of the cell, a hu moment invariant 1, an intensity variance of an image of the cell, an average entropy, and an intensity correlation of an image of the cell. In some embodiments, 1, 2, 3, 4, 5, 6, 7, 8, 9, 10, 11, 12, 13, 14, or more or all input features selected from an average measure of uniformity of phase over the cell surface (e.g., an average phase uniformity of a cell), a peak diameter, a normalized refractive peak height of the cell, an average phase of the cell, a refractive peak area normalized by an area of the cell, an a minimum optical height of the cell, a compactness of the cell, a circularity of the cell, a phase smoothness of a cell, an intensity homogeneity of an image of the cell, a plane (e.g., in microns) where the intensity of the cell is maximum, an area of a refractive peak of the cell, a phase correlation of the cell, a cell depth, an intensity contrast of an image of the cell, an intensity uniformity of an image of the cell, a normalized radius variance, an intensity smoothness of an image of the cell, a phase intensity contrast of the cell, an a maximum optical height of the cell in microns, an average intensity contrast of the cell, an average intensity uniformity of the cell, an intensity skewness of an image of the cell, a hu moment invariant 1, an intensity variance of an image of the cell, an average entropy, and an intensity correlation of an image of the cell, in any combination, can be used by a machine learning model, such as a random forest classifier, to classify whether a cell is of a certain subtype (e.g., CD4 or CD8 T cell). In some embodiments, at least 1, 2, 3, 4, 5, 6, 7, 8, 9, 10, 11, 12, 13, 14 or all input features selected from an average measure of uniformity of phase over the cell surface (e.g., an average phase uniformity of a cell), a peak diameter, a normalized refractive peak height of the cell, an average phase of the cell, a refractive peak area normalized by an area of the cell, an a minimum optical height of the cell, a compactness of the cell, a circularity of the cell, a phase smoothness of a cell, an intensity homogeneity of an image of the cell, a plane (e.g., in microns) where the intensity of the cell is maximum, an area of a refractive peak of the cell, a phase correlation of the cell, a cell depth, an intensity contrast of an image of the cell, an intensity uniformity of an image of the cell, a normalized radius variance, an intensity smoothness of an image of the cell, a phase intensity contrast of the cell, an a maximum optical height of the cell in microns, an average intensity contrast of the cell, an average intensity uniformity of the cell, an intensity skewness of an image of the cell, a hu moment invariant 1, an intensity variance of an image of the cell, an average entropy, and an intensity correlation of an image of the cell, in any combination, can be used by a machine learning model, such as a random forest classifier, to classify whether a cell is of a certain subtype (e.g., CD4 or CD8 T cell).

In some embodiments, one or more input features may be used by the random forest classifier to classify cell subtypes in a population of cells, e.g., T cells in a population of cells containing T cells. In some embodiments, the one or more input features include a cell depth, an intensity contrast of an image of the cell, an intensity uniformity of an image of the cell, a normalized radius variance, an intensity smoothness of an image of the cell, a phase intensity contrast of the cell, an a maximum optical height of the cell in microns, an average intensity contrast, an average intensity uniformity of an image of the cell, an intensity skewness of an image of the cell, a hu moment invariant 1, an intensity variance of an image of the cell, an average entropy, and an intensity correlation of an image of the cell. In some embodiments, 1, 2, 3, 4, 5, 6, 7, 8, 9, 10, 11, 12, 13, 14 input features selected from a cell depth, an intensity contrast of an image of the cell, an intensity uniformity of an image of the cell, a normalized radius variance, an intensity smoothness of an image of the cell, a phase intensity contrast of the cell, an a maximum optical height of the cell in microns, an average intensity contrast, an average intensity uniformity of an image of the cell, an intensity skewness of an image of the cell, a hu moment invariant 1, an intensity variance of an image of the cell, an average entropy, and an intensity correlation of an image of the cell, in any combination, can be used by a machine learning model, such as a random forest classifier, to classify whether a cell is of a certain subtype (e.g., CD4 or CD8 T cell). In some embodiments, at least 1, 2, 3, 4, 5, 6, or all input features selected from a cell depth, an intensity contrast of an image of the cell, an intensity uniformity of an image of the cell, a normalized radius variance, an intensity smoothness of an image of the cell, a phase intensity contrast of the cell, an a maximum optical height of the cell in microns, an average intensity contrast, an average intensity uniformity of an image of the cell, an intensity skewness of an image of the cell, a hu moment invariant 1, an intensity variance of an image of the cell, an average entropy, and an intensity correlation of an image of the cell, in any combination, can be used by a machine learning model, such as a random forest classifier, to classify whether a cell is of a certain subtype (e.g., CD4 or CD8 T cell). In some embodiments, 1, 2, 3, 4, 5, or 6 input features selected from a cell depth, an intensity contrast of an image of the cell, an intensity uniformity of an image of the cell, a normalized radius variance, an intensity smoothness of an image of the cell, and a phase intensity contrast of the cell, in any combination, can be used by a machine learning model, such as a random forest classifier, to classify whether a cell is of a certain subtype (e.g., CD4 or CD8 T cell). In some embodiments, at least 1, 2, 3, 4, 5, or 6 input features selected from a cell depth, an intensity contrast of an image of the cell, an intensity uniformity of an image of the cell, a normalized radius variance, an intensity smoothness of an image of the cell, and a phase intensity contrast of the cell, in any combination, can be used by a machine learning model, such as a random forest classifier, to classify whether a cell is of a certain subtype (e.g., CD4 or CD8 T cell). In some embodiments, one or more features selected from a cell depth, an intensity contrast of an image of the cell, an intensity uniformity of an image of the cell, in any combination, can be used by a machine learning model, such as a random forest classifier, to classify whether a cell is of a certain subtype (e.g., CD4 or CD8 T cell). In some embodiments, the one or more input features include a cell depth. In some embodiments, the one or more feature includes an intensity contrast. In some embodiments, the one or more feature includes an intensity uniformity.

In some embodiments, a random forest may be used to determine whether a cell in a population of cells expresses a recombinant molecule. In some embodiments, the recombinant molecule is a recombinant receptor. In some embodiments, the recombinant receptor is a chimeric antigen receptor (CAR). In some embodiments, the recombinant receptor is a T cell receptor (TCR). In some embodiments, input features determined from image data associated with cells of a population can be used as input to a random forest to determine the cell expresses a recombinant molecule, and/or the percentage, total number, and/or concentration of cells expressing the recombinant molecule in the cell population. In some embodiments, the random forest is able to classify CAR+ and CAR− cells. In some embodiments, the cells to be classified are T cells of a population of cells containing T cells.

In some embodiments, a random forest may be used to determine whether a cell in a population of cells is in an activated state. In some embodiments, input features determined from image data associated with cells of a population can be used as input to a random forest to determine the cell is activated, and/or the percentage, total number, and/or concentration of activated cells in the cell population. In some embodiments, the random forest is able to classify activated and non-activated cells. In some embodiments, the cells to be classified are T cells of a population of cells containing T cells.

In some embodiments, a preprocessing stage may be applied to image data associated with a cell (e.g., T cell) to generate parameters (e.g., values) that correspond to individual input features (e.g., any of the optical, morphological, intensity, phase, or system features described above), with those parameters then provided as input to a machine learning model (e.g., any of the machine learning models described above). For example, a preprocessing stage can act on image data of a candidate cell—for instance, a 3D array of RGB or grayscale values, with each RGB or grayscale value corresponding to a pixel of that image. In some embodiments, preprocessing includes elimination or reduction of noise (e.g., background noise) image data associated with a cell. In some embodiments, preprocessing includes normalizing image data associated with a cell. The preprocessing stage can compute intensity values, optical height values, contrast values, or any other suitable parameter (such as those described above) from the image, and those parameters can then be applied to the machine learning model.

In some embodiments, more than one type of machine learning model may be used to classify cells. For example, if a population of cells to be classified undergoes a manufacturing process, for example a process as described herein, the methods of classification may be used at any time point or step during the manufacturing process to classify cells of the population. It is contemplated that certain machine learning models may work better for classifying cells at different time points or steps. In some embodiments, one or more machine learning models, for example as described above, may be used at different time points or during different steps of, for example, a manufacturing process.

1. Training Methods

In some embodiments, the machine learning models may be trained using training data. In some embodiments, the training data is or includes image data associated with a cell (e.g., T cell). In some embodiments, the training data is or includes input features determined from image data associated with a cell (e.g., T cell). In some embodiments, the training data is associated with cells contained in cellular dataset, for example as described below. Training of the algorithm may be accomplished through supervised, unsupervised, or semi-supervised training methods.

In some embodiments, the training of a machine learning model is supervised. In this case, training data (e.g., image data, input features) used for training the machine learning model comes from cells known to have one or more cellular attributes that indicate that the cell belongs to a particular group, where the group is defined by the one or more cellular attributes. For example, the training data may include image data and/or input features gathered from cells (e.g., T cells) with known cellular attributes (e.g., CD4+, CD8+, transduced cell). In this way, the model is trained (e.g., learns) that certain data (e.g., image data, input features) correspond to cells (e.g., T cells) having specific cellular attributes (e.g., CD4+, CD8+, transduced cell). Therefore, when the model is presented with novel data (e.g., image data or input features) from a cell for which cellular attributes are unknown, the model can classify (e.g., predict), based on the previous training, that the cell belongs to a group defined by one or more cellular attributes. In some embodiments, the image data is obtained by DDHM. In some embodiments, the input features are determined from image data obtained by DDHM.

In some embodiments, image data associated with cells having known cellular attributes is manipulated to generate additional data sets for supervised training of the machine learning model. In some embodiments, the image data associated with the cell having known cellular attributes is manipulated by zooming, skewing, and/or rotating. This strategy can be useful for boosting learning power when dealing with small training data sets or training data sets lacking diversity. In some embodiments, the image data is obtained by DDHM.

Alternatively, in some embodiments, the training of a machine learning model is unsupervised. In this case, the training data (e.g., image data, input features) used for training the model comes from cells for which cellular attributes are unknown. Therefore, when the model is presented with data (e.g., image data, input features) of unknown origin (e.g., unknown cell type, unknown transduction success), the model will associate the novel data with a cluster generated by the unsupervised data. The model may classify the novel data as part of an existing cluster generated by the unsupervised training data or as part of a cluster different from the existing clusters or as an outlier. Association of novel data with a cluster may be accomplished by the model through the use of, for example, centroid-based clustering techniques, such as k-means clustering and/or the like.

Data sets on which the machine learning models may be trained may be split or divided in any suitable way to generate a set of data to be used for training, a set to be used for testing, and/or a set to be used for validation. For example, in some embodiments, the data set is split or divided such that 80% of the data is used for training the machine learning model and 20% is used for testing the machine learning model. Exemplary splitting or division of data for training and testing the machine learning models may be found in Section VI below.

In some embodiments, the training data is balanced. In some embodiments, the testing data is balanced. For example, if a population of cells belonging to a first group is larger than a population of cells belonging to a second group, the first group can be randomly sampled to create a population of cells that is identical to the size of the second group.

In some embodiments, the machine learning model is trained to identify cells (e.g., T cells) as belonging to a first or second group, where the first group is defined by one or more cellular attributes and the second group is defined by one or more cellular attributes where at least one attribute is different from the one or more attributes that define the first group. In some embodiments, the machine learning model is trained to classify cells (e.g., T cells) as belonging to one of three or more or a plurality of groups, where the groups are defined by one or more cellular attributes, and at least one attribute in each of the three or more or plurality of groups is different from the each other three or more or plurality of groups.

In some embodiments, the machine learning model is trained on training data including image data (e.g., one or more of phase data, intensity data, and superposition data) from a plurality of cells known to have one or more specific cellular attributes, thereby belonging to one of two or more groups, and the machine learning model is trained to differentiate between the cells of the groups. In some embodiments, the machine learning model is trained on image data including phase data, intensity data, and superposition data. In some embodiments, the machine learning model is trained on image data including phase data and intensity data. As described above, in some embodiments, the image data is manipulated by zooming, skewing, and/or rotating. Thus, in some cases, additional training data can be generated, e.g., from existing image data. In some embodiments, the image data is obtained using DDHM. In some embodiments, a convolutional neural network is trained using image data as described herein.

In some embodiments, the machine learning model is trained on training data including one or more input features (e.g., one or more of the features described above) determined from image data from a plurality of cells known to have one or more specific cellular attributes, thereby belonging to one of two or more groups, and the machine learning model is trained to differentiate between the cells of the groups, and the machine learning model is trained to differentiate between the cells of the groups.

In some embodiments, the machine learning model may select an input feature subset from a larger set of input features, with the classification based on the selected subset. A subset of the extracted input features may be used for learning, as determined from feature selection and ranking, feature combination, or other processes. Example features that may used are described above.

In some embodiments, the input features are derived from image data obtained using DDHM. In some embodiments, an initial analysis is performed to determine which input features are correlated with a cellular attribute. These input features can then be used as input to train the machine learning model. In some embodiments, statistical tests may be performed to identify highly correlated input features. In some embodiments, statistical tests may be performed to identify input features that display low variance. In some embodiments, statistical tests may be performed to identify input features that display low variance and to determine correlated input features. In some embodiments, input features with low variance are excluded as input for training the machine learning model. In some embodiments, only one input feature of a pair of correlated input features is used as input to train the machine learning model. In some embodiments, a random forests model, a neural network, an SVM is trained using input features. In some embodiments, the input features used for training and/or classification have undergone an initial analysis as described herein. In some embodiments, using features that have undergone initial analysis can improve model performance.

A machine learning model as described herein can be used to output a classification of a candidate T cell as belonging to a category, based on one or more input features. Such input features can include one or more of the input features described above and can be derived from image data of the candidate T cell. In some embodiments, the machine learning model will classify, based at least on one or more or a plurality of input features (e.g., as described above), a cell to one of one or more clusters that group cells having known a classification (e.g., CD4+, CD8+, CAR+, CAR−). In some embodiments, the machine learning model may have generated, by applying one or more density-based clustering algorithms, a plurality of clusters that group variables having known classifications (e.g., CD4+, CD8+, CAR+, CAR−).

D. Methods of Generating Cellular Datasets

Also provided herein are methods for generating cellular datasets for training a machine learning model. Training data (e.g., image data, input features) for training a machine learning model may be derived from cells contained in a cellular dataset. The cellular dataset, as described herein, is generated to contain cells having known cellular attributes (e.g., cells belonging to a specific group). In some embodiments, the cellular dataset includes cells known to belong to a specific group. For example, a first cellular dataset, generated according to a method described herein, may contain CD4+ cells and a second cellular dataset, generated according to a method described herein, may contain CD8+ cells. In this way, the first cellular dataset contains cells belonging to a first group, the first group defined by the cellular attribute of expressing (e.g., being surface positive) for CD4, and the second cellular dataset contains cells belonging to a second group, the second group defined by the cellular attribute of expressing (e.g., being surface positive) for CD8. The methods provided herein for generating cellular datasets allow for the generation of cellular datasets containing cell populations known to belong to a specific group, the group being defined by one or more cellular attributes. As indicated supra, cellular attributes include, but are not limited to, cell health (e.g., viable (live), dead), cell cycle status, differentiation status, activation status, cell subtype (CD4+, CD8+ T cell), and/or engineering status (e.g., whether a T cell expresses a recombinant receptor (e.g., a chimeric antigen receptor (CAR), T cell receptor (TCR)).

Cellular datasets from which training data can be obtained may be generated using different techniques. Selection of a technique for generating cellular datasets useful for training a machine learning model will depend on numerous factors, including, but not limited to, how the cell populations to be classified are processed. For example, it may be beneficial, e.g., it may increase accuracy and/or robustness, to train a machine learning model on training data from cells in a cellular dataset that are processed in the same manner as the cell population to be classified. In some embodiments, the training data is derived from cellular datasets processed in a way that is identical or substantially identical to the processing of the population of cells to be classified.

1. Pure Cell Populations

A pure cell population may serve as a cellular dataset for training a machine learning model. For example, in some embodiments, a pure population is generated by selecting, based on a desired attribute, cells from a sample (e.g., apheresis, leukapheresis, blood, PBMC sample), thereby isolating a population of selected cells having the same the attribute and thus creating a cellular dataset. The population of selected cells may be referred to as a pure population since it includes only cells having the attribute.

Cellular datasets containing pure populations have an advantage in that all cells of the population are known to belong to a group, and training data (e.g., image data, input features) can be directly obtained from the cellular dataset containing the pure population and used for supervised training of machine learning models. For example, a T cell subtype (e.g., CD4+ or CD8+) may be isolated from a mixed population of cells in a sample (e.g., apheresis, leukapheresis, blood, PBMC sample) and collected and/or processed (e.g., stimulated; transduced; cultivated; incubated; manufactured, for example according to the methods used herein). In some embodiments, the pure population is collected and/or processed in a manner that is identical or substantially identical to the collection and/or processing of the population to be classified.

The cellular dataset containing the cells of the pure population may be directly assessed (e.g., imaged via an imaging technique described herein) to obtain training data (e.g., image data, input features) without the need for further processing (e.g., selection, isolation, separation of cells from the pure population). In some embodiments, the cellular dataset containing the cells of the pure population may be directly assessed using DDHM.

2. Mixed Cell Populations

As an alternative to pure populations, cellular datasets may be derived from mixed populations of cells. A mixed cell population differs from a pure population in that the cells contained in the mixed population do not necessarily have the same cellular attributes. In some embodiments, the mixed cell population is a sample (e.g., apheresis, leukapheresis, blood, PBMC sample). In some embodiments, the mixed cell population contains cells that include one or more cellular attributes, where each cell of the mixed population does not necessarily include the same cellular attribute. For example, T cell subtypes (e.g., CD4+ and CD8+) may be isolated from a mixed population of cells in a sample (e.g., apheresis, leukapheresis, blood, PBMC sample) and the isolated populations recombined in, for example, a specific ratio to generate a mixed population of cells. In some embodiments, the mixed cell population is collected and/or processed in a manner that is identical or substantially identical to the collection and/or processing of the population to be classified.

Unlike the pure population, the training data obtained from the mixed population cannot be used directly for supervised training since the identity of the cells (e.g., group to which the cells belong) is unknown. Thus, in some embodiments, to obtain useful training data from the mixed cell population, cells of the mixed population that have the same one or more cellular attributes may be separated from the mixed population, thereby generating a cellular dataset. In some embodiments, the separated cells (e.g., cells of the cellular dataset) are assessed (e.g., imaged via an imaging technique described herein) to obtain training data (e.g., image data, input features).

In some embodiments, methods for separating cells with one or more of the same attribute from the mixed cell population to generate a cellular dataset do not alter the physiological or functional status of the cell. In some embodiments, the methods of separating the cells from the mixed population do not result in the cells retaining the agents and reagents used to separate the cells. Such embodiments minimize or reduce the ability of the cells to be altered in an way, which can occur in certain methods for separating the cells from a mixed population, and which may result in training data obtained from cellular dataset that is not useful for teaching the machine learning model what data (e.g., image data, input features) are useful for classification. Likewise, if the cells of the cellular dataset retained agents and reagents used to separate (e.g., isolate) the cells, the training data obtained from the cellular dataset may not be useful for teaching the machine learn model what data (e.g., image data, input features) are useful for classification. In some embodiments, the method of separation does not alter the physiological or functional status of the cell. In some embodiments, the method of separation results in the separate cells being free or substantially free from agents and reagents used to effect the separation. In some embodiments, substantially free includes where less than or less than about 30%, 25%, 20%, 15%, 10, 9%, 8%, 7%, 6%, 5%, 4%, 3%, 2%, or 1% of the agents and reagents used to effect the separation are present in the separated cell population. Separation methods considered suitable for separation of mixed populations are described in Section I-D-2-a below and also in U.S. Published Patent Appl. No. US2015/0024411 and US2017/0037369, both of which are incorporated herein by reference in their entirety.

Generation of cellular datasets from mixed populations may be particularly useful for training machine learning models when the cell population to be classified is itself a mixed population. For example, cellular datasets from mixed populations may be useful for training machine learning models when the population of cells to be classified contains multiple cell subtypes (e.g., CD4+ and CD8+ T cells) and/or the cells have been transduced or transfected such that only some cells of the population to be classified express a recombinant molecule (e.g., CAR, TCR). It is possible that cell signaling and/or other environmental conditions in a mixed cell population are different from pure populations due to presence of the different cell types. The ability to generate cellular datasets from mixed cell populations has an advantage in that the cells of the mixed population experience the same conditions that the population to be classified experiences.

a. Separation Based on Immunoaffinity

In some embodiments, the separation methods include the separation of different cell types of the mixed population based on the expression or presence of one or more specific molecules, such as surface molecules, e.g., surface proteins, on the cell surface. In some embodiments, expression of a surface molecule indicates that the cell is surface positive for the molecule. Conversely, in some embodiments, if the cell does not express the surface molecule, the cell is surface negative for the molecule.

In some embodiments, the separation is immunoaffinity-based separation. For example, the isolation in some aspects includes separation of cells and cell populations based on the cells' expression or expression level of one or more molecules, typically cell surface molecules, for example, by incubation with an antibody or binding agent that specifically binds to such molecules, followed generally by washing steps and separation of cells having bound the antibody or binding agent, from those cells having not bound to the antibody or binding agent.

Such separation steps can be based on positive selection, in which the cells having bound the antibody or binding agent are retained for further use, and/or negative selection, in which the cells having not bound to the antibody or binding agent are retained. In some examples, both fractions are retained for further use. In some aspects, negative selection can be particularly useful where no antibody or binding agent is available that specifically identifies a cell type in a heterogeneous population, such that separation is best carried out based on molecules expressed by cells other than the desired population.

The separation need not result in 100% enrichment or removal of a particular cell population or cells expressing a particular marker. For example, positive selection of or enrichment for cells of a particular type, such as those expressing a surface molecule, refers to increasing the number or percentage of such cells, but need not result in a complete absence of cells not expressing the surface molecule. Likewise, negative selection, removal, or depletion of cells of a particular type, such as those expressing a surface molecule, refers to decreasing the number or percentage of such cells, but need not result in a complete removal of all such cells. For example, in some aspects, a selection of one of a CD4+ or CD8+ population enriches for said population, either the CD4+ or CD8+ population, but also can contain some residual or small percentage of other non-selected cells, which can, in some cases, include the other of the CD4 or CD8 population still being present in the enriched population.

In some examples, multiple rounds of separation steps are carried out, where the positively or negatively selected fraction from one step is subjected to another separation step, such as a subsequent positive or negative selection. In some examples, a single separation step can deplete cells expressing multiple markers simultaneously, such as by incubating cells with a plurality of antibodies or binding agents, each specific for a marker targeted for negative selection. Likewise, multiple cell types can simultaneously be positively selected by incubating cells with a plurality of antibodies or binding agents expressed on the various cell types.

In some embodiments, the affinity-based selection employs immunoaffinity chromatography. Immunoaffinity chromatography methods include, in some aspects, one or more chromatography matrix as described in U.S. Published Patent Appl. No. US2015/0024411. In some embodiments, the chromatographic method is a fluid chromatography, typically a liquid chromatography. In some embodiments, the chromatography can be carried out in a flow through mode in which a fluid sample containing the cells to be isolated is applied, for example, by gravity flow or by a pump on one end of a column containing the chromatography matrix and in which the fluid sample exits the column at the other end of the column. In addition, in some aspects, the chromatography can be carried out in an "up and down" mode in which a fluid sample containing the cells to be isolated is applied, for example, by a pipette on one end of a column containing the chromatography matrix packed within a pipette tip and in which the fluid sample enters and exits the chromatography matrix/pipette tip at the other end of the column. In some embodiments, the chromatography can also be carried out in a batch mode in which the chromatography material (stationary phase) is incubated with the sample that contains the cells, for example, under shaking, rotating or repeated contacting and removal of the fluid sample, for example, by means of a pipette.

In some embodiments, the chromatography matrix is a stationary phase. In some embodiments, the chromatography is column chromatography. In some embodiments, any suitable chromatography material can be used. In some embodiments, the chromatography matrix has the form of a solid or semi-solid phase. In some embodiments, the chromatography matrix can include a polymeric resin or a metal oxide or a metalloid oxide. In some embodiments, the chromatography matrix is a non-magnetic material or non-magnetizable material. In some embodiments, the chromatography matrix is a derivatized silica or a crosslinked gel, such as in the form of a natural polymer, for example a polysaccharide. In some embodiments, the chromatography matrix is an agarose gel. Agarose gel for use in a chromatography matrix are known in the art and include, in some aspects, Superflow™ agarose or a Sepharose material such as Superflow™ Sepharose®, which are commercially available in different bead and pore sizes. In some embodiments, the chromatography matrix is a particular cross-linked agarose matrix to which dextran is covalently bonded, such as any known in the art, for example in some aspects, Sephadex®, Superdex® or Sephacryl®, which are available in different bead and pore sizes.

In some embodiments, a chromatography matrix is made of a synthetic polymer, such as polyacrylamide, a styrene-divinylbenzene gel, a copolymer of an acrylate and a diol or of an acrylamide and a diol, a co-polymer of a polysaccharide and agarose, e.g. a polyacrylamide/agarose composite, a polysaccharide and N, N'-methylenebiscarylamide, or a derivatized silica coupled to a synthetic or natural polymer.

In some embodiments, the chromatography matrix, such as agarose beads or other matrix, has a size of at least or about at least 50 µm, 60 µm, 70 µm, 80 µm, 90 µm, 100 µm, 120 µm or 150 µm or more. The exclusion limit of the size exclusion chromatography matrix is selected to be below the maximal width of the target cell in a sample, e.g. T cells. In some embodiments, the volume of the matrix is at least 0.5 mL, 1 mL, 1.5 mL, 2 mL, 3 mL, 4 mL, 5 mL, 6 mL, 7 mL, 8 mL, 9 mL, 10 mL or more. In some embodiments, the chromatography matrix is packed into a column.

In some embodiments, the chromatography matrix, which is an immunoaffinity chromatography matrix, includes a binding agent, such as an antibody or antigen-binding fragment, such as Fab, immobilized thereto. In some embodiments, the antibody is a full-length antibody or is an antigen-binding fragment thereof, including a (Fab) fragments, F(ab')2 fragments, Fab' fragments, Fv fragments, variable heavy chain (VH) regions capable of specifically binding the antigen, single chain antibody fragments, including single chain variable fragments (scFv), and single domain antibodies (e.g., sdAb, sdFv, nanobody) and antigen-binding fragments thereof. In some embodiments, the antibody is a Fab fragment. In some embodiments, the antibody can be monovalent, bivalent or multivalent. In some embodiments, the binding agent includes a monovalent binding site. In some embodiments, the monovalent binding site is a Fab fragment, a sdAb, a Fv fragment or a single chain Fv fragment.

In some aspects, the antibody or antigen-binding fragment thereof can be produced by or derived from a hybridoma as follows: OKT3 (αCD3), 13B8.2 (αCD4), OKT8 (αCD8). In some embodiments, any of the above antibodies can contain one or more mutations within the framework of heavy and light chain variable regions without targeting the highly variable CDR regions. Exemplary of such antibodies include, in some aspects, anti-CD4 antibodies as described in U.S. Pat. No. 7,482,000 and Bes et al. (2003) *J. Biol. Chem.*, 278:14265-14273.

In some embodiments, the antibody or antigen-binding fragment thereof is an anti-idiotypic antibody or an antigen-binding fragment thereof (anti-ID). In some embodiments, the anti-ID binds to a target antigen receptor, e.g. CAR.

In some embodiments, the antibody or antigen-binding fragment thereof specifically binds to a surrogate marker. A surrogate marker can be used to detect cells that have been introduced with a polynucleotide, e.g., a polynucleotide encoding a recombinant receptor. In some embodiments, the surrogate marker can indicate or confirm modification of a cell. In some embodiments, the surrogate marker is a protein that is made to be co-expressed on the cell surface with the recombinant receptor, e.g. CAR. In particular embodiments, such a surrogate marker is a surface protein that has been modified to have little or no activity. In certain embodiments, the surrogate marker is encoded on the same polynucleotide that encodes the recombinant receptor. In some embodiments, the nucleic acid sequence encoding the recombinant receptor is operably linked to a nucleic acid sequence encoding a marker, optionally separated by an internal ribosome entry site (IRES), or a nucleic acid encoding a self-cleaving peptide or a peptide that causes ribosome skipping, such as a 2A sequence, such as a T2A, a P2A, a E2A or a F2A. Extrinsic marker genes may in some cases be utilized in connection with engineered cell to permit detection or selection of cells and, in some cases, also to promote cell suicide.

Exemplary surrogate markers can include truncated forms of cell surface polypeptides such as truncated forms that are non-functional and to not transduce or are not capable of transducing a signal or a signal ordinarily transduced by the full-length form of the cell surface polypeptide, and/or do not or are not capable of internalizing. Exemplary truncated cell surface polypeptides including truncated forms of growth factors or other receptors, such as a truncated human epidermal growth factor receptor 2 (tHER2), a truncated epidermal growth factor receptor (EGFRt, exemplary EGFRt sequence set forth in SEQ ID NO: 23 or 24) or a prostate-specific membrane antigen (PSMA) or modified form thereof. EGFRt may contain an epitope recognized by the antibody cetuximab (Erbitux®) or other therapeutic anti-EGFR antibody or binding molecule, which can be used to identify or select cells that have been engineered with the EGFRt construct and a recombinant receptor, such as a chimeric antigen receptor (CAR), and/or to eliminate or separate cells expressing the receptor. See U.S. Pat. No. 8,802,374 and Liu et al., Nature Biotech. 2016 April; 34(4): 430-434). In some aspects, the marker, e.g. surrogate marker, includes all or part (e.g., truncated form) of CD34, a NGFR, a CD19 or a truncated CD19, e.g., a truncated non-human CD19, or epidermal growth factor receptor (e.g., tEGFR). In some embodiments, the nucleic acid encoding the marker is operably linked to a polynucleotide encoding for a linker sequence, such as a cleavable linker sequence, e.g., T2A. For example, a marker, and optionally a linker sequence, can be any as disclosed in PCT Pub. No. WO2014031687. For example, the marker can be a truncated EGFR (tEGFR) that is, optionally, linked to a linker sequence, such as a T2A cleavable linker sequence. An exemplary polypeptide for a truncated EGFR (e.g. tEGFR) comprises the sequence of amino acids set forth in SEQ ID NO: 23 or 24 or a sequence of amino acids that exhibits at least 85%, 86%, 87%, 88%, 89%, 90%, 91%, 92%, 93%, 94%, 95%, 96%, 97%, 98%, 99% or more sequence identity to SEQ ID NO: 23 or 24.

In some embodiments, an antigen-binding fragment, such as a Fab fragment, can be generated from such antibodies using methods known in the art, such as, in some aspects, amplification of hypervariable sequences of heavy and light chains and cloning to allow combination with sequences coding for an appropriate constant domain. In some embodiments, the constant domain is of human subclass IgG1/κ. Such antibodies can be carboxy-terminally fused with a peptide streptavidin binding molecule, such as set forth in SEQ ID NO:10. Exemplary of such antibodies are described in Stemberger et al. (2102) PLoS One, 7:35798 and International PCT Application No.

The antibody or antigen-binding fragment, such as a Fab, can be any as described above, including, in some aspects, known antibodies in the art, antibodies having a particular koi rate and/or antibodies having a particular dissociation constant.

In some embodiments, the dissociation constant ($K_D$) is in the range of about $10^{-2}$ M to about $10^{-11}$ M, or of about $10^{-2}$ M to about $10^{-10}$ M, or of about $10^{-2}$ M to about $10^{-9}$ M, or of about $10^{-2}$ M to about $10^{-8}$ M, or of about $10^{-2}$ M to about $10^{-7}$ M, or of about $10^{-2}$ M to about $10^{-6}$ M, or of about $10^{-2}$ M to about $10^{-5}$, or of about $10^{-2}$ M to about $10^{-4}$ M, or of about $10^{-2}$ to about $10^{-3}$, or any number in between. In some embodiments, the dissociation constant ($K_D$) is in the range of about $10^{-3}$ M to about $10^{-10}$ M, or of about $10^{-3}$ M to about $10^{-9}$ M, or of about $10^{-3}$ M to about $10^{-8}$ M, or of about $10^{-3}$ M to about $10^{-7}$ M, or of about $10^{-3}$ M to about $10^{-6}$ M, or of about $10^{-3}$ M to about $10^{-5}$ M, or of about $10^{-3}$ M to about $10^{-4}$, or any number in between. In some embodiments, the dissociation constant ($K_D$) is in the range of about $10^{-3}$ M to about $10^{-7}$ M, or of about $10^{-3}$ M to about $0.5 \times 10^{-7}$ M, or of about $10^{-3}$ M to about $10^{-4}$ M, or of about $10^{-3}$ M to about $0.5 \times 10^4$ M, or of about $10^{-3}$ M to about $10^{-5}$ M, or of about $10^{-3}$ M to about $0.5 \times 10^{-5}$ M, or of about $10^{-3}$ M to about $10^{-4}$, or of about $10^{-3}$ M to about $0.5 \times 10^{-4}$, or any number in between.

In some embodiments, the dissociation rate constant ($k_{off}$) for the binding between the binding agent via the binding site and the surface molecule may have a value of about $3 \times 10^{-5}$ sec$^{-1}$ or greater (this dissociation rate constant is the constant characterizing the dissociation reaction of the complex formed between the binding site of the binding agent and the surface molecule on the surface of the target cell). The association rate constant ($k_{on}$) for the association reaction between the binding site of the binding agent and the surface molecule on the surface of the target cell may have any value. In order to ensure a sufficiently reversible binding between surface molecule and binding agent it is advantageous to select the $k_{off}$ value of the binding equilibrium to have a value of about $3 \times 10^{-5}$ sec$^{-1}$ or greater, of about $5 \times 10^{-5}$ sec$^{-1}$ or greater, such as about $1 \times 10^{-4}$ sec$^{-1}$ or greater, about $1.5 \times 10^{-4}$ sec$^{-1}$ or greater, about $2.0 \times 10^{-4}$ sec$^{-1}$ or greater, about $2.5 \times 10^{-4}$ sec$^{-1}$ or greater, about $3 \times 10^{-4}$ sec$^{-1}$ or greater, about $3.5 \times 10^{-4}$ sec$^{-1}$ or greater, about $4 \times 10^{-4}$ sec$^{-1}$ of greater, about $5 \times 10^{-4}$ sec$^{-1}$ or greater, about $7.5 \times 10^{-4}$ sec$^{-1}$ or greater, about $1 \times 10^{-3}$ sec$^{-1}$ or greater, about $1.5 \times 10^{-3}$ sec$^{-1}$ or greater, about $2 \times 10^{-3}$ sec$^{-1}$ or greater, about $2.5 \times 10^{-3}$ sec$^{-1}$ or greater, about $3 \times 10^{-3}$ sec$^{-1}$ or greater, about $4 \times 10^{-3}$ sec$^1$, about $5 \times 10^{-3}$ sec$^{-1}$ or greater, about $7.5 \times 10^{-3}$ sec$^{-1}$ or greater, about $1 \times 10^{-2}$ sec$^{-1}$ or greater, about $5 \times 10^{-2}$ sec$^{-1}$ or greater, about $1 \times 10^{-1}$ sec$^{-1}$ or greater or about $5 \times 10^{-1}$ sec$^{-1}$ or greater. The term "about" when used herein in relation to the $k_{off}$ rate, the $k_{on}$ rate or the $K_D$ (see below) is meant to include an error margin of 20.0%, including ±15.0%, ±10.0%, ±8.0%, ±9.0%, ±7.0%, ±6.0%, ±5.0%, ±4.5%, ±4.0.%, ±3.5%, ±3.0%, ±2.8%, ±2.6%, ±2.4,%, ±2.2%, ±2.0%, ±1.8%, ±1.6%, ±1.4%, ±1.2%, ±1.0%, ±0.9%, ±0.8%, ±0.7%, ±0.6%, ±0.5%, ±0.4%, ±0.3%, ±0.2%, ±0.1%, or ±0.01%. It is noted here that the values of the kinetic and thermodynamic constants as used herein, refer to conditions of atmospheric pressure, i.e. 1.013 bar, and room temperature, i.e. 25° C. In some embodiments, irrespective of the strength of the binding, meaning whether the dissociation constant ($K_d$) for the binding between the binding agent via the binding site and the surface molecule is of low affinity, for example, in the range of a $K_d$ of about $10^{-3}$ to about $10^{-7}$ M, or of high affinity, for example, in the range of a $K_d$ of about $10^{-7}$ to about $1 \times 10^{-10}$ M, a target cell can be reversibly bound as long as the dissociation of the binding of the binding agent via the binding site and the surface molecule occurs sufficiently fast.

In some embodiments the binding agent has a single (monovalent) binding site capable of specifically binding to the surface molecule. In some embodiments the binding agent has at least two (i.e., a plurality of binding sites including three, four or also five identical binding sites), capable of binding to the surface molecule. In any of these embodiment the binding of the surface molecule via (each of) the binding site(s) may have a $k_{off}$ value of about $3 \times 10^{-5}$ sec$^{-1}$ or greater. Thus, the binding agent can be monovalent (for example a monovalent antibody fragment or a monovalent artificial binding molecule (proteinaceous or other) such as a mutein based on a polypeptide of the lipocalin family (also known as "Anticalin®"), or a bivalent molecule such as an antibody or a fragment in which both binding sites are retained such as an F(ab')$_2$ fragment. In some embodiments the surface molecule may be a multivalent molecule such as a pentameric IgE molecule, provided the $k_{off}$ rate is $3 \times 10^{-5}$ sec$^{-1}$ or greater. In some embodiments, it is on a molecular level not the $k_{off}$ rate (of $3 \times 10^{-5}$ sec$^{-1}$ or greater) of the binding of the binding agent via the binding site and the surface molecule on the target cell that provides for the (traceless) isolation of biological material via reversible cell immunoaffinity chromatography technology described herein. Rather, and as described, for example, in U.S. Pat. No. 7,776,562 or International Patent application WO02/054065, a low affinity binding between the surface molecule and the binding site of the binding agent together with an avidity effect mediated via the multimerization reagent allows for a reversibly and traceless isolation of a target cell. As mentioned above, such a low binding affinity may be characterized by a dissociation constant ($K_D$) in the range from about $1.0 \times 10^{-3}$ M to about $1.0 \times 10^{-7}$ M for the binding of the binding agent via the binding site and the surface molecule on the target cell surface. In these embodiments a complex between the binding sites of the multimerization reagent and a binding partner (see below) included in at least two binding agents can form, allowing a reversible immobilization and subsequent elution of the target cells from the affinity chromatography matrix.

In some embodiments, addition of the competition reagent can disrupt the binding (complex) formed between the binding partner and the binding sites of the multimerization reagent, which in turn leads to the dissociation of the binding agent from the target cell.

In some embodiments, cells can be separated from a mixed population of cells to generate a cellular dataset, where the cells of the cellular dataset are free from the reagents and agents used to separate the cells. The separation methods provided herein allow for the generation of cellular datasets free of agents and reagents used to separate (e.g., isolate) the cells from the mixed population.

In some embodiments, the binding agent is immobilized. In some embodiments, the binding agent is fused or linked to a binding partner that interacts with a multimerization reagent immobilized on the matrix. In some embodiments, the binding capacity of the chromatography matrix is sufficient to adsorb or is capable of adsorbing at least $1 \times 10^7$ cells/mL, $5 \times 10^7$ cells/mL, $1 \times 10^8$ cells/mL, $5 \times 10^8$ cells/mL, $1 \times 10^9$ cells/ml or more, in which said cells are cells expressing a cell surface molecule specifically recognized by the binding site of the binding agent.

In some embodiments, the interaction between the multimerization reagent and binding partner forms a reversible bond, so that binding of the binding agent to the matrix is reversible. In some embodiments, the reversible binding can be mediated by a streptavidin mutant binding partner and a multimerization reagent immobilized on the matrix that is streptavidin, a streptavidin mutein, avidin or an avidin mutein.

In some embodiments, reversible binding of the binding agent, is via a peptide ligand binding reagent and streptavidin mutein interaction.

In some embodiments, the affinity-based selection employs a multimerization reagent including a streptavidin mutein, e.g. Strep-Tactin® or Strep-Tactin XT® (see e.g. U.S. Pat. No. 6,103,493, International Published PCT Appl. Nos. WO/2013011011, WO 2014/076277). In some embodiments, the streptavidin mutein is functionalized, coated and/or immobilized on the matrix.

In some embodiments, the streptavidin mutein exhibits a higher binding affinity for a peptide ligand containing the sequence of amino acids set forth in any of SEQ ID NOS:1-6, such as for example SEQ ID NO:5 and/or SEQ ID NO:6 (e.g. Strep-tag II®), than an unmodified or wild type streptavidin, such as an unmodified or wild type streptavidin set forth in SEQ ID NO: 11 or SEQ ID NO:14. In some embodiments, the streptavidin mutant exhibits a binding affinity as an affinity constant for such peptides that is greater than the binding affinity of wild type streptavidin for the same peptide by greater than 5-fold, 10-fold, 50-fold, 100-fold, 200-fold or greater.

The streptavidin mutein contains one or more amino acid differences compared to an unmodified streptavidin, such as a wild type streptavidin or fragment thereof. The term "unmodified streptavidin" refers to a starting polypeptide to which one or more modifications are made. In some embodiments, the starting or unmodified polypeptide may be a wild type polypeptide set forth in SEQ ID NO:11. In some embodiments, the unmodified streptavidin is a fragment of wild type streptavidin, which is shortened at the N- and/or C-terminus. Such minimal streptavidins include any that begin N-terminally in the region of amino acid positions 10 to 16 of SEQ ID NO:11 and terminate C-terminally in the region of amino acid positions 133 to 142 of SEQ ID NO:11. In some embodiments, the unmodified streptavidin has the sequence of amino acids set forth in SEQ ID NO:14. In some embodiments, the unmodified streptavidin, such as set forth in SEQ ID NO:14, can further contain an N-terminal methionine at a position corresponding to Ala13 with numbering as set forth in SEQ ID NO:11. Reference to number of residues in streptavidin provided herein is with reference to numbering of residues in SEQ ID NO:11.

The term "streptavidin mutein," "streptavidin mutant" or variations thereof, refers to a streptavidin protein that contains one or more amino acid differences compared to an unmodified or wild type streptavidin, such as a streptavidin set forth in SEQ ID NO: 11 or SEQ ID NO:14. The one or more amino acid differences can be amino acid mutations, such as one or more amino acid replacements (substitutions), insertions or deletions. In some embodiments, a streptavidin mutein can have at least 1, 2, 3, 4, 5, 6, 7, 8, 9, 10, 11, 12, 13, 14, 15, 16, 17, 18, 19 or 20 amino acid differences compared to a wild type or unmodified streptavidin. In some embodiments, the amino acid replacements (substitutions) are conservative or non-conservative mutations. The streptavidin mutein containing the one or more amino acid differences exhibits a binding affinity as an affinity constant that is greater than $2.7 \times 10^4$ $M^{-1}$ for the peptide ligand (Trp Arg His Pro Gln Phe Gly; also called Strep-Tag®, set forth in SEQ ID NO:5). In some embodiments, the streptavidin mutant exhibits a binding affinity as an affinity constant that is greater than $1.4 \times 10^4$ $M^{-1}$ for the peptide ligand (Trp Ser His Pro Gln Phe Glu Lys; also called Strep-Tag® II, set forth in SEQ ID NO:6). In some embodiments, binding affinity can be determined by methods known in the art, such as any described below.

In some embodiments, the streptavidin mutein contains a mutation at one or more residues 44, 45, 46, and/or 47. In some embodiments, the streptavidin mutant contains residues Val44-Thr45-Ala46-Arg47, such as set forth in exemplary streptavidin muteins set forth in SEQ ID NO: 12 or SEQ ID NO:15. In some embodiments, the streptavidin mutein contains residues Ile44-Gly45-Ala-46-Arg47, such as set forth in exemplary streptavidin muteins set forth in SEQ ID NO: 13 or 16. In some embodiments, the streptavidin mutein exhibits the sequence of amino acids set forth in SEQ ID NO: 12, 13, 15, 16, 20, 21, or 22, or a sequence of amino acids that exhibits at least 90%, 91%, 92%, 93%, 94%, 95%, 96%, 97%, 98%, 99% or more sequence identity to the sequence of amino acids set forth in SEQ ID NO:12, 13, 15 or 16, and exhibits a binding affinity that is greater than $2.7 \times 10^4$ $M^{-1}$ for the peptide ligand (Trp Arg His Pro Gln Phe Gly Gly; also called Strep-Tag®, set forth in SEQ ID NO:5) and/or greater than $1.4 \times 10^4$ $M^{-1}$ for the peptide ligand (Trp Ser His Pro Gln Phe Glu Lys; also called Strep-Tag® II, set forth in SEQ ID NO:6).

In some embodiment, the streptavidin mutein is a mutant as described in International Published PCT Appl. Nos. WO 2014/076277. In some embodiments, the streptavidin mutein contains at least two cysteine residues in the region of amino acid positions 44 to 53 with reference to amino acid positions set forth in SEQ ID NO:11. In some embodiments, the cysteine residues are present at positions 45 and 52 to create a disulfide bridge connecting these amino acids. In such an embodiment, amino acid 44 is typically glycine or alanine and amino acid 46 is typically alanine or glycine and amino acid 47 is typically arginine. In some embodiments, the streptavidin mutein contains at least one mutation or amino acid difference in the region of amino acids residues 115 to 121 with reference to amino acid positions set forth in SEQ ID NO:11. In some embodiments, the streptavidin mutein contains at least one mutation at amino acid position 117, 120 and 121 and/or a deletion of amino acids 118 and 119 and substitution of at least amino acid position 121.

In some embodiments, a streptavidin mutein can contain any of the above mutations in any combination, so long as the resulting streptavidin mutein exhibits a binding affinity that is greater than $2.7 \times 10^4$ $M^{-1}$ for the peptide ligand (Trp Arg His Pro Gln Phe Gly Gly; also called Strep-Tag®, set forth in SEQ ID NO:5) and/or greater than $1.4 \times 10^4$ $M^{-1}$ for the peptide ligand (Trp Ser His Pro Gln Phe Glu Lys; also called Strep-Tag® II, set forth in SEQ ID NO:6).

In some embodiments, the binding affinity of a streptavidin mutant for a peptide ligand binding reagent is greater than $5 \times 10^4$ $M^{-1}$, $1 \times 10^5$ $M^{-1}$, $5 \times 10^5$ $M^{-1}$, $1 \times 10^6$ $M^{-1}$, $5 \times 10^6$ $M^{-1}$ or $1 \times 10^7$ $M^{-1}$, but generally is less than $1 \times 10^{13}$ $M^{-1}$, $1 \times 10^{12}$ $M^{-1}$ or $1 \times 10^{11}$ $M^{-1}$.

In some embodiments, the streptavidin mutant also exhibits binding to other streptavidin ligands, such as but not limited to, biotin, iminobiotin, lipoic acid, desthiobiotin, diaminobiotin, HABA (hydroxyazobenzene-benzoic acid) or/and dimethyl-HABA. In some embodiments, the streptavidin muteins exhibits a binding affinity for another streptavidin ligand, such as biotin or desthiobiotin, that is greater than the binding affinity of the streptavidin mutein for the peptide ligand (Trp Arg His Pro Gln Phe Gly; also called Strep-Tag®, set forth in SEQ ID NO:5) or the peptide ligand (Trp Ser His Pro Gln Phe Glu Lys; also called Strep-Tag® II, set forth in SEQ ID NO:6).

In some embodiments, the streptavidin mutein is a multimer. Multimers can be generated using any methods known in the art, such as any described in published U.S. Patent Application No. US2004/0082012. In some embodiments, oligomers or polymers of muteins can be prepared by the introduction of carboxyl residues into a polysaccharide, e.g. dextran. In some aspects, streptavidin muteins then are coupled via primary amino groups of internal lysine residues and/or the free N-terminus to the carboxyl groups in the dextran backbone using conventional carbodiimide chemistry in a second step. In some embodiments, the coupling reaction is performed at a molar ratio of about 60 moles streptavidin mutant per mole of dextran. In some embodiments, oligomers or polymers of can also be obtained by crosslinking via bifunctional linkers, such as glutardialdehyde or by other methods known in the art.

In aspects of the chromatography matrix, the matrix, such as agarose beads or other matrix, is functionalized or conjugated a multimerization reagent, such as a streptavidin mutein, such as any described above, for example any set forth in SEQ ID NOS: 12, 13, 15, 16, 20, 21, or 22. In some embodiments, the antibody or antigen-binding fragment, such as a Fab, is fused or linked, directly or indirectly, to a peptide ligand capable of binding to a streptavidin mutant, such as any described above. In some embodiments, the peptide ligand is any as described above, such as a peptide containing the sequence of amino acids set forth in any of SEQ ID NOS:1-10 or 17-19. In some embodiments, the chromatography matrix column is contacted with such a binding agent to immobilize or reversibly bind the binding agent to the column.

In some embodiments, the immunoaffinity chromatography matrix can be used in enrichment and selection methods as described herein by contacting said matrix with a sample containing cells (e.g., mixed population) to be enriched or selected. In some embodiments, the selected cells are eluted or released from the matrix by disrupting the interaction of the binding partner/mutlimerization reagent. In some embodiments, binding partner/mutlimerization reagent is mediated by a peptide ligand and streptavidin mutant interaction, and the release of selected cells can be effected due to the presence of a reversible bond. For example, in some embodiments, the bond between the peptide ligand binding partner and streptavidin mutein binding reagent is high, such as described above, but is less than the binding affinity of the streptavidin binding reagent for biotin or a biotin analog. Hence, in some embodiments, biotin (Vitamin H) or a biotin analog can be added to compete for binding to disrupt the binding interaction between the streptavidin mutein binding reagent on the matrix and the peptide ligand binding partner associated with the antibody specifically bound to a cell marker on the surface. In some embodiments, the interaction can be reversed in the presence of low concentrations of biotin or analog, such as in the presence of 0.1 mM to 10 mM, 0.5 mM to 5 mM or 1 mM to 3 mM, such as generally at least or about at least 1 mM or at least 2 mM, for example at or about 2.5 mM. In some embodiments, elution in the presence of a competition reagent, such as a biotin or biotin analog, releases the selected cell from the matrix. In some embodiments, the competition reagent is biotin or a biotin analog.

In some embodiments, immunoaffinity chromatography in the provided methods is performed using at least two chromatography matrix columns that are operably connected. For example, binding agent including a monovalent binding site capable of binding to one of CD4 or CD8, such as an antibody, e.g. a Fab, is coupled to a first chromatography matrix in a first selection column and a binding agent including a monovalent binding site capable of binding to the to the other of CD4 or CD8, such as an antibody, e.g. a Fab, is coupled to a second chromatography matrix in a second selection column. In some embodiments, the at least two chromatography matrix columns are present in a closed system or apparatus, such as a closed system or apparatus that is sterile.

In some embodiments, also provided herein is a closed system or apparatus containing at least two chromatography matrix columns that are operably connected.

In some embodiments, the closed system is automated. In some embodiments, components associated with the system can include an integrated microcomputer, peristaltic pump, and various valves, such as pinch valves or stop cocks, to control flow of fluid between the various parts of the system. The integrated computer in some aspects controls all components of the instrument and directs the system to perform repeated procedures in a standardized sequence. In some embodiments, the peristaltic pump controls the flow rate throughout the tubing set and, together with the pinch valves, ensures the controlled flow of buffer through the system.

The washing buffer can be any physiological buffer that is compatible with cells, such as phosphate buffered saline. In some embodiments, the washing buffer contains bovine serum albumin, human serum albumin, or recombinant human serum albumin, such as at a concentration of 0.1% to 5% or 0.2% to 1%, such as or at about 0.5%. In some embodiments, the eluent is biotin or a biotin analog, such as desbiotin, for example in an amount that is or is about at least 0.5 mM, 1 mM, 1.5 mM, 2 mM, 2.5 mM, 3 mM, 4 mM, or 5 mM.

In some embodiments, separation of cells from a mixed population to generate a cellular dataset according to the methods described herein, occurs sequentially. For example, a first positive selection may occur on a first column, and a second selection, either of the positive fraction or negative fraction from the first selection, may occur on a second column. In some embodiments, separation of cells from a mixed population to generate a cellular dataset according to the methods described herein, occurs in parallel. For example, two positive selections may occur simultaneously on two different columns. In some embodiments, parallel selection (e.g., separation, isolation) may be accomplished by applying the mixed population to both columns simultaneously or nearly simultaneously. It is contemplated that any number of separation steps may be used to generate cellular datasets for training machine learning models.

II. Methods for Generating Engineered T Cells

In some embodiments, the methods of classifying cells provided herein can be used in connection with processes including manufacturing, generating, or producing a cell therapy. In some embodiments, the cell therapy includes cells, such as T cells, engineered with a recombinant receptor, such as a chimeric antigen receptor (CAR), e.g. CAR T cells. In some embodiments, the methods of classifying cells provided herein are used in connection with manufacturing, generating or producing a cell therapy, which can be carried out via a process that includes one or more processing steps, such as steps for the isolation, separation, selection, activation or stimulation, transduction, incubation, cultivation, expansion, washing, suspension, dilution, concentration, and/or formulation of the cells. In some embodiments, the process does not include steps for expansion. In some embodiments, the process does not include steps for cultivation. For example, in some embodiments, the process does not include steps described in Section II-D below. In some embodiments, the process that includes one or more processing steps, such as steps for the isolation, separation, selection, activation or stimulation, transduction, incubation, washing, suspension, dilution, concentration, and/or formulation of the cells. In some embodiments, a manufacturing process that does not include an expansion step is referred to as a non-expanded or minimally expanded process. A "non-expanded" process may also be referred to as a "minimally expanded" process. In some embodiments, a non-expanded or minimally expanded process may result in cells having undergone expansion despite the process not including a step for expansion. In some embodiments, the cells that are harvested may have undergone an incubation or cultivating step that includes a media composition designed to reduce, suppress, minimize, or eliminate expansion of a cell population as a whole. In some embodiments, the manufacturing process is a non-expanded or minimally expanded process.

In some embodiments, the methods of generating or producing a cell therapy include isolating cells from a subject, preparing, processing, culturing under one or more stimulating conditions. In some embodiments, the method includes processing steps carried out in an order in which: cells, e.g. primary cells, are first isolated, such as selected or separated, from a biological sample; selected cells are incubated with viral vector particles for transduction, optionally subsequent to a step of stimulating the isolated cells in the presence of a stimulation reagent; culturing the transduced cells, such as to expand or not expand the cells, or incubating the transduced cells, for example as in a non-expanded or minimally expanded process; and formulating the transduced cells in a composition. In some embodiments, the generated engineered cells are re-introduced into the same subject, before or after cryopreservation. In some embodiments, the cells during one or more steps of the steps, including before and/or after isolation, selection, transduction and/or cultivation, the cells can be cryopreserved, and subsequently thawed.

In some embodiments, the one or more processing steps can include one or more of (a) washing a biological sample containing cells (e.g., a whole blood sample, a buffy coat sample, a peripheral blood mononuclear cells (PBMC) sample, an unfractionated T cell sample, a lymphocyte sample, a white blood cell sample, an apheresis product, or a leukapheresis product), (b) isolating, e.g. selecting, from the sample a desired subset or population of cells (e.g., CD4+ and/or CD8+ T cells), for example, by incubation of cells with a selection or immunoaffinity reagent for immunoaffinity-based separation; c) incubating the isolated, such as selected cells, with viral vector particles, (d) culturing, cultivating, incubating, or, optionally, expanding the cells such using methods as described and (e) formulating the transduced cells, such as in a pharmaceutically acceptable buffer, cryopreservative or other suitable medium. In some embodiments, the methods can further include (e) stimulating cells by exposing cells to stimulating conditions, which can be performed prior to, during and/or subsequent to the incubation of cells with viral vector particles. In some embodiments, one or more further step of washing or suspending step, such as for dilution, concentration and/or buffer exchange of cells, can also be carried out prior to or subsequent to any of the above steps.

In some embodiments, the provided methods are carried out such that one, more, or all steps in the preparation of cells for clinical use, e.g., in adoptive cell therapy, are carried out without exposing the cells to non-sterile conditions and without the need to use a sterile room or cabinet. In some embodiments of such a process, the cells are isolated, separated or selected, transduced, washed, optionally activated or stimulated and formulated, all within a closed system. In some embodiments, the methods are carried out in an automated fashion. In some embodiments, one or more of the steps is carried out apart from the closed system or device.

In some embodiments, a closed system is used for carrying out one or more of the other processing steps of a method for manufacturing, generating or producing a cell therapy. In some embodiments, one or more or all of the processing steps, e.g., isolation, selection and/or enrichment, processing, incubation in connection with transduction and engineering, and formulation steps is carried out using a system, device, or apparatus in an integrated or self-contained system, and/or in an automated or programmable fashion. In some aspects, the system or apparatus includes a computer and/or computer program in communication with the system or apparatus, which allows a user to program, control, assess the outcome of, and/or adjust various aspects of the processing, isolation, engineering, and formulation steps. In one example, the system is a system as described in International Patent Application, Publication Number WO2009/072003, or US 20110003380 A1. In one example, the system is a system as described in International Publication Number WO2016/073602. In some embodiments, methods of classifying cells as described herein are integrated with the system or apparatus such that the outcome of the classification process can be used to control and/or adjust various aspects of the processing, isolation, engineering, and formulation steps. For example, the methods of classifying cells described herein may be used to determine cell healthy (viable (live), dead), cell type, and/or cells expressing a recombinant molecule, such as determining (e.g., predicting) percentage, total number, and/or concentration of viable cells, cell type (e.g., CD4+, CD8+), and/or recombinant molecule positive cells (e.g., CAR+, CAR−). This information can be used to inform processing, isolation, engineering, formulation, and/or harvesting steps. The output of the classification process can be used by an operator (e.g., a human operator), directly interface with the system or apparatus, or a combination of both, to program, control, assess the outcome of, and/or adjust various aspects of the processing, isolation, engineering, harvesting, and formulation steps.

In some embodiments, the methods of classifying cells provided herein are carried out at any time during the manufacturing process. In some embodiments, the methods of classifying cells provided herein are carried out at any step of the manufacturing process. In some embodiments, the methods of classifying cells provided herein are carried out during one or more step of the manufacturing process. In some embodiments, the classification methods provided herein are carried out during a specific step of the manufacturing process, such as a step of a manufacturing process described herein. In some embodiments, the classification methods provided herein are carried out during an incubation, cultivation, or expansion step of the manufacturing process, such as an incubation, cultivation, or expansion step as described herein. In some embodiments, the classification methods provided herein are carried out during an incubation step.

In some embodiments, the methods of classifying cells provided herein are used to guide stimulating conditions, engineering conditions, incubation conditions, and cultivating conditions of the manufacturing process. In some embodiments, the classification methods provided herein are useful for determining the need to modify stimulating conditions, engineering conditions, incubation conditions, and cultivating conditions. For example, determining cell health, identifying cell types, and determining viable concentration may be useful for determining perfusion and/or feeding schedules, the need for reducing or adding cytokines during stimulating conditions, detecting a concentration of activated or differentiated T cells, determining whether the mixed population contains a proper concentration of viable cells and/or viable cell subtypes to be transduced or transfected, determining concentrations of successfully transduced cells, and/or determining concentrations of viable cells, viable transduced/transfected cell, viable transduced/transfected cell subtypes to determine the harvesting. As described above, methods of classifying cells as described herein may output information that can be used by an operator (e.g., human operator), a computer, and/or a system capable of receiving or interfacing with the classification process output.

In some embodiments, the methods of classifying cells provided herein are carried out in the closed system as described herein. In some embodiments, the methods of classifying cells provided herein are carried out in a sterile configuration. For example, an imaging apparatus (e.g., DDHM microscope) may be sterilely connected to a chamber in which the cell population is held. In some embodiments, the sterile connection is a closed loop system between the imaging apparatus (e.g., microscope) and the chamber, wherein the cells of the population are transported to the imaging apparatus for imaging and subsequently returned to the chamber. In some embodiments, the chamber is an incubation chamber. In some embodiments, the chamber is a bioreactor. In some embodiments, the transfer of the cells from the chamber to the imaging apparatus (e.g., DDHM microscope) and back to the chamber is automatic. For example, the closed loop connection may use a pump, which allows for non-damaging circulation of cells from the chamber to the imaging apparatus (e.g., DDHM microscope) and back to the chamber at set intervals. In some embodiments, the transfer of the cells from the chamber to the imaging apparatus (e.g., DDHM microscope) and back to the chamber includes an operator (e.g., human operator). For example, an operator (e.g. human operator) may determine the time intervals for imaging cells in the closed loop system. In some embodiments, an operator (e.g. human operator) may image cells in the closed loop system at one or more discrete time points, for example at the operator's discretion.

In some embodiments, the methods of classifying cells provided herein support a fully automated, e.g., without the need for manual (e.g., human operator) input, manufacturing process. In some embodiments, the fully automated system is a closed-loop system. In some embodiments, the fully automated, closed-loop system efficiently and reliably produces sterile, viable populations of engineered cells, including specific cell types (e.g., CD4+, CD8+, CAR+, TCR+) at specific ratios or total numbers of cells, for cell therapy (e.g., adoptive cell therapy, autologous cell therapy).

Classification may be performed, for example, to ascertain (e.g., measure, quantify) cell health (cell viability, cell death), cell subtype (CD4+, CD8+ T cell), and/or engineering status (e.g., whether a T cell expresses a recombinant receptor (e.g., a chimeric antigen receptor (CAR), T cell receptor (TCR)). In some embodiments, classification is performed to determine the total number, percentage, and/or concentration of viable cells, the total number, percentage, and/or concentration of cell subtypes (e.g., CD4+, CD8+), and/or the total number, percentage, and/or concentration of cells expressing a recombinant receptor. In some embodiments, the methods of classification described herein are included in an automated system. For example, the methods of classifying cells described herein may be stored and/or executed on a computer which interfaces with an imaging apparatus (e.g., microscope) that is connected to a cultivation (e.g., incubation) chamber, such as a bioreactor, containing the cells. As a further example, the computer containing the classification methods may interface or otherwise be able to communicate with equipment or apparatus used to control a particular step. In this way, the output of the classification methods may be used to control the equipment or apparatus. For example, output of the classification methods may be used to determine feeding cycles, media composition (e.g., cytokine concentrations), and/or harvest time. The automated system may require minimal or no manual (e.g., human operator) input to classify the cultivated cells. In some embodiments, manual (e.g., human operator) input is required.

In some embodiments, the automated system is compatible with a bioreactor, for example a bioreactor as described herein, such that cells can be removed from the bioreactor, imaged (e.g., for purposes of obtaining image data and/or input features as described above), and subsequently returned to the bioreactor. In some embodiments, the classification and cultivation occur in a closed loop configuration. In some aspects, in a closed loop configuration, the automated system and bioreactor remain sterile. In embodiments, the automated system is sterile. In some embodiments, the automated system is an in-line system.

In some embodiments, the automated system includes an imaging apparatus suitable for imaging cells in a liquid suspension. Any imaging technique suitable for imaging cells in a suspension is contemplated. Non-limiting examples of useful imaging techniques include bright field microscopy, fluorescence microscopy, differential interference microscopy, phase contrast microscopy, digital holography microscopy (DHM), differential digital holography microscopy (DDHM), or a combination thereof. In certain embodiments, the automated system includes a differential digital holography microscope. In certain embodiments, the automated system includes a differential digital holography microscope including illumination means (e.g., laser, led). Descriptions of DDHM methodology and use may be found, for example, in U.S. Pat. No. 7,362,449; EP 1,631,788; U.S. Pat. Nos. 9,904,248; and 9,684,281, which are incorporated herein by reference in their entirety, and in Section I-A-1 above.

In some embodiments, the automated system includes a digital recording device to record the output of the imaging technique (e.g., DDHM). In some embodiments, the device is a CCD camera or a CMOS camera. In some embodiments, the automated system includes a computer including algorithms for analyzing the images. In some embodiments, the automated system includes a computer including algorithms for extracting image data (e.g., phase, intensity, superposition, such as described in Section I-B above) from the recorded image. In some embodiments, the automated system includes a monitor and/or computer for displaying the images. In some embodiments, the automated system includes a computer including algorithms for extracting input features, such as described in Section I-B above, from the recorded image and/or image data. In some embodiments, the analysis is automated (i.e., capable of being performed in the absence of user input). In some embodiments, the automated system includes a computer including a machine learning model as described herein, which is able to receive image data and/or input features associated with the images cells and perform classification. An example of a suitable automated system for monitoring cells includes, but is not limited to, Ovizio iLine F (Ovizio Imaging Systems NV/SA, Brussels, Belgium).

In certain embodiments, the classification methods are performed continuously. In some embodiments, the classification methods are performed in real-time. In some embodiments, the classification methods are performed at discrete time points. In some embodiments, the classification methods are performed at least every 15 minutes for the duration of the cultivating step. In some embodiments, the classification methods are performed at least every 30 minutes for the duration of the cultivating step. In some embodiments, the classification methods are performed at least every 45 minutes for the duration of the cultivating step. In some embodiments, the classification methods are performed at least every hour for the duration of the cultivating step. In some embodiments, the classification methods are performed at least every 2 hours for the duration of the cultivating step. In some embodiments, the classification methods are performed at least every 4 hours for the duration of the cultivating step. In some embodiments, the classification methods are performed at least every 6 hours for the duration of the cultivating step. In some embodiments, the classification methods are performed at least every 8 hours for the duration of the cultivating step. In some embodiments, the classification methods are performed at least every 10 hours for the duration of the cultivating step. In some embodiments, the classification methods are performed at least every 12 hours for the duration of the cultivating step. In some embodiments, the classification methods are performed at least every 14 hours for the duration of the cultivating step. In some embodiments, the classification methods are performed at least every 16 hours for the duration of the cultivating step. In some embodiments, the classification methods are performed at least every 18 hours for the duration of the cultivating step. In some embodiments, the classification methods are performed at least every 20 hours for the duration of the cultivating step. In some embodiments, the classification methods are performed at least every 22 hours for the duration of the cultivating step. In some embodiments, the classification methods are performed at least once a day for the duration of the cultivating step. In some embodiments, the classification methods are performed at least once every second day for the duration of the cultivating step. In some embodiments, the classification methods are performed at least once every third day for the duration of the cultivating step. In some embodiments, the classification methods are performed at least once every fourth day for the duration of the cultivating step. In some embodiments, the classification methods are performed at least once every fifth day for the duration of the cultivating step. In some embodiments, the classification methods are performed at least once every sixth day for the duration of the cultivating step. In some embodiments, the classification methods are performed at least once every seventh day for the duration of the cultivating step. In some embodiments, the classification methods are performed at least once every eighth day for the duration of the cultivating step. In some embodiments, the classification methods are performed at least once every ninth day for the duration of the cultivating step. In some embodiments, the classification methods are performed at least once every tenth day for the duration of the cultivating step. In some embodiments, the classification methods are performed at least once during the cultivating step.

In some embodiments, for example in a process including an expansion step, the cells are monitored by the automated system including the classification methods until a threshold of expansion is reached. In some embodiments, once a threshold of expansion is reached, the cells are harvested, such as by automatic or manual methods, for example, by a human operator. The threshold of expansion may depend on the total concentration, density and/or number of cultured cells determined by the automated system. Alternatively, the threshold of expansion may depend on the viable cell concentration, density and/or number.

A. Isolation and Selection of Cells

In some embodiments, the processing steps include isolation of cells or compositions thereof from biological samples, such as those obtained from or derived from a subject, such as one having a particular disease or condition or in need of a cell therapy or to which cell therapy will be administered. In some aspects, the subject is a human, such as a subject who is a patient in need of a particular therapeutic intervention, such as the adoptive cell therapy for which cells are being isolated, processed, and/or engineered. Accordingly, the cells in some embodiments are primary cells, e.g., primary human cells. In some embodiments, the cells comprise CD4+ and CD8+ T cells. In some embodiments, the cells comprise CD4+ or CD8+ T cells. The samples include tissue, fluid, and other samples taken directly from the subject. The biological sample can be a sample obtained directly from a biological source or a sample that is processed. Biological samples include, but are not limited to, body fluids, such as blood, plasma, serum, cerebrospinal fluid, synovial fluid, urine and sweat, tissue and organ samples, including processed samples derived therefrom.

In some aspects, the sample is blood or a blood-derived sample, or is or is derived from an apheresis or leukapheresis product. Exemplary samples include whole blood, peripheral blood mononuclear cells (PBMCs), leukocytes, bone marrow, thymus, tissue biopsy, tumor, leukemia, lymphoma, lymph node, gut associated lymphoid tissue, mucosa associated lymphoid tissue, spleen, other lymphoid tissues, liver, lung, stomach, intestine, colon, kidney, pancreas, breast, bone, prostate, cervix, testes, ovaries, tonsil, or other organ, and/or cells derived therefrom. Samples include, in the context of cell therapy, e.g., adoptive cell therapy, samples from autologous and allogeneic sources.

In some examples, cells from the circulating blood of a subject are obtained, e.g., by apheresis or leukapheresis. The samples, in some aspects, contain lymphocytes, including T cells, monocytes, granulocytes, B cells, other nucleated white blood cells, red blood cells, and/or platelets, and in some aspects contains cells other than red blood cells and platelets.

In some embodiments, the blood cells collected from the subject are washed, e.g., to remove the plasma fraction and to place the cells in an appropriate buffer or media for subsequent processing steps. In some embodiments, the cells are washed with phosphate buffered saline (PBS). In some embodiments, the wash solution lacks calcium and/or magnesium and/or many or all divalent cations. In some aspects, a washing step is accomplished a semi-automated "flow-through" centrifuge (for example, the Cobe 2991 cell processor, Baxter) according to the manufacturer's instructions. In some aspects, a washing step is accomplished by tangential flow filtration (TFF) according to the manufacturer's instructions. In some embodiments, the cells are resuspended in a variety of biocompatible buffers after washing, such as, for example, $Ca^{++}/Mg^{++}$ free PBS. In certain embodiments, components of a blood cell sample are removed and the cells directly resuspended in culture media.

In some embodiments, the preparation methods include steps for freezing, e.g., cryopreserving, the cells, either before or after isolation, selection and/or enrichment and/or incubation for transduction and engineering, and/or after cultivation and/or harvesting of the engineered cell. Exemplary methods for freezing, cryopreservation or cryogenic preservation of biological samples, such as T cells or T cell compositions, include those described in WO2018170188, which is incorporated by reference in its entirety. In some embodiments, the freeze and subsequent thaw step removes granulocytes and, to some extent, monocytes in the cell population. In some embodiments, the cells are suspended in a freezing solution, e.g., following a washing step to remove plasma and platelets. Any of a variety of known freezing solutions and parameters in some aspects may be used. In some embodiments, the cells are frozen, e.g., cryopreserved or cryoprotected, in media and/or solution with a final concentration of or of about 12.5%, 12.0%, 11.5%, 11.0%, 10.5%, 10.0%, 9.5%, 9.0%, 8.5%, 8.0%, 7.5%, 7.0%, 6.5%, 6.0%, 5.5%, or 5.0% DMSO, or between 1% and 15%, between 6% and 12%, between 5% and 10%, or between 6% and 8% DMSO. In particular embodiments, the cells are frozen, e.g., cryopreserved or cryoprotected, in media and/or solution with a final concentration of or of about 5.0%, 4.5%, 4.0%, 3.5%, 3.0%, 2.5%, 2.0%, 1.5%, 1.25%, 1.0%, 0.75%, 0.5%, or 0.25% HSA, or between 0.1% and −5%, between 0.25% and 4%, between 0.5% and 2%, or between 1% and 2% HSA. One example involves using PBS containing 20% DMSO and 8% human serum albumin (HSA), or other suitable cell freezing media. This is then diluted 1:1 with media so that the final concentration of DMSO and HSA are 10% and 4%, respectively. The cells are generally then frozen to or to about −80° C. at a rate of or of about 1° C. per minute and stored in the vapor phase of a liquid nitrogen storage tank.

In some embodiments, isolation of the cells or populations includes one or more preparation and/or non-affinity based cell separation steps. In some examples, cells are washed, centrifuged, and/or incubated in the presence of one or more reagents, for example, to remove unwanted components, enrich for desired components, lyse or remove cells sensitive to particular reagents. In some examples, cells are separated based on one or more property, such as density, adherent properties, size, sensitivity and/or resistance to particular components. In some embodiments, the methods include density-based cell separation methods, such as the preparation of white blood cells from peripheral blood by lysing the red blood cells and centrifugation through a Percoll or Ficoll gradient.

In some embodiments, at least a portion of the selection step includes incubation of cells with a selection reagent. The incubation with a selection reagent or reagents, e.g., as part of selection methods which may be performed using one or more selection reagents for selection of one or more different cell types based on the expression or presence in or on the cell of one or more specific molecules, such as surface markers, e.g., surface proteins, intracellular markers, or nucleic acid. In some embodiments, any known method using a selection reagent or reagents for separation based on such markers may be used. In some embodiments, the selection reagent or reagents result in a separation that is affinity- or immunoaffinity-based separation. For example, the selection in some aspects includes incubation with a reagent or reagents for separation of cells and cell populations based on the cells' expression or expression level of one or more markers, typically cell surface markers, for example, by incubation with an antibody or binding partner that specifically binds to such markers, followed generally by washing steps and separation of cells having bound the antibody or binding partner, from those cells having not bound to the antibody or binding partner. In some embodiments, the selection and/or other aspects of the process is as described in International Patent Application Publication Number WO/2015/164675.

In some aspects of such processes, a volume of cells is mixed with an amount of a desired affinity-based selection reagent. The immunoaffinity-based selection can be carried out using any system or method that results in a favorable energetic interaction between the cells being separated and the molecule specifically binding to the marker on the cell, e.g., the antibody or other binding partner on the solid surface, e.g., particle. In some embodiments, methods are carried out using particles such as beads, e.g. magnetic beads, that are coated with a selection agent (e.g. antibody) specific to the marker of the cells. The particles (e.g. beads) can be incubated or mixed with cells in a container, such as a tube or bag, while shaking or mixing, with a constant cell density-to-particle (e.g., bead) ratio to aid in promoting energetically favored interactions. In other cases, the methods include selection of cells in which all or a portion of the selection is carried out in the internal cavity of a centrifugal chamber, for example, under centrifugal rotation. In some embodiments, incubation of cells with selection reagents, such as immunoaffinity-based selection reagents, is performed in a centrifugal chamber. In certain embodiments, the isolation or separation is carried out using a system, device, or apparatus described in International Patent Application, Publication Number WO2009/072003, or US 20110003380 A1. In one example, the system is a system as described in International Publication Number WO2016/073602.

In some embodiments, by conducting such selection steps or portions thereof (e.g., incubation with antibody-coated particles, e.g., magnetic beads) in the cavity of a centrifugal chamber, the user is able to control certain parameters, such as volume of various solutions, addition of solution during processing and timing thereof, which can provide advantages compared to other available methods. For example, the ability to decrease the liquid volume in the cavity during the incubation can increase the concentration of the particles (e.g. bead reagent) used in the selection, and thus the chemical potential of the solution, without affecting the total number of cells in the cavity. This in turn can enhance the pairwise interactions between the cells being processed and the particles used for selection. In some embodiments, carrying out the incubation step in the chamber, e.g., when associated with the systems, circuitry, and control as described herein, permits the user to effect agitation of the solution at desired time(s) during the incubation, which also can improve the interaction.

In some embodiments, at least a portion of the selection step is performed in a centrifugal chamber, which includes incubation of cells with a selection reagent. In some aspects of such processes, a volume of cells is mixed with an amount of a desired affinity-based selection reagent that is far less than is normally employed when performing similar selections in a tube or container for selection of the same number of cells and/or volume of cells according to manufacturer's instructions. In some embodiments, an amount of selection reagent or reagents that is/are no more than 5%, no more than 10%, no more than 15%, no more than 20%, no more than 25%, no more than 50%, no more than 60%, no more than 70% or no more than 80% of the amount of the same selection reagent(s) employed for selection of cells in a tube or container-based incubation for the same number of cells and/or the same volume of cells according to manufacturer's instructions is employed.

In some embodiments, for selection, e.g., immunoaffinity-based selection of the cells, the cells are incubated in the cavity of the chamber in a composition that also contains the selection buffer with a selection reagent, such as a molecule that specifically binds to a surface marker on a cell that it desired to enrich and/or deplete, but not on other cells in the composition, such as an antibody, which optionally is coupled to a scaffold such as a polymer or surface, e.g., bead, e.g., magnetic bead, such as magnetic beads coupled to monoclonal antibodies specific for CD4 and CD8. In some embodiments, as described, the selection reagent is added to cells in the cavity of the chamber in an amount that is substantially less than (e.g. is no more than 5%, 10%, 20%, 30%, 40%, 50%, 60%, 70% or 80% of the amount) as compared to the amount of the selection reagent that is typically used or would be necessary to achieve about the same or similar efficiency of selection of the same number of cells or the same volume of cells when selection is performed in a tube with shaking or rotation. In some embodiments, the incubation is performed with the addition of a selection buffer to the cells and selection reagent to achieve a target volume with incubation of the reagent of, for example, 10 mL to 200 mL, such as at least or about at least or about or 10 mL, 20 mL, 30 mL, 40 mL, 50 mL, 60 mL, 70 mL, 80 mL, 90 mL, 100 mL, 150 mL or 200 mL. In some embodiments, the selection buffer and selection reagent are pre-mixed before addition to the cells. In some embodiments, the selection buffer and selection reagent are separately added to the cells. In some embodiments, the selection incubation is carried out with periodic gentle mixing condition, which can aid in promoting energetically favored interactions and thereby permit the use of less overall selection reagent while achieving a high selection efficiency.

In some embodiments, the total duration of the incubation with the selection reagent is from 5 minutes to 6 hours or from about 5 minutes to about 6 hours, such as 30 minutes to 3 hours, for example, at least or about at least 30 minutes, 60 minutes, 120 minutes or 180 minutes.

In some embodiments, the incubation generally is carried out under mixing conditions, such as in the presence of spinning, generally at relatively low force or speed, such as speed lower than that used to pellet the cells, such as from 600 rpm to 1700 rpm or from about 600 rpm to about 1700 rpm (e.g. at or about or at least 600 rpm, 1000 rpm, or 1500 rpm or 1700 rpm), such as at an RCF at the sample or wall of the chamber or other container of from 80 g to 100 g or from about 80 g to about 100 g (e.g. at or about or at least 80 g, 85 g, 90 g, 95 g, or 100 g). In some embodiments, the spin is carried out using repeated intervals of a spin at such low speed followed by a rest period, such as a spin and/or rest for 1, 2, 3, 4, 5, 6, 7, 8, 9, or 10 seconds, such as a spin at approximately 1 or 2 seconds followed by a rest for approximately 5, 6, 7, or 8 seconds.

In some embodiments, such process is carried out within the entirely closed system to which the chamber is integral. In some embodiments, this process (and in some aspects also one or more additional step, such as a previous wash step washing a sample containing the cells, such as an apheresis sample) is carried out in an automated fashion, such that the cells, reagent, and other components are drawn into and pushed out of the chamber at appropriate times and centrifugation effected, so as to complete the wash and binding step in a single closed system using an automated program.

In some embodiments, after the incubation and/or mixing of the cells and selection reagent and/or reagents, the incubated cells are subjected to a separation to select for cells based on the presence or absence of the particular reagent or reagents. In some embodiments, the separation is performed in the same closed system in which the incubation of cells with the selection reagent was performed. In some embodiments, after incubation with the selection reagents, incubated cells, including cells in which the selection reagent has bound are transferred into a system for immunoaffinity-based separation of the cells. In some embodiments, the system for immunoaffinity-based separation is or contains a magnetic separation column.

Such separation steps can be based on positive selection, in which the cells having bound the reagents, e.g. antibody or binding partner, are retained for further use, and/or negative selection, in which the cells having not bound to the reagent, e.g., antibody or binding partner, are retained. In some examples, both fractions are retained for further use. In some aspects, negative selection can be particularly useful where no antibody is available that specifically identifies a cell type in a heterogeneous population, such that separation is best carried out based on markers expressed by cells other than the desired population.

In some embodiments, the process steps further include negative and/or positive selection of the incubated and cells, such as using a system or apparatus that can perform an affinity-based selection. In some embodiments, isolation is carried out by enrichment for a particular cell population by positive selection, or depletion of a particular cell population, by negative selection. In some embodiments, positive or negative selection is accomplished by incubating cells with one or more antibodies or other binding agent that specifically bind to one or more surface markers expressed or expressed (marker+) at a relatively higher level (marker$^{high}$) on the positively or negatively selected cells, respectively. Multiple rounds of the same selection step, e.g., positive or negative selection step, can be performed. In certain embodiments, the positively or negatively selected fraction subjected to the process for selection, such as by repeating a positive or negative selection step. In some embodiments, selection is repeated twice, three times, four times, five times, six times, seven times, eight times, nine times or more than nine times. In certain embodiments, the same selection is performed up to five times. In certain embodiments, the same selection step is performed three times.

The separation need not result in 100% enrichment or removal of a particular cell population or cells expressing a particular marker. For example, positive selection of or enrichment for cells of a particular type, such as those expressing a marker, refers to increasing the number or percentage of such cells, but need not result in a complete absence of cells not expressing the marker. Likewise, negative selection, removal, or depletion of cells of a particular type, such as those expressing a marker, refers to decreasing the number or percentage of such cells, but need not result in a complete removal of all such cells.

In some examples, multiple rounds of separation steps are carried out, where the positively or negatively selected fraction from one step is subjected to another separation step, such as a subsequent positive or negative selection. In some examples, a single separation step can deplete cells expressing multiple markers simultaneously, such as by incubating cells with a plurality of antibodies or binding partners, each specific for a marker targeted for negative selection. Likewise, multiple cell types can simultaneously be positively selected by incubating cells with a plurality of antibodies or binding partners expressed on the various cell types. In certain embodiments, one or more separation steps are repeated and/or performed more than once. In some embodiments, the positively or negatively selected fraction resulting from a separation step is subjected to the same separation step, such as by repeating the positive or negative selection step. In some embodiments, a single separation step is repeated and/or performed more than once, for example, to increase the yield of positively selected cells, to increase the purity of negatively selected cells, and/or to further remove the positively selected cells from the negatively selected fraction. In certain embodiments, one or more separation steps are performed and/or repeated two times, three times, four times, five times, six times, seven times, eight times, nine times, ten times, or more than ten times. In certain embodiments, the one or more selection steps are performed and/or repeated between one and ten times, between one and five times, or between three and five times. In certain embodiments, one or more selection steps are repeated three times.

For example, in some aspects, specific subpopulations of T cells, such as cells positive or expressing high levels of one or more surface markers, e.g., CD28+, CD62L+, CCR7+, CD27+, CD127+, CD4+, CD8+, CD45RA+, and/or CD45RO+ T cells, are isolated by positive or negative selection techniques. In some embodiments, such cells are selected by incubation with one or more antibody or binding partner that specifically binds to such markers. In some embodiments, the antibody or binding partner can be conjugated, such as directly or indirectly, to a solid support or matrix to effect selection, such as a magnetic bead or paramagnetic bead. For example, CD3+, CD28+ T cells can be positively selected using anti-CD3/anti-CD28 conjugated magnetic beads (e.g., DYNABEADS® M-450 CD3/CD28 T Cell Expander, and/or ExpACT® beads).

In some embodiments, T cells are separated from a PBMC sample by negative selection of markers expressed on non-T cells, such as B cells, monocytes, or other white blood cells, such as CD14. In some aspects, a CD4+ or CD8+ selection step is used to separate CD4+ helper and CD8+ cytotoxic T cells. Such CD4+ and CD8+ populations can be further sorted into sub-populations by positive or negative selection for markers expressed or expressed to a relatively higher degree on one or more naive, memory, and/or effector T cell subpopulations.

In some embodiments, CD8+ T cells are further enriched for or depleted of naive, central memory, effector memory, and/or central memory stem cells, such as by positive or negative selection based on surface antigens associated with the respective subpopulation. In some embodiments, enrichment for central memory T (TCM) cells is carried out to increase efficacy, such as to improve long-term survival, expansion, and/or engraftment following administration, which in some aspects is particularly robust in such subpopulations. See Terakura et al., (2012) Blood. 1:72-82; Wang et al. (2012) J Immunother. 35(9):689-701. In some embodiments, combining TCM-enriched CD8+ T cells and CD4+ T cells further enhances efficacy.

In embodiments, memory T cells are present in both CD62L+ and CD62L− subsets of CD8+ peripheral blood lymphocytes. PBMC can be enriched for or depleted of CD62L-CD8+ and/or CD62L+CD8+ fractions, such as using anti-CD8 and anti-CD62L antibodies.

In some embodiments, the enrichment for central memory T (TCM) cells is based on positive or high surface expression of CD45RO, CD62L, CCR7, CD28, CD3, and/or CD 127; in some aspects, it is based on negative selection for cells expressing or highly expressing CD45RA and/or granzyme B. In some aspects, isolation of a CD8+ population enriched for TCM cells is carried out by depletion of cells expressing CD4, CD14, CD45RA, and positive selection or enrichment for cells expressing CD62L. In one aspect, enrichment for central memory T (TCM) cells is carried out starting with a negative fraction of cells selected based on CD4 expression, which is subjected to a negative selection based on expression of CD14 and CD45RA, and a positive selection based on CD62L.

Such selections in some aspects are carried out simultaneously and in other aspects are carried out sequentially, in either order. In some aspects, the same CD4 expression-based selection step used in preparing the CD8+ T cell population or subpopulation, also is used to generate the CD4+ T cell population or sub-population, such that both the positive and negative fractions from the CD4-based separation are retained and used in subsequent steps of the methods, optionally following one or more further positive or negative selection steps. In some embodiments, the selection for the CD4+ T cell population and the selection for the CD8+ T cell population are carried out simultaneously. In some embodiments, the CD4+ T cell population and the selection for the CD8+ T cell population are carried out sequentially, in either order. In some embodiments, methods for selecting cells can include those as described in published U.S. App. No. US20170037369. In some embodiments, the selected CD4+ T cell population and the selected CD8+ T cell population may be combined subsequent to the selecting. In some aspects, the selected CD4+ T cell population and the selected CD8+ T cell population may be combined in a container or a bag, such as a bioreactor bag. In some embodiments, the selected CD4+ T cell population and the selected CD8+ T cell population are separately processed, whereby the selected CD4+ T cell population is enriched in CD4+ T cells and incubated with a stimulatory reagent (e.g. anti-CD3/anti-CD28 magnetic beads), transduced with a viral vector encoding a recombinant protein (e.g. CAR) and cultivated under conditions to expand T cells and the selected CD8+ T cell population is enriched in CD8+ T cell and incubated with a stimulatory reagent (e.g. anti-CD3/anti-CD28 magnetic beads), transduced with a viral vector encoding a recombinant protein (e.g. CAR), the same recombinant protein as for engineering of the CD4+ T cells from the same donor, and cultivated under conditions to expand T cells, such as in accord with the provided methods.

In particular embodiments, a biological sample, e.g., a sample of PBMCs or other white blood cells, are subjected to selection of CD4+ T cells, where both the negative and positive fractions are retained. In certain embodiments, CD8+ T cells are selected from the negative fraction. In some embodiments, a biological sample is subjected to selection of CD8+ T cells, where both the negative and positive fractions are retained. In certain embodiments, CD4+ T cells are selected from the negative fraction.

In a particular example, a sample of PBMCs or other white blood cell sample is subjected to selection of CD4+ T cells, where both the negative and positive fractions are retained. The negative fraction then is subjected to negative selection based on expression of CD14 and CD45RA or CD19, and positive selection based on a marker characteristic of central memory T cells, such as CD62L or CCR7, where the positive and negative selections are carried out in either order.

CD4+T helper cells may be sorted into naïve, central memory, and effector cells by identifying cell populations that have cell surface antigens. CD4+ lymphocytes can be obtained by standard methods. In some embodiments, naive CD4+T lymphocytes are CD45RO−, CD45RA+, CD62L+, or CD4+ T cells. In some embodiments, central memory CD4+ T cells are CD62L+ and CD45RO+. In some embodiments, effector CD4+ T cells are CD62L− and CD45RO−.

In one example, to enrich for CD4+ T cells by negative selection, a monoclonal antibody cocktail typically includes antibodies to CD14, CD20, CD11b, CD16, HLA-DR, and CD8. In some embodiments, the antibody or binding partner is bound to a solid support or matrix, such as a magnetic bead or paramagnetic bead, to allow for separation of cells for positive and/or negative selection. For example, in some embodiments, the cells and cell populations are separated or isolated using immunomagnetic (or affinitymagnetic) separation techniques (reviewed in Methods in Molecular Medicine, vol. 58: Metastasis Research Protocols, Vol. 2: Cell Behavior In Vitro and In Vivo, p 17-25 Edited by: S. A. Brooks and U. Schumacher C Humana Press Inc., Totowa, NJ).

In some aspects, the incubated sample or composition of cells to be separated is incubated with a selection reagent containing small, magnetizable or magnetically responsive material, such as magnetically responsive particles or microparticles, such as paramagnetic beads (e.g., such as Dynalbeads or MACS® beads). The magnetically responsive material, e.g., particle, generally is directly or indirectly attached to a binding partner, e.g., an antibody, that specifically binds to a molecule, e.g., surface marker, present on the cell, cells, or population of cells that it is desired to separate, e.g., that it is desired to negatively or positively select.

In some embodiments, the magnetic particle or bead comprises a magnetically responsive material bound to a specific binding member, such as an antibody or other binding partner. Many well-known magnetically responsive materials for use in magnetic separation methods are known, e.g., those described in Molday, U.S. Pat. No. 4,452,773, and in European Patent Specification EP 452342 B, which are hereby incorporated by reference. Colloidal sized particles, such as those described in Owen U.S. Pat. No. 4,795,698, and Liberti et al., U.S. Pat. No. 5,200,084 also may be used.

The incubation generally is carried out under conditions whereby the antibodies or binding partners, or molecules, such as secondary antibodies or other reagents, which specifically bind to such antibodies or binding partners, which are attached to the magnetic particle or bead, specifically bind to cell surface molecules if present on cells within the sample.

In certain embodiments, the magnetically responsive particles are coated in primary antibodies or other binding partners, secondary antibodies, lectins, enzymes, or streptavidin. In certain embodiments, the magnetic particles are attached to cells via a coating of primary antibodies specific for one or more markers. In certain embodiments, the cells, rather than the beads, are labeled with a primary antibody or binding partner, and then cell-type specific secondary antibody- or other binding partner (e.g., streptavidin)-coated magnetic particles, are added. In certain embodiments, streptavidin-coated magnetic particles are used in conjunction with biotinylated primary or secondary antibodies.

In some aspects, separation is achieved in a procedure in which the sample is placed in a magnetic field, and those cells having magnetically responsive or magnetizable particles attached thereto will be attracted to the magnet and separated from the unlabeled cells. For positive selection, cells that are attracted to the magnet are retained; for negative selection, cells that are not attracted (unlabeled cells) are retained. In some aspects, a combination of positive and negative selection is performed during the same selection step, where the positive and negative fractions are retained and further processed or subject to further separation steps.

In some embodiments, the affinity-based selection is via magnetic-activated cell sorting (MACS) (Miltenyi Biotec, Auburn, CA). Magnetic Activated Cell Sorting (MACS), e.g., CliniMACS systems are capable of high-purity selection of cells having magnetized particles attached thereto. In certain embodiments, MACS operates in a mode wherein the non-target and target species are sequentially eluted after the application of the external magnetic field. That is, the cells attached to magnetized particles are held in place while the unattached species are eluted. Then, after this first elution step is completed, the species that were trapped in the magnetic field and were prevented from being eluted are freed in some manner such that they can be eluted and recovered. In certain embodiments, the non-target cells are labelled and depleted from the heterogeneous population of cells.

In some embodiments, the magnetically responsive particles are left attached to the cells that are to be subsequently incubated, cultured and/or engineered; in some aspects, the particles are left attached to the cells for administration to a patient. In some embodiments, the magnetizable or magnetically responsive particles are removed from the cells. Methods for removing magnetizable particles from cells are known and include, e.g., the use of competing non-labeled antibodies, magnetizable particles or antibodies conjugated to cleavable linkers, etc. In some embodiments, the magnetizable particles are biodegradable.

B. Activation and Stimulation of Cells

In some embodiments, the one or more processing steps include a step of stimulating the isolated cells, such as selected cell populations. The incubation may be prior to or in connection with genetic engineering, such as genetic engineering resulting from embodiments of the transduction method described above. In some embodiments, the stimulation results in activation and/or proliferation of the cells, for example, prior to transduction.

In some embodiments, the processing steps include incubations of cells, such as selected cells, in which the incubation steps can include culture, cultivation, stimulation, activation, and/or propagation of cells. In some embodiments, the compositions or cells are incubated in the presence of stimulating conditions or a stimulatory agent. Such conditions include those designed to induce proliferation, activation, and/or survival of cells in the population, to mimic antigen exposure, and/or to prime the cells for genetic engineering, such as for the introduction of a recombinant antigen receptor.

In some embodiments, the conditions for stimulation and/or activation can include one or more of particular media, temperature, oxygen content, carbon dioxide content, time, agents, e.g., nutrients, amino acids, antibiotics, ions, and/or stimulatory factors, such as cytokines, chemokines, antigens, binding partners, fusion proteins, recombinant soluble receptors, and any other agents designed to activate the cells.

In some embodiments, the stimulating conditions or agents include one or more agent, e.g., ligand, which is capable of stimulating or activating an intracellular signaling domain of a TCR complex. In some aspects, the agent turns on or initiates TCR/CD3 intracellular signaling cascade in a T cell. Such agents can include agents suitable to deliver a primary signal, e.g., to initiate activation of an ITAM-induced signal, such as antibodies, such as those specific for a TCR, e.g. anti-CD3. In some embodiments, the stimulating conditions include one or more agent, e.g. ligand, which is capable of stimulating a costimulatory receptor, e.g., anti-CD28 or anti-4-1BB. In some embodiments, such agents and/or ligands may be, bound to solid support such as a bead, and/or one or more cytokines. Among the stimulating agents are anti-CD3/anti-CD28 beads (e.g., DYNABEADS® M-450 CD3/CD28 T Cell Expander, and/or ExpACT® beads). Optionally, the expansion method may further comprise the step of adding anti-CD3 and/or anti CD28 antibody to the culture medium (e.g., at a concentration of at least about 0.5 ng/ml). In some embodiments, the stimulating agents include IL-2, IL-7 and/or IL-15, for example, an IL-2 concentration of at least about 10 units/mL, at least about 50 units/mL, at least about 100 units/mL or at least about 200 units/mL.

The conditions can include one or more of particular media, temperature, oxygen content, carbon dioxide content, time, agents, e.g., nutrients, amino acids, antibiotics, ions, and/or stimulatory factors, such as cytokines, chemokines, antigens, binding partners, fusion proteins, recombinant soluble receptors, and any other agents designed to activate the cells.

In some aspects, incubation is carried out in accordance with techniques such as those described in U.S. Pat. No. 6,040,177 to Riddell et al., Klebanoff et al. (2012) J Immunother. 35(9): 651-660, Terakura et al. (2012) Blood. 1:72-82, and/or Wang et al. (2012) J Immunother. 35(9):689-701.

In some embodiments, at least a portion of the incubation in the presence of one or more stimulating conditions or stimulatory agents is carried out in the internal cavity of a centrifugal chamber, for example, under centrifugal rotation, such as described in International Publication Number WO2016/073602. In some embodiments, at least a portion of the incubation performed in a centrifugal chamber includes mixing with a reagent or reagents to induce stimulation and/or activation. In some embodiments, cells, such as selected cells, are mixed with a stimulating condition or stimulatory agent in the centrifugal chamber. In some aspects of such processes, a volume of cells is mixed with an amount of one or more stimulating conditions or agents that is far less than is normally employed when performing similar stimulations in a cell culture plate or other system.

In some embodiments, the stimulating agent is added to cells in the cavity of the chamber in an amount that is substantially less than (e.g. is no more than 5%, 10%, 20%, 30%, 40%, 50%, 60%, 70% or 80% of the amount) as compared to the amount of the stimulating agent that is typically used or would be necessary to achieve about the same or similar efficiency of selection of the same number of cells or the same volume of cells when selection is performed without mixing in a centrifugal chamber, e.g. in a tube or bag with periodic shaking or rotation. In some embodiments, the incubation is performed with the addition of an incubation buffer to the cells and stimulating agent to achieve a target volume with incubation of the reagent of, for example, about 10 mL to about 200 mL, or about 20 mL to about 125 mL, such as at least or about at least or about 10 mL, 20 mL, 30 mL, 40 mL, 50 mL, 60 mL, 70 mL, 80 mL, 90 mL, 100 mL, 105 mL, 110 mL, 115 mL, 120 mL, 125 mL, 130 mL, 135 mL, 140 mL, 145 mL, 150 mL, 160 mL, 170 mL, 180 mL, 190 mL, or 200 mL. In some embodiments, the incubation buffer and stimulating agent are pre-mixed before addition to the cells. In some embodiments, the incubation buffer and stimulating agent are separately added to the cells. In some embodiments, the stimulating incubation is carried out with periodic gentle mixing condition, which can aid in promoting energetically favored interactions and thereby permit the use of less overall stimulating agent while achieving stimulating and activation of cells.

In some embodiments, the incubation generally is carried out under mixing conditions, such as in the presence of spinning, generally at relatively low force or speed, such as speed lower than that used to pellet the cells, such as from 600 rpm to 1700 rpm or from about 600 rpm to about 1700 rpm (e.g. at or about or at least 600 rpm, 1000 rpm, or 1500 rpm or 1700 rpm), such as at an RCF at the sample or wall of the chamber or other container of from 80 g to 100 g or from about 80 g to about 100 g (e.g. at or about or at least 80 g, 85 g, 90 g, 95 g, or 100 g). In some embodiments, the spin is carried out using repeated intervals of a spin at such low speed followed by a rest period, such as a spin and/or rest for 1, 2, 3, 4, 5, 6, 7, 8, 9, or 10 seconds, such as a spin at approximately 1 or 2 seconds followed by a rest for approximately 5, 6, 7, or 8 seconds.

In some embodiments, the total duration of the incubation, e.g. with the stimulating agent, is between or between about 1 hour and 96 hours, 1 hour and 72 hours, 1 hour and 48 hours, 4 hours and 36 hours, 8 hours and 30 hours, 18 hours and 30 hours, or 12 hours and 24 hours, such as at least or about at least or about 6 hours, 12 hours, 18 hours, 24 hours, 36 hours or 72 hours. In some embodiments, the further incubation is for a time between or about between 1 hour and 48 hours, 4 hours and 36 hours, 8 hours and 30 hours or 12 hours and 24 hours, inclusive.

C. Genetic Engineering

In some embodiments, the processing steps include introduction of a nucleic acid molecule encoding a recombinant protein. Among such recombinant proteins are recombinant receptors, such as any described in Section III. Introduction of the nucleic acid molecules encoding the recombinant protein, such as recombinant receptor, in the cell may be carried out using any of a number of known vectors. Such vectors include viral and non-viral systems, including lentiviral and gammaretroviral systems, as well as transposon-based systems such as PiggyBac or Sleeping Beauty-based gene transfer systems. Exemplary methods include those for transfer of nucleic acids encoding the receptors, including via viral, e.g., retroviral or lentiviral, transduction, transposons, and electroporation.

In certain embodiments, when cultivation and/or expansion is included as a manufacturing step, compositions of cells are engineered, e.g., transduced or transfected, prior to cultivating the cells, e.g., under conditions that promote proliferation and/or expansion. In some embodiments, genetic engineering of the cells, such as by transforming or transducing, occurs prior to incubating the cells, for examples as described in Section II-C-3. In particular embodiments, compositions of cells are engineered after the compositions have been stimulated, activated, and/or incubated under stimulating conditions. In particular embodiments, the compositions are stimulated compositions. In particular embodiments, the stimulated compositions have been previously cryopreserved and stored, and are thawed prior to engineering.

In some embodiments, gene transfer is accomplished by first stimulating the cell, such as by combining it with a stimulus that induces a response such as proliferation, survival, and/or activation, e.g., as measured by expression of a cytokine or activation marker, followed by transduction of the activated cells, and expansion in culture to numbers sufficient for clinical applications.

In some embodiments, recombinant nucleic acids are transferred into cells using recombinant infectious virus particles, such as, e.g., vectors derived from simian virus 40 (SV40), adenoviruses, adeno-associated virus (AAV), and human immunodeficiency virus (HIV).

In some embodiments, recombinant nucleic acids are transferred into T cells via electroporation (see, e.g., Chicaybam et al, (2013) PLoS ONE 8(3): e60298 and Van Tedeloo et al. (2000) Gene Therapy 7(16): 1431-1437). In some embodiments, recombinant nucleic acids are transferred into T cells via transposition (see, e.g., Manuri et al. (2010) Hum Gene Ther 21(4): 427-437; Sharma et al. (2013) Molec Ther Nucl Acids 2, e74; and Huang et al. (2009) Methods Mol Biol 506: 115-126). Other methods of introducing and expressing genetic material in immune cells include calcium phosphate transfection (e.g., as described in Current Protocols in Molecular Biology, John Wiley & Sons, New York. N.Y.), protoplast fusion, cationic liposome-mediated transfection; tungsten particle-facilitated microparticle bombardment (Johnston, Nature, 346: 776-777 (1990)); and strontium phosphate DNA co-precipitation (Brash et al., Mol. Cell Biol., 7: 2031-2034 (1987)).

Other approaches and vectors for transfer of the nucleic acids encoding the recombinant products are those described, e.g., in international patent application, Publication No.: WO2014055668, and U.S. Pat. No. 7,446,190.

In some embodiments, the cells, e.g., T cells, may be transfected either during or after expansion e.g. with a T cell receptor (TCR) or a chimeric antigen receptor (CAR). This transfection for the introduction of the gene of the desired receptor can be carried out with any suitable retroviral vector, for example. The genetically modified cell population can then be liberated from the initial stimulus (the CD3/CD28 stimulus, for example) and subsequently be stimulated with a second type of stimulus e.g. via a de novo introduced receptor). This second type of stimulus may include an antigenic stimulus in form of a peptide/MHC molecule, the cognate (cross-linking) ligand of the genetically introduced receptor (e.g. natural ligand of a CAR) or any ligand (such as an antibody) that directly binds within the framework of the new receptor (e.g. by recognizing constant regions within the receptor). See, for example, Cheadle et al, "Chimeric antigen receptors for T-cell based therapy" Methods Mol Biol. 2012; 907:645-66 or Barrett et al., Chimeric Antigen Receptor Therapy for Cancer Annual Review of Medicine Vol. 65: 333-347 (2014).

In some cases, a vector may be used that does not require that the cells, e.g., T cells, are activated. In some such instances, the cells may be selected and/or transduced prior to activation. Thus, the cells may be engineered prior to, or subsequent to culturing of the cells, and in some cases at the same time as or during at least a portion of the culturing.

In some aspects, the cells further are engineered to promote expression of cytokines or other factors. Among additional nucleic acids, e.g., genes for introduction are those to improve the efficacy of therapy, such as by promoting viability and/or function of transferred cells; genes to provide a genetic marker for selection and/or evaluation of the cells, such as to assess in vivo survival or localization; genes to improve safety, for example, by making the cell susceptible to negative selection in vivo as described by Lupton S. D. et al., Mol. and Cell Biol., 11:6 (1991); and Riddell et al., Human Gene Therapy 3:319-338 (1992); see also the publications of PCT/US91/08442 and PCT/US94/05601 by Lupton et al. describing the use of bifunctional selectable fusion genes derived from fusing a dominant positive selectable marker with a negative selectable marker. See, e.g., Riddell et al., U.S. Pat. No. 6,040,177, at columns 14-17.

In some embodiments, the introducing is carried out by contacting one or more cells of a composition with a nucleic acid molecule encoding the recombinant protein, e.g. recombinant receptor. In some embodiments, the contacting can be effected with centrifugation, such as spinoculation (e.g. centrifugal inoculation). Such methods include any of those as described in International Publication Number WO2016/073602. Exemplary centrifugal chambers include those produced and sold by Biosafe SA, including those for use with the Sepax® and Sepax® 2 system, including an A-200/F and A-200 centrifugal chambers and various kits for use with such systems. Exemplary chambers, systems, and processing instrumentation and cabinets are described, for example, in U.S. Pat. Nos. 6,123,655, 6,733,433 and Published U.S. Patent Application, Publication No.: US 2008/0171951, and published international patent application, publication no. WO 00/38762, the contents of each of which are incorporated herein by reference in their entirety. Exemplary kits for use with such systems include, but are not limited to, single-use kits sold by BioSafe SA under product names CS-430.1, CS-490.1, CS-600.1 or CS-900.2.

In some embodiments, the system is included with and/or placed into association with other instrumentation, including instrumentation to operate, automate, control and/or monitor aspects of the transduction step and one or more various other processing steps performed in the system, e.g. one or more processing steps that can be carried out with or in connection with the centrifugal chamber system as described herein or in International Publication Number WO2016/073602. This instrumentation in some embodiments is contained within a cabinet. In some embodiments, the instrumentation includes a cabinet, which includes a housing containing control circuitry, a centrifuge, a cover, motors, pumps, sensors, displays, and a user interface. An exemplary device is described in U.S. Pat. Nos. 6,123,655, 6,733,433 and US 2008/0171951.

In some embodiments, the system comprises a series of containers, e.g., bags, tubing, stopcocks, clamps, connectors, and a centrifuge chamber. In some embodiments, the containers, such as bags, include one or more containers, such as bags, containing the cells to be transduced and the viral vector particles, in the same container or separate containers, such as the same bag or separate bags. In some embodiments, the system further includes one or more containers, such as bags, containing medium, such as diluent and/or wash solution, which is pulled into the chamber and/or other components to dilute, resuspend, and/or wash components and/or compositions during the methods. The containers can be connected at one or more positions in the system, such as at a position corresponding to an input line, diluent line, wash line, waste line and/or output line.

In some embodiments, the chamber is associated with a centrifuge, which is capable of effecting rotation of the chamber, such as around its axis of rotation. Rotation may occur before, during, and/or after the incubation in connection with transduction of the cells and/or in one or more of the other processing steps. Thus, in some embodiments, one or more of the various processing steps is carried out under rotation, e.g., at a particular force. The chamber is typically capable of vertical or generally vertical rotation, such that the chamber sits vertically during centrifugation and the side wall and axis are vertical or generally vertical, with the end wall(s) horizontal or generally horizontal.

In some embodiments, the composition containing cells, viral particles and reagent can be rotated, generally at relatively low force or speed, such as speed lower than that used to pellet the cells, such as from 600 rpm to 1700 rpm or from about 600 rpm to about 1700 rpm (e.g. at or about or at least 600 rpm, 1000 rpm, or 1500 rpm or 1700 rpm). In some embodiments, the rotation is carried at a force, e.g., a relative centrifugal force, of from 100 g to 3200 g or from about 100 g to about 3200 g (e.g. at or about or at least at or about 100 g, 200 g, 300 g, 400 g, 500 g, 1000 g, 1500 g, 2000 g, 2500 g, 3000 g or 3200 g), as measured for example at an internal or external wall of the chamber or cavity. The term "relative centrifugal force" or RCF is generally understood to be the effective force imparted on an object or substance (such as a cell, sample, or pellet and/or a point in the chamber or other container being rotated), relative to the earth's gravitational force, at a particular point in space as compared to the axis of rotation. The value may be determined using well-known formulas, taking into account the gravitational force, rotation speed and the radius of rotation (distance from the axis of rotation and the object, substance, or particle at which RCF is being measured).

In some embodiments, during at least a part of the genetic engineering, e.g. transduction, and/or subsequent to the genetic engineering the cells are transferred to a container such as a bag, e.g., a bioreactor bag assembly, for culture of the genetically engineered cells, such as for cultivation or expansion of the cells, as described above. In some embodiments, the container for cultivation or expansion of the cells is a bioreactor bag, such as a perfusion bag.

1. Vectors and Methods

In some embodiments, the processing steps include introduction of a nucleic acid molecule encoding a recombinant protein, into the cell, and may be carried out using any of a number of known vectors. In some embodiments, the vector contains the nucleic acid encoding the recombinant receptor. In particular embodiments, the vector is a viral vector a non-viral vector. In some cases, the vector is a viral vector, such as a retroviral vector, e.g., a lentiviral vector or a gammaretroviral vector.

In some cases, the nucleic acid sequence encoding the recombinant receptor, e.g., chimeric antigen receptor (CAR) contains a signal sequence that encodes a signal peptide. Non-limiting exemplary examples of signal peptides include, for example, the GMCSFR alpha chain signal peptide, the CD8 alpha signal peptide, or the CD33 signal peptide.

In some embodiments, the vectors include viral vectors, e.g., retroviral or lentiviral, non-viral vectors or transposons, e.g. Sleeping Beauty transposon system, vectors derived from simian virus 40 (SV40), adenoviruses, adeno-associated virus (AAV), lentiviral vectors or retroviral vectors, such as gamma-retroviral vectors, retroviral vector derived from the Moloney murine leukemia virus (MoMLV), myeloproliferative sarcoma virus (MPSV), murine embryonic stem cell virus (MESV), murine stem cell virus (MSCV), spleen focus forming virus (SFFV) or adeno-associated virus (AAV).

In some embodiments, the viral vector or the non-viral DNA contains a nucleic acid that encodes a heterologous recombinant protein. In some embodiments, the heterologous recombinant molecule is or includes a recombinant receptor, e.g., an antigen receptor, SB-transposons, e.g., for gene silencing, capsid-enclosed transposons, homologous double stranded nucleic acid, e.g., for genomic recombination or reporter genes (e.g., fluorescent proteins, such as GFP) or luciferase).

2. Preparation of Viral Vector Particles for Transduction

In some embodiments, recombinant nucleic acids are transferred into cells using recombinant infectious virus particles, such as, e.g., vectors derived from simian virus 40 (SV40), adenoviruses, adeno-associated virus (AAV). In some embodiments, recombinant nucleic acids are transferred into T cells using recombinant lentiviral vectors or retroviral vectors, such as gamma-retroviral vectors (see, e.g., Koste et al. (2014) Gene Therapy 2014 Apr. 3. doi: 10.1038/gt.2014.25; Carlens et al. (2000) Exp Hematol 28(10): 1137-46; Alonso-Camino et al. (2013) Mol Ther Nucl Acids 2, e93; Park et al., Trends Biotechnol. 2011 Nov. 29(11): 550-557.

In some embodiments, the retroviral vector has a long terminal repeat sequence (LTR), e.g., a retroviral vector derived from the Moloney murine leukemia virus (MoMLV), myeloproliferative sarcoma virus (MPSV), murine embryonic stem cell virus (MESV), murine stem cell virus (MSCV), or spleen focus forming virus (SFFV). In some embodiments, the retroviruses include those derived from any avian or mammalian cell source. The retroviruses typically are amphotropic, meaning that they are capable of infecting host cells of several species, including humans. In one embodiment, the gene to be expressed replaces the retroviral gag, pol and/or env sequences. A number of illustrative retroviral systems have been described (e.g., U.S. Pat. Nos. 5,219,740; 6,207,453; 5,219,740; Miller and Rosman (1989) BioTechniques 7:980-990; Miller, A. D. (1990) Human Gene Therapy 1:5-14; Scarpa et al. (1991) Virology 180:849-852; Burns et al. (1993) Proc. Natl. Acad. Sci. USA 90:8033-8037; and Boris-Lawrie and Temin (1993) Cur. Opin. Genet. Develop. 3:102-109.

Methods of lentiviral transduction are known. Exemplary methods are described in, e.g., Wang et al. (2012) *J. Immunother.* 35(9): 689-701; Cooper et al. (2003) *Blood.* 101: 1637-1644; Verhoeyen et al. (2009) *Methods Mol Biol.* 506: 97-114; and Cavalieri et al. (2003) Blood. 102(2): 497-505.

In some embodiments, the viral vector particles contain a genome derived from a retroviral genome based vector, such as derived from a lentiviral genome based vector. In some aspects of the provided viral vectors, the heterologous nucleic acid encoding a recombinant receptor, such as a CAR, is contained and/or located between the 5' LTR and 3' LTR sequences of the vector genome.

In some embodiments, the viral vector genome is a lentivirus genome, such as an HIV-1 genome or an SIV genome. For example, lentiviral vectors have been generated by multiply attenuating virulence genes, for example, the genes env, vif, vpu and nef can be deleted, making the vector safer for therapeutic purposes. Lentiviral vectors are known. See Naldini et al., (1996 and 1998); Zufferey et al., (1997); Dull et al., 1998, U.S. Pat. Nos. 6,013,516; and 5,994,136). In some embodiments, these viral vectors are plasmid-based or virus-based, and are configured to carry the essential sequences for incorporating foreign nucleic acid, for selection, and for transfer of the nucleic acid into a host cell. Known lentiviruses can be readily obtained from depositories or collections such as the American Type Culture Collection ("ATCC"; 10801 University Blvd., Manassas, Va. 20110-2209), or isolated from known sources using commonly available techniques.

Non-limiting examples of lentiviral vectors include those derived from a lentivirus, such as Human Immunodeficiency Virus 1 (HIV-1), HIV-2, an Simian Immunodeficiency Virus (SIV), Human T-lymphotropic virus 1 (HTLV-1), HTLV-2 or equine infection anemia virus (E1AV). For example, lentiviral vectors have been generated by multiply attenuating the HIV virulence genes, for example, the genes env, vif, vpr, vpu and nef are deleted, making the vector safer for therapeutic purposes. Lentiviral vectors are known in the art, see Naldini et al., (1996 and 1998); Zufferey et al., (1997); Dull et al., 1998, U.S. Pat. Nos. 6,013,516; and 5,994,136). In some embodiments, these viral vectors are plasmid-based or virus-based, and are configured to carry the essential sequences for incorporating foreign nucleic acid, for selection, and for transfer of the nucleic acid into a host cell. Known lentiviruses can be readily obtained from depositories or collections such as the American Type Culture Collection ("ATCC"; 10801 University Blvd., Manassas, Va. 20110-2209), or isolated from known sources using commonly available techniques.

The viral vector genome is typically constructed in a plasmid form that can be transfected into a packaging or producer cell line. In any of such examples, the nucleic acid encoding a recombinant protein, such as a recombinant receptor, is inserted or located in a region of the viral vector, such as generally in a non-essential region of the viral genome. In some embodiments, the nucleic acid is inserted into the viral genome in the place of certain viral sequences to produce a virus that is replication defective.

Any of a variety of known methods can be used to produce retroviral particles whose genome contains an RNA copy of the viral vector genome. In some embodiments, at least two components are involved in making a virus-based gene delivery system: first, packaging plasmids, encompassing the structural proteins as well as the enzymes necessary to generate a viral vector particle, and second, the viral vector itself, i.e., the genetic material to be transferred. Biosafety safeguards can be introduced in the design of one or both of these components.

In some embodiments, the packaging plasmid can contain all retroviral, such as HIV-1, proteins other than envelope proteins (Naldini et al., 1998). In other embodiments, viral vectors can lack additional viral genes, such as those that are associated with virulence, e.g. vpr, vif, vpu and nef, and/or Tat, a primary transactivator of HIV. In some embodiments, lentiviral vectors, such as HIV-based lentiviral vectors, comprise only three genes of the parental virus: gag, pol and rev, which reduces or eliminates the possibility of reconstitution of a wild-type virus through recombination.

In some embodiments, the viral vector genome is introduced into a packaging cell line that contains all the components necessary to package viral genomic RNA, transcribed from the viral vector genome, into viral particles. Alternatively, the viral vector genome may comprise one or more genes encoding viral components in addition to the one or more sequences, e.g., recombinant nucleic acids, of interest. In some aspects, in order to prevent replication of the genome in the target cell, however, endogenous viral genes required for replication are removed and provided separately in the packaging cell line.

In some embodiments, a packaging cell line is transfected with one or more plasmid vectors containing the components necessary to generate the particles. In some embodiments, a packaging cell line is transfected with a plasmid containing the viral vector genome, including the LTRs, the cis-acting packaging sequence and the sequence of interest, i.e. a nucleic acid encoding an antigen receptor, such as a CAR; and one or more helper plasmids encoding the virus enzymatic and/or structural components, such as Gag, pol and/or rev. In some embodiments, multiple vectors are utilized to separate the various genetic components that generate the retroviral vector particles. In some such embodiments, providing separate vectors to the packaging cell reduces the chance of recombination events that might otherwise generate replication competent viruses. In some embodiments, a single plasmid vector having all of the retroviral components can be used.

In some embodiments, the retroviral vector particle, such as lentiviral vector particle, is pseudotyped to increase the transduction efficiency of host cells. For example, a retroviral vector particle, such as a lentiviral vector particle, in some embodiments is pseudotyped with a VSV-G glycoprotein, which provides a broad cell host range extending the cell types that can be transduced. In some embodiments, a packaging cell line is transfected with a plasmid or polynucleotide encoding a non-native envelope glycoprotein, such as to include xenotropic, polytropic or amphotropic envelopes, such as Sindbis virus envelope, GALV or VSV-G.

In some embodiments, the packaging cell line provides the components, including viral regulatory and structural proteins, that are required in trans for the packaging of the viral genomic RNA into lentiviral vector particles. In some embodiments, the packaging cell line may be any cell line that is capable of expressing lentiviral proteins and producing functional lentiviral vector particles. In some aspects, suitable packaging cell lines include 293 (ATCC CCL X), 293T, HeLA (ATCC CCL 2), D17 (ATCC CCL 183), MDCK (ATCC CCL 34), BHK (ATCC CCL-10) and Cf2Th (ATCC CRL 1430) cells.

In some embodiments, the packaging cell line stably expresses the viral protein(s). For example, in some aspects, a packaging cell line containing the gag, pol, rev and/or other structural genes but without the LTR and packaging components can be constructed. In some embodiments, a packaging cell line can be transiently transfected with nucleic acid molecules encoding one or more viral proteins along with the viral vector genome containing a nucleic acid molecule encoding a heterologous protein, and/or a nucleic acid encoding an envelope glycoprotein.

In some embodiments, the viral vectors and the packaging and/or helper plasmids are introduced via transfection or infection into the packaging cell line. The packaging cell line produces viral vector particles that contain the viral vector genome. Methods for transfection or infection are well known. Non-limiting examples include calcium phosphate, DEAE-dextran and lipofection methods, electroporation and microinjection.

When a recombinant plasmid and the retroviral LTR and packaging sequences are introduced into a special cell line (e.g., by calcium phosphate precipitation for example), the packaging sequences may permit the RNA transcript of the recombinant plasmid to be packaged into viral particles, which then may be secreted into the culture media. The media containing the recombinant retroviruses in some embodiments is then collected, optionally concentrated, and used for gene transfer. For example, in some aspects, after cotransfection of the packaging plasmids and the transfer vector to the packaging cell line, the viral vector particles are recovered from the culture media and titered by standard methods used by those of skill in the art.

In some embodiments, a retroviral vector, such as a lentiviral vector, can be produced in a packaging cell line, such as an exemplary HEK 293T cell line, by introduction of plasmids to allow generation of lentiviral particles. In some embodiments, a packaging cell is transfected and/or contains a polynucleotide encoding gag and pol, and a polynucleotide encoding a recombinant receptor, such as an antigen receptor, for example, a CAR. In some embodiments, the packaging cell line is optionally and/or additionally transfected with and/or contains a polynucleotide encoding a rev protein. In some embodiments, the packaging cell line is optionally and/or additionally transfected with and/or contains a polynucleotide encoding a non-native envelope glycoprotein, such as VSV-G. In some such embodiments, approximately two days after transfection of cells, e.g. HEK 293T cells, the cell supernatant contains recombinant lentiviral vectors, which can be recovered and titered.

Recovered and/or produced retroviral vector particles can be used to transduce target cells using the methods as described. Once in the target cells, the viral RNA is reverse-transcribed, imported into the nucleus and stably integrated into the host genome. One or two days after the integration of the viral RNA, the expression of the recombinant protein, e.g. antigen receptor, such as CAR, can be detected.

3. Incubating the Cells

In some embodiments, composition of cells that have been engineered, e.g., transduced or transfected, is incubated. In some embodiments, the incubation is effected at temperatures greater than room temperature, such as greater than or greater than about 25° C., such as generally greater than or greater than about 32° C., 35° C. or 37° C. In some embodiments, the incubation is effected at a temperature of at or about 37° C. 2° C., such as at a temperature of at or about 37° C. In some embodiments, the incubation is for a time between or about between 12 hours and 96 hours, such as at least or at least about 12 hours, 24 hours, 36 hours, 48 hours, 72 hours or 96 hours.

In some embodiments, the incubation occurs in a closed system. In some embodiments, the incubation occurs at a temperature of at or about 37° C. 2° C. for a time between or about between 1 hour and 48 hours, 4 hours and 36 hours, 8 hours and 30 hours or 12 hours and 24 hours, inclusive. In certain embodiments, the total duration of the incubation is, is about, or is at least 12 hours, 18 hours, 24 hours, 30 hours, 36 hours, 42 hours, 48 hours, 54 hours, 60 hours, 72 hours, 84 hours, 96 hours, 108 hours, or 120 hours. In certain embodiments, the total duration of the incubation is, is about, or is at least one day, 2 days, 3 days, 4 days, or 5 days. In particular embodiments, the incubation is completed at, at about, or within 120 hours, 108 hours, 96 hours, 84 hours, 72 hours, 60 hours, 54 hours, 48 hours, 42 hours, 36 hours, 30 hours, 24 hours, 18 hours, or 12 hours. In particular embodiments, the incubation is completed at, at about, or within one day, 2 days, 3 days, 4 days, or 5 days. In some embodiments, the total duration of the incubation is between or between about 12 hour and 120 hours, 18 hour and 96 hours, 24 hours and 72 hours, or 24 hours and 48 hours, inclusive. In some embodiments, the total duration of the incubation is between or about between 1 hour and 48 hours, 4 hours and 36 hours, 8 hours and 30 hours or 12 hours and 24 hours, inclusive. In particular embodiments, the incubation is performed for or for about 24 hours, 48 hours, or 72 hours, or for or for about 1 day, 2 days, or 3 days, respectively. In particular embodiments, the incubation is performed for 24 hours f 6 hours, 48 hours f 6 hours, or 72 hours f 6 hours. In particular embodiments, the incubation is performed for or for about 72 hours or for or for about 3 days.

D. Cultivation and/or Expansion of Cells

In some embodiments, engineered cells are cultivated under conditions that promote proliferation and/or expansion subsequent to a step of genetically engineering, e.g., introducing a recombinant polypeptide to the cells by transduction or transfection. In particular embodiments, the cells are cultivated after the cells have been incubated under stimulating conditions and transduced or transfected with a recombinant polynucleotide, e.g., a polynucleotide encoding a recombinant receptor. In some embodiments, the cultivation produces one or more cultivated compositions of enriched T cells. In some embodiments, such conditions may be designed to induce proliferation, expansion, activation, and/or survival of cells in the population. In particular embodiments, the stimulating conditions can include one or more of particular media, temperature, oxygen content, carbon dioxide content, time, agents, e.g., nutrients, amino acids, antibiotics, ions, and/or stimulatory factors, such as cytokines, chemokines, antigens, binding partners, fusion proteins, recombinant soluble receptors, and any other agents designed to promote growth, division, and/or expansion of the cells.

In some embodiments, the engineered cells are cultured in a container that can be filled, e.g. via the feed port, with cell media and/or cells for culturing of the added cells. The cells can be from any cell source for which culture of the cells is desired, for example, for expansion and/or proliferation of the cells.

In some aspects, the culture media is an adapted culture medium that supports that growth, cultivation, expansion or proliferation of the cells, such as T cells. In some aspects, the medium can be a liquid containing a mixture of salts, amino acids, vitamins, sugars or any combination thereof. In some embodiments, the culture media further contains one or more stimulating conditions or agents, such as to stimulate the cultivation, expansion or proliferation of cells during the incubation. In some embodiments, the stimulating condition is or includes one or more cytokines, such as selected from IL-2, IL-7 or IL-15. In some embodiments, the cytokine is a recombinant cytokine. In particular embodiments, the one or more cytokines are human recombinant cytokines. In certain embodiments, the one or more cytokines bind to and/or are capable of binding to receptors that are expressed by and/or are endogenous to T cells. In particular embodiments, the one or more cytokines is or includes a member of the 4-alpha-helix bundle family of cytokines. In some embodiments, members of the 4-alpha-helix bundle family of cytokines include, but are not limited to, interleukin-2 (IL-2), interleukin-4 (IL-4), interleukin-7 (IL-7), interleukin-9 (IL-9), interleukin 12 (IL-12), interleukin 15 (IL-15), granulocyte colony-stimulating factor (G-CSF), and granulocyte-macrophage colony-stimulating factor (GM-CSF). In some embodiments, the one or more cytokines is or includes IL-15. In particular embodiments, the one or more cytokines is or includes IL-7. In particular embodiments, the one or more cytokines is or includes recombinant IL-2.

In some embodiments, the concentration of the one or more cytokine in the culture media during the culturing or incubation, independently, is from or from about 1 IU/mL to 1500 IU/mL, such as from or from about 1 IU/mL to 100 IU/mL, 2 IU/mL to 50 IU/mL, 5 IU/mL to 10 IU/mL, 10 IU/mL to 500 IU/mL, 50 IU/mL to 250 IU/mL or 100 IU/mL to 200 IU/mL, 50 IU/mL to 1500 IU/mL, 100 IU/mL to 1000 IU/mL or 200 IU/mL to 600 IU/mL. In some embodiments, the concentration of the one or more cytokine, independently, is at least or at least about 1 IU/mL, 5 IU/mL, 10 IU/mL, 50 IU/mL, 100 IU/mL, 200 IU/mL, 500 IU/mL, 1000 IU/mL or 1500 IU/mL.

In some aspects, the cells are incubated for at least a portion of time after transfer of the engineered cells and culture media. In some embodiments, the stimulating conditions generally include a temperature suitable for the growth of primary immune cells, such as human T lymphocytes, for example, at least about 25 degrees Celsius, generally at least about 30 degrees, and generally at or about 37 degrees Celsius. In some embodiments, the composition of enriched T cells is incubated at a temperature of 25 to 38° C., such as 30 to 37° C., for example at or about 37° C. f 2° C. The incubation is carried out for a time period until the culture, e.g. cultivation or expansion, results in a desired or threshold density, concentration, number or dose of cells. In some embodiments, the incubation is carried out for a time period until the culture, e.g. cultivation or expansion, results in a desired or threshold density, concentration, number or dose of viable cells. In some embodiments, the incubation is greater than or greater than about or is for about or 24 hours, 48 hours, 72 hours, 96 hours, 5 days, 6 days, 7 days, 8 days, 9 days or more.

In some embodiments, the cells are incubated under conditions to maintain a target amount of carbon dioxide in the cell culture. In some aspects, this ensures optimal cultivation, expansion and proliferation of the cells during the growth. In some aspects, the amount of carbon dioxide ($CO_2$) is between 10% and 0% (v/v) of said gas, such as between 8% and 2% (v/v) of said gas, for example an amount of or about 5% (v/v) $CO_2$.

In particular embodiments, the cultivation is performed in a closed system. In certain embodiments, the cultivation is performed in a closed system under sterile conditions. In particular embodiments, the cultivation is performed in the same closed system as one or more steps of the provided systems. In some embodiments the composition of enriched T cells is removed from a closed system and placed in and/or connected to a bioreactor for the cultivation. Examples of suitable bioreactors for the cultivation include, but are not limited to, GE Xuri W25, GE Xuri W5, Sartorius BioSTAT RM 20|50, Finesse SmartRocker Bioreactor Systems, and Pall XRS Bioreactor Systems. In some embodiments, the bioreactor is used to perfuse and/or mix the cells during at least a portion of the cultivation step.

In some embodiments, cells cultivated while enclosed, connected, and/or under control of a bioreactor undergo expansion during the cultivation more rapidly than cells that are cultivated without a bioreactor, e.g., cells that are cultivated under static conditions such as without mixing, rocking, motion, and/or perfusion. In some embodiments, cells cultivated while enclosed, connected, and/or under control of a bioreactor reach or achieve a threshold expansion, cell count, and/or density within 14 days, 10 days, 9 days, 8 days, 7 days, 6 days, 5 days, 4 days, 3 days, 2 days, 60 hours, 48 hours, 36 hours, 24 hours, or 12 hours. In some embodiments, cells cultivated while enclosed, connected, and/or under control of a bioreactor reach or achieve a threshold expansion, cell count, and/or density at least 50%, at least 60%, at least 70%, at least 80%, at least 90%, at least 95%, at least 100%, at least 150%, at least 1-fold, at least 2-fold, at least 3-fold, at least 4-fold, at least 5-fold than cells cultivated in an exemplary and/or alternative process where cells are not cultivated while enclosed, connected, and/or under control of a bioreactor.

In some embodiments, the mixing is or includes rocking and/or motioning. In some embodiments, cells are incubated using containers, e.g., bags, which are used in connection with a bioreactor. In some cases, the bioreactor can be subject to motioning or rocking, which, in some aspects, can increase oxygen transfer. Motioning the bioreactor may include, but is not limited to rotating along a horizontal axis, rotating along a vertical axis, a rocking motion along a tilted or inclined horizontal axis of the bioreactor or any combination thereof. In some embodiments, at least a portion of the incubation is carried out with rocking. The rocking speed and rocking angle may be adjusted to achieve a desired agitation. In some embodiments the rock angle is or is about 20°, 19°, 18°, 17°, 16°, 15°, 14°, 13°, 12°, 11°, 10°, 9°, 8°, 7°, 6°, 5°, 4°, 3°, 2° or 1°. In certain embodiments, the rock angle is between 6-16°. In other embodiments, the rock angle is between 7-16°. In other embodiments, the rock angle is between 8-12°. In some embodiments, the rock rate is 1, 2, 3, 4, 5, 6, 7, 8, 9, 10, 11, 112, 13, 14 15, 16, 17, 18, 19, 20, 21, 22, 23, 24, 25, 26, 27, 28, 29, 30, 31, 32, 33, 34, 35, 36, 37, 38, 39, 40 rpm. In some embodiments, the rock rate is between 4 and 12 rpm, such as between 4 and 6 rpm, inclusive. At least a portion of the cell culture expansion is performed with a rocking motion, such as at an angle of between 5° and 10°, such as 6°, at a constant rocking speed, such as a speed of between 5 and 15 RPM, such as 6 RMP or 10 RPM.

In some embodiments, a composition comprising cells, such as engineered T cells, e.g. engineered CD4+ T cells or engineered CD8+ T cells, is cultivated in the presence of a surfactant. In particular embodiments, cultivating the cells of the composition reduces the amount of shear stress that may occur during the cultivation, e.g., due to mixing, rocking, motion, and/or perfusion. In particular embodiments, the composition of cells, such as engineered T cells, e.g. engineered CD4+ T cells or engineered CD8+ T cells, is cultivated with the surfactant and at least 50%, at least 60%, at least 70%, at least 75%, at least 80%, at least 85%, at least 90%, at least 95%, at least 99%, or at least 99.9% of the T cells survive, e.g., are viable and/or do not undergo necrosis, programed cell death, or apoptosis, during or at least 1 day, 2 days, 3 days, 4 days, 5 days, 6 days, 7 days, or more than 7 days after the cultivation is complete. In particular embodiments, the composition of cells, such as engineered T cells, e.g. engineered CD4+ T cells or engineered CD8+ T cells, is cultivated in the presence of a surfactant and less than 50%, less than 40%, less than 30%, less than 25%, less than 20%, less than 15%, less than 10%, less than 5%, less than 1%, less than 0.1% or less than 0.01% of the cells undergo cell death, e.g., programmed cell death, apoptosis, and/or necrosis, such as due to shearing or shearing-induced stress.

In particular embodiments, a composition of cells, such as engineered T cells, e.g. engineered CD4+ T cells or engineered CD8+ T cells, is cultivated in the presence of between 0.1 µl/ml and 10.0 µl/ml, between 0.2 µl/ml and 2.5 µl/ml, between 0.5 µl/ml and 5 µl/ml, between 1 µl/ml and 3 µl/ml, or between 2 µl/ml and 4 µl/ml of the surfactant. In some embodiments, the composition of cells, such as engineered T cells, e.g. engineered CD4+ T cells or engineered CD8+ T cells, is cultivated in the presence of, of about, or at least 0.1 µl/ml, 0.2 µl/ml, 0.4 µl/ml, 0.6 µl/ml, 0.8 µl/ml, 1 µl/ml, 1.5 µl/ml, 2.0 µl/ml, 2.5 µl/ml, 5.0 µl/ml, 10 µl/ml, 25 µl/ml, or 50 µl/ml of the surfactant. In certain embodiments, the composition of cells is cultivated in the presence of or of about 2 µl/ml of the surfactant.

In some embodiments, a surfactant is or includes an agent that reduces the surface tension of liquids and/or solids. For example, a surfactant includes a fatty alcohol (e.g., steryl alcohol), a polyoxyethylene glycol octylphenol ether (e.g., Triton X-100), or a polyoxyethylene glycol sorbitan alkyl ester (e.g., polysorbate 20, 40, 60). In certain embodiments the surfactant is selected from the group consisting of Polysorbate 80 (PS80), polysorbate 20 (PS20), poloxamer 188 (P188). In an exemplary embodiment, the concentration of the surfactant in chemically defined feed media is about 0.0025% to about 0.25% (v/v) of PS80; about 0.0025% to about 0.25% (v/v) of PS20; or about 0.1% to about 5.0% (w/v) of P188.

In some embodiments, the surfactant is or includes an anionic surfactant, a cationic surfactant, a zwitterionic surfactant, or a nonionic surfactant added thereto. Suitable anionic surfactants include but are not limited to alkyl sulfonates, alkyl phosphates, alkyl phosphonates, potassium laurate, triethanolamine stearate, sodium lauryl sulfate, sodium dodecylsulfate, alkyl polyoxyethylene sulfates, sodium alginate, dioctyl sodium sulfosuccinate, phosphatidyl glycerol, phosphatidyl inosine, phosphatidylinositol, diphosphatidylglycerol, phosphatidylserine, phosphatidic acid and their salts, sodium carboxymethylcellulose, cholic acid and other bile acids (e.g., cholic acid, deoxycholic acid, glycocholic acid, taurocholic acid, glycodeoxycholic acid) and salts thereof (e.g., sodium deoxycholate).

In some embodiments, suitable nonionic surfactants include: glyceryl esters, polyoxyethylene fatty alcohol ethers, polyoxyethylene sorbitan fatty acid esters (polysorbates), polyoxyethylene fatty acid esters, sorbitan esters, glycerol monostearate, polyethylene glycols, polypropylene glycols, cetyl alcohol, cetostearyl alcohol, stearyl alcohol, aryl alkyl polyether alcohols, polyoxyethylene-polyoxypropylene copolymers (poloxamers), poloxamines, methylcellulose, hydroxymethyl cellulose, hydroxypropyl cellulose, hydroxypropylmethyl cellulose, noncrystalline cellulose, polysaccharides including starch and starch derivatives such as hydroxyethylstarch (HES), polyvinyl alcohol, and polyvinylpyrrolidone. In certain embodiments, the nonionic surfactant is a polyoxyethylene and polyoxypropylene copolymer and preferably a block copolymer of propylene glycol and ethylene glycol. Such polymers are sold under the tradename POLOXAMER, also sometimes referred to as PLURONIC® F68 or Kolliphor® P188. Among polyoxyethylene fatty acid esters is included those having short alkyl chains. One example of such a surfactant is SOLUTOL® HS 15, polyethylene-660-hydroxystearate.

In some embodiments, suitable cationic surfactants may include, but are not limited to, natural phospholipids, synthetic phospholipids, quaternary ammonium compounds, benzalkonium chloride, cetyltrimethyl ammonium bromide, chitosans, lauryl dimethyl benzyl ammonium chloride, acyl carnitine hydrochlorides, dimethyl dioctadecyl ammomium bromide (DDAB), dioleyoltrimethyl ammonium propane (DOTAP), dimyristoyl trimethyl ammonium propane (DMTAP), dimethyl amino ethane carbamoyl cholesterol (DC-Chol), 1,2-diacylglycero-3-(O-alkyl) phosphocholine, O-alkylphosphatidylcholine, alkyl pyridinium halides, or long-chain alkyl amines such as, for example, n-octylamine and oleylamine.

Zwitterionic surfactants are electrically neutral but possess local positive and negative charges within the same molecule. Suitable zwitterionic surfactants include but are not limited to zwitterionic phospholipids. Suitable phospholipids include phosphatidylcholine, phosphatidylethanolamine, diacyl-glycero-phosphoethanolamine (such as dimyristoyl-glycero-phosphoethanolamine (DMPE), dipalmitoyl-glycero-phosphoethanolamine (DPPE), distearoyl-glycero-phosphoethanolamine (DSPE), and dioleolyl-glycero-phosphoethanolamine (DOPE)). Mixtures of phospholipids that include anionic and zwitterionic phospholipids may be employed in this invention. Such mixtures include but are not limited to lysophospholipids, egg or soybean phospholipid or any combination thereof. The phospholipid, whether anionic, zwitterionic or a mixture of phospholipids, may be salted or desalted, hydrogenated or partially hydrogenated or natural semi-synthetic or synthetic.

In certain embodiments, the surfactant is poloxamer, e.g., poloxamer 188. In some embodiments, a composition of cells is cultivated in the presence of between 0.1 µl/ml and 10.0 µl/ml, between 0.2 µl/ml and 2.5 µl/ml, between 0.5 µl/ml and 5 µl/ml, between 1 µl/ml and 3 µl/ml, or between 2 µl/ml and 4 µl/ml of poloxamer. In some embodiments, the composition of cells is cultivated in the presence of, of about, or at least 0.1 µl/ml, 0.2 µl/ml, 0.4 µl/ml, 0.6 µl/ml, 0.8 µl/ml, 1 µl/ml, 1.5 µl/ml, 2.0 µl/ml, 2.5 µl/ml, 5.0 µl/ml, 10 µl/ml, 25 µl/ml, or 50 µl/ml of the surfactant. In certain embodiments, the composition of cells is cultivated in the presence of or of about 2 µl/ml of poloxamer.

In some aspects, the CD4+ and CD8+ cells are each separately expanded or expanded together until they each reach a threshold amount or cell density. In particular embodiments, the cultivation ends, such as by harvesting cells, when cells achieve a threshold amount, concentration, and/or expansion. In particular embodiments, the cultivation ends when the cell achieve or achieve about or at least a 1.5-fold expansion, a 2-fold expansion, a 2.5-fold expansion, a 3-fold expansion, a 3.5-fold expansion, a 4-fold expansion, a 4.5-fold expansion, a 5-fold expansion, a 6-fold expansion, a 7-fold expansion, a 8-fold expansion, a 9-fold expansion, a 10-fold expansion, or greater than a 10-fold expansion, e.g., with respect and/or in relation to the amount of density of the cells at the start or initiation of the cultivation. In some embodiments, the threshold expansion is a 4-fold expansion, e.g., with respect and/or in relation to the amount of density of the cells at the start or initiation of the cultivation. In some embodiments, the cultivation ends, such as by harvesting cells, when the cells achieve a threshold total amount of cells, e.g., threshold cell count. In some embodiments, the cultivation ends when the cells achieve a threshold total nucleated cell (TNC) count. In some embodiments, the cultivation ends when the cells achieve a threshold viable amount of cells, e.g., threshold viable cell count. In some embodiments, the threshold cell count is or is about or is at least of $50\times10^6$ cells, $100\times10^6$ cells, $200\times10^6$ cells, $300\times10^6$ cells, $400\times10^6$ cells, $600\times10^6$ cells, $800\times10^6$ cells, $1000\times10^6$ cells, $1200\times10^6$ cells, $1400\times10^6$ cells, $1600\times10^6$ cells, $1800\times10^6$ cells, $2000\times10^6$ cells, $2500\times10^6$ cells, $3000\times10^6$ cells, $4000\times10^6$ cells, $5000\times10^6$ cells, $10,000\times10^6$ cells, $12,000\times10^6$ cells, $15,000\times10^6$ cells or $20,000\times10^6$ cells, or any of the foregoing threshold of viable cells.

In particular embodiments, the cultivation ends when the cells achieve a threshold cell count. In some embodiments, the cultivation ends at, at about, or within 6 hours, 12 hours, 24 hours, 36 hours, 1 day, 2 days, 3 days, 4 days, 5 days, 6 days, or 7 or more days, after the threshold cell count is achieved. In particular embodiments, the cultivation is ended at or about 1 day after the threshold cell count is achieved. In certain embodiments, the threshold density is, is about, or is at least $0.1\times10^6$ cells/ml, $0.5\times10^6$ cells/ml, $1\times10^6$ cells/ml, $1.2\times10^6$ cells/ml, $1.5\times10^6$ cells/ml, $1.6\times10^6$ cells/ml, $1.8\times10^6$ cells/ml, $2.0\times10^6$ cells/ml, $2.5\times10^6$ cells/ml, $3.0\times10^6$ cells/ml, $3.5\times10^6$ cells/ml, $4.0\times10^6$ cells/ml, $4.5\times10^6$ cells/ml, $5.0\times10^6$ cells/ml, $6\times10^6$ cells/ml, $8\times10^6$ cells/ml, or $10\times10^6$ cells/ml, or any of the foregoing threshold of viable cells. In particular embodiments, the cultivation ends when the cells achieve a threshold density. In some embodiments, the cultivation ends at, at about, or within 6 hours, 12 hours, 24 hours, 36 hours, 1 day, 2 days, 3 days, 4 days, 5 days, 6 days, or 7 or more days, after the threshold density is achieved. In particular embodiments, the cultivation is ended at or about 1 day after the threshold density is achieved.

In some embodiments, at least a portion of the incubation is carried out under static conditions. In some embodiments, at least a portion of the incubation is carried out with perfusion, such as to perfuse out spent media and perfuse in fresh media during the culture. In some embodiments, the method includes a step of perfusing fresh culture medium into the cell culture, such as through a feed port. In some embodiments, the culture media added during perfusion contains the one or more stimulating agents, e.g. one or more recombinant cytokine, such as IL-2, IL-7 and/or IL-15. In some embodiments, the culture media added during perfusion is the same culture media used during a static incubation.

In some embodiments, subsequent to the incubation, the container, e.g., bag, is re-connected to a system for carrying out the one or more other processing steps of for manufacturing, generating or producing the cell therapy, such as is re-connected to the system containing the centrifugal chamber. In some aspects, cultured cells are transferred from the bag to the internal cavity of the chamber for formulation of the cultured cells.

E. Harvesting and Formulation

In some embodiments, the dose of cells comprising cells engineered with a recombinant antigen receptor, e.g. CAR or TCR, is harvested or formulated to provide as a composition or formulation, such as a pharmaceutical composition or formulation. Such compositions can be used in accord with adoptive cell therapy methods, including methods for the prevention or treatment of diseases, conditions, and disorders, or in detection, diagnostic, and prognostic methods.

In some cases, the cells are processed in one or more steps (e.g. carried out in the centrifugal chamber and/or closed system) for manufacturing, generating or producing a cell therapy and/or engineered cells may include formulation of cells, such as formulation of genetically engineered cells resulting from the provided transduction processing steps prior to or after the culturing, e.g. cultivation and expansion, and/or one or more other processing steps as described. In some embodiments, the cells are processed in one or more steps (e.g. carried out in the centrifugal chamber and/or closed system) for manufacturing, generating or producing a cell therapy and/or engineered cells may include formulation of cells, such as formulation of genetically engineered cells resulting from the provided transduction processing steps prior to or after incubation, such as described in Section II-C-3. For example, engineered cells of a non-expanded or minimally expanded process may be formulated. In some cases, the cells can be formulated in an amount for dosage administration, such as for a single unit dosage administration or multiple dosage administration. In some embodiments, the provided methods associated with formulation of cells include processing transduced cells, such as cells transduced and/or expanded using the processing steps described above, in a closed system.

In certain embodiments, one or more compositions of cells, such as engineered and cultivated T cells, are formulated. In particular embodiments, one or more compositions of cells, such as engineered and cultivated T cells, are formulated after the one or more compositions have been engineered and/or cultivated.

In some embodiments, T cells, such as CD4+ and/or CD8+ T cells, generated by one or more of the processing steps are formulated. In some aspects, a plurality of compositions are separately manufactured, produced or generated, each containing a different population and/or sub-types of cells from the subject, such as for administration separately or independently, optionally within a certain period of time. For example, separate formulations of engineered cells containing different populations or sub-types of cells can include CD8+ and CD4+ T cells, respectively, and/or CD8+- and CD4+-enriched populations, respectively, e.g., CD4+ and/or CD8+ T cells each individually including cells genetically engineered to express the recombinant receptor. In some embodiments, at least one composition is formulated with CD4+ T cells genetically engineered to express the recombinant receptor. In some embodiments, at least one composition is formulated with CD8+ T cells genetically engineered to express the recombinant receptor. In some embodiments, the administration of the dose comprises administration of a first composition comprising a dose of CD8+ T cells or a dose of CD4+ T cells and administration of a second composition comprising the other of the dose of CD4+ T cells and the CD8+ T cells. In some embodiments, a first composition comprising a dose of CD8+ T cells or a dose of CD4+ T cells is administered prior to the second composition comprising the other of the dose of CD4+ T cells and the CD8+ T cells. In some embodiments, the administration of the dose comprises administration of a composition comprising both of a dose of CD8+ T cells and a dose of CD4+ T cells.

In certain embodiments, the one or more compositions of cells, such as engineered and cultivated T cells, are or include two separate compositions, e.g., separate engineered and/or cultivated compositions, of cells. In particular embodiments, two separate compositions of cells, e.g., two separate compositions of CD4+ T cells and CD8+ T cells selected, isolated, and/or enriched from the same biological sample, separately engineered and separately cultivated, are separately formulated. In certain embodiments, the two separate compositions include a composition of CD4+ T cells, such as a composition of engineered and/or cultivated CD4+ T cells. In particular embodiments, the two separate compositions include a composition of CD8+ T cells, such as a composition of engineered and/or cultivated CD8+ T cells. In some embodiments, two separate compositions of CD4+ T cells and CD8+ T cells, such as separate compositions of engineered and cultivated CD4+ T cells and engineered and cultivated CD8+ T cells, are separately formulated. In some embodiments, a single composition of cells is formulated. In certain embodiments, the single composition is a composition of CD4+ T cells, such as a composition of engineered and/or cultivated CD4+ T cells. In some embodiments, the single composition is a composition of CD4+ and CD8+ T cells that have been combined from separate compositions prior to the formulation.

In some embodiments, separate compositions of CD4+ and CD8+ T cells, such as separate compositions of engineered and cultivated CD4+ and CD8+ T cells are combined into a single composition and are formulated. In certain embodiments, separate formulated compositions of CD4+ and CD8+ T cells are combined into a single composition after the formulation has been performed and/or completed. In particular embodiments, separate compositions of CD4+ and CD8+ T cells, such as separate compositions of engineered and cultivated CD4+ and CD8+ T cells, are separately formulated as separate compositions.

In some embodiments, the cells are formulated between 0 days and 10 days, between 0 and 5 days, between 2 days and 7 days, between 0.5 days, and 4 days, or between 1 day and 3 days after the cells reach the threshold cell count, density, and/or expansion has been achieved during the cultivation. In certain embodiments, the cells are formulated at or at or about or within 12 hours, 18 hours, 24 hours, 1 day, 2 days, or 3 days after the threshold cell count, density, and/or expansion has been achieved during the cultivation. In some embodiments, the cells are formulated within or within about 1 day after the threshold cell count, density, and/or expansion has been achieved during the cultivation.

In cases where the process is a non-expanded or minimally expanded process, in some embodiments, the cells are formulated between 0 days and 10 days, between 0 and 5 days, between 2 days and 7 days, between 0.5 days, and 4 days, or between 1 day and 3 days after incubation (e.g., see Section II-C-3). In certain embodiments, the cells are formulated at or at or about or within 12 hours, 18 hours, 24 hours, 1 day, 2 days, or 3 days after incubation. In some embodiments, the cells are formulated within or within about 1 day after incubation.

In some embodiments, the cells are formulated in a pharmaceutically acceptable buffer, which may, in some aspects, include a pharmaceutically acceptable carrier or excipient. In some embodiments, the processing includes exchange of a medium into a medium or formulation buffer that is pharmaceutically acceptable or desired for administration to a subject. In some embodiments, the processing steps can involve washing the transduced and/or expanded cells to replace the cells in a pharmaceutically acceptable buffer that can include one or more optional pharmaceutically acceptable carriers or excipients. Exemplary of such pharmaceutical forms, including pharmaceutically acceptable carriers or excipients, can be any described below in conjunction with forms acceptable for administering the cells and compositions to a subject. The pharmaceutical composition in some embodiments contains the cells in amounts effective to treat or prevent the disease or condition, such as a therapeutically effective or prophylactically effective amount.

A "pharmaceutically acceptable carrier" refers to an ingredient in a pharmaceutical formulation, other than an active ingredient, which is nontoxic to a subject. A pharmaceutically acceptable carrier includes, but is not limited to, a buffer, excipient, stabilizer, or preservative.

In some aspects, the choice of carrier is determined in part by the particular cell and/or by the method of administration. Accordingly, there are a variety of suitable formulations. For example, the pharmaceutical composition can contain preservatives. Suitable preservatives may include, for example, methylparaben, propylparaben, sodium benzoate, and benzalkonium chloride. In some aspects, a mixture of two or more preservatives is used. The preservative or mixtures thereof are typically present in an amount of about 0.0001% to about 2% by weight of the total composition. Carriers are described, e.g., by Remington's Pharmaceutical Sciences 16th edition, Osol, A. Ed. (1980). Pharmaceutically acceptable carriers are generally nontoxic to recipients at the dosages and concentrations employed, and include, but are not limited to: buffers such as phosphate, citrate, and other organic acids; antioxidants including ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as polyethylene glycol (PEG).

Buffering agents in some aspects are included in the compositions. Suitable buffering agents include, for example, citric acid, sodium citrate, phosphoric acid, potassium phosphate, and various other acids and salts. In some aspects, a mixture of two or more buffering agents is used. The buffering agent or mixtures thereof are typically present in an amount of about 0.001% to about 4% by weight of the total composition. Methods for preparing administrable pharmaceutical compositions are known. Exemplary methods are described in more detail in, for example, Remington: The Science and Practice of Pharmacy, Lippincott Williams & Wilkins; 21st ed. (May 1, 2005).

The formulations can include aqueous solutions. The formulation or composition may also contain more than one active ingredient useful for the particular indication, disease, or condition being treated with the cells, preferably those with activities complementary to the cells, where the respective activities do not adversely affect one another. Such active ingredients are suitably present in combination in amounts that are effective for the purpose intended. Thus, in some embodiments, the pharmaceutical composition further includes other pharmaceutically active agents or drugs, such as chemotherapeutic agents, e.g., asparaginase, busulfan, carboplatin, cisplatin, daunorubicin, doxorubicin, fluorouracil, gemcitabine, hydroxyurea, methotrexate, paclitaxel, rituximab, vinblastine, and/or vincristine.

Compositions in some embodiments are provided as sterile liquid preparations, e.g., isotonic aqueous solutions, suspensions, emulsions, dispersions, or viscous compositions, which may in some aspects be buffered to a selected pH. Liquid compositions can comprise carriers, which can be a solvent or dispersing medium containing, for example, water, saline, phosphate buffered saline, polyol (for example, glycerol, propylene glycol, liquid polyethylene glycol) and suitable mixtures thereof. Sterile injectable solutions can be prepared by incorporating the cells in a solvent, such as in admixture with a suitable carrier, diluent, or excipient such as sterile water, physiological saline, glucose, dextrose, or the like. The compositions can contain auxiliary substances such as wetting, dispersing, or emulsifying agents (e.g., methylcellulose), pH buffering agents, gelling or viscosity enhancing additives, preservatives, flavoring agents, and/or colors, depending upon the route of administration and the preparation desired. Standard texts may in some aspects be consulted to prepare suitable preparations.

Various additives which enhance the stability and sterility of the compositions, including antimicrobial preservatives, antioxidants, chelating agents, and buffers, can be added. Prevention of the action of microorganisms can be ensured by various antibacterial and antifungal agents, for example, parabens, chlorobutanol, phenol, and sorbic acid. Prolonged absorption of the injectable pharmaceutical form can be brought about by the use of agents delaying absorption, for example, aluminum monostearate and gelatin.

In some embodiments, the formulation buffer contains a cryopreservative. In some embodiments, the cell are formulated with a cyropreservative solution that contains 1.0% to 30% DMSO solution, such as a 5% to 20% DMSO solution or a 5% to 10% DMSO solution. In some embodiments, the cryopreservation solution is or contains, for example, PBS containing 20% DMSO and 8% human serum albumin (HSA), or other suitable cell freezing media. In some embodiments, the cryopreservative solution is or contains, for example, at least or about 7.5% DMSO. In some embodiments, the processing steps can involve washing the transduced and/or expanded cells to replace the cells in a cryopreservative solution. In some embodiments, the cells are frozen, e.g., cryopreserved or cryoprotected, in media and/or solution with a final concentration of or of about 12.5%, 12.0%, 11.5%, 11.0%, 10.5%, 10.0%, 9.5%, 9.00%, 8.5%, 8.0%, 7.5%, 7.0%, 6.5%, 6.0%, 5.5%, or 5.0% DMSO, or between 1% and 15%, between 6% and 12%, between 5% and 10%, or between 6% and 8% DMSO. In particular embodiments, the cells are frozen, e.g., cryopreserved or cryoprotected, in media and/or solution with a final concentration of or of about 5.0%, 4.5%, 4.0%, 3.5%, 3.0%, 2.5%, 2.0%, 1.5%, 1.25%, 1.0%, 0.75%, 0.5%, or 0.25% HSA, or between 0.1% and 5%, between 0.25% and 4%, between 0.5% and 2%, or between 1% and 2% HSA.

In particular embodiments, the composition of enriched T cells, e.g., T cells that have been stimulated, engineered, and/or cultivated, are formulated, cryopreserved, and then stored for an amount of time. In certain embodiments, the formulated, cryopreserved cells are stored until the cells are released for infusion. In particular embodiments, the formulated cryopreserved cells are stored for between 1 day and 6 months, between 1 month and 3 months, between 1 day and 14 days, between 1 day and 7 days, between 3 days and 6 days, between 6 months and 12 months, or longer than 12 months. In some embodiments, the cells are cryopreserved and stored for, for about, or for less than 1 days, 2 days, 3 days, 4 days, 5 days, 6 days, or 7 days. In certain embodiments, the cells are thawed and administered to a subject after the storage. In certain embodiments, the cells are stored for or for about 5 days.

In some embodiments, the formulation is carried out using one or more processing step including washing, diluting or concentrating the cells, such as the cultured or expanded cells. In some embodiments, the processing can include dilution or concentration of the cells to a desired concentration or number, such as unit dose form compositions including the number of cells for administration in a given dose or fraction thereof. In some embodiments, the processing steps can include a volume-reduction to thereby increase the concentration of cells as desired. In some embodiments, the processing steps can include a volume-addition to thereby decrease the concentration of cells as desired. In some embodiments, the processing includes adding a volume of a formulation buffer to transduced and/or expanded cells. In some embodiments, the volume of formulation buffer is from 10 mL to 1000 mL or from about 10 mL to about 1000 mL, such as at least or about at least or about 50 mL, 100 mL, 200 mL, 300 mL, 400 mL, 500 mL, 600 mL, 700 mL, 800 mL, 900 mL or 1000 mL.

In some embodiments, the cells are cultured, such as stimulated engineered and/or cultivated in a container, e.g., bag or a centrifugal chamber. In some aspects, the container is a first container and the cultured cells are expressed or transferred from the first container, e.g. bag or centrifugal chamber, to a second container, that is operably linked to the first container.

In some embodiments, such processing steps for formulating a cell composition is carried out in a closed system. Exemplary of such processing steps can be performed using a centrifugal chamber in conjunction with one or more systems or kits associated with a cell processing system, such as a centrifugal chamber produced and sold by Biosafe SA, including those for use with the Sepax® or Sepax 2® cell processing systems. An exemplary system and process is described in International Publication Number WO2016/073602. In some embodiments, the method includes effecting expression or transfer from the internal cavity of the centrifugal chamber a formulated composition, which is the resulting composition of cells formulated in a formulation buffer, such as pharmaceutically acceptable buffer, in any of the above embodiments as described. In some embodiments, the expression or transfer of the formulated composition is to a container that is operably linked as part of a closed system with the centrifugal chamber.

In some aspects, cells can be expressed or transferred to the one or more of the plurality of output containers in an amount for dosage administration, such as for a single unit dosage administration or multiple dosage administration.

In some embodiments, each of the output containers individually comprises a unit dose of the cells. Thus in some embodiments, each of the containers comprises the same or approximately or substantially the same number of cells. In some embodiments, each unit dose contains at least or about at least $1\times10^6$, $2\times10^6$, $5\times10^6$, $1\times10^7$, $5\times10^7$, $1\times10^8$, $2.5\times10^8$, or $5\times10^8$ engineered cells, total cells, T cells, or PBMCs. In some embodiments, each unit dose contains at least at or about $2.5\times10^7$, at or about $5.0\times10^7$, at or about $1.5\times10^8$, at or about $3.0\times10^8$, at or about $4.5\times10^8$, at or about $8.0\times10^8$ or at or about $1.2\times10^9$ engineered cells, total cells, T cells, or PBMCs. In some embodiments, each unit dose contains no more than at or about $2.5\times10^7$, at or about $5.0\times10^7$, at or about $1.5\times10^8$, at or about $3.0\times10^8$, at or about $4.5\times10^8$, at or about $8.0\times10^8$ or at or about $1.2\times10^9$ engineered cells, total cells, T cells, or PBMCs. In some aspects, exemplary dose of cells that can be contained in the container include any doses described herein.

In some embodiments, the volume of the formulated cell composition in each container is 10 mL to 100 mL, such as at least or about at least or about 20 mL, 30 mL, 40 mL, 50 mL, 60 mL, 70 mL, 80 mL, 90 mL or 100 mL. In some embodiments, the cells in the container can be cryopreserved. In some embodiments, the container can be stored in liquid nitrogen until further use.

In some embodiments, such cells produced by the method, or a composition comprising such cells, are administered to a subject for treating a disease or condition.

III. Recombinant Receptors

In various embodiments, provided are engineered, transformed, transduced, or transfected cells, such as immune cells, such as T cells, that express one or more recombinant proteins(s). In particular embodiments, at least one of the one or more recombinant proteins is a recombinant receptor, e.g., antigen receptors and receptors containing one or more component thereof. In some embodiments, the recombinant protein is or includes a recombinant receptor, e.g. an antigen receptor. The antigen receptor may include a functional non-TCR antigen receptors, including chimeric antigen receptors (CARs), and other antigen-binding receptors such as transgenic T cell receptors (TCRs). The receptors may also include other receptors, such as other chimeric receptors, such as receptors that bind to particular ligands and having transmembrane and/or intracellular signaling domains similar to those present in a CAR. In some embodiments, the methods of classifying cells provided herein may be used to classify (e.g., predict) cells from a population of cells that have been successfully engineered, transformed, transduced, or transfected to express (e.g., are surface positive) a recombinant protein, such as recombinant receptor.

Exemplary antigen receptors, including CARs, and methods for engineering and introducing such receptors into cells, include those described, for example, in international patent application publication numbers WO200014257, WO2013126726, WO2012/129514, WO2014031687, WO2013/166321, WO2013/071154, WO2013/123061, U.S. patent application publication numbers US2002131960, US2013287748, US20130149337, U.S. Pat. Nos. 6,451,995, 7,446,190, 8,252,592, 8,339,645, 8,398,282, 7,446,179, 6,410,319, 7,070,995, 7,265,209, 7,354,762, 7,446,191, 8,324,353, and 8,479,118, and European patent application number EP2537416, and/or those described by Sadelain et al., Cancer Discov. 2013 April; 3(4): 388-398; Davila et al. (2013) PLoS ONE 8(4): e61338; Turtle et al., Curr. Opin. Immunol., 2012 October; 24(5): 633-39; Wu et al., Cancer, 2012 Mar. 18(2): 160-75. In some aspects, the antigen receptors include a CAR as described in U.S. Pat. No. 7,446,190, and those described in International Patent Application Publication No.: WO/2014055668 A1. Examples of the CARs include CARs as disclosed in any of the aforementioned publications, such as WO2014031687, U.S. Pat. Nos. 8,339,645, 7,446,179, US 2013/0149337, U.S. Pat. Nos. 7,446,190, 8,389,282, Kochenderfer et al., 2013, Nature Reviews Clinical Oncology, 10, 267-276 (2013); Wang et al. (2012) J. Immunother. 35(9): 689-701; and Brentjens et al., Sci Transl Med. 2013 5(177). See also WO2014031687, U.S. Pat. Nos. 8,339,645, 7,446,179, US 2013/0149337, U.S. Pat. Nos. 7,446,190, and 8,389,282.

In some embodiments, the nucleic acid(s) encoded the recombinant protein further encodes one or more marker, e.g., for purposes of confirming transduction or engineering of the cell to express the receptor and/or selection and/or targeting of cells expressing molecule(s) encoded by the polynucleotide. In some aspects, such a marker may be encoded by a different nucleic acid or polynucleotide, which also may be introduced during the genetic engineering process, typically via the same method, e.g., transduction by any of the methods provided herein, e.g., via the same vector or type of vector.

In some aspects, the marker, e.g., transduction marker, is a protein and/or is a cell surface molecule. Exemplary markers are truncated variants of a naturally-occurring, e.g., endogenous markers, such as naturally-occurring cell surface molecules. In some aspects, the variants have reduced immunogenicity, reduced trafficking function, and/or reduced signaling function compared to the natural or endogenous cell surface molecule. In some embodiments, the marker is a truncated version of a cell surface receptor, such as truncated EGFR (tEGFR). In some aspects, the marker includes all or part (e.g., truncated form) of CD34, an NGFR, or epidermal growth factor receptor (e.g., tEGFR). In some embodiments, the nucleic acid encoding the marker is operably linked to a polynucleotide encoding for a linker sequence, such as a cleavable linker sequence. See, e.g., WO2014/031687. In some embodiments, a single promoter may direct expression of an RNA that contains, in a single open reading frame (ORF), two or three genes (e.g. encoding the molecule involved in modulating a metabolic pathway and encoding the recombinant receptor) separated from one another by sequences encoding a self-cleavage peptide (e.g., 2A sequences) or a protease recognition site (e.g., furin). The ORF thus encodes a single polypeptide, which, either during (in the case of 2A) or after translation, is processed into the individual proteins. In some cases, the peptide, such as T2A, can cause the ribosome to skip (ribosome skipping) synthesis of a peptide bond at the C-terminus of a 2A element, leading to separation between the end of the 2A sequence and the next peptide downstream (see, for example, de Felipe. *Genetic Vaccines and Ther.* 2:13 (2004) and deFelipe et al. *Traffic* 5:616-626 (2004)). Many 2A elements are known. Examples of 2A sequences that can be used in the methods and nucleic acids disclosed herein, without limitation, 2A sequences from the foot-and-mouth disease virus (F2A), equine rhinitis A virus (E2A), Thosea asigna virus (T2A), and porcine teschovirus-1 (P2A) as described in U.S. Patent Publication No. 20070116690.

In some embodiments, the marker is a molecule, e.g., cell surface protein, not naturally found on T cells or not naturally found on the surface of T cells, or a portion thereof.

In some embodiments, the molecule is a non-self molecule, e.g., non-self protein, i.e., one that is not recognized as "self" by the immune system of the host into which the cells will be adoptively transferred.

In some embodiments, the marker serves no therapeutic function and/or produces no effect other than to be used as a marker for genetic engineering, e.g., for selecting cells successfully engineered. In other embodiments, the marker may be a therapeutic molecule or molecule otherwise exerting some desired effect, such as a ligand for a cell to be encountered in vivo, such as a costimulatory or immune checkpoint molecule to enhance and/or dampen responses of the cells upon adoptive transfer and encounter with ligand.

A. Chimeric Antigen Receptors

In some embodiments, a CAR is generally a genetically engineered receptor with an extracellular ligand binding domain, such as an extracellular portion containing an antibody or fragment thereof, linked to one or more intracellular signaling components. In some embodiments, the chimeric antigen receptor includes a transmembrane domain and/or intracellular domain linking the extracellular domain and the intracellular signaling domain. Such molecules typically mimic or approximate a signal through a natural antigen receptor and/or signal through such a receptor in combination with a costimulatory receptor.

In some embodiments, CARs are constructed with a specificity for a particular marker, such as a marker expressed in a particular cell type to be targeted by adoptive therapy, e.g., a cancer marker and/or any of the antigens described. Thus, the CAR typically includes one or more antigen-binding fragment, domain, or portion of an antibody, or one or more antibody variable domains, and/or antibody molecules. In some embodiments, the CAR includes an antigen-binding portion or portions of an antibody molecule, such as a variable heavy chain (VH) or antigen-binding portion thereof, or a single-chain antibody fragment (scFv) derived from the variable heavy (VH) and variable light (VL) chains of a monoclonal antibody (mAb).

In some embodiments, the CAR contains an antibody or an antigen-binding fragment (e.g. scFv) that specifically recognizes an antigen, such as an intact antigen, expressed on the surface of a cell.

In some embodiments, the antigen is or includes αvP6 integrin (avb6 integrin), B cell maturation antigen (BCMA), B7-H3, B7-H6, carbonic anhydrase 9 (CA9, also known as CAIX or G250), a cancer-testis antigen, cancer/testis antigen 1B (CTAG, also known as NY-ESO-1 and LAGE-2), carcinoembryonic antigen (CEA), a cyclin, cyclin A2, C-C Motif Chemokine Ligand 1 (CCL-1), CD19, CD20, CD22, CD23, CD24, CD30, CD33, CD38, CD44, CD44v6, CD44v7/8, CD123, CD133, CD138, CD171, chondroitin sulfate proteoglycan 4 (CSPG4), epidermal growth factor protein (EGFR), type III epidermal growth factor receptor mutation (EGFR vIII), epithelial glycoprotein 2 (EPG-2), epithelial glycoprotein 40 (EPG-40), ephrinB2, ephrin receptor A2 (EPHa2), estrogen receptor, Fc receptor like 5 (FCRL5; also known as Fc receptor homolog 5 or FCRH5), fetal acetylcholine receptor (fetal AchR), a folate binding protein (FBP), folate receptor alpha, ganglioside GD2, O-acetylated GD2 (OGD2), ganglioside GD3, glycoprotein 100 (gp100), glypican-3 (GPC3), G Protein Coupled Receptor 5D (GPRC5D), Her2/neu (receptor tyrosine kinase erbB2), Her3 (erb-B3), Her4 (erb-B4), erbB dimers, Human high molecular weight-melanoma-associated antigen (HMW-MAA), hepatitis B surface antigen, Human leukocyte antigen A1 (HLA-A1), Human leukocyte antigen A2 (HLA-A2), IL-22 receptor alpha (IL-22Rα), IL-13 receptor alpha 2 (IL-13Rα2), kinase insert domain receptor (kdr), kappa light chain, L1 cell adhesion molecule (L1-CAM), CE7 epitope of L1-CAM, Leucine Rich Repeat Containing 8 Family Member A (LRRC8A), Lewis Y, Melanoma-associated antigen (MAGE)-A1, MAGE-A3, MAGE-A6, MAGE-A10, mesothelin (MSLN), c-Met, murine cytomegalovirus (CMV), mucin 1 (MUC1), MUC16, natural killer group 2 member D (NKG2D) ligands, melan A (MART-1), neural cell adhesion molecule (NCAM), oncofetal antigen, Preferentially expressed antigen of melanoma (PRAME), progesterone receptor, a prostate specific antigen, prostate stem cell antigen (PSCA), prostate specific membrane antigen (PSMA), Receptor Tyrosine Kinase Like Orphan Receptor 1 (ROR1), survivin, Trophoblast glycoprotein (TPBG also known as 5T4), tumor-associated glycoprotein 72 (TAG72), Tyrosinase related protein 1 (TRP1, also known as TYRP1 or gp75), Tyrosinase related protein 2 (TRP2, also known as dopachrome tautomerase, dopachrome delta-isomerase or DCT), vascular endothelial growth factor receptor (VEGFR), vascular endothelial growth factor receptor 2 (VEGFR2), Wilms Tumor 1 (WT-1), a pathogen-specific or pathogen-expressed antigen, or an antigen associated with a universal tag, and/or biotinylated molecules, and/or molecules expressed by HIV, HCV, HBV or other pathogens. Antigens targeted by the receptors in some embodiments include antigens associated with a B cell malignancy, such as any of a number of known B cell marker. In some embodiments, the antigen is or includes CD20, CD19, CD22, ROR1, CD45, CD21, CD5, CD33, Igkappa, Iglambda, CD79a, CD79b or CD30.

In some embodiments, the antigen is or includes a pathogen-specific or pathogen-expressed antigen. In some embodiments, the antigen is a viral antigen (such as a viral antigen from HIV, HCV, HBV, etc.), bacterial antigens, and/or parasitic antigens.

In some embodiments, the CAR contains a TCR-like antibody, such as an antibody or an antigen-binding fragment (e.g. scFv) that specifically recognizes an intracellular antigen, such as a tumor-associated antigen, presented on the cell surface as a MHC-peptide complex. In some embodiments, an antibody or antigen-binding portion thereof that recognizes an MHC-peptide complex can be expressed on cells as part of a recombinant receptor, such as an antigen receptor. Among the antigen receptors are functional non-TCR antigen receptors, such as chimeric antigen receptors (CARs). Generally, a CAR containing an antibody or antigen-binding fragment that exhibits TCR-like specificity directed against peptide-MHC complexes also may be referred to as a TCR-like CAR.

In some embodiments, the extracellular portion of the CAR, such as an antibody portion thereof, further includes a spacer, such as a spacer region between the antigen-recognition component, e.g. scFv, and a transmembrane domain. The spacer may be or include at least a portion of an immunoglobulin constant region or variant or modified version thereof, such as a hinge region, e.g., an IgG4 hinge region, and/or a $C_H1/C_L$ and/or Fc region. In some embodiments, the constant region or portion is of a human IgG, such as IgG4 or IgG1. The spacer can be of a length that provides for increased responsiveness of the cell following antigen binding, as compared to in the absence of the spacer. In some examples, the spacer is at or about 12 amino acids in length or is no more than 12 amino acids in length. Exemplary spacers include those having at least about 10 to 229 amino acids, about 10 to 200 amino acids, about 10 to 175 amino acids, about 10 to 150 amino acids, about 10 to 125 amino acids, about 10 to 100 amino acids, about 10 to 75 amino acids, about 10 to 50 amino acids, about 10 to 40 amino acids, about 10 to 30 amino acids, about 10 to 20 amino acids, or about 10 to 15 amino acids, and including any integer between the endpoints of any of the listed ranges. In some embodiments, a spacer region has about 12 amino acids or less, about 119 amino acids or less, or about 229 amino acids or less. Exemplary spacers include IgG4 hinge alone, IgG4 hinge linked to $C_H2$ and $C_H3$ domains, or IgG4 hinge linked to the $C_H3$ domain. Exemplary spacers include, but are not limited to, those described in Hudecek et al. (2013) Clin. Cancer Res., 19:3153 or international patent application publication number WO2014/031687.

The extracellular ligand binding, such as antigen recognition domain, generally is linked to one or more intracellular signaling components, such as signaling components that mimic activation through an antigen receptor complex, such as a TCR complex, in the case of a CAR, and/or signal via another cell surface receptor. In some embodiments, a transmembrane domain links the extracellular ligand binding and intracellular signaling domains. In some embodiments, the CAR includes a transmembrane domain fused to the extracellular domain. In one embodiment, a transmembrane domain that naturally is associated with one of the domains in the receiver, e.g., CAR, is used. In some instances, the transmembrane domain is selected or modified by amino acid substitution to avoid binding of such domains to the transmembrane domains of the same or different surface membrane proteins to minimize interactions with other members of the receptor complex.

The transmembrane domain in some embodiments is derived either from a natural or from a synthetic source. Where the source is natural, the domain in some aspects is derived from any membrane-bound or transmembrane protein. Transmembrane regions include those derived from (i.e., comprise at least the transmembrane region(s) of) the alpha, beta or zeta chain of the T-cell receptor, CD28, CD3 epsilon, CD45, CD4, CD5, CD8, CD9, CD16, CD22, CD33, CD37, CD64, CD80, CD86, CD134, CD137 or CD154. The transmembrane domain in some embodiments is synthetic. In some aspects, the synthetic transmembrane domain comprises predominantly hydrophobic residues such as leucine and valine. In some aspects, a triplet of phenylalanine, tryptophan and valine will be found at each end of a synthetic transmembrane domain. In some embodiments, the linkage is by linkers, spacers, and/or transmembrane domain(s).

In some embodiments, a short oligo- or polypeptide linker, for example, a linker of between 2 and 10 amino acids in length, such as one containing glycines and serines, e.g., glycine-serine doublet, is present and forms a linkage between the transmembrane domain and the cytoplasmic signaling domain of the CAR.

The recombinant receptor, e.g., the CAR, generally includes at least one intracellular signaling component or components. In some embodiments, the receptor includes an intracellular component of a TCR complex, such as a TCR CD3 chain that mediates T-cell activation and cytotoxicity, e.g., CD3 zeta chain. Thus, in some aspects, the antigen-binding portion is linked to one or more cell signaling modules. In some embodiments, cell signaling modules include CD3 transmembrane domain, CD3 intracellular signaling domains, and/or other CD transmembrane domains. In some embodiments, the receptor, e.g., CAR, further includes a portion of one or more additional molecules such as Fc receptor γ, CD8, CD4, CD25, or CD16. For example, in some aspects, the CAR or other chimeric receptor includes a chimeric molecule between CD3-zeta (CD3-ζ) or Fc receptor γ and CD8, CD4, CD25 or CD16.

In some embodiments, upon ligation of the CAR or other chimeric receptor, the cytoplasmic domain or intracellular signaling domain of the receptor activates at least one of the normal effector functions or responses of the immune cell, e.g., T cell engineered to express the CAR. For example, in some contexts, the CAR induces a function of a T cell such as cytolytic activity or T-helper activity, such as secretion of cytokines or other factors. In some embodiments, a truncated portion of an intracellular signaling domain of an antigen receptor component or costimulatory molecule is used in place of an intact immunostimulatory chain, for example, if it transduces the effector function signal. In some embodiments, the intracellular signaling domain or domains include the cytoplasmic sequences of the T cell receptor (TCR), and in some aspects also those of co-receptors that in the natural context act in concert with such receptors to initiate signal transduction following antigen receptor engagement, and/or any derivative or variant of such molecules, and/or any synthetic sequence that has the same functional capability.

In the context of a natural TCR, full activation generally requires not only signaling through the TCR, but also a costimulatory signal. Thus, in some embodiments, to promote full activation, a component for generating secondary or co-stimulatory signal is also included in the CAR. In other embodiments, the CAR does not include a component for generating a costimulatory signal. In some aspects, an additional CAR is expressed in the same cell and provides the component for generating the secondary or costimulatory signal.

T cell activation is in some aspects described as being mediated by at least two classes of cytoplasmic signaling sequences: those that initiate antigen-dependent primary activation through the TCR (primary cytoplasmic signaling sequences), and those that act in an antigen-independent manner to provide a secondary or co-stimulatory signal (secondary cytoplasmic signaling sequences). In some aspects, the CAR includes one or both of such signaling components.

In some aspects, the CAR includes a primary cytoplasmic signaling sequence that regulates primary activation of the TCR complex. Primary cytoplasmic signaling sequences that act in a stimulatory manner may contain signaling motifs which are known as immunoreceptor tyrosine-based activation motifs or ITAMs. Examples of ITAM containing primary cytoplasmic signaling sequences include those derived from TCR zeta, FcR gamma, FcR beta, CD3 gamma, CD3 delta, CD3 epsilon, CD8, CD22, CD79a, CD79b, and CD66d. In some embodiments, cytoplasmic signaling molecule(s) in the CAR contain(s) a cytoplasmic signaling domain, portion thereof, or sequence derived from CD3 zeta.

In some embodiments, the CAR includes a signaling domain and/or transmembrane portion of a costimulatory receptor, such as CD28, 4-1BB, OX40, CD27, DAP10, and ICOS. In some aspects, the same CAR includes both the activating and costimulatory components.

In some embodiments, the activating domain is included within one CAR, whereas the costimulatory component is provided by another CAR recognizing another antigen. In some embodiments, the CARs include activating or stimulatory CARs, and costimulatory CARs, both expressed on the same cell (see WO2014/055668). In some aspects, the CAR is the stimulatory or activating CAR; in other aspects, it is the costimulatory CAR. In some embodiments, the cells further include inhibitory CARs (iCARs, see Fedorov et al., Sci. Transl. Medicine, 5(215) (December, 2013), such as a CAR recognizing a different antigen, whereby an activating signal delivered through a CAR recognizing a first antigen is diminished or inhibited by binding of the inhibitory CAR to its ligand, e.g., to reduce off-target effects.

In some embodiments, the intracellular signaling domain of the CD8+ cytotoxic T cells is the same as the intracellular signaling domain of the CD4+ helper T cells. In some embodiments, the intracellular signaling domain of the CD8+ cytotoxic T cells is different than the intracellular signaling domain of the CD4+ helper T cells.

In certain embodiments, the intracellular signaling region comprises a CD28 transmembrane and signaling domain linked to a CD3 (e.g., CD3-zeta) intracellular domain. In some embodiments, the intracellular signaling region comprises a chimeric CD28 and CD137 (4-1BB, TNFRSF9) co-stimulatory domains, linked to a CD3 zeta intracellular domain.

In some embodiments, the CAR encompasses one or more, e.g., two or more, costimulatory domains and an activation domain, e.g., primary activation domain, in the cytoplasmic portion. Exemplary CARs include intracellular components of CD3-zeta, CD28, and 4-1BB.

In some cases, CARs are referred to as first, second, and/or third generation CARs. In some aspects, a first generation CAR is one that solely provides a CD3-chain induced signal upon antigen binding; in some aspects, a second-generation CARs is one that provides such a signal and costimulatory signal, such as one including an intracellular signaling domain from a costimulatory receptor such as CD28 or CD137; in some aspects, a third generation CAR in some aspects is one that includes multiple costimulatory domains of different costimulatory receptors.

In some embodiments, the chimeric antigen receptor includes an extracellular ligand-binding portion, such as an antigen-binding portion, such as an antibody or fragment thereof and in intracellular domain. In some embodiments, the antibody or fragment includes an scFv or a single-domain VH antibody and the intracellular domain contains an ITAM. In some aspects, the intracellular signaling domain includes a signaling domain of a zeta chain of a CD3-zeta (CD3ζ) chain. In some embodiments, the chimeric antigen receptor includes a transmembrane domain linking the extracellular domain and the intracellular signaling domain. In some aspects, the transmembrane domain contains a transmembrane portion of CD28. The extracellular domain and transmembrane can be linked directly or indirectly. In some embodiments, the extracellular domain and transmembrane are linked by a spacer, such as any described herein. In some embodiments, the chimeric antigen receptor contains an intracellular domain of a T cell costimulatory molecule, such as between the transmembrane domain and intracellular signaling domain. In some aspects, the T cell costimulatory molecule is CD28 or 4-1BB.

In some embodiments, the CAR contains an antibody, e.g., an antibody fragment, a transmembrane domain that is or contains a transmembrane portion of CD28 or a functional variant thereof, and an intracellular signaling domain containing a signaling portion of CD28 or functional variant thereof and a signaling portion of CD3 zeta or functional variant thereof. In some embodiments, the CAR contains an antibody, e.g., antibody fragment, a transmembrane domain that is or contains a transmembrane portion of CD28 or a functional variant thereof, and an intracellular signaling domain containing a signaling portion of a 4-1BB or functional variant thereof and a signaling portion of CD3 zeta or functional variant thereof. In some such embodiments, the receptor further includes a spacer containing a portion of an Ig molecule, such as a human Ig molecule, such as an Ig hinge, e.g. an IgG4 hinge, such as a hinge-only spacer.

In some embodiments, the transmembrane domain of the receptor, e.g., the CAR is a transmembrane domain of human CD28 or variant thereof, e.g., a 27-amino acid transmembrane domain of a human CD28 (Accession No.: P10747.1). In some embodiments, the intracellular domain comprises an intracellular costimulatory signaling domain of human CD28 or functional variant thereof, such as a 41 amino acid domain thereof and/or such a domain with an LL to GG substitution at positions 186-187 of a native CD28 protein. In some embodiments, the intracellular domain comprises an intracellular costimulatory signaling domain of 4-1BB or functional variant thereof, such as a 42-amino acid cytoplasmic domain of a human 4-1BB (Accession No. Q07011.1). In some embodiments, the intracellular signaling domain comprises a human CD3 zeta stimulatory signaling domain or functional variant thereof, such as an 112 AA cytoplasmic domain of isoform 3 of human CD3ζ (Accession No.: P20963.2) or a CD3 zeta signaling domain as described in U.S. Pat. No. 7,446,190. In some aspects, the spacer contains only a hinge region of an IgG, such as only a hinge of IgG4 or IgG1. In other embodiments, the spacer is an Ig hinge, e.g., and IgG4 hinge, linked to a $C_H2$ and/or $C_H3$ domains. In some embodiments, the spacer is an Ig hinge, e.g., an IgG4 hinge, linked to $C_H2$ and $C_H3$ domains. In some embodiments, the spacer is an Ig hinge, e.g., an IgG4 hinge, linked to a $C_H3$ domain only. In some embodiments, the spacer is or comprises a glycine-serine rich sequence or other flexible linker such as known flexible linkers.

For example, in some embodiments, the CAR includes: an extracellular ligand-binding portion, such as an antigen-binding portion, such as an antibody or fragment thereof, including sdAbs and scFvs, that specifically binds an antigen, e.g. an antigen described herein; a spacer such as any of the Ig-hinge containing spacers; a transmembrane domain that is a portion of CD28 or a variant thereof; an intracellular signaling domain containing a signaling portion of CD28 or functional variant thereof; and a signaling portion of CD3 zeta signaling domain or functional variant thereof. In some embodiments, the CAR includes: an extracellular ligand-binding portion, such as an antigen-binding portion, such as an antibody or fragment thereof, including sdAbs and scFvs, that specifically binds an antigen, e.g. an antigen described herein; a spacer such as any of the Ig-hinge containing spacers; a transmembrane domain that is a portion of CD28 or a variant thereof; an intracellular signaling domain containing a signaling portion of 4-1BB or functional variant thereof; and a signaling portion of CD3 zeta signaling domain or functional variant thereof. In some embodiments, such CAR constructs further includes a T2A ribosomal skip element and/or a truncated EGFR (e.g., tEGFR) sequence, e.g., downstream of the CAR.

B. T Cell Receptors (TCRs)

In some embodiments, the recombinant protein is or includes a recombinant T cell receptor (TCR). In some embodiments, the recombinant TCR is specific for an antigen, generally an antigen present on a target cell, such as a tumor-specific antigen, an antigen expressed on a particular cell type associated with an autoimmune or inflammatory disease, or an antigen derived from a viral pathogen or a bacterial pathogen.

In some embodiments, the TCR is one that has been cloned from naturally occurring T cells. In some embodiments, a high-affinity T cell clone for a target antigen (e.g., a cancer antigen) is identified and isolated from a patient. In some embodiments, the TCR clone for a target antigen has been generated in transgenic mice engineered with human immune system genes (e.g., the human leukocyte antigen system, or HLA). See, e.g., tumor antigens (see, e.g., Parkhurst et al. (2009) Clin Cancer Res. 15:169-180 and Cohen et al. (2005) J Immunol. 175:5799-5808. In some embodiments, phage display is used to isolate TCRs against a target antigen (see, e.g., Varela-Rohena et al. (2008) Nat Med. 14:1390-1395 and Li (2005) Nat Biotechnol. 23:349-354.

In some embodiments, after the T-cell clone is obtained, the TCR alpha and beta chains are isolated and cloned into a gene expression vector. In some embodiments, the TCR alpha and beta genes are linked via a picornavirus 2A ribosomal skip peptide so that both chains are coexpressed.

In some embodiments, the nucleic acid encoding a TCR further includes a marker to confirm transduction or engineering of the cell to express the receptor.

IV. Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" include plural referents unless the context clearly dictates otherwise. For example, "a" or "an" means "at least one" or "one or more." It is understood that aspects and variations described herein include "consisting" and/or "consisting essentially of" aspects and variations.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

The term "about" as used herein refers to the usual error range for the respective value readily known to the skilled person in this technical field. Reference to "about" a value or parameter herein includes (and describes) embodiments that are directed to that value or parameter per se. For example, description referring to "about X" includes description of "X".

As used herein, recitation that nucleotides or amino acid positions "correspond to" nucleotides or amino acid positions in a disclosed sequence, such as set forth in the Sequence listing, refers to nucleotides or amino acid positions identified upon alignment with the disclosed sequence to maximize identity using a standard alignment algorithm, such as the GAP algorithm. By aligning the sequences, one skilled in the art can identify corresponding residues, for example, using conserved and identical amino acid residues as guides. In general, to identify corresponding positions, the sequences of amino acids are aligned so that the highest order match is obtained (see, e.g.: Computational Molecular Biology, Lesk, A. M., ed., Oxford University Press, New York, 1988; Biocomputing: Informatics and Genome Projects, Smith, D. W., ed., Academic Press, New York, 1993; Computer Analysis of Sequence Data, Part I, Griffin, A. M., and Griffin, H. G., eds., Humana Press, New Jersey, 1994; Sequence Analysis in Molecular Biology, von Heinje, G., Academic Press, 1987; and Sequence Analysis Primer, Gribskov, M. and Devereux, J., eds., M Stockton Press, New York, 1991; Carrillo et al. (1988) SIAM J Applied Math 48: 1073).

The term "vector," as used herein, refers to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors." Among the vectors are viral vectors, such as retroviral, e.g., gammaretroviral and lentiviral vectors.

The terms "host cell," "host cell line," and "host cell culture" are used interchangeably and refer to cells into which exogenous nucleic acid has been introduced, including the progeny of such cells. Host cells include "transformants" and "transformed cells," which include the primary transformed cell and progeny derived therefrom without regard to the number of passages. Progeny may not be completely identical in nucleic acid content to a parent cell, but may contain mutations. Mutant progeny that have the same function or biological activity as screened or selected for in the originally transformed cell are included herein.

As used herein, a statement that a cell or population of cells is "positive" for a particular marker refers to the detectable presence on or in the cell of a particular marker, typically a surface marker. When referring to a surface marker, the term refers to the presence of surface expression as detected by flow cytometry, for example, by staining with an antibody that specifically binds to the marker and detecting said antibody, wherein the staining is detectable by flow cytometry at a level substantially above the staining detected carrying out the same procedure with an isotype-matched control under otherwise identical conditions and/or at a level substantially similar to that for cell known to be positive for the marker, and/or at a level substantially higher than that for a cell known to be negative for the marker.

As used herein, a statement that a cell or population of cells is "negative" for a particular marker refers to the absence of substantial detectable presence on or in the cell of a particular marker, typically a surface marker. When referring to a surface marker, the term refers to the absence of surface expression as detected by flow cytometry, for example, by staining with an antibody that specifically binds to the marker and detecting said antibody, wherein the staining is not detected by flow cytometry at a level substantially above the staining detected carrying out the same procedure with an isotype-matched control under otherwise identical conditions, and/or at a level substantially lower than that for cell known to be positive for the marker, and/or at a level substantially similar as compared to that for a cell known to be negative for the marker.

As used herein, "percent (%) amino acid sequence identity" and "percent identity" when used with respect to an amino acid sequence (reference polypeptide sequence) is defined as the percentage of amino acid residues in a candidate sequence (e.g., the subject antibody or fragment) that are identical with the amino acid residues in the reference polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or Megalign (DNASTAR) software. Those skilled in the art can determine appropriate parameters for aligning sequences, including any algorithms needed to achieve maximal alignment over the full length of the sequences being compared.

An amino acid substitution may include replacement of one amino acid in a polypeptide with another amino acid. The substitution may be a conservative amino acid substitution or a non-conservative amino acid substitution. Amino acid substitutions may be introduced into a binding molecule, e.g., antibody, of interest and the products screened for a desired activity, e.g., retained/improved antigen binding, decreased immunogenicity, or improved ADCC or CDC.

Amino acids generally can be grouped according to the following common side-chain properties:
(1) hydrophobic: Norleucine, Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro;
(6) aromatic: Trp, Tyr, Phe.

In some embodiments, conservative substitutions can involve the exchange of a member of one of these classes for another member of the same class. In some embodiments, non-conservative amino acid substitutions can involve exchanging a member of one of these classes for another class.

As used herein, a composition refers to any mixture of two or more products, substances, or compounds, including cells. It may be a solution, a suspension, liquid, powder, a paste, aqueous, non-aqueous or any combination thereof.

As used herein, a "subject" is a mammal, such as a human or other animal, and typically is human.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

V. Exemplary Embodiments

Among the provided embodiments are:
1. A method of classifying T cells, the method comprising:
receiving image data associated with a first T cell of a population of cells comprising T cells;
determining, from the image data, one or more input features, said one or more input features comprising a morphological feature of the image data, an optical feature of the image data, an intensity feature of the image data, a phase feature of the image data, a system feature of the image data, or any combination thereof;
applying the one or more input features as input to a process configured to classify, based on the one or more input features, the first T cell as belonging to a first group or a second group.
2. A method comprising:
receiving image data associated with a first T cell of a population of cells comprising T cells;
determining a classification of the first T cell as belonging to a first group or a second group;
determining, from the image data, one or more input features, said one or more input features comprising a morphological feature of the image data, an optical feature of the image data, an intensity feature of the image data, a phase feature of the image data, a system feature of the image data, or any combination thereof, and generating a feature map having one or more dimensions, wherein each dimension of the one or more dimensions is associated with one or more of the morphological feature of the image data, the optical feature of the image data, the intensity feature of the image data, the phase feature of the image data, the system feature of the image data, or any combination thereof;
training a convolutional neural network based on the feature map and the determined classification.
3. The method of embodiment 1, wherein:
the process comprises applying a convolutional neural network trained using the method of embodiment 2; and
applying the one or more input features determined from the image data associated with the first T cell as input to the process comprises applying the one or more input features to the convolutional neural network.
4. A method of classifying T cells, the method comprising:
receiving image data associated with a first T cell of a population of cells comprising T cells;
determining, from the image data, one or more input features, said one or more input features comprising a morphological feature of the image data, an optical feature of the image data, an intensity feature of the image data, a phase feature of the image data, a system feature of the image data, or any combination thereof;
applying the one or more input features as input to a process, the process comprising a convolutional neural network trained on one or more input features determined from image data associated with T cells known to belong to a first group and T cells known to belong to a second group, said one or more input features comprising a morphological feature of the image data, an optical feature of the image data, an intensity feature of the image data, a phase feature of the image data, a system feature of the image data, or any combination thereof, to classify the first T cell as belonging to the first group or the second group.
5. A method comprising:
receiving image data associated with a first T cell of a population of cells comprising T cells;
determining a classification of the first T cell as belonging to a first group or a second group; determining, from the image data, one or more input features, said one or more input features comprising a morphological feature of the image data, an optical feature of the image data, an intensity feature of the image data, a phase feature of the image data, a system feature of the image data, or any combination thereof;
training a neural network on the input features and the determined classification.
6. The method of embodiment 1, wherein:
the process comprises applying a neural network trained using the method of embodiment 5; and
applying the one or more input features determined from the image data associated with the first T cell as input to the process comprises applying the one or more input features to the neural network.

7. A method of classifying T cells, the method comprising:
receiving image data associated with a first T cell of a population of cells comprising T cells;
determining, from the image data, one or more input features, said one or more input features comprising a morphological feature of the image data, an optical feature of the image data, an intensity feature of the image data, a phase feature of the image data, a system feature of the image data, or any combination thereof;
applying the one or more input features as input to a process, the process comprising a neural network trained on one or more input features determined from image data associated with T cells known to belong to a first group and T cells known to belong to a second group, said one or more input features comprising a morphological feature of the image data, an optical feature of the image data, an intensity feature of the image data, a phase feature of the image data, a system feature of the image data, or any combination thereof, to classify the first T cell as belonging to the first group or the second group.

8. A method comprising:
receiving image data associated with a first T cell of a population of cells comprising T cells;
determining a classification of the first T cell as belonging to a first group or a second group; and
determining a hyperplane for a support vector machine, the hyperplane indicating a decision boundary between the first group and the second group,
wherein the hyperplane is determined based on one or more input features determined from the image data, said one or more input features comprising a morphological feature of the image data, an optical feature of the image data, an intensity feature of the image data, a phase feature of the image data, a system feature of the image data, or any combination thereof.

9. The method of embodiment 1, wherein:
the process comprises applying a support vector machine using a hyperplane determined using the method of embodiment 8; and
applying the one or more input features determined from the image data associated with the first T cell as input to the process comprises applying the one or more input features to the support vector machine.

10. A method of classifying T cells, the method comprising:
receiving image data associated with a first T cell of a population of cells comprising T cells;
determining, from the image data, one or more input features, said one or more input features comprising a morphological feature of the image data, an optical feature of the image data, an intensity feature of the image data, a phase feature of the image data, a system feature of the image data, or any combination thereof;
applying the one or more input features as input to a process, the process comprising a support vector machine trained on one or more input features determined from image data associated with T cells known to belong to a first group and T cells known to belong to a second group, said one or more input features comprising a morphological feature of the image data, an optical feature of the image data, an intensity feature of the image data, a phase feature of the image data, a system feature of the image data, or any combination thereof, to classify the first T cell as belonging to the first group or the second group.

11. A method comprising:
receiving image data associated with a first T cell of a population of cells comprising T cells;
determining a classification of the first T cell as belonging to a first group or a second group; and
determining a random forest for a classification process, the random forest comprising one or more decision trees, the classification process relating one or more input features determined from the image data associated with the first T cell to the classification of the first T cell as belonging to the first group or belonging to the second group,
wherein a decision tree of the one or more decision tress is determined based on one or more input features, said one or more input features comprising a morphological feature of the image data, an optical feature of the image data, an intensity feature of the image data, a phase feature of the image data, a system feature of the image data, or any combination thereof.

12. The method of embodiment 1, wherein:
the process comprises a random forest determined using the method of embodiment 11; and
applying the one or more input features determined from the image data associated with the image of the first T cell as input to the process comprises applying the one or more input features to the random forest.

13. A method of classifying T cells, the method comprising:
receiving image data associated with a first T cell of a population of cells comprising T cells;
determining, from the image data, one or more input features, said one or more input features comprising a morphological feature of the image data, an optical feature of the image data, an intensity feature of the image data, a phase feature of the image data, a system feature of the image data, or any combination thereof;
applying the one or more input features as input to a process, the process comprising a random forest classification process relating one or more input features determined from image data associated with T cells known to belong to a first group and T cells known to belong to a second group, said one or more input features comprising a morphological feature of the image data, an optical feature of the image data, an intensity feature of the image data, a phase feature of the image data, a system feature of the image data, or any combination thereof, to classify the first T cell as belonging to the first group or the second group.

14. A method comprising:
receiving image data associated with a first T cell of a population of cells comprising T cells, the image data comprising one or more of phase image data, intensity image data, and superposition image data;
determining a classification of the first T cell as belonging to a first group or a second group;
generating, from the image data, a feature map having one or more dimensions;
training a convolutional neural network based on the feature map and the determined classification.

15. A method of classifying T cells, the method comprising:
receiving image data associated with a first T cell of a population of cells comprising T cells, wherein the image data comprises one or more of phase image data, intensity image data, and superposition image data;
applying the image data as input to a process, the process comprising a convolutional neural network trained on image data associated with T cells known to belong to a first group and T cells known to belong to a second group, wherein the images comprise image data comprising one or more of phase image data, intensity image data, and superposition image data, to classify the first T cell as belonging to the first group or the second group.

16. The method of any of embodiments 1, 3, 4, 6, 7, 9, 10, and 12-15, wherein the process is configured to classify about or at least 70, 75, 80, 85, 90, 91, 92, 93, 94, 95, 96, 97, 98, 99, or 100% of T cells in the population of cells comprising T cells as belonging to the first group or belonging to the second group.

17. A method of generating a cellular dataset for training a machine learning model, the method comprising:
(a) providing a mixed population of cells comprising at least a first and second different cell type, wherein at least the first cell type expresses at least one surface molecule not expressed by other cell types in the mixed population of cells;
(b) contacting the mixed population of cells with a first multimerization reagent reversibly bound to a plurality of first binding agents, each of said first binding agent comprising a monovalent binding site able to bind the surface molecule expressed by the first cell type; and
(c) isolating one or more cells of the first cell type that are bound to the first binding agent by immunoaffinity-based chromatography, thereby obtaining a first cellular dataset, wherein the isolating is carried out under conditions to reversibly dissociate the first multimerization reagent from the first binding agent;
wherein the first cellular dataset is substantially free of the first multimerization reagent and the first binding agent.

18. The method of embodiment 17, wherein the at least one first cell type expresses a recombinant surface molecule.

19. The method of embodiment 18, wherein the recombinant surface molecule is a recombinant receptor.

20. The method of embodiment 19, wherein the recombinant receptor is a chimeric antigen receptor or a T cell receptor.

21 The method of any of embodiments 17-20, wherein prior to (c) the method produces a second population of cells not bound to the first binding agent, said second population of cells comprising cells that do not express the surface molecule expressed by the first cell type, thereby obtaining a second cellular dataset.

22 The method of any of embodiments 17-21, wherein each of the first and second cell type expresses at least one surface molecule not expressed by other cell types in the mixed population of cells.

23. The method of any of embodiments 17-22, further comprising:
(d) contacting the mixed population of cells with a second multimerization reagent reversibly bound to a plurality of second binding agents, each of said second binding agent comprising a monovalent binding site able to bind the surface molecule expressed by the second cell type; and
(e) isolating one or more cells of the second cell type that are bound to the second binding agent by immunoaffinity-based chromatography, thereby obtaining a second cellular dataset, wherein the isolating is carried out under conditions to reversibly dissociate the second multimerization reagent from the second binding agent;
wherein the second cellular dataset is substantially free of the second multimerization reagent and the second binding agent.

24. The method of embodiment 23, wherein the mixed population of cells further comprises a third cell type that expresses at least one surface molecule not expressed by other cell types in the mixed population of cells, and the method further comprises:
(f) contacting the mixed population of cells with a third multimerization reagent reversibly bound to a plurality of third binding agents, each of said third binding agent comprising a monovalent binding site able to bind the surface molecule expressed by the third cell type; and
(e) isolating one or more cells of the third cell type that are bound to the third binding agent by immunoaffinity-based chromatography, thereby obtaining a third cellular dataset, wherein the isolating is carried out under conditions to reversibly dissociate the third multimerization reagent from the third binding agent;
wherein the third cellular dataset is substantially free of the third multimerization reagent and the third binding agent.

25. The method of any of embodiments 17-23 that is repeated for one or more additional different cell type.

26. The method of any of embodiments 17-22, wherein prior to (c) the method produces a second population of cells not bound to the first binding agent, said second population of cells comprising cells that do not express the surface molecule expressed by the first cell type, and the method further comprises:
(d) contacting the second population of cells with a second multimerization reagent reversibly bound to a plurality of second binding agents, each of said second binding agent comprising a monovalent binding site able to bind the surface molecule expressed by the second cell type; and
(e) isolating one or more cells of the second cell type that are bound to the second binding agent by immunoaffinity-based chromatography, thereby obtaining a second cellular dataset, wherein the isolating is carried out under conditions to reversibly dissociate the second multimerization reagent from the second binding agent;
wherein the second cellular dataset is substantially free of the second multimerization reagent and the second binding agent.

27. The method of embodiment 26, wherein prior to (e) the method produces a third population of cells not bound to the second binding agent, said third population of cells comprising cells that do not express the surface molecule expressed by the first cell type and the second cell type, and the method further comprises:
(d) contacting the third population of cells with a third multimerization reagent reversibly bound to a plurality of third binding agents, each of said third binding agent comprising a monovalent binding site able to bind the surface molecule expressed by the third cell type; and
(e) isolating one or more cells of the third cell type that are bound to the third binding agent by immunoaffinity-based chromatography, thereby obtaining a third cellular dataset, wherein the isolating is carried out under conditions to reversibly dissociate the third multimerization reagent from the third binding agent;
wherein the third cellular dataset is substantially free of the third multimerization reagent and the third binding agent.

28. The method of any of embodiments 17-22, 26 and 27 that is repeated for one or more additional different cell type.

29. The method of any of embodiments 17-28, wherein the first and second cell type is one of (i) CD4+ T cells and (ii) CD8+ T cells and the second cell type is the other of (i) CD4+ T cells and (ii) CD8+ T cells.
30. The method of any of embodiments 17-29, wherein the contacting is carried out by adding the cells to a chromatography column comprising a stationary phase to which is immobilized the multimerization reagent reversibly bound to the binding agent (e.g. the first multimerization reagent reversibly bound to the first binding agent, the second multimerization reagent reversibly bound to the second binding agent, or the third multimerization reagent reversibly bound to the third binding agent).
31. The method of any of embodiments 17-30, wherein the isolating comprises eluting the cells from the chromatography column.
32. The method of any of embodiments 17-31, wherein the first binding agent further comprises a binding partner capable of forming a reversible bond with the first multimerization reagent, wherein:
the binding partner comprises a sequence of amino acids set forth in SEQ ID NO:6, 7, 8, 9, or 10; and
the first multimerization reagent comprises streptavidin, a streptavidin mutein, avidin, or an avidin mutein.
33. The method of any of embodiments 23-32, wherein the second binding agent further comprises a binding partner capable of forming a reversible bond with the second multimerization reagent, wherein:
the binding partner comprises a sequence of amino acids set forth in SEQ ID NO:6, 7, 8, 9, or 10; and
the second multimerization reagent comprises streptavidin, a streptavidin mutein, avidin, or an avidin mutein.
34. The method of any of embodiments 24-33, wherein the third binding agent further comprises a binding partner capable of forming a reversible bond with the third multimerization reagent, wherein:
the binding partner comprises a sequence of amino acids set forth in SEQ ID NO:6, 7, 8, 9, or 10; and
the third multimerization reagent comprises streptavidin, a streptavidin mutein, avidin, or an avidin mutein.
35. The method of any of embodiments 32-34, wherein the streptavidin mutein comprises the sequence of amino acids set forth in SEQ ID NO: 12, 13, 15 or 16.
36. The method of any of embodiments 17-35, wherein the reversible bond has a dissociation constant ($K_D$) in the range of about $10^{-2}$ to about $10^{-13}$ M.
37 The method of any of embodiments 17-36, wherein the monovalent binding site is a Fab fragment, a sdAb, a Fv fragment or a single chain Fv fragment.
38. The method of any of embodiments 17-37, wherein the bond between the monovalent binding site and the surface molecule has a dissociation constant ($K_D$) in the range of about $10^{-3}$ to about $10^{-7}$ M.
39. The method of any of embodiments 17-37, wherein the bond between the monovalent binding site and the surface molecule has a dissociation rate constant of about $3\times10^5$ $sec^1$ or greater.
40. The method of any of embodiments 17-39, wherein the reversible dissociation comprises addition of a competition reagent.
41. The method of embodiment 40, wherein the competition reagent is biotin or a biotin analog.
42. The method of any of embodiments 17-41, further comprising:
receiving image data associated with the cells of the first cellular dataset, the image data comprising one or more of phase image data, intensity image data, and superposition image data.

43. The method of any of embodiments 18-42, further comprising:
receiving image data associated with the cells of the second cellular dataset, the image data comprising one or more of phase image data, intensity image data, and superposition image data.
44. The method of any of embodiments 26-43, further comprising:
receiving image data associated with the cells of the third cellular dataset, the image data comprising one or more of phase image data, intensity image data, and superposition image data.
45. The method of any of embodiments 17-44, further comprising:
receiving image data associated with cells of the first cellular dataset;
determining, from the image data, one or more input features, said one or more input features comprising a morphological feature of the image data, an optical feature of the image data, an intensity feature of the image data, a phase feature of the image data, a system feature of the image data, or any combination thereof.
46. The method of any of embodiments 18-45, further comprising:
receiving image data associated with cells of the second cellular dataset;
determining, from the image data, one or more input features, said one or more input features comprising a morphological feature of the image data, an optical feature of the image data, an intensity feature of the image data, a phase feature of the image data, a system feature of the image data, or any combination thereof.
47 The method of any of embodiments 23-46, further comprising:
receiving image data associated with cells of the third cellular dataset;
determining, from the image data, one or more input features, said one or more input features comprising a morphological feature of the image data, an optical feature of the image data, an intensity feature of the image data, a phase feature of the image data, a system feature of the image data, or any combination thereof.
48. The method of any of embodiments 42, 43, or 44, further comprising generating from the image data a feature map having one or more dimensions;
training a convolutional neural network based on the feature map.
50. The method of any of embodiments 45, 46, or 47, further comprising training a neural network on the input features.
51. The method of any of embodiments 45, 46, or 47, further comprising determining a hyperplane associated with a support vector machine, the determining based on the one or more input features.
52. The method of any of embodiments 45-, 46, or 47, further comprising determining one or more decision trees of a random forest, the determining based on the one or more input features.
53. The method of any of embodiments 2, 5, 8, 11, and 14, wherein image data is received from about or at least 70, 75, 80, 85, 90, 91, 92, 93, 94, 95, 96, 97, 98, 99, or 100% of the T cells of the population of cells comprising T cells.
54. The method of any of embodiments 1-16 and 53, wherein the image data comprises one or more of phase image data, intensity image data, and superposition image data.

55. The method of any of embodiments 1-16 and 42-54, wherein the image data is obtained using differential digital holographic microscopy (DDHM).
56. The method of any of embodiments 1-16 and 42-55, wherein the image data is obtained using an objective of about 20×.
57. The method of any of embodiments 1-16 and 42-56, wherein the image data is obtained using a CCD camera.
58. The method of embodiment 15, wherein the image data associated with the T cell is used to determine one or more input features, said one or more input features comprising a morphological feature of the image data, an optical feature of the image data, an intensity feature of the image data, a phase feature of the image data, a system feature of the image data, or any combination thereof.
59. The method of any of embodiments 1-14, 16, 45-47, and 50-58, wherein the one or more input features comprise one or more of an aspect ratio of the cell, a cell depth, an area of a cell, a cell descriptor, a cell identifier, an image identifier, an object identifier, a center of mass along an X axis, a center of mass along a Y axis e, a circularity of the cell, a compactness of the cell, a normalized aspect ratio, an elongation of the cell, a diameter of the cell, a peak diameter, a hu moment invariant 1, a hu moment invariant 2, a hu moment invariant 3, a hu moment invariant 4, a hu moment invariant 5, ahu moment invariant 6, a hu moment invariant 7, an average intensity contrast, an average entropy, an average intensity, an average intensity uniformity, an intensity contrast of an image of the cell, an intensity correlation of an image of the cell, an intensity entropy of an image of the cell, an intensity homogeneity of an image of the cell, a maximum intensity of the cell, a mean intensity of the cell, a minimum intensity of the cell an intensity skewness of an image of the cell, an intensity smoothness of an image of the cell, an intensity variance of an image of the cell, an intensity uniformity of an image of the cell, a plane where the intensity of the cell is maximum, an indication a cell lies along border of a field of view, an indication a refractive peak lies along a border of a field of view, mass eccentricity of the cell, a maximum optical height of the cell in radians, a maximum optical height of the cell in microns, a mean optical height of the cell in radians, a mean optical height of the cell in microns, a normalized optical height of the cell, a minimum optical height of the cell in radians, a minimum optical height of the cell in microns, a variance in optical height of a phase of an image of the cell in radians, a variance in optical height of a phase of an image of the cell in microns, an optical volume of the cell, an area of a refractive peak of the cell, a refractive peak area normalized by an area of the cell, a number of refractive peaks of the cell, an intensity of a refractive peak of the cell, a normalized refractive peak height of the cell, a perimeter, an average intensity contrast of a phase image of the cell, an average entropy of a phase image of the cell, an average phase of the cell, an average phase uniformity of the cell, a phase intensity contrast of the cell, a phase correlation of the cell, a phase entropy feature of the cell, a phase homogeneity of the cell, a phase skewness of the cell, a phase smoothness of the cell, a phase uniformity of the cell, a mean of a radius of the cell, a variance of a radius of the cell, and a normalized radius variance of the cell.
60. The method of any of embodiments 1-14, 16, 45-47, and 50-59, wherein the input features comprise about or at least 70, 65, 60, 55, 50, 45, 40, 35, 30, 25, 20, 15, 10, 9, 8, 7, 6, 5, 4, 3, 2, or 1 input features.
61. The method of any of embodiments 1-14, 16, 45-47, and 50-60, wherein the input features comprise about 1 to about 70, about 1 to about 60, about 1 to about 50, about 1 to about 40, about 1 to about 30, about 1 to about 20, about 1 to about 15, about 1 to about 10, or about 1 to about 5 input features.
62. The method of any of embodiments 1-14, 16, 45-47, and 50-61, wherein the input features comprise less than or less than about 70, 65, 60, 55, 50, 45, 40, 35, 30, 25, 20, 15, 10, or 5 input features.
63. The method of any of embodiments 1-14, 16, 45-47, and 50-62, wherein the input features comprise less than or less than about 20, 15, 10, or 5 input features.
64. The method of any of embodiments 1-14, 16, 45-47, and 50-63, wherein the one or more input features is a morphological feature of the image data selected from one or more of an aspect ratio of the cell, an area of the cell, a circularity of the cell, a compactness of the cell, a normalized aspect ratio, an elongation of the cell, a diameter of the cell, a hu moment invariant 1, a hu moment invariant 2, a hu moment invariant 3, a hu moment invariant 4, a hu moment invariant 5, a hu moment invariant 6, a hu moment invariant 7, a perimeter, a mean of a radius of the cell, a variance of a radius of the cell, and a normalized radius variance.
65. The method of any of embodiments 1-14, 16, 45-47, and 50-64, wherein the one or more input features is an area of the cell.
66. The method of any of embodiments 1-14, 16, 45-47, and 50-65, wherein the one or more input features is an optical feature of the image data selected from one or more of a diameter of the cell, a maximum intensity of the cell, a mean intensity of the cell, a minimum intensity of the cell, a mass eccentricity of the cell, a maximum optical height of the cell in radians, a maximum optical height of the cell in microns, a mean optical height of the cell in radians, a mean optical height of the cell in microns, a normalized optical height of the cell, a minimum optical height of the cell in radians, a minimum optical height of the cell in microns, an optical volume of the cell, an area of a refractive peak of the cell, a refractive peak area normalized by an area of the cell, a number of refractive peaks of the cell, an intensity of a refractive peak of a cell, and a normalized refractive peak height of the cell.
67. The method of any of embodiments 1-14, 16, 45-47, and 50-66, wherein the one or more of the input features is an intensity feature of the image data selected from one or more of an average intensity contrast, an average entropy, an average intensity, an average intensity uniformity, an intensity contrast of an image of the cell, an intensity correlation of an image of the cell, an intensity entropy of an image of the cell, an intensity homogeneity of an image of the cell, an intensity skewness of an image of the cell, an intensity smoothness of an image of the cell, an intensity variance of an image of the cell, a plane where the intensity of the cell is maximum, and an intensity uniformity of an image of the cell.

68. The method of any of embodiments 1-14, 16, 45-47, and 50-67, wherein the one or more input features is a phase feature of the image data selected from one or more of a variance in optical height of a phase of an image of the cell in radians, a variance in optical height of a phase of an image of the cell in microns, an average intensity contrast of a phase image of the cell, an average entropy of a phase image of the cell, an average phase of the cell, an average phase uniformity of the cell, a phase intensity contrast of the cell, a phase correlation of the cell, a phase entropy feature of the cell, a phase homogeneity of the cell, a phase skewness of a cell, a phase smoothness of a cell, and a phase uniformity of the cell.

69. The method of any of embodiments 1-14, 16, 45-47, and 50-58, wherein the one or more input features is or comprises a phase correlation of the cell.

70. The method of any of embodiments 1-14, 16, 45-47, and 50-69, wherein the one or more inputs is a system feature of the image data selected from one or more of a cell depth, a cell identified, an image identifier, a cell descriptor, a center of mass along an X axis, a center of mass along a Y axis, an object identifier, an indication a cell lies along border of a field of view, and an indication a refractive peak lies along a border of a field of view.

71. The method of any of embodiments 1-14, 16, 45-47, and 50-70, wherein the one or more input features is or comprises a cell depth.

72. The method of any of embodiments 1-16 and 53-71, wherein the first group and second group are defined by one or more cellular attributes selected from live, dead, CD4+, CD8+, recombinant receptor positive, or recombinant receptor negative, wherein the first group and second group comprise at least one different attribute.

73. The method of any of embodiments 1-16 and 53-72, wherein one of the first or second group comprises the attribute live and the other group comprises the attribute dead.

74. The method of embodiment 72 or embodiment 73, wherein the attribute dead comprises non-viable cells and debris.

75. The method of embodiment 72 or embodiment 73, wherein the attribute live comprises single viable cells or clusters of viable cells.

76. The method of any of embodiments 1-16, 45-47, and 50-75, wherein the one or more input features comprises a phase correlation of the cell, an area of the cell, a number of refractive peaks of the cell, a phase skewness of a cell, a peak diameter, a refractive peak area normalized by an area of the cell, a variance of a radius of the cell, an intensity uniformity of an image of the cell, a compactness of the cell, a phase intensity contrast of the cell, a normalized radius variance, and a circularity of the cell.

77. The method of any of embodiments 1-16, 45-47, and 50-76, wherein the one or more input features comprises a phase correlation of the cell.

78. The method of any of embodiments 1-16, 45-47, and 50-77, wherein the one or more input features comprises an area of the cell.

79. The method of any of embodiments 1-16, and 53-72, wherein one of the first or second group comprises the attribute CD4+ and the other group comprises the attribute CD8+.

80. The method of any of embodiments 1-16, 45-47, 50-72, and 79, wherein the one or more input features comprises an average phase uniformity of the cell, the peak diameter, a normalized refractive peak height of the cell, an average phase of the cell, a refractive peak area normalized by an area of the cell, a minimum optical height of the cell in microns, a compactness of the cell, a circularity of the cell, a phase smoothness of a cell, an intensity homogeneity of an image of the cell, a plane where the intensity of the cell is maximum, an area of a refractive peak of the cell, a phase correlation of the cell, a cell depth, an intensity contrast of an image of the cell, an intensity uniformity of an image of the cell, a normalized radius variance, an intensity smoothness of an image of the cell, a phase intensity contrast of the cell, a maximum optical height of the cell, an average intensity contrast of the cell, an average intensity uniformity of the cell, an intensity skewness of an image of the cell, a hu moment invariant 1, an intensity variance of an image of the cell, an average entropy, and an intensity correlation of an image of the cell.

81. The method of any of embodiments 1-16, 45-47, 50-72, 79, and 80, wherein the one or more input features comprises a cell depth, an intensity contrast of an image of the cell, an intensity uniformity of an image of the cell, a normalized radius variance, an intensity smoothness of an image of the cell, a phase intensity contrast of the cell, a maximum optical height of the cell in microns, an average intensity contrast of the cell, an average intensity uniformity of the cell, an intensity skewness of an image of the cell, a hu moment invariant 1, an intensity variance of an image of the cell, an average entropy, and an intensity correlation of an image of the cell.

82. The method of any of embodiments 1-16, 45-47, 50-72, and 79-81, wherein the one or more input features comprises a cell depth.

83. The method of any of embodiments 1-16, 45-47, 50-72, 79, and 80, wherein the one or more input features comprises a an average phase uniformity of the cell, a peak diameter, a normalized refractive peak height of the cell, an average phase of the cell, a refractive peak area normalized by an area of the cell, a minimum optical height of the in microns, a compactness of the cell, a circularity of the cell, a phase smoothness of a cell, an intensity homogeneity of an image of the cell, a plane where the intensity of the cell is maximum, an area of a refractive peak of the cell, and a phase correlation of the cell.

84. The method of any of embodiments 1-16, and 53-72, wherein one of the first or second group comprises the attribute recombinant receptor positive and the other group comprises the attribute recombinant receptor negative.

85. The method of any of embodiments 1-84, wherein the population of cells comprising T cells comprises a population of T cells enriched or purified from a biological sample or a population of mixed T cell subtypes, optionally obtained by mixing T cell populations enriched or purified from a biological sample.

86. The method of embodiment 85, wherein the biological sample comprises a whole blood sample, a buffy coat sample, a peripheral blood mononuclear cell (PBMC) sample, an unfractionated T cell sample, a lymphocyte sample, a white blood cell sample, an apheresis product, or a leukapheresis product.

87. The method of any of embodiments 1-86, wherein the population of cells comprising T cells comprises primary cells obtained from a subject.
88. The method of any of embodiments 1-87, wherein the population of cells comprising T cells comprises a population of T cells transduced with a vector comprising a recombinant receptor.
89. The method of any of embodiments 1-88, wherein the population of T cells from which one or more T cell is classified comprises a population of T cells undergoing manufacturing to generate a therapeutic T cell composition.
90. The method of embodiment 89, wherein the manufacturing includes an incubation step following transduction of the T cell population with a vector comprising a recombinant receptor.
91. The method of any of embodiments 72, 84, and 88-90, wherein the recombinant receptor is a chimeric antigen receptor (CAR).
92. The method of embodiment 90 or embodiment 91, wherein the one or more T cells of a population of cells comprising T cells are classified at different time points during the incubation step.
93. The method of embodiment 90 or embodiment 91, wherein the one or more T cells of a population of cells comprising T cells are classified continuously over the duration of the incubation period.
94. The method of any of embodiments 1-16 and 53-93, wherein classifying the one or more T cells of a population of cells comprising T cells takes place in a closed system.
95. The method of embodiment 94, wherein the closed system is sterile.
96. The method of embodiment 94 or embodiment 95, wherein the closed system is automated.

VI. Examples

The following examples are included for illustrative purposes only and are not intended to limit the scope of the invention.

Example 1: Continuous In-Line Imaging for Determination of Cell Viability and Diameter During Cultivation in a Process for Generating Engineered Anti-BCMA CAR-T Cells Various optical parameters of T cells in the process of engineering for expression of a recombinant receptor, were obtained using in-line differential digital holography microscopy (DHM). Differential DHM permits label-free imaging of cells, with high-contrast images for object segmentation, and obtaining a plurality of optical or morphological features that quantitatively describe the imaged objects, for example, for determining cell counts, viability and morphological features (e.g. diameter).

Primary T cells from a healthy human donor were engineered to express an anti-BCMA chimeric antigen receptor (CAR) using an exemplary engineering process that included separately selecting CD4+ and CD8+ T cells from a sample prior to combining the selected cells at a defined ratio for subsequent processing steps. Separate compositions of CD4+ and CD8+ cells were selected from isolated PBMCs from a human leukapheresis sample and the selected cell compositions were cryofrozen. The selected CD4+ and CD8+ T cell compositions were subsequently thawed and mixed at a ratio of 1:1 of viable CD4+ T cells to viable CD8+ T cells prior to carrying out steps for stimulation, transduction and expansion. The mixed CD4+/CD8+ T cell composition was stimulated in the presence of paramagnetic polystyrene-coated beads with attached anti-CD3 and anti-CD28 antibodies at a 1:1 bead to cell ratio in serum-free media in the presence of recombinant IL-2, IL-7, and IL-15. The stimulation was carried out by incubation for between 18 to 30 hours. The cells were transduced with a lentiviral vector encoding the anti-BCMA CAR by spinoculation for 60 minutes followed by incubation for about 18 to 30 hours at about 37° C. The CAR contained an scFv antigen-binding domain specific for BCMA, a CD28 transmembrane region, a 4-1BB costimulatory signaling region, and a CD3-zeta derived intracellular signaling domain. The transduced cells were then cultivated for expansion by transfer to a bioreactor (e.g. a rocking motion bioreactor) in serum free media containing twice the concentration of IL-2, IL-7, and IL-15 as used during the incubation and transduction steps and were incubated initially under steady rocking conditions (non-perfusion) followed by cultivation that included media replacement with semi-continuous perfusion and continual mixing. Cells were harvested after a desired threshold expansion was achieved. Following harvest, the anti-CD3 and anti-CD28 antibody conjugated beads were removed from the cell composition by exposure to a magnetic field. The cells were then formulated, aliquoted into freezing bags for administration (e.g. CryoStore Freezing Bags) and vials for further analysis, and cryofrozen. Seven experimental runs were performed (Runs 1-7).

Holographic images and optical parameters of the cells were captured continuously for up to approximately 120 hours of culture using an in-line differential DHM imaging system ("continuous"), for example an Ovizio iLine F (Ovizio Imaging Systems NV/SA, Brussels, Belgium). The in-line differential DHM system contained a disposable tubing system connected to the bioreactor such that a sample can flow from the bioreactor, through the tubing system, where an imaging system captures holographic images and optical parameters of the cells traveling through, and returns the sample to the bioreactor. Cell viability, viable cell count (VCC), and cell diameter were determined from images. Viability of the engineered cells were also compared to results by manual sampling ("manual") and cell counting using an automated cell counter, sampled at various time points for up to approximately 120 hours of culture. The two methods were compared based on time course analysis and linear regression.

Figure 1B:
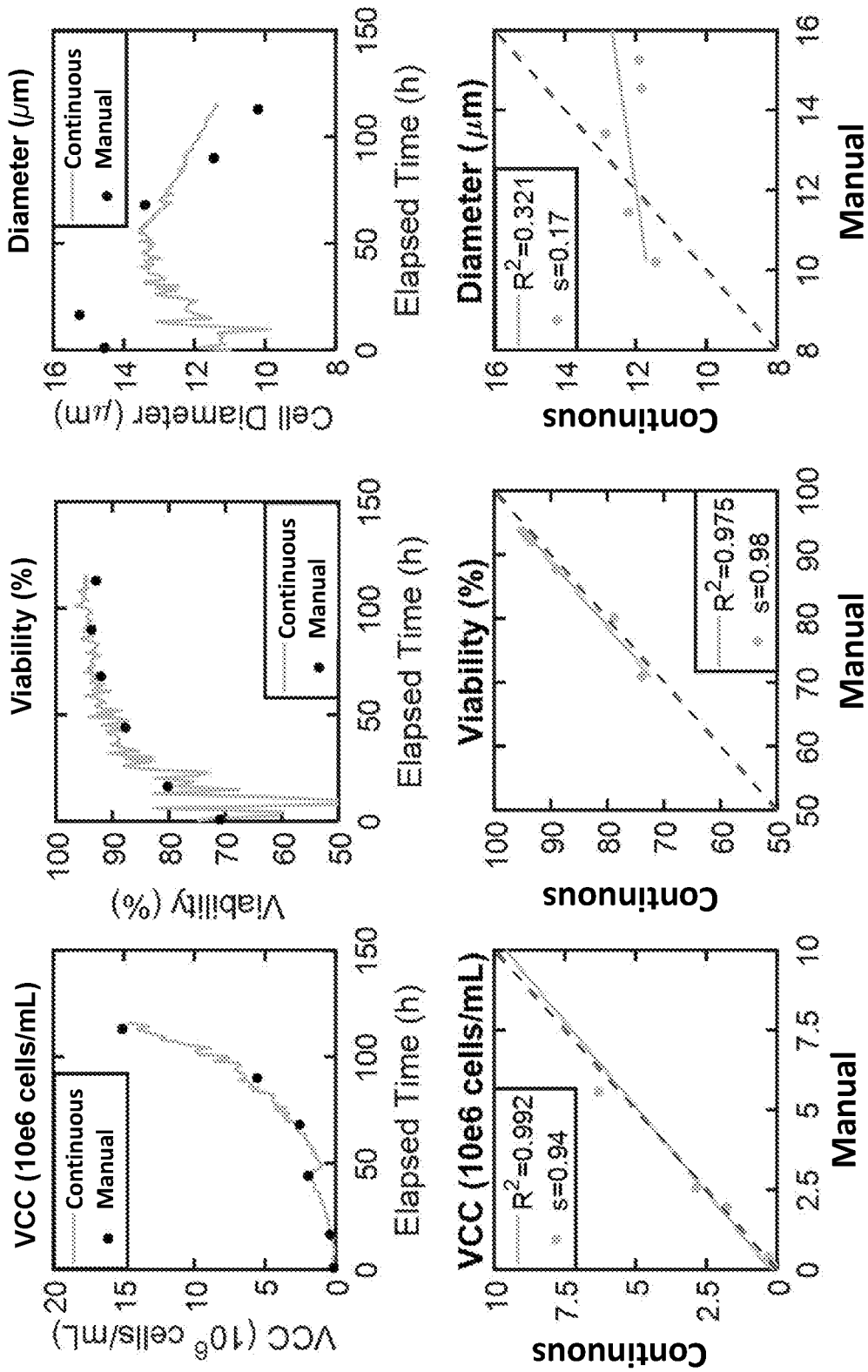

FIGS. 1A and 1B show the comparison of viable cell count (VCC), viability, and cell diameter assessed using continuous monitoring by differential DHM or manual sampling, in experimental Run 1 (FIG. 1A) and Run 2 (FIG. 1B). The $R^2$ and slope of the comparison for all seven Runs is shown in Table E1 below. The difference in VCC as measured using the two methods fell within the expected variance of the manual sampling method.

TABLE E1

R² and slope of comparison between sampling methods.

| Experiment | R² | | | Slope | | |
|---|---|---|---|---|---|---|
| | VCC | Viability | Diameter | VCC | Viability | Diameter |
| Run 1 | 0.97 | 0.96 | 0.54 | 0.92 | 0.80 | 0.32 |
| Run 2 | 0.99 | 0.98 | 0.32 | 0.94 | 0.98 | 0.17 |
| Run 3 | 0.998 | 0.973 | 0.237 | 1.16 | 1.01 | 0.23 |
| Run 4 | 0.979 | 0.848 | 0.098 | 1 | 0.9 | 0.12 |
| Run 5 | 0.992 | 0.757 | 0.008 | 0.89 | 1.07 | 0.04 |
| Run 6 | 0.987 | 0.676 | 0.012 | 0.88 | 0.93 | 0.08 |
| Run 7 | 0.986 | 0.903 | 0.246 | 1 | 0.84 | 0.17 |

The results showed that the VCC and viability as continuous monitoring and manual sampling were highly correlated. The lower correlation of cell diameter between continuous and manual monitoring may be explained by the automated focusing steps employed during continuous monitoring. Due to the manual image focusing steps during manual monitoring, cell diameter measurements obtained during manual monitoring can be variable based on operator technique. The use of automated image focusing removes operator bias. It is further possible that the difference in objectives (4× for manual versus 20× for continuous) may contribute to a reduced correlation. Furthermore, cell segmentation using brightfield, as was done for manual sampling, can result in unclear cellular boundaries due to poor contrast between the cell and the image background. The high contrast images produced by differential DHM used during continuous monitoring may be more representative of cell diameter. The results were consistent with the utility of the continuous monitoring by differential DHM during cultivation for expansion of the cells in the cell engineering process.

Example 2: Continuous In-Line Imaging for Determination of Cell Viability and Cell Diameter During Cultivation in a Process for Generating Engineered Anti-CD19 CAR– T Cells Differential DHM was carried out substantially as described in Example 1, except that holographic images and optical parameters of the cells were captured continuously for up to approximately 120 hours of the culture during cultivation in an alternative process for engineering CAR-T cells, using an in-line differential DHM imaging system ("continuous"), for example an Ovizio iLine F (Ovizio Imaging Systems NV/SA, Brussels, Belgium).

The alternative CAR-T cell process included a process involving subjecting CD4+ and CD8+ populations to process steps separately. Separate compositions of CD4+ and CD8+ cells were selected from isolated PBMCs from human leukapheresis samples and cryofrozen. The selected CD4+ and CD8+ compositions were subsequently thawed and separately underwent steps for stimulation, transduction, and expansion. The thawed CD4+ and CD8+ cells were separately stimulated in the presence of paramagnetic polystyrene-coated beads with attached anti-CD3 and anti-CD28 antibodies at a 1:1 bead to cell ratio. The cells were stimulated in media containing IL-2, IL-15, and N-Acetyl Cysteine (NAC). The CD4+ cell media also included IL-7. Following the introduction of the beads, CD4+ and CD8+ cells were separately transduced with a lentiviral vector encoding the same anti-CD19 CAR. The CAR contained an anti-CD19 scFv derived from a murine antibody, an immunoglobulin spacer, a transmembrane domain derived from CD28, a costimulatory region derived from 4-1BB, and a CD3-zeta intracellular signaling domain. The vector also encoded a truncated receptor that served as a surrogate marker for CAR expression that was connected to the CAR construct by a T2A sequence. The cells were transduced in the presence of 10 µg/ml protamine sulfate. After transduction, the beads were removed from the cell compositions by exposure to a magnetic field. CD4+ and CD8+ cells were then separately cultivated for expansion with continual mixing and oxygen transfer by a bioreactor (Xuri W25 Bioreactor). Poloxamer was added to the media. Both cell compositions were cultivated in the presence of IL-2 and IL-15. The CD4+ cell media also included IL-7. The CD4+ and CD8+ cells were each cultivated, prior to harvest, to about 4-fold expansion. Cells from each composition were separately harvested, formulated, and cryofrozen.

Two experiments were performed: Experiment 1 with two experimental runs with CD4+ cells from two different healthy donors (Donor 1 or Donor 2), and Experiment 2 with an experimental run, each of CD4+ cells and CD8+ cells from a third donor (Donor 3).

Figure 2A:
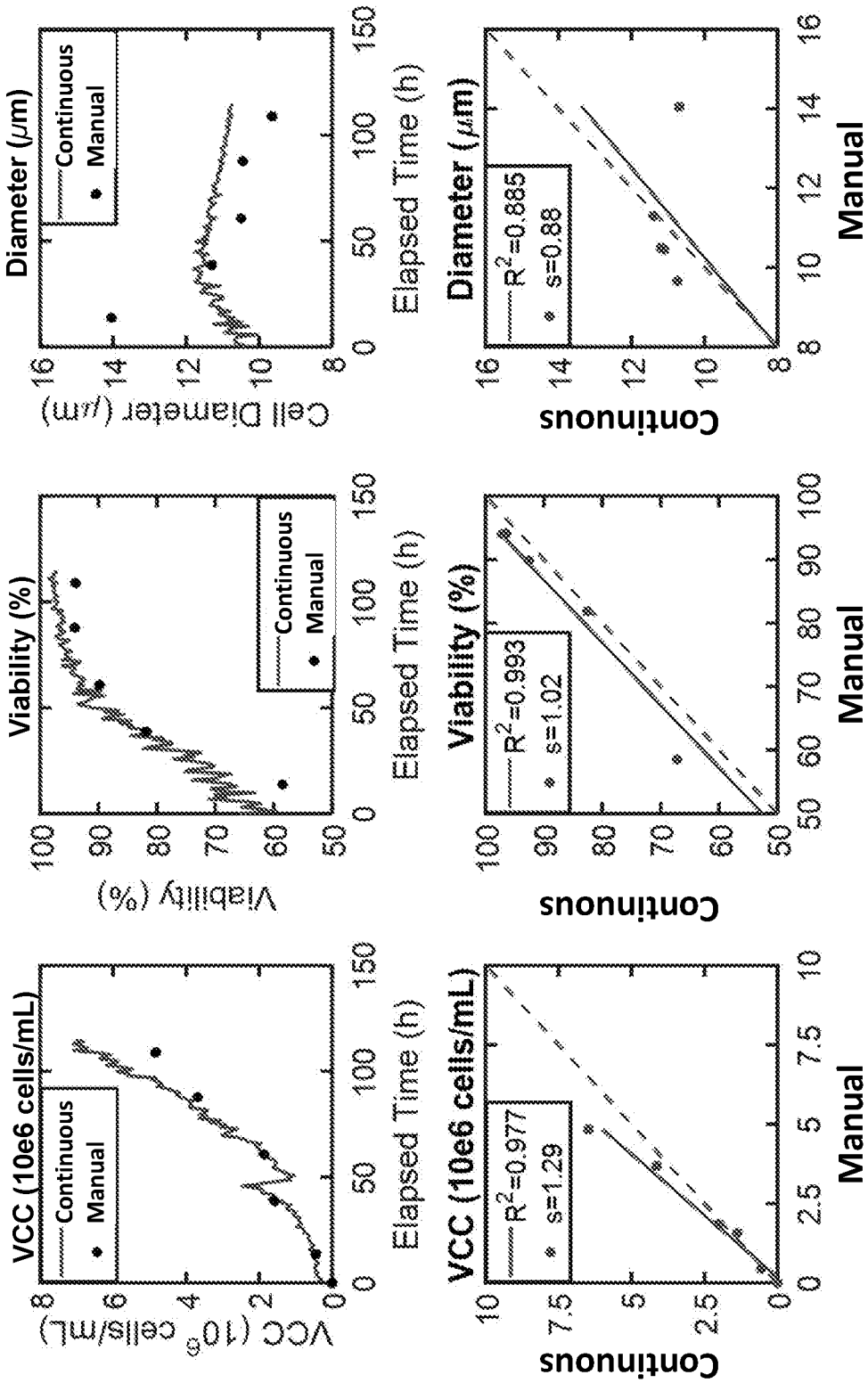
FIGS. 2A-2D depict viable cell count (VCC; $\times 10^6$ cells/mL), cell viability (%), and cell diameter (μm) assessed using continuous monitoring by differential DHM ("continuous", line) or manual sampling ("manual", dots) for CD4+ cells from Experiment 1 Donor 1 (FIG. 2A), Experiment 1 Donor 2 (FIG. 2B) or Experiment 2 Donor 3 (FIG. 2C), or CD8+ cells from Experiment 2 Donor 3 (FIG. 2D). Top panels depict the measurements for each, bottom panels depict linear regression analysis and the $R^2$ and slope (s), for comparing the continuous monitoring and manual sampling.
Figure 2B:
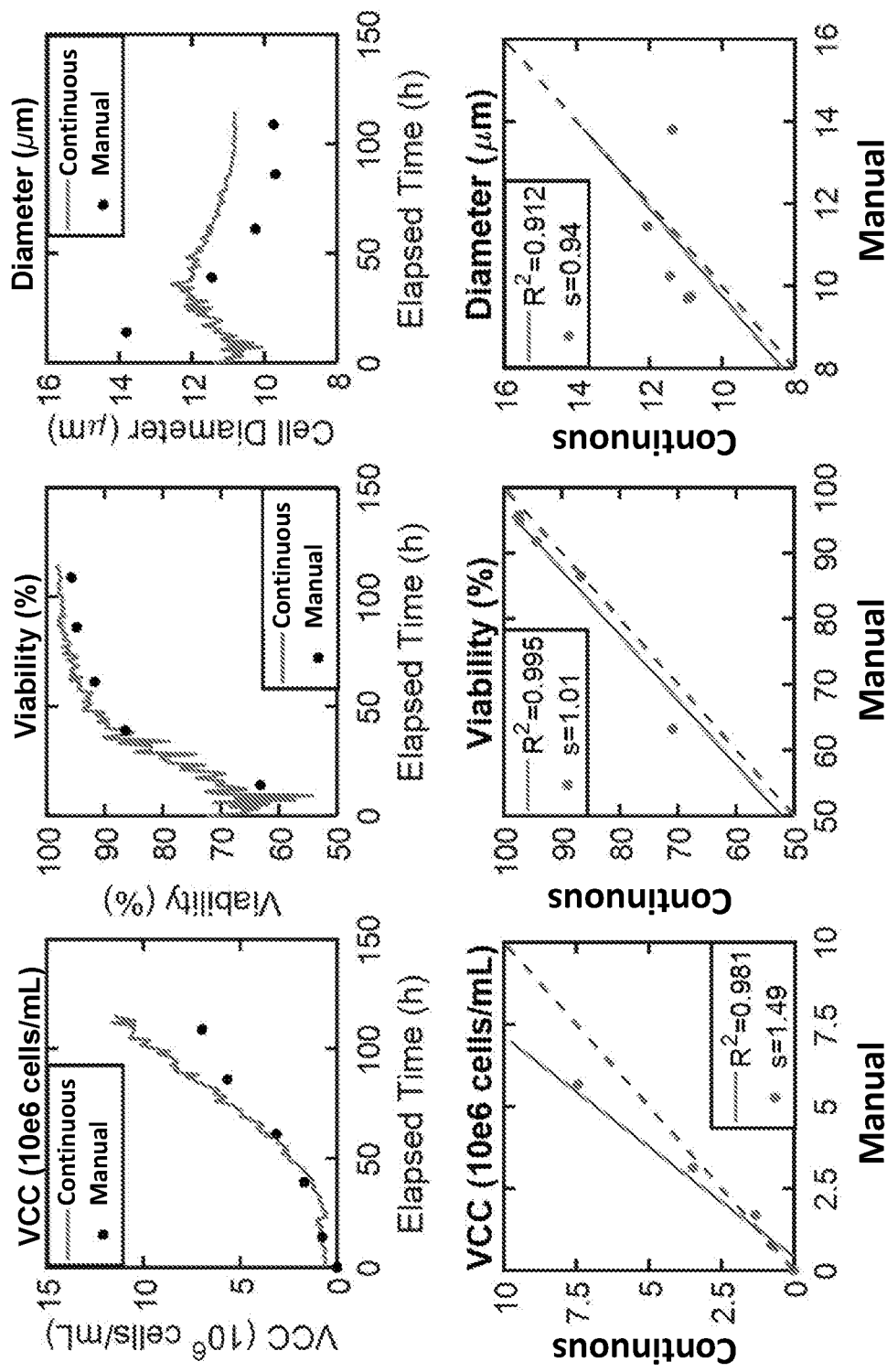
Figure 2C:
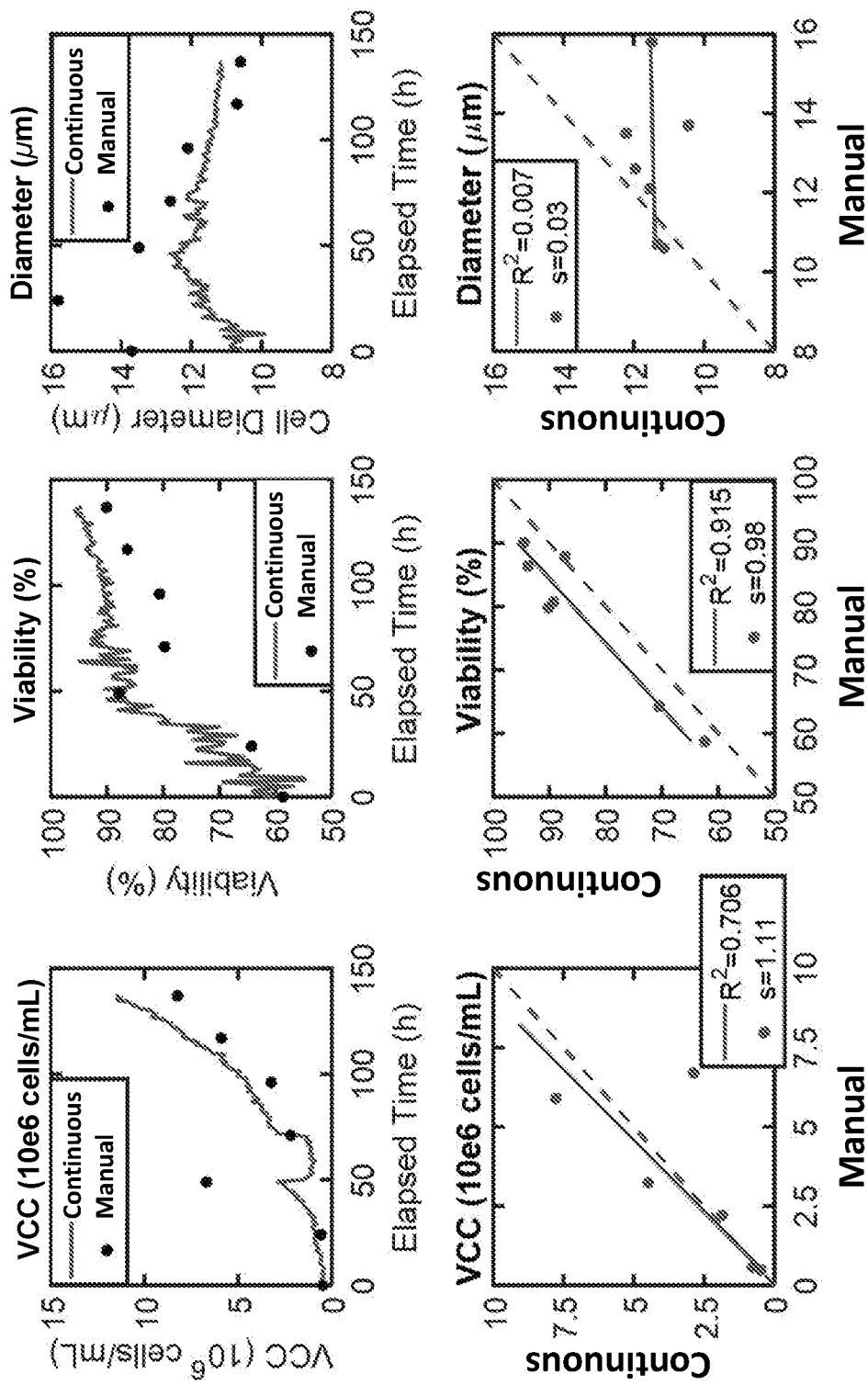
Figure 2D:
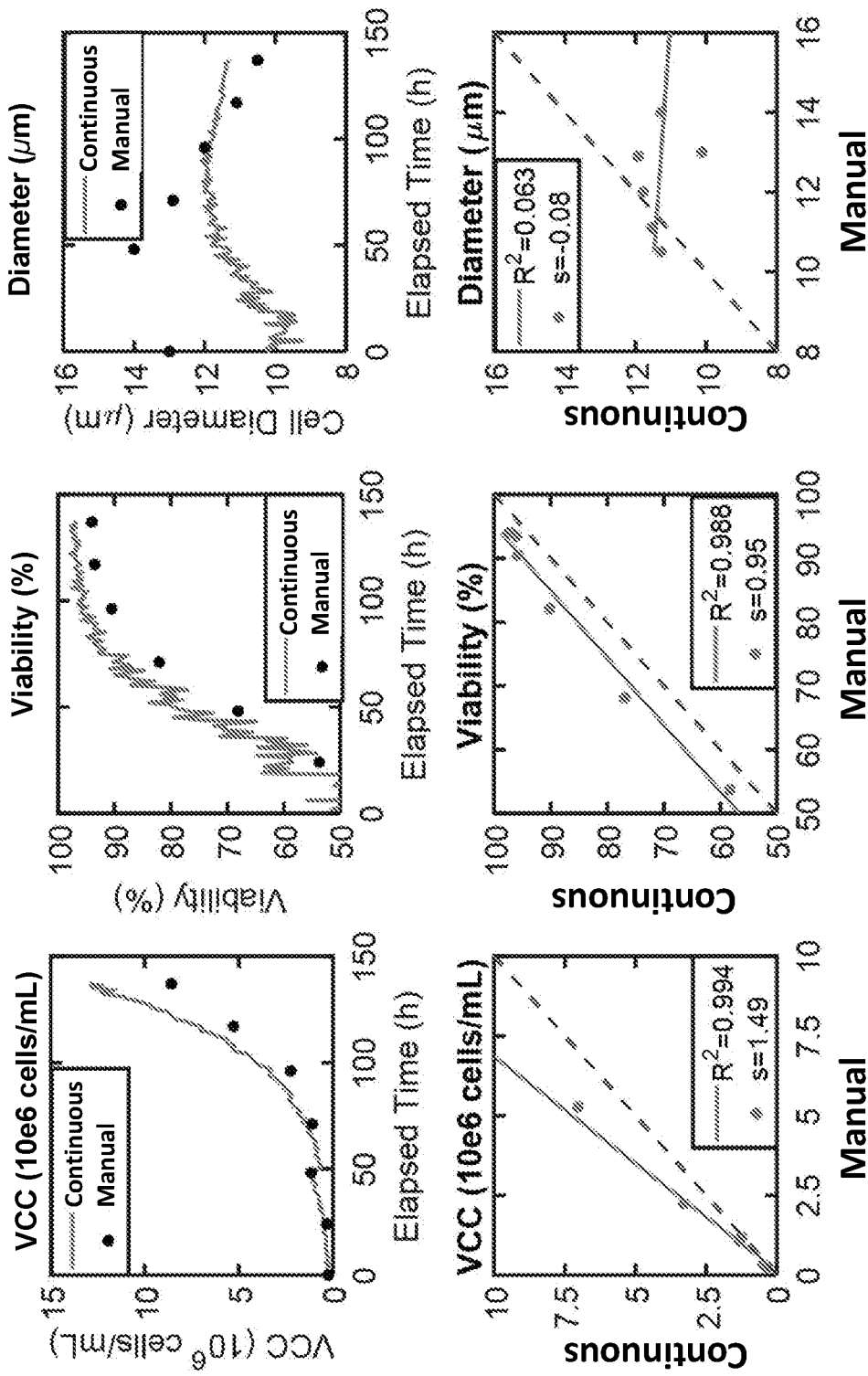

FIGS. 2A-2D show the comparison of viable cell count (VCC), viability, and cell diameter assessed using continuous monitoring by differential DHM or manual sampling, in CD4+ cells from Experiment 1 Donor 1 (FIG. 2A), Experiment 1 Donor 2 (FIG. 2B) or Experiment 2 Donor 3 (FIG. 2C), or CD8+ cells from Experiment 2 Donor 3 (FIG. 2D). The R2 and slope of the comparison is shown in Table E2 below

TABLE E2

R² and slope of comparison between sampling methods.

| Experiment | R² | | | slope | | |
|---|---|---|---|---|---|---|
| | VCC | Viability | Diameter | VCC | Viability | Diameter |
| Experiment 1, Donor 1, CD4+ | 0.98 | 0.99 | 0.89 | 1.29 | 1.02 | 0.88 |

TABLE E2-continued

R² and slope of comparison between sampling methods.

| Experiment | R² | | | slope | | |
|---|---|---|---|---|---|---|
| | VCC | Viability | Diameter | VCC | Viability | Diameter |
| Experiment 1, Donor 2, CD4+ | 0.98 | 1.00 | 0.91 | 1.49 | 1.01 | 0.94 |
| Experiment 2, Donor 3, CD4+ | 0.71 | 0.92 | 0.01 | 1.11 | 0.98 | 0.03 |
| Experiment 2, Donor 3, CD8+ | 0.99 | 0.99 | 0.06 | 1.49 | 0.95 | 0.08 |

The results showed that the VCC and viability as continuous monitoring and manual sampling were highly correlated, for CD4+ and CD8+ cells and cells from different donors. The lower correlation of cell diameter between continuous and manual monitoring may be explained as described in Example 1. The results were consistent with the utility of the continuous monitoring by differential DHM during cultivation for expansion of the cells in the cell engineering process.

Example 3: Comparison of Manual and Automated Expansion Using Continuous In-Line Imaging A fully automated, operator-free cell expansion method with continuous monitoring of the cells by in-line imaging and automated perfusion, was compared to a manual expansion method.

Primary T cells from a healthy human donor were activated and transduced with a vector to express an exemplary chimeric antigen receptor (CAR), using an exemplary engineering process. After transduction, cells were pooled and inoculated for two different cultures, one automated expansion based on continuous in-line imaging using differential DHM, and one manual expansion method.

In the automated expansion culture, cells were cultivated in a rocking motion bioreactor, with media replacement with semi-continuous perfusion and continual mixing as described in Example 1. Cell viability, viable cell count (VCC), and cell diameter were monitored using an automated differential DHM imaging system, generally as described in Example 1 above. The initial VCC at the time of inoculation was similar for both cultures ($0.12 \times 10^6$ cells/mL for automated culture, $0.14 \times 10^6$ cells/mL for manual culture). Perfusion in the automated expansion was based on a four-hour rolling average of VCC calculated by a software algorithm, where a VCC average greater than the target VCC was required for progression of the method. The target VCC was at $0.6 \times 10^6$ cells/mL, $1 \times 10^6$ cells/mL and $4 \times 10^6$ cells/mL for 1 QS and 2 perfusion steps. No additional operator intervention occurred after inoculation.

In the manual expansion culture, perfusion was performed generally as described in Example 1 above, with a single daily sampling.

Cells were also assessed for cell surface expression of markers by flow cytometry.

Figure 3:
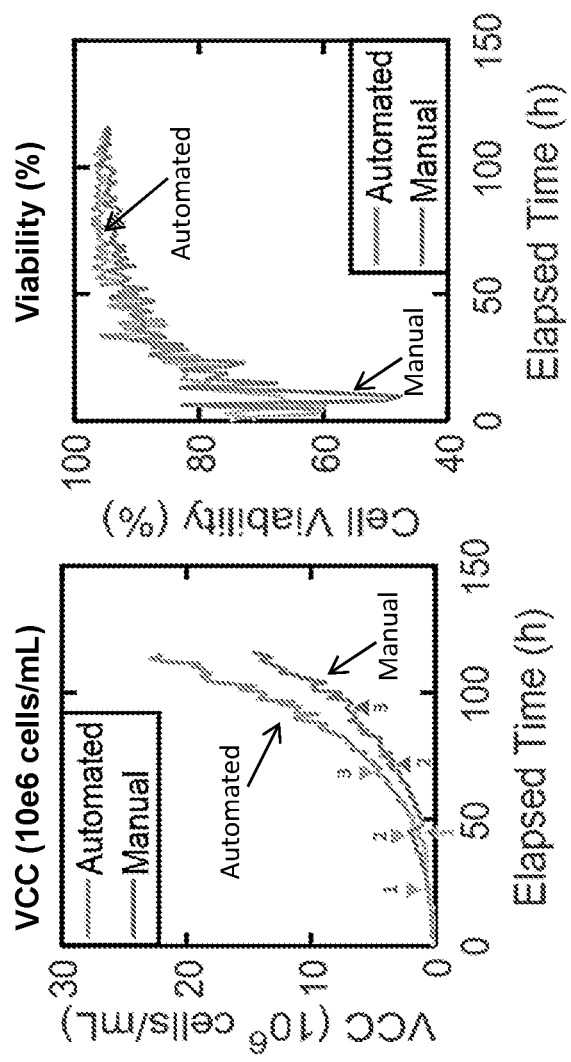
FIG. 3 depicts viable cell count (VCC; $\times 10^6$ cells/mL) and cell viability (%), assessed using continuous monitoring by differential DHM, in an automated expansion process compared to a manual expansion process.

As shown in FIG. 3, higher T cell growth over time in culture, as determined by VCC, was observed with the automated expansion system. Cell viability as assessed by continuous differential DHM imaging, and cell phenotypes, as assessed by flow cytometry, were similar between the automated vs. manual expansion processes. For example, automated and manual systems produced nearly identical frequencies of CD3+, CD4+, and CD8+ cells. Together, these results indicate that automated expansion has a positive impact on T cell growth kinetics, with only minimal differences displayed in cell viability values.

The results were consistent with the utility of the continuous DHM imaging and automated expansion process, for cultivation and monitoring of cells during a T cell engineering process, without the need for a human operator. In some aspects, such method can be used to determine the growth kinetics of the primary T cells, and determine the time for harvesting the cells for engineering of administration.

Example 4: Machine Learning Methods for Predicting Cell Viability

T cell viability was assessed on T cells during an ex vivo process for producing a T cell composition engineered with a recombinant receptor using an in-line differential digital holography microscopy (DDHM) imaging system, for example an Ovizio iLine F (Ovizio Imaging Systems NV/SA, Brussels, Belgium), in combination with machine learning methodologies.

The process for engineering the T cells was carried out by separately isolating CD4+ and CD8+ T cell populations from the same healthy donor generally as described in Example 1 above. The isolated CD4+ and CD8+ T cells were then mixed at a 1:1 ratio and then stimulated with anti-CD3/anti-CD28 antibodies. The mixed CD4+ and CD8+ T cells were inoculated into a bioreactor and continuously monitored during the expansion step of the manufacturing process using in-line DDHM.

For comparison, separate populations of CD4+ and CD8+ T cells were isolated from the same healthy donor as the process described above but were separately stimulated with anti-CD3/anti-CD28 antibodies, transduced with the anti-BCMA CAR, and inoculated under conditions for expansion as near-pure populations, rather than a mixed population. The process for stimulation, T transduction, inoculation and expansion steps was similar to the process used for the mixed population. CD4+ or CD8+ T cells were inoculated into separate bioreactors and continuously monitored during the expansion step using separate in-line DDHM.

The process described above was performed concurrently two times from cells from the same healthy donor for comparison purposes as replicates in methods to predict T cell viability. Over the course of 5 days during the expansion phase, CD4+, CD8+, and mixed CD4/CD8 T cell cultures were independently assessed by in-line automated DDHM, which captures holographic images of the cells from which object images (phase, intensity, and superposition) can be computed through numerical reconstruction algorithms. Approximately 20 images were captured per hour. Cells were detected based on their peak intensity when out of focus. Using the phase image, cell image segmentation (creation of boundaries around cells) was carried out, whereby the cell contours are delineated based on intensity thresholding. The image within the segmented boundary was then analyzed, and on a single cell basis 70 features, including morphological (e.g., diameter circularity, aggregate size, etc.,) optical (e.g., (optical volume, aggregate size, etc.), intensity, phase, and system features (for example, see Section I-B above) were computed. The extracted features or raw images were used in machine learning methods to detect cell viability.

A. Viability Prediction with a Gradient-Boosted Random Forest Classifier

A gradient-boosted random forest classifier (via the 'xgboost' package in R) was applied to the features of cells during the expansion step. The cells included samples from the mixed population.

Features deemed uninformative for this task included, for example, a border indication of the cell (e.g., whether the cell, or a refractive peak of the cell, lies along a border in an image), a center of mass of the cell (e.g., a center of mass coordinate along an X or Y axis in an image), and were removed from the dataset. Additionally, highly correlated (Pearson cor.>=0.97) and low-variance (var.=0) features were removed, leaving the following 48 features for classification: an aspect ratio of the cell, an area of the cell (e.g., a surface area or projected surface area), a circularity of the cell (e.g., a ratio of an area of the cell to a perimeter of the cell), a compactness of the cell (e.g., a ratio of an area of the cell to a variance of an object in an axis of the cell), a normalized aspect ratio of the cell, an elongation of the cell (e.g., a ratio of the width and height of a rectangle enclosing the cell), a diameter of the cell (e.g., a diameter of a circle having the same area as the cell), peak diameter (e.g., a diameter of a circle having the same area as a refractive peak of the cell), a hu moment invariant 1, a hu moment invariant 2, a hu moment invariant 3, an average intensity contrast of the cell, an average intensity entropy of the cell, an intensity average of the cell, an average measure of uniformity of the intensity over the cell surface (e.g., an average intensity uniformity), an intensity contrast of an image of the cell, an intensity correlation of an image of the cell (e.g., a correlation between the intensities of a pixel and a neighboring pixel in the image), an intensity homogeneity of an image of the cell (e.g., a spatial closeness of a distribution to a diagonal), a minimum and maximum intensity of the cell, an intensity skewness of an image of the cell (e.g., a symmetry of an intensity), an intensity smoothness of an image of the cell (e.g., an average smoothness), an intensity variance of an image of the cell (e.g., variance value of intensity over the cell surface), an intensity uniformity of an image of the cell (e.g., a measure of uniformity of the intensity over a cell surface), a mass eccentricity of the cell (e.g., a distance (such as in pixels) between a geometric center of the cell and a center of mass of the cell, weighted by an optical height), a maximum, minimum, mean, variance, and normalized (e.g., an optical height of the cell (e.g., in microns) divided by the cell diameter) optical height of the cell (e.g., in radians), an optical volume of the cell (e.g., a value proportional to a volume of the cell and to its refractive index an area of a refractive peak of the cell (e.g., in microns), a refractive peak area normalized by an area of the cell (e.g., a peak area divided by the product of, e.g., cell area and mean intensity), a number of refractive peaks of the cell, an intensity of a refractive peak of the cell, a normalized refractive peak height of the cell (e.g., an intensity of a refractive peak of the cell divided by the product of, e.g., a surface of the cell and a mean intensity of a cell), a plane (e.g., in microns) where the intensity of the cell is maximum, an average entropy of a phase image of the cell, an average measure of uniformity of phase over the cell surface (e.g., an average phase uniformity of a cell), a phase intensity contrast of the cell (e.g., an intensity contrast of a phase image of the cell, e.g., between pixels across the surface of the cell), a phase correlation of the cell (e.g., a measure of how correlated a pixel is to its neighbor in a phase image of the cell), a phase homogeneity of the cell (e.g., a measure of a spatial closeness of a distribution to a diagonal in a phase image of the cell), a phase skewness of the cell (e.g., a measure of asymmetry in a phase image of the cell), a phase uniformity of the cell (e.g., a measure of phase uniformity across a cell surface), and a variance or normalized variance of a radius of the cell.

Default 'xgboost' parameters were utilized (eta=0.3; max_depth=6; gamma=1) and 200 training rounds were applied. For global assessment, the model was trained on a randomly-selected 80% of cells from the mixed population of cells and tested on the remaining 20%.

The classifier achieved >99% balanced accuracy of the "alive"/"dead" classification as predicted by an alternative viability prediction method involving optical imaging that also uses features extracted from cell images (e.g., holograms) to predict viability on a per-cell basis on the test data by machine learning methods. This included a difference in classification rate of ~0.13% for "alive" cells and ~0.36% for "dead" cells compared to the predictions of the alternative method.

Figure 4:
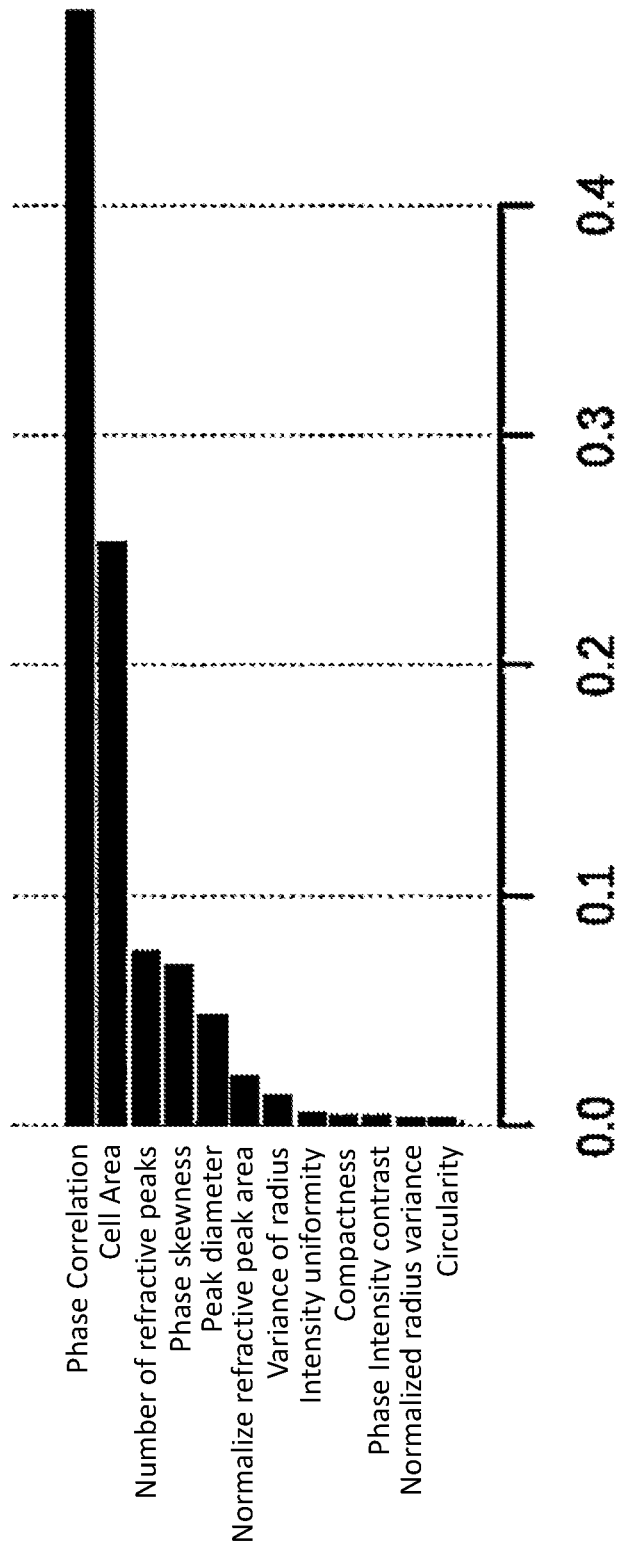
FIG. 4 shows the relative importance of features used by the gradient-boosted random forest classifier to predict cell viability.

The default 'Gain' measure of each feature's total information gain over all tree splits was used to assess feature importance. FIG. 4 shows the relative importance of the features used by the classifier to predict cell viability. Two features, phase correlation and area of the cell, which measure the "smoothness" of the cell surface in the phase image, and the total size of the cell, respectively, appeared to be most important in informing the classification (FIG. 4).

Figure 5B:
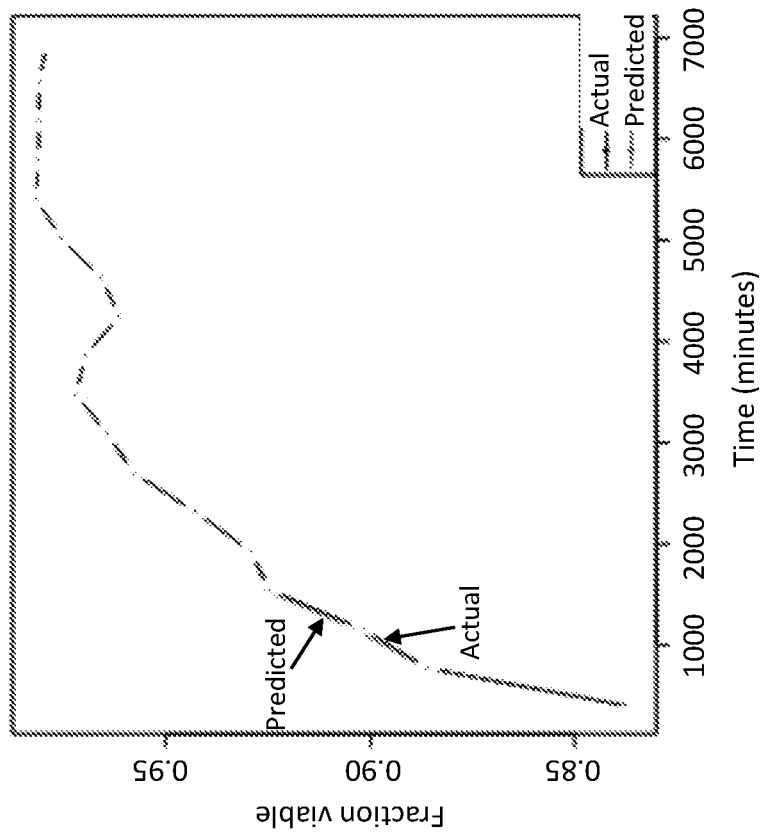
FIGS. 5A-5C show the accuracy of the gradient-boosted random forest classifier to reproduce viability measurements over inoculation time predicted by an alternative viability prediction model involving optical imaging that also uses features extracted from cell images (e.g., holograms) to predict viability on a per-cell basis on the test data by machine learning methods.
Figure 5A:
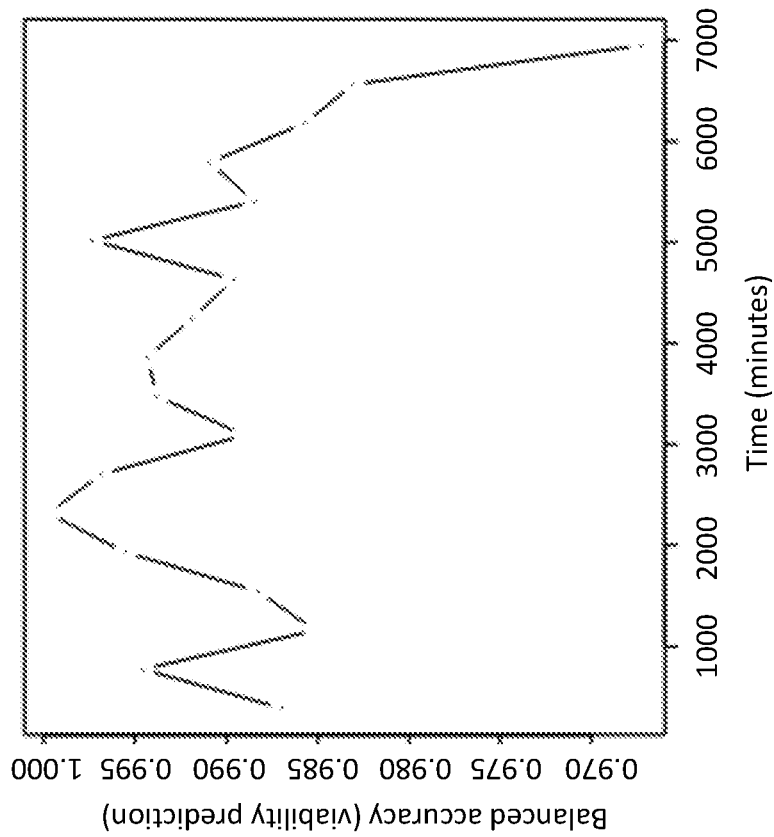
Figure 5C:
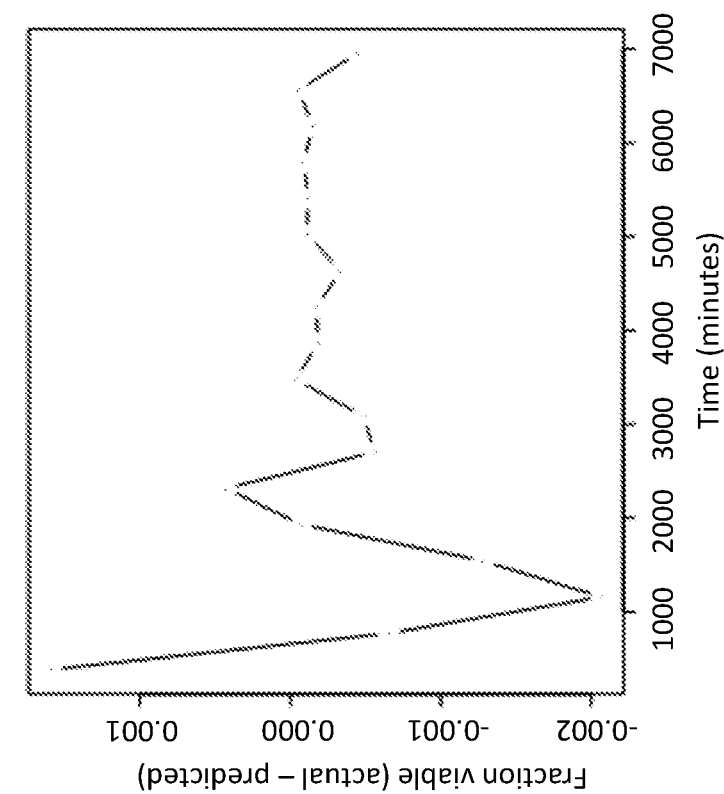

Since the distribution of many features may shift as a function of inoculation time, the accuracy of the viability prediction over time was tested. For each time point, all cell features from the training set were removed, the classifier was re-trained, and the viable cell prediction accuracy was tested against the alternative viability prediction method for the removed cells. FIGS. 5A-5C show the accuracy of viability measurements predicted with the Gradient-Boosted Random Forest Classifier over inoculation time compared to the alternative viability prediction method. FIG. 5A shows the accuracy of the classifier relative to the alternative viability prediction method "alive"/"dead" classification as a function of inoculation time. FIG. 5B shows a comparison of overall "alive" percentage predictions over time ("Actual": percentage predicted by the alternative viability prediction method; "Predicted": percentage predicted by the Random Forest classifier). FIG. 5C shows the relative difference in predictions between the Random Forest classifier and the alternative viability prediction method. Although the accuracy of the Random Forest classifier compared to the alternative viability prediction method fluctuates over time, it does not vary by more than ~2% for any given time point (FIG. 5A). Moreover, the total VCC prediction remained consistent with the alternative viability prediction method to <1% over all time points (FIGS. 5B-5C). These results are supportive of the use of a Random Forest classifier for predicting cell viability from extracted features.

B. Cell Viability Prediction Via Deep Learning Applied to Raw Images

A deep learning classifier was used to predict object classification (e.g., alive/dead/cluster/debris) using raw images produced by DDHM.

The raw images include "Phase" (3-D holographic) and optical images, and the deep learning method was applied to a two-channel image of each cell. Approximately 200,000 cell images, each with dimensions of 48×48 pixels, were used. The images were randomly separated into 80%/20% for training/testing, respectively.

The deep learning model, a three-layer convolutional neural network (CNN), was applied with an 'elu' activation function, batch normalization, and dropout between each layer, feeding into a final dense 'softmax' classification layer. The total number of free parameters was on the order of 100,000. For optimization, the categorical crossentropy loss function was utilized in conjunction with the AdaGrad optimizer, and the model was optimized using a batch size of 64. Slight rotations, flips and shifts were applied to supplement the training data.

The deep CNN model achieved 97.8% accuracy on both the training and test data, recapitulating the object category (e.g., alive, dead, debris, cluster) results of the alternative viability prediction method that uses features extracted from cell images (e.g., holograms) to predict viability. Because the categories, e.g., alive, dead, debris, and cluster, are not represented equally in the dataset (e.g., there may be more alive cells than dead cells in the dataset), assessing the prediction accuracy for each category is more representative (see Table E3). The accuracy was highest for prediction of "debris" and lowest for prediction of "cluster."

TABLE E3

Accuracy for each of the four object categories, from cell object classification using CNNs on original iLine F images.

| Alive | Dead | Debris | Cluster |
| --- | --- | --- | --- |
| 0.94 | 0.95 | 0.98 | 0.91 |

Figure 6B:
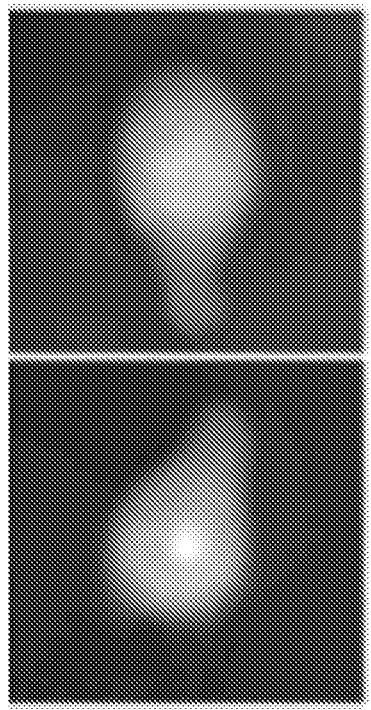
FIG. 6B shows two images of objects classified as "cluster" by the alternative viability prediction model but appear to be individual live T cells with appendages.
Figure 6A:
FIG. 6A shows two images of objects classified as "alive" by the alternative viability prediction model but classified as "dead" by the deep learning model.

Visualizing the images of objects that were differently classified revealed that the somewhat lower accuracy on some object categories may be partially due to misclassifications in the alternative viability prediction model. Examples of misclassifications can be seen in FIGS. 6A and 6B. FIG. 6A shows two images of objects classified as "alive" by the alternative viability prediction model but classified as "dead" by the deep learning model. Similarly, FIG. 6B shows two images of objects classified as "cluster" by the alternative viability prediction model but appear to be individual live T cells with appendages. These results are supportive of the use of deep learning on raw images to accurately predict cell viability.

Example 5: Machine Learning Methods for Predicting T Cell Subtype

T cell subtype (e.g., CD4+ or CD8+) was predicted using in-line differential digital holography microscopy (DDHM), for example an Ovizio iLine F (Ovizio Imaging Systems NV/SA, Brussels, Belgium), in combination with machine learning methodologies.

T cells (pure CD4 or pure CD8) from a process for producing an engineered T cell composition as described in Example 4 were assessed for T cell subtype using DDHM to capture holographic images of the cultured cells from which 70 features (see, e.g., Section I-B above) could be extracted on a single cell basis. The extracted features, a subset thereof, or raw images were used in machine learning methods to predict cell subtype (e.g., CD4 or CD8).

A. T Cell Subtype Prediction Using a Support Vector Machine

A support vector machine (SVM) model was designed to assess feature data and learn which trends in the features corresponded with either CD4 or CD8 subtypes. Table E4 shows the SVM model specifications. Feature data was assessed from over 200,000 individual cell images across an entire experiment, with one arm of pure CD4 cells, and another with pure CD8 cells. For each separate arm, the SVM was trained on feature data relating to morphological, optical, intensity and phase features (see Section I-B above); system features were excluded. The data was split into 80% for training and the remaining 20% for testing the model validity. The subtype identity of each image was known.

TABLE E4

| SVM model specifications. | |
| --- | --- |
| Kernel | Radial Basis Function |
| Gamma (kernel coefficient) | 1/(nFeatures * stdev) |
| C (penalty for wrong label assignment) | 1 |
| Decision Function Shape | One-vs-one ('ovo') for binary classification |

Model accuracy was about 75% on the test data set. These results are supportive of the use of SVM on feature data to predict cell subtype.

B. T Cell Subtype Prediction Using Neural Networks

A Neural Network (NN) model was used to predict cell subtype (e.g., CD4+ or CD8+). The NN included hidden layer dimensions equal to the number of features x number of features x number of features, activation was modeled by a rectified linear unit function (relu), and alpha was set to 0.0001 to specify the penalty between nodes. The model was trained on the separate CD4 and CD8 population data, with 90% reserved for training and the remaining 10% for testing. The feature data included in the analysis was the same as described for the SVM model above.

The NN prediction accuracy was approximately 91% on the test data. These results are supportive of the use of a NN on feature data to predict cell subtype.

A T-test was used to identify features with high correlation to cell subtype (e.g., CD4 or CD8). Features including the average phase uniformity of the cell, peak diameter (e.g., a diameter of a circle having the same area as a refractive peak of the cell), normalized refractive peak height of the cell (e.g., an intensity of a refractive peak of the cell divided by the product of, e.g., a surface of the cell and a mean intensity of a cell), average phase over the cell surface (e.g., average phase of the cell), refractive peak area normalized by an area of the cell (e.g., a peak area divided by the product of, e.g., cell area and mean intensity), minimum optical height of the cell, compactness of the cell (e.g., a ratio of an area of the cell to a variance of an object in an axis of the cell), circularity of the cell (e.g., a ratio of an area of the cell to a perimeter of the cell), phase smoothness of the cell (e.g., a measure of smoothness in a phase image of the cell), intensity homogeneity of an image of the cell (e.g., a spatial closeness of a distribution to a diagonal), plane (e.g., in microns) where the intensity of the cell is maximum, area of a refractive peak of the cell, and phase correlation of the cell (e.g., a measure of how correlated a pixel is to its neighbor in a phase image of the cell) were estimated to be highly correlated with predicting cell subtype, e.g. CD4+ or CD8+. The NN was re-trained using the aforementioned features from data derived from the separate CD4 and CD8 populations.

C. T Cell Subtype Prediction Using Random Forests

To determine the relationship between extracted features (see, e.g., Section I-B above) and T cell subtype (e.g., CD4+ or CD8+), a random forest supervised machine learning algorithm was trained using 80% of available data from the CD4+ and CD8+ nearly-pure populations. The CD4+ and CD8+ datasets were computationally mixed to create one dataset where cell identity was known for each cell of the dataset. Model performance was tested using the remaining data from the computationally mixed dataset. The model included 100 trees with a max tree depth of 3, a learning rate of 0.01, and balanced class weight.

The trained random forest model was applied to the test set (remaining 20% of the computationally mixed dataset) for CD4/CD8 classification. To ensure the model was not overfit to the training data, model performance on the training and testing data was compared.

Figure 7:
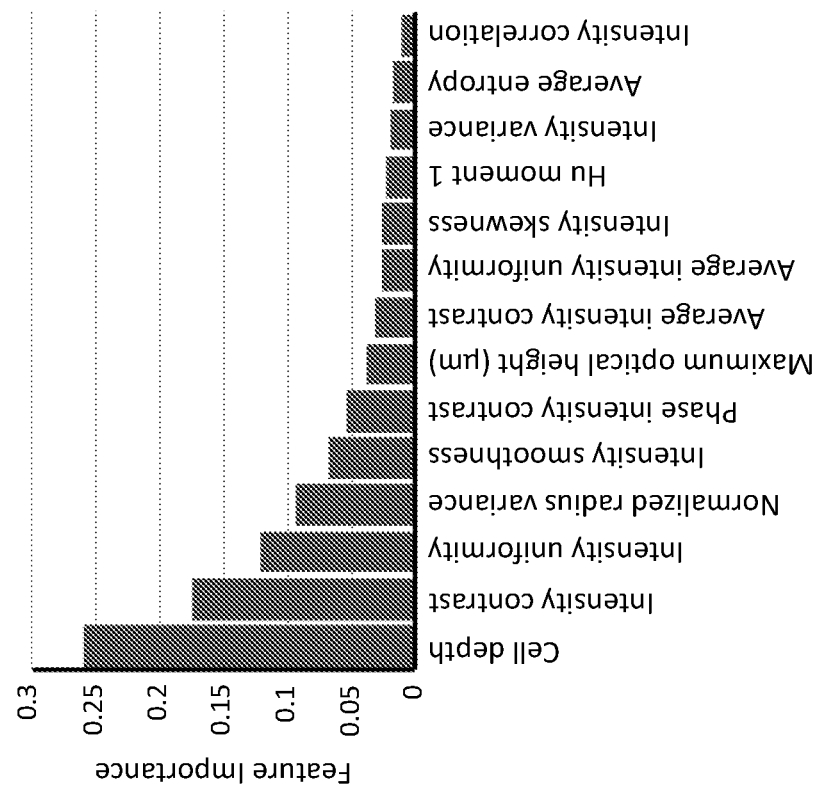
FIG. 7 depicts a bar graph showing the relative importance of the 14 most commonly used features within the random forest model used to predict CD4 and CD8 T cell type.

The random forests model achieved 89% accuracy for discriminating between CD4 and CD8 T cells using 62 features. The following features were not included in the analysis: the cell descriptor, the border indication of the cell (e.g., whether the cell, or a refractive peak of the cell, lies along a border in an image), the number of refractive peaks, the minimum optical height in microns, the cell identifier, the image identifier, and the object identifier. Additionally, it was found that the most commonly used feature in the model is one that describes the position of a cell along the vertical z-axis (e.g., position of the cell along a depth axis (cell depth); FIG. 7). Without wishing to be bound by theory, this may be due to disparate densities of CD4 and CD8 T cells due to the abundance of cytotoxic granules in CD8 T cells.

The data used to train the random forest model was pooled across 197 and 253 time points where samples were taken for the CD4+ and CD8+ experiments, respectively. Samples were collected every 30 minutes over a period of 122 hour and 14 minutes or 118 hours 53 minutes. To determine the impact of time on features, feature values were visualized across all time points for CD4 and CD8 cells separately.

The feature identified as playing an important role in cell subtype prediction, cell depth, showed a distinct pattern over time. For example, the first approximately 20 time points showed nearly indistinguishable feature values for cell depth across each time point for CD4 and CD8 cells, while the final 20 time points were completely non-overlapping. Different patterns over time were observed for different features, indicating that there is a feature dependency on particular time point of analysis of the cells.

In view of the potential fluctuation in feature values, another prediction experiment was performed to determine if the model could better predict the 50% of earliest or latest time points. Data was divided into first and second halves with the time point cutoff at the approximately 60 hour time point. The data in each half was then split into training (80%) and testing (20%) datasets and random forests models were either trained and test on the first or second half datasets. The model trained on the first half of the dataset showed poorer accuracy for predicting cell subtype for cells collected in the earliest half of time points compared to the model trained and tested on the second half of the dataset (83% vs. 100% accuracy).

These results are consistent with the utility of in-line DDHM imaging and feature detection in combination with a random forest classifier to predict CD4+ and CD8+ T cell subtype.

D. T Cell Subtype Prediction Using Deep Learning

The above-described models used particular features to predict cell subtype (e.g., CD4+ or CD8+). Instead of using features extracted from the holographic image to predict cell subtype, a computational model capable of being trained on raw images to predict cell subtype was developed. The model was designed as a combination of convolutional and pooling layers that allowed the model to continuously learn as it encountered more images. As the images progressed through the layers, the number of nodes was reduced to keep the total number of parameters to train on at about 35-50 thousand parameters. The size of the node layers is dependent on the input image dimensions, with the sizes of layers being divided by 2, 4, and 8, respectively, to reduce parameters. After the convolution and pooling layers, a density layer determined the probability for binary classification for the prediction.

Figure 8:
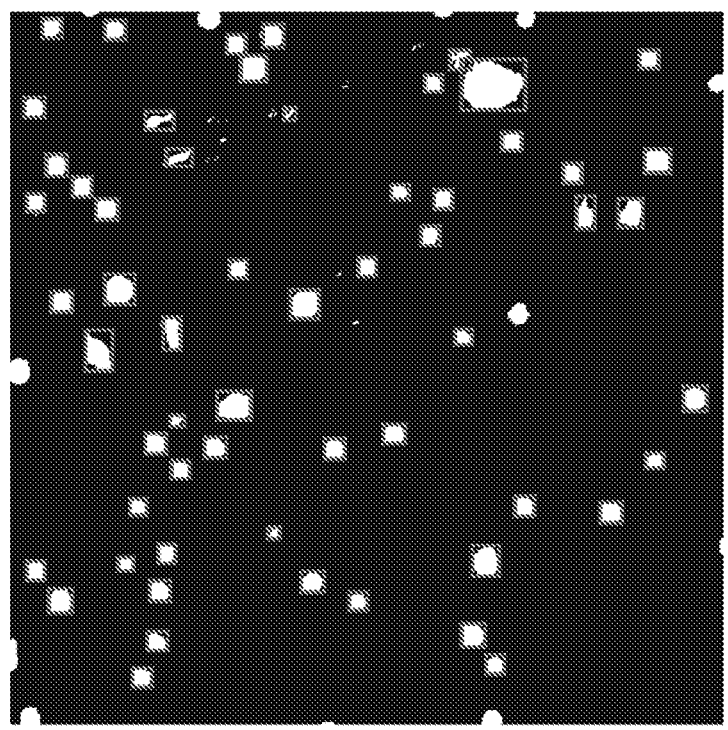
FIG. 8 shows image segmentation masks with identified cells; boxes represent identified cell object from scikit-image.
Figure 9:
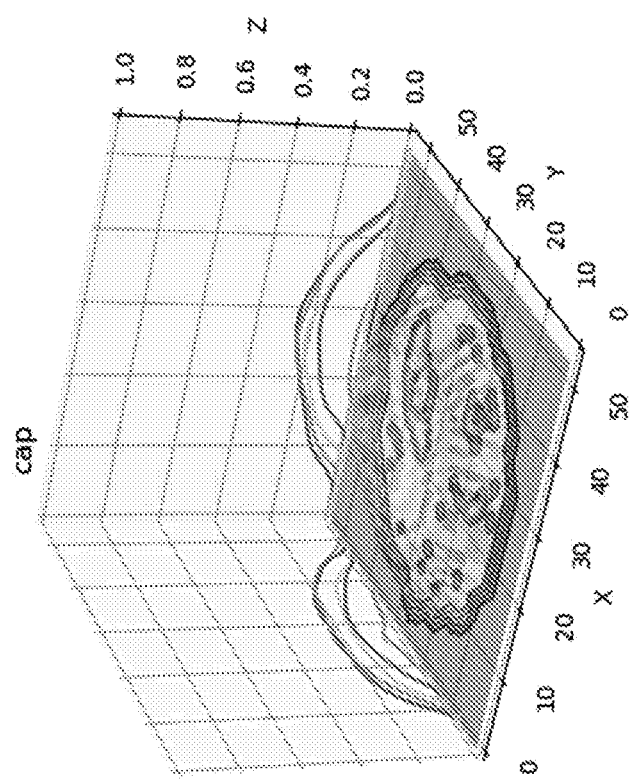
FIG. 9 shows a 3D plot of an extracted cell image. Relative z contour is shown on the X and Y axis, and identified caps are shown on the Z axis. Caps represent peaks on surface of cell image.

Raw 3D image data (in X, Y, Z format) underwent image segmentation to capture images of individual cells. For example, raw images were filtered such that Z values less than 0.7 (in microns) were removed to reduce background noise. The images were also normalized to 1000 prior to edge detection. Scikit-image was used to identify individual cell objects on the processed data (FIG. 8), and those edges were used to create a mask to isolate each cell object individually. The extracted cell images were stored in an array for later analysis (FIG. 9).

The dataset was balanced by querying the returned pool of cell images for counts of CD4 and CD8 images. The cell subtype with the most images, either CD4 or CD8, was randomly sampled to generate a set of images equal in number to the image count for the other subtype.

To boost the learning power of the model, an additional set of images was created by modifying the zoom, skew, and rotation of the individual images.

The dataset was split into a train (90%) and test (10%) set, then Keras was used to fit the deep learning (DL) model to the training dataset for at least 25 iterations. Using the test dataset, the accuracy score for the model per iteration of training was generated. The accuracy should continue to grow and stabilize as the image is retrained throughout the process.

Model performance for predicting cell subtype was approximately 80%. These data are supportive of using raw images in combination with deep learning methods to predict cell class.

Example 6: Machine Learning Methods for Predicting T Cell Subtype Ratios in a Mixed CD4+CD8+ Population The manufacturing process described in Example 1 includes mixing selected CD4+ and CD8+ T cell compositions at a ratio of 1:1 of viable CD4+ T cells to viable CD8+

T cells prior to carrying out steps for stimulation, transduction and expansion. Machine learning methods were used to predict cellular attributes, such as cell subtypes, of such a mixed population of cells. The SVM and NN models trained on nearly pure populations of CD4 and CD8 T cells to predict cell subtype, as described in Example 5, were used to predict CD4/CD8 ratios in mixed populations of CD4 and CD8 T cells. The model ratios did not accurately predict observed ratios determined using a flow cytometry panel. Without wishing to be bound by theory, it is believed such results may be due to changes that may occur when the CD4 and CD8 populations are cultured together such that training with cells from pure populations that had not been similarly cultured in a mixed population may not be optimally predictive.

Machine learning methods, such as those described in Example 5, are trained on CD4 and CD8 T cells selected from a mixed population of CD4 and CD8 cells. The trained models are used to predict the ratio of cell subtypes in a mixed population of similarly processed cells.

Example 7: Machine Learning Methods for Predicting T Cell Attributes

Machine learning methods may be used to predict T cell attributes including, but not limited to, percentage or number of engineered (e.g. transduced) cells, for example T cells expressing a chimeric antigen receptor (CAR); T cell activation state; T cell differentiation state; and/or cell cycle status. Attribute prediction experimentation is carried out on CD4+ and CD8+ T cells produced by the process described in Example 1. Cells from each experimental process are continuously monitored using an in-line DDHM imaging system, for example an Ovizio iLine F (Ovizio Imaging Systems NV/SA, Brussels, Belgium). As described in Example 4, 70 features (see Section I-B above) can be extracted from the holographic images of the cultured cells on a single cell basis. The extracted features, a subset thereof, or raw images can be used in machine learning methods to predict cell attributes (e.g., CAR+, activation state, differentiation state, cell cycle status).

A. Predicting Cell Attributes from Features

Supervised machine learning models are used to model the relationships between features extracted from the holographic images (see Section I-B above) and cellular attributes (e.g., CAR-positivity). The necessity of each feature to the model are determined, as some may be highly correlated with one another. Redundant features are removed by selecting independent features within feature clusters that are significantly correlated ($\rho > 0.7$). The remaining continuous features (e.g., features represented as numerical values that are not binned) are centered and scaled.

The following machine learning algorithms are tested: logistic regression, support vector machine, random forests, and stochastic gradient boosting. To evaluate the effect of algorithm choice on model performance, hyperparameters are coarsely tuned, ten-fold nested cross-validation is performed, and model performances on validation sets are compared. Performance of a particular model is measured as the mean of each fold's balanced accuracy. The algorithm yielding the highest mean balanced accuracy is selected to undergo fine-tuning of hyperparameters.

If a cellular-attribute is found to be dependent on donor, each cross-validation round is trained and tested on independent donors (leave-one-group-out), so as to more accurately measure the performance of the models.

B. Predicting Cell Attribute from Raw Images

As an alternative to predicting T cell attributes, e.g. CAR-positive cells, based on features, machine learning is applied to predict attributes from raw images. A model (e.g., Mask RCNN model) is developed that accepts phase and intensity images as input, segments and classifies individual cells within these images, and provides total counts for tested attributes, such as live CAR-positive cells, live CAR-negative cells, dead cells, debris, and cell clusters as output. Images from unmixed (pure) CAR-positive and unmixed (pure) CAR-negative fractions, where every cell's attributes are known, is used to train the classifier. Model accuracy is evaluated by comparing the predicted fraction of CAR-positive cells in images obtained from unmixed and empirically-mixed fractions with known CAR-positive frequency.

C. Predictive Performance

Several standard statistical measures are used to determine a model's predictive performance. Correct predictions are reported as true positives and true negatives, while incorrect predictions are reported as false positives and false negatives. Using these metrics, the model's sensitivity (also called true positive rate) and specificity (true negative rate) are computed. Furthermore, sensitivity and specificity are used to build receiver operator characteristic (ROC) curves, such that the trade-off for generating a model that is more sensitive than specific, or vice versa, can be visualized. The ROC curve also allows measurement of the area under the curve (AUC), which serves as a summary statistic for model performance. AUC scores range from 0.5 to 1.0 and are interpreted as follows: scores close to 0.5 indicate that a model's predictions are no better than random guessing a cell's positivity for a particular attributes, whereas an AUC score of 1.0 indicates perfect predictive performance.

The present invention is not intended to be limited in scope to the particular disclosed embodiments, which are provided, for example, to illustrate various aspects of the invention. Various modifications to the compositions and methods described will become apparent from the description and teachings herein. Such variations may be practiced without departing from the true scope and spirit of the disclosure and are intended to fall within the scope of the present disclosure.

| Sequences | | |
|---|---|---|
| # | SEQUENCE | ANNOTATION |
| 1 | His-Pro-Xaa | Xaa is selected from glutamine, asparagine and methionine |
| 2 | His-Pro-Gln-Phe | |
| 3 | Oaa-Xaa-His-Pro-Gln-Phe-Yaa-Zaa | Oaa is Trp, Lys or Arg; Xaa is any amino acid; Yaa is Gly |

| # | SEQUENCE | ANNOTATION |
|---|---|---|
| 4 | -Trp-Xaa-His-Pro-Gln-Phe-Yaa-Zaa- | Xaa is any amino acid; Yaa is Gly or Glu Zaa is Gly, Lys or Arg |
| 5 | Trp-Arg-His-Pro-Gln-Phe-Gly-Gly | |
| 6 | WSHPQFEK | |
| 7 | Trp-Ser-His-Pro-Gln-Phe-Glu-Lys-(Xaa)n-Trp-Ser-His-Pro-Gln-Phe-Glu-Lys- | Xaa is any amino acid; n is either 8 or 12 |
| 8 | Trp-Ser-His-Pro-Gln-Phe-Glu-Lys-(GlyGlyGlySer)n-Trp-Ser-His-Pro-Gln-Phe-Glu-Lys | n is 2 or 3 |
| 9 | SAWSHPQFEKGGGSGGGSGGGSWSHPQFEK | |
| 10 | SAWSHPQFEKGGGSGGGSGGSAWSHPQFEK | |
| 11 | DPSKDSKAQVSAAEAGITGTWYNQLGSTFIVTAGADGALTGTYESAVGNAESRYVLTGRYDSAPATDGSGTALGWTVAWKNNYRNAHSATTWSGQYVGGAEARINTQWLLTSGTTEANAWKSTLVGHDTFTKVKPSAASIDAAKKAGVNNGNPLDAVQQ | Streptavidin |
| 12 | DPSKDSKAQVSAAEAGITGTWYNQLGSTFIVTAGADGALTGTYVTARGNAESRYVLTGRYDSAPATDGSGTALGWTVAWKNNYRNAHSATTWSGQYVGGAEARINTQWLLTSGTTEANAWKSTLVGHDTFTKVKPSAASIDAAKKAGVNNGNPLDAVQQ | Mutein Streptavidin Val44-Thr45-Ala46-Arg47 |
| 13 | DPSKDSKAQVSAAEAGITGTWYNQLGSTFIVTAGADGALTGTYIGARGNAESRYVLTGRYDSAPATDGSGTALGWTVAWKNNYRNAHSATTWSGQYVGGAEARINTQWLLTSGTTEANAWKSTLVGHDTFTKVKPSAASIDAAKKAGVNNGNPLDAVQQ | Mutein Streptavidin Ile44-Gly45-Ala-46-Arg47 |
| 14 | EAGITGTWYNQLGSTFIVTAGADGALTGTYESAVGNAESRYVLTGRYDSAPATDGSGTALGWTVAWKNNYRNAHSATTWSGQYVGGAEARINTQWLLTSGTTEANAWKSTLVGHDTFTKVKPSAAS | Minimal streptavidin |
| 15 | EAGITGTWYNQLGSTFIVTAGADGALTGTYVTARGNAESRYVLTGRYDSAPATDGSGTALGWTVAWKNNYRNAHSATTWSGQYVGGAEARINTQWLLTSGTTEANAWKSTLVGHDTFTKVKPSAAS | Mutein Streptavidin Val44-Thr45-Ala46-Arg47 |
| 16 | EAGITGTWYNQLGSTFIVTAGADGALTGTYIGARGNAESRYVLTGRYDSAPATDGSGTALGWTVAWKNNYRNAHSATTWSGQYVGGAEARINTQWLLTSGTTEANAWKSTLVGHDTFTKVKPSAAS | Mutein Streptavidin Ile44-Gly45-Ala-46-Arg47 |
| 17 | WSHPQFEKGGGSGGGSGGGSWSHPQFEK | |
| 18 | WSHPQFEKGGGSGGGSWSHPQFEK | |
| 19 | WSHPQFEKGGGSGGGSGGSAWSHPQFEK | |
| 20 | MEAGITGTWYNQLGSTFIVTAGADGALTGTYESAVGNAESRYVLTGRYDSAPATDGSGTALGWTVAWKNNYRNAHSATTWSGQYVGGAEARINTQWLLTSGTTEANAWKSTLVGHDTFTKVKPSAAS | |
| 21 | MEAGITGTWYNQLGSTFIVTAGADGALTGTYVTARGNAESRYVLTGRYDSAPATDGSGTALGWTVAWKNNYRNAHSATTWSGQYVGGAEARINTQWLLTSGTTEANAWKSTLVGHDTFTKVKPSAAS | |
| 22 | MEAGITGTWYNQLGSTFIVTAGADGALTGTYIGARGNAESRYVLTGRYDSAPATDGSGTALGWTVAWKNNYRNAHSATTWSGQYVGGAEARINTQWLLTSGTTEANAWKSTLVGHDTFTKVKPSAAS | |
| 23 | MLLLVTSLLLCELPHPAFLLIPRKVCNGIGIGEFKDSLSINATNIKHFKNCTSISGDLHILPVAFRGDSFTHTPPLDPQELDILKTVKEITGFLLIQAWPENRTDLHAFENLEIIRGRTKQHGQFSLAVVSLNITSLGLRSLKEISDGDVIISGNKNLCYANTINWKKLFGTSGQKTKIISNRGENSCKATGQVCHALCSPEGCWGPEPRDCVSCRNVSRGRECVDKCNLLEGEPREFVENSECIQCHPECLPQAMNITCTGRGPDNCIQCAHYIDGPHCVKTCPAGVMGENNTLVWKYADAGHVCHLCHPNCTYGCTGPGLEGCPTNGPKIPSIATGMVGALLLLLVVALGIGLFM | tEGFR |
| 24 | RKVCNGIGIGEFKDSLSINATNIKHFKNCTSISGDLHILPVAFRGDSFTHTPPLDPQELDILKTVKEITGFLLIQAWPENRTDLHAFENLEIIRGRTKQH | tEGFR |

| # | SEQUENCE | ANNOTATION |
|---|---|---|
| | GQFSLAVVSLNITSLGLRSL<br>KEISDGDVIISGNKNLCYAN<br>TINWKKLFGTSGQKTKIISN<br>RGENSCKATGQVCHALCSPE<br>GCWGPEPRDCVSCRNVSRGR<br>ECVDKCNLLEGEPREFVENS<br>ECIQCHPECLPQAMNITCTG | |

| # | SEQUENCE | ANNOTATION |
|---|---|---|
| | RGPDNCIQCAHYIDGPHCVK<br>TCPAGVMGENNTLVWKYADA<br>GHVCHLCHPNCTYGCTGPGL<br>EGCPTNGPKIPSIATGMVGA<br>LLLLLVVALGIGLFM | |

The invention claimed is:

1. A method of classifying T cells, the method comprising:
receiving image data associated with each cell of a plurality of T cells of a population of cells comprising T cells, wherein the image data comprises one or more of phase image data, intensity image data, and superposition image data from each cell of the plurality of T cells, and wherein the image data is obtained using differential digital holographic microscopy (DDHM) without using a marker or dye;
determining, from the image data, one or more input features for each cell of the plurality of T cells, wherein the one or more input features comprises a morphological feature of the image data, an optical feature of the image data, an intensity feature of the image data, a phase feature of the image data, a system feature of the image data, or any combination thereof; and
applying the image data from each cell of the plurality of T cells as input to a process, the process comprising a convolutional neural network trained on image data associated with T cells known to belong to a first group and T cells known to belong to a second group, wherein the image data to train the convolutional neural network comprises one or more of phase image data, intensity image data, and superposition image data from each cell of the T cells known to belong to the first group and the T cells known to belong to the second group, to classify each cell of the plurality of T cells as belonging to the first group or the second group, wherein the first group and the second group are selected from: a) live and dead cells, b) CD4+ and CD8+ T cells, or c) recombinant receptor positive and recombinant receptor negative cells.

2. A method of classifying T cells, the method comprising:
receiving image data associated with each cell of a plurality of T cells of a population of cells comprising T cells, wherein the image data comprises one or more of phase image data, intensity image data, and superposition image data from each cell of the plurality of T cells, and wherein the image data is obtained using differential digital holographic microscopy (DDHM) without using a marker or dye;
determining, from the image data, one or more input features for each cell of the plurality of T cells, wherein the one or more input features comprises a morphological feature of the image data, an optical feature of the image data, an intensity feature of the image data, a phase feature of the image data, a system feature of the image data, or any combination thereof; and
applying information about the one or more input features as input to a process machine learning model trained to classify cells of the plurality of T cells as having one or more cellular attributes, wherein the one or more cellular attributes are live, dead, CD4+, CD8+, recombinant receptor positive, or recombinant receptor negative.

3. A method comprising:
receiving image data associated with each cell of a plurality of T cells of a population of cells comprising T cells, the image data comprising one or more of phase image data, intensity image data, and superposition image data from each cell of the plurality of T cells, wherein the image data is obtained using differential digital holographic microscopy (DDHM) without using a marker or dye;
determining, from the image data, one or more input features for each cell of the plurality of T cells, wherein the one or more input features comprises a morphological feature of the image data, an optical feature of the image data, an intensity feature of the image data, a phase feature of the image data, a system feature of the image data, or any combination thereof;
determining a classification of each cell of the plurality of T cells as belonging to a first group or a second group, wherein the first group and the second group are selected from: a) live and dead cells, b) CD4+ and CD8+ T cells or c) recombinant receptor positive and recombinant receptor negative cells; and
training a convolutional neural network based on the image data and the determined classification of each cell of the plurality of T cells.

4. The method of claim 2, wherein:
the machine learning model comprises a neural network, a support vector machine, or a random forest classification process.

5. The method of claim 4, wherein the neural network comprises a convolutional neural network.

6. The method of claim 2, wherein the one or more input features comprise one or more of an aspect ratio of the cell, a cell depth, an area of a cell, a cell descriptor, a cell identifier, an image identifier, an object identifier, a center of mass along an X axis, a center of mass along a Y axis, a circularity of the cell, a compactness of the cell, a normalized aspect ratio, an elongation of the cell, a diameter of the cell, a peak diameter, a hu moment invariant 1, a hu moment invariant 2, a hu moment invariant 3, a hu moment invariant 4, a hu moment invariant 5, a hu moment invariant 6, a hu moment invariant 7, an average intensity contrast, an average entropy, an average intensity, an average intensity uniformity, an intensity contrast of an image of the cell, an intensity correlation of an image of the cell, an intensity entropy of an image of the cell, an intensity homogeneity of an image of the cell, a maximum intensity of the cell, a mean intensity of the cell, a minimum intensity of the cell an intensity skewness of an image of the cell, an intensity smoothness of an image of the cell, an intensity variance of an image of the cell, an intensity uniformity of an image of the cell, a plane where the intensity of the cell is maximum, an indication a cell lies along border of a field of view, an indication a refractive peak lies along a border of a field of view, a mass eccentricity of the cell, a maximum optical height of the cell in radians, a maximum optical height of the cell in microns, a mean optical height of the cell in radians, a mean optical height of the cell in microns, a normalized optical height of the cell, a minimum optical height of the cell in radians, a minimum optical height of the cell in microns, a variance in optical height of a phase of an image of the cell in radians, a variance in optical height of a phase of an image of the cell in microns, an optical volume of the cell, an area of a refractive peak of the cell, a refractive peak area normalized by an area of the cell, a number of refractive peaks of the cell, an intensity of a refractive peak of the cell, a normalized refractive peak height of the cell, a perimeter, an average intensity contrast of a phase image of the cell, an average entropy of a phase image of the cell, an average phase of the cell, an average phase uniformity of the cell, a phase intensity contrast of the cell, a phase correlation of the cell, a phase entropy feature of the cell, a phase homogeneity of the cell, a phase skewness of the cell, a phase smoothness of the cell, a phase uniformity of the cell, a mean of a radius of the cell, a variance of a radius of the cell, and a normalized radius variance of the cell.

7. The method of claim 2, wherein the population of cells comprising T cells comprises a population of T cells undergoing manufacturing to generate a therapeutic T cell composition.

8. The method of claim 7, wherein the manufacturing includes an incubation step following transduction of the population of T cells with a vector encoding a recombinant receptor.

9. The method of claim 8, wherein the recombinant receptor is a chimeric antigen receptor (CAR).

10. The method of claim 8, wherein during the incubation step, the T cells of the population of T cells are classified at different time points.

11. The method of claim 2, wherein the method comprises applying information about the one or more input features as input to a machine learning model trained to classify cells of the plurality of T cells as live or dead.

12. The method of claim 2, wherein the method comprises applying information about the one or more input features as input to a machine learning model trained to classify cells of the plurality of T cells as CD4+ or CD8+.

13. The method of claim 2, wherein the method comprises applying information about the one or more input features as input to a machine learning model trained to classify cells of the plurality of T cells as recombinant receptor positive or recombinant receptor negative.

14. The method of claim 8, wherein the method comprises applying information about the one or more input features as input to a machine learning model trained to classify cells of the plurality of T cells as live or dead.

15. The method of claim 8, wherein the method comprises applying information about the one or more input features as input to a machine learning model trained to classify cells of the plurality of T cells as CD4+ or CD8+.

16. The method of claim 8, wherein the method comprises applying information about the one or more input features as input to a machine learning model trained to classify cells of the plurality of T cells as recombinant receptor positive or recombinant receptor negative.

* * * * *

UNITED STATES PATENT AND TRADEMARK OFFICE
CERTIFICATE OF CORRECTION

| | | |
|---|---|---|
| PATENT NO. | : 12,444,491 B2 | Page 1 of 1 |
| APPLICATION NO. | : 17/638789 | |
| DATED | : October 14, 2025 | |
| INVENTOR(S) | : Ivie Aifuwa et al. | |

It is certified that error appears in the above-identified patent and that said Letters Patent is hereby corrected as shown below:

In the Claims

At Column 143, Line 51, Claim 2: delete "a process" and insert -- a --

Signed and Sealed this
Sixth Day of January, 2026

John A. Squires
*Director of the United States Patent and Trademark Office*

SEQUENCE LISTING

<160> NUMBER OF SEQ ID NOS: 24

<210> SEQ ID NO 1
<211> LENGTH: 3
<212> TYPE: PRT
<213> ORGANISM: Artificial Sequence
<220> FEATURE:
<223> OTHER INFORMATION: Peptide Ligand
<220> FEATURE:
<221> NAME/KEY: VARIANT
<222> LOCATION: 3
<223> OTHER INFORMATION: Xaa is selected from glutamine, asparagine and
      methionine

<400> SEQUENCE: 1

His Pro Xaa
1

<210> SEQ ID NO 2
<211> LENGTH: 4
<212> TYPE: PRT
<213> ORGANISM: Artificial Sequence
<220> FEATURE:
<223> OTHER INFORMATION: Peptide Ligand

<400> SEQUENCE: 2

His Pro Gln Phe
1

<210> SEQ ID NO 3
<211> LENGTH: 8
<212> TYPE: PRT
<213> ORGANISM: Artificial Sequence
<220> FEATURE:
<223> OTHER INFORMATION: Peptide Ligand
<220> FEATURE:
<221> NAME/KEY: VARIANT
<222> LOCATION: 1
<223> OTHER INFORMATION: Xaa is Trp, Lys or Arg
<220> FEATURE:
<221> NAME/KEY: VARIANT
<222> LOCATION: 2
<223> OTHER INFORMATION: Xaa is any amino acid
<220> FEATURE:
<221> NAME/KEY: VARIANT
<222> LOCATION: 7
<223> OTHER INFORMATION: Xaa is Gly or Glu
<220> FEATURE:
<221> NAME/KEY: VARIANT
<222> LOCATION: 8
<223> OTHER INFORMATION: Xaa is Gly, Lys or Arg

<400> SEQUENCE: 3

Xaa Xaa His Pro Gln Phe Xaa Xaa
1               5

```
<210> SEQ ID NO 4
<211> LENGTH: 8
<212> TYPE: PRT
<213> ORGANISM: Artificial Sequence
<220> FEATURE:
<223> OTHER INFORMATION: Peptide Ligand
<220> FEATURE:
<221> NAME/KEY: VARIANT
<222> LOCATION: 2
<223> OTHER INFORMATION: Xaa is any amino acid
<220> FEATURE:
<221> NAME/KEY: VARIANT
<222> LOCATION: 7
<223> OTHER INFORMATION: Xaa is Gly or Glu
<220> FEATURE:
<221> NAME/KEY: VARIANT
<222> LOCATION: 8
<223> OTHER INFORMATION: Xaa is Gly, Lys or Arg

<400> SEQUENCE: 4

Trp Xaa His Pro Gln Phe Xaa Xaa
1               5

<210> SEQ ID NO 5
<211> LENGTH: 8
<212> TYPE: PRT
<213> ORGANISM: Artificial Sequence
<220> FEATURE:
<223> OTHER INFORMATION: Strep-tag

<400> SEQUENCE: 5

Trp Arg His Pro Gln Phe Gly Gly
1               5

<210> SEQ ID NO 6
<211> LENGTH: 8
<212> TYPE: PRT
<213> ORGANISM: Artificial Sequence
<220> FEATURE:
<223> OTHER INFORMATION: Strep-tag II

<400> SEQUENCE: 6

Trp Ser His Pro Gln Phe Glu Lys
1               5

<210> SEQ ID NO 7
<211> LENGTH: 28
<212> TYPE: PRT
<213> ORGANISM: Artificial Sequence
<220> FEATURE:
<223> OTHER INFORMATION: Peptide Ligand
<220> FEATURE:
<221> NAME/KEY: VARIANT
<222> LOCATION: 9
<223> OTHER INFORMATION: Xaa is any amino acid
<220> FEATURE:
<221> NAME/KEY: VARIANT
<222> LOCATION: 10
<223> OTHER INFORMATION: Xaa is any amino acid
<220> FEATURE:
<221> NAME/KEY: VARIANT
<222> LOCATION: 11
<223> OTHER INFORMATION: Xaa is any amino acid
<220> FEATURE:
<221> NAME/KEY: VARIANT
<222> LOCATION: 12
<223> OTHER INFORMATION: Xaa is any amino acid
<220> FEATURE:
<221> NAME/KEY: VARIANT
<222> LOCATION: 13
<223> OTHER INFORMATION: Xaa is any amino acid
<220> FEATURE:
```

```
<221> NAME/KEY: VARIANT
<222> LOCATION: (14)...(4)
<223> OTHER INFORMATION: Xaa is any amino acid
<220> FEATURE:
<221> NAME/KEY: VARIANT
<222> LOCATION: (15)...(15)
<223> OTHER INFORMATION: Xaa is any amino acid
<220> FEATURE:
<221> NAME/KEY: VARIANT
<222> LOCATION: (16)...(16)
<223> OTHER INFORMATION: Xaa is any amino acid
<220> FEATURE:
<221> NAME/KEY: VARIANT
<222> LOCATION: (17)...(17)
<223> OTHER INFORMATION: Xaa is any amino acid or null
<220> FEATURE:
<221> NAME/KEY: VARIANT
<222> LOCATION: (18)...(18)
<223> OTHER INFORMATION: Xaa is any amino acid if Xaa at position 17 is
      any amino acid, otherwise Xaa is null
<220> FEATURE:
<221> NAME/KEY: VARIANT
<222> LOCATION: (19)...(19)
<223> OTHER INFORMATION: Xaa is any amino acid if Xaa at position 17 is
      any amino acid, otherwise Xaa is null
<220> FEATURE:
<221> NAME/KEY: VARIANT
<222> LOCATION: (20)...(20)
<223> OTHER INFORMATION: Xaa is any amino acid if Xaa at position 17 is
      any amino acid, otherwise Xaa is null

<400> SEQUENCE: 7

Trp Ser His Pro Gln Phe Glu Lys Xaa Xaa Xaa Xaa Xaa Xaa Xaa Xaa
1               5                   10                  15

Xaa Xaa Xaa Xaa Trp Ser His Pro Gln Phe Glu Lys
            20                  25

<210> SEQ ID NO 8
<211> LENGTH: 28
<212> TYPE: PRT
<213> ORGANISM: Artificial Sequence
<220> FEATURE:
<223> OTHER INFORMATION: Peptide Ligand
<220> FEATURE:
<221> NAME/KEY: VARIANT
<222> LOCATION: 17
<223> OTHER INFORMATION: Xaa is Gly or null
<220> FEATURE:
<221> NAME/KEY: VARIANT
<222> LOCATION: 18
<223> OTHER INFORMATION: Xaa is Gly if Xaa at position 17 is Gly,
      otherwise Xaa is null
<220> FEATURE:
<221> NAME/KEY: VARIANT
<222> LOCATION: 19
<223> OTHER INFORMATION: Xaa is Gly if Xaa at position 17 is Gly,
      otherwise Xaa is null
<220> FEATURE:
<221> NAME/KEY: VARIANT
<222> LOCATION: 20
<223> OTHER INFORMATION: Xaa is Ser if Xaa at position 17 is Gly,
      otherwise Xaa is null

<400> SEQUENCE: 8

Trp Ser His Pro Gln Phe Glu Lys Gly Gly Gly Ser Gly Gly Gly Ser
1               5                   10                  15

Xaa Xaa Xaa Xaa Trp Ser His Pro Gln Phe Glu Lys
            20                  25

<210> SEQ ID NO 9
<211> LENGTH: 30
<212> TYPE: PRT
<213> ORGANISM: Artificial Sequence
```

<220> FEATURE:
<223> OTHER INFORMATION: Peptide Ligand

<400> SEQUENCE: 9

Ser Ala Trp Ser His Pro Gln Phe Glu Lys Gly Gly Ser Gly Gly
1               5                   10                  15

Gly Ser Gly Gly Gly Ser Trp Ser His Pro Gln Phe Glu Lys
            20                  25                  30

<210> SEQ ID NO 10
<211> LENGTH: 30
<212> TYPE: PRT
<213> ORGANISM: Artificial Sequence
<220> FEATURE:
<223> OTHER INFORMATION: Peptide Ligand

<400> SEQUENCE: 10

Ser Ala Trp Ser His Pro Gln Phe Glu Lys Gly Gly Gly Ser Gly
1               5                   10                  15

Gly Ser Gly Gly Ser Ala Trp Ser His Pro Gln Phe Glu Lys
            20                  25                  30

<210> SEQ ID NO 11
<211> LENGTH: 159
<212> TYPE: PRT
<213> ORGANISM: Artificial Sequence
<220> FEATURE:
<223> OTHER INFORMATION: Streptavidin

<400> SEQUENCE: 11

Asp Pro Ser Lys Asp Ser Lys Ala Gln Val Ser Ala Ala Glu Ala Gly
1               5                   10                  15

Ile Thr Gly Thr Trp Tyr Asn Gln Leu Gly Ser Thr Phe Ile Val Thr
            20                  25                  30

Ala Gly Ala Asp Gly Ala Leu Thr Gly Thr Tyr Glu Ser Ala Val Gly
        35                  40                  45

Asn Ala Glu Ser Arg Tyr Val Leu Thr Gly Arg Tyr Asp Ser Ala Pro
    50                  55                  60

Ala Thr Asp Gly Ser Gly Thr Ala Leu Gly Trp Thr Val Ala Trp Lys
65                  70                  75                  80

Asn Asn Tyr Arg Asn Ala His Ser Ala Thr Thr Trp Ser Gly Gln Tyr
                85                  90                  95

Val Gly Gly Ala Glu Ala Arg Ile Asn Thr Gln Trp Leu Leu Thr Ser
            100                 105                 110

Gly Thr Thr Glu Ala Asn Ala Trp Lys Ser Thr Leu Val Gly His Asp
        115                 120                 125

Thr Phe Thr Lys Val Lys Pro Ser Ala Ala Ser Ile Asp Ala Ala Lys
    130                 135                 140

Lys Ala Gly Val Asn Asn Gly Asn Pro Leu Asp Ala Val Gln Gln
145                 150                 155

<210> SEQ ID NO 12
<211> LENGTH: 159
<212> TYPE: PRT
<213> ORGANISM: Artificial Sequence
<220> FEATURE:
<223> OTHER INFORMATION: Mutein Streptavidin Val44-Thr45-Ala46-Arg47

<400> SEQUENCE: 12

Asp Pro Ser Lys Asp Ser Lys Ala Gln Val Ser Ala Ala Glu Ala Gly
1               5                   10                  15

Ile Thr Gly Thr Trp Tyr Asn Gln Leu Gly Ser Thr Phe Ile Val Thr
                20                  25                  30

Ala Gly Ala Asp Gly Ala Leu Thr Gly Thr Tyr Val Thr Ala Arg Gly
                35                  40                  45

Asn Ala Glu Ser Arg Tyr Val Leu Thr Gly Arg Tyr Asp Ser Ala Pro
 50                  55                  60

Ala Thr Asp Gly Ser Gly Thr Ala Leu Gly Trp Thr Val Ala Trp Lys
 65                  70                  75                  80

Asn Asn Tyr Arg Asn Ala His Ser Ala Thr Thr Trp Ser Gly Gln Tyr
                 85                  90                  95

Val Gly Gly Ala Glu Ala Arg Ile Asn Thr Gln Trp Leu Leu Thr Ser
                100                 105                 110

Gly Thr Thr Glu Ala Asn Ala Trp Lys Ser Thr Leu Val Gly His Asp
                115                 120                 125

Thr Phe Thr Lys Val Lys Pro Ser Ala Ala Ser Ile Asp Ala Ala Lys
                130                 135                 140

Lys Ala Gly Val Asn Asn Gly Asn Pro Leu Asp Ala Val Gln Gln
145                 150                 155

<210> SEQ ID NO 13
<211> LENGTH: 159
<212> TYPE: PRT
<213> ORGANISM: Artificial Sequence
<220> FEATURE:
<223> OTHER INFORMATION: Mutein Streptavidin Ile44-Gly45-Ala-46-Arg47

<400> SEQUENCE: 13

Asp Pro Ser Lys Asp Ser Lys Ala Gln Val Ser Ala Ala Glu Ala Gly
1               5                   10                  15

Ile Thr Gly Thr Trp Tyr Asn Gln Leu Gly Ser Thr Phe Ile Val Thr
                20                  25                  30

Ala Gly Ala Asp Gly Ala Leu Thr Gly Thr Tyr Ile Gly Ala Arg Gly
                35                  40                  45

Asn Ala Glu Ser Arg Tyr Val Leu Thr Gly Arg Tyr Asp Ser Ala Pro
 50                  55                  60

Ala Thr Asp Gly Ser Gly Thr Ala Leu Gly Trp Thr Val Ala Trp Lys
 65                  70                  75                  80

Asn Asn Tyr Arg Asn Ala His Ser Ala Thr Thr Trp Ser Gly Gln Tyr
                 85                  90                  95

Val Gly Gly Ala Glu Ala Arg Ile Asn Thr Gln Trp Leu Leu Thr Ser
                100                 105                 110

Gly Thr Thr Glu Ala Asn Ala Trp Lys Ser Thr Leu Val Gly His Asp
                115                 120                 125

Thr Phe Thr Lys Val Lys Pro Ser Ala Ala Ser Ile Asp Ala Ala Lys
                130                 135                 140

Lys Ala Gly Val Asn Asn Gly Asn Pro Leu Asp Ala Val Gln Gln
145                 150                 155

<210> SEQ ID NO 14
<211> LENGTH: 126
<212> TYPE: PRT
<213> ORGANISM: Artificial Sequence
<220> FEATURE:
<223> OTHER INFORMATION: Minimal streptavidin

<400> SEQUENCE: 14

Glu Ala Gly Ile Thr Gly Thr Trp Tyr Asn Gln Leu Gly Ser Thr Phe

```
                1               5                       10                      15
            Ile Val Thr Ala Gly Ala Asp Gly Ala Leu Thr Gly Thr Tyr Glu Ser
                            20                      25                      30

Ala Val Gly Asn Ala Glu Ser Arg Tyr Val Leu Thr Gly Arg Tyr Asp
                            35                      40                      45

Ser Ala Pro Ala Thr Asp Gly Ser Gly Thr Ala Leu Gly Trp Thr Val
                            50                      55                      60

Ala Trp Lys Asn Asn Tyr Arg Asn Ala His Ser Ala Thr Thr Trp Ser
            65                      70                      75                      80

Gly Gln Tyr Val Gly Gly Ala Glu Ala Arg Ile Asn Thr Gln Trp Leu
                            85                      90                      95

Leu Thr Ser Gly Thr Thr Glu Ala Asn Ala Trp Lys Ser Thr Leu Val
                            100                     105                     110

Gly His Asp Thr Phe Thr Lys Val Lys Pro Ser Ala Ala Ser
                            115                     120                     125

<210> SEQ ID NO 15
<211> LENGTH: 126
<212> TYPE: PRT
<213> ORGANISM: Artificial Sequence
<220> FEATURE:
<223> OTHER INFORMATION: Mutein Streptavidin Val44-Thr45-Ala46-Arg47

<400> SEQUENCE: 15

Glu Ala Gly Ile Thr Gly Thr Trp Tyr Asn Gln Leu Gly Ser Thr Phe
            1               5                       10                      15

Ile Val Thr Ala Gly Ala Asp Gly Ala Leu Thr Gly Thr Tyr Val Thr
                            20                      25                      30

Ala Arg Gly Asn Ala Glu Ser Arg Tyr Val Leu Thr Gly Arg Tyr Asp
                            35                      40                      45

Ser Ala Pro Ala Thr Asp Gly Ser Gly Thr Ala Leu Gly Trp Thr Val
                            50                      55                      60

Ala Trp Lys Asn Asn Tyr Arg Asn Ala His Ser Ala Thr Thr Trp Ser
            65                      70                      75                      80

Gly Gln Tyr Val Gly Gly Ala Glu Ala Arg Ile Asn Thr Gln Trp Leu
                            85                      90                      95

Leu Thr Ser Gly Thr Thr Glu Ala Asn Ala Trp Lys Ser Thr Leu Val
                            100                     105                     110

Gly His Asp Thr Phe Thr Lys Val Lys Pro Ser Ala Ala Ser
                            115                     120                     125

<210> SEQ ID NO 16
<211> LENGTH: 126
<212> TYPE: PRT
<213> ORGANISM: Artificial Sequence
<220> FEATURE:
<223> OTHER INFORMATION: Mutein Streptavidin Ile44-Gly45-Ala-46-Arg47

<400> SEQUENCE: 16

Glu Ala Gly Ile Thr Gly Thr Trp Tyr Asn Gln Leu Gly Ser Thr Phe
            1               5                       10                      15

Ile Val Thr Ala Gly Ala Asp Gly Ala Leu Thr Gly Thr Tyr Ile Gly
                            20                      25                      30

Ala Arg Gly Asn Ala Glu Ser Arg Tyr Val Leu Thr Gly Arg Tyr Asp
                            35                      40                      45

Ser Ala Pro Ala Thr Asp Gly Ser Gly Thr Ala Leu Gly Trp Thr Val
                            50                      55                      60
```

Ala Trp Lys Asn Asn Tyr Arg Asn Ala His Ser Ala Thr Thr Trp Ser
 65                  70                  75                  80

Gly Gln Tyr Val Gly Gly Ala Glu Ala Arg Ile Asn Thr Gln Trp Leu
                 85                  90                  95

Leu Thr Ser Gly Thr Thr Glu Ala Asn Ala Trp Lys Ser Thr Leu Val
            100                 105                 110

Gly His Asp Thr Phe Thr Lys Val Lys Pro Ser Ala Ala Ser
        115                 120                 125

<210> SEQ ID NO 17
<211> LENGTH: 28
<212> TYPE: PRT
<213> ORGANISM: Artificial Sequence
<220> FEATURE:
<223> OTHER INFORMATION: Peptide Ligand

<400> SEQUENCE: 17

Trp Ser His Pro Gln Phe Glu Lys Gly Gly Gly Ser Gly Gly Gly Ser
1               5                   10                  15

Gly Gly Gly Ser Trp Ser His Pro Gln Phe Glu Lys
            20                  25

<210> SEQ ID NO 18
<211> LENGTH: 24
<212> TYPE: PRT
<213> ORGANISM: Artificial Sequence
<220> FEATURE:
<223> OTHER INFORMATION: Peptide Ligand

<400> SEQUENCE: 18

Trp Ser His Pro Gln Phe Glu Lys Gly Gly Gly Ser Gly Gly Gly Ser
1               5                   10                  15

Trp Ser His Pro Gln Phe Glu Lys
            20

<210> SEQ ID NO 19
<211> LENGTH: 28
<212> TYPE: PRT
<213> ORGANISM: Artificial Sequence
<220> FEATURE:
<223> OTHER INFORMATION: Peptide Ligand

<400> SEQUENCE: 19

Trp Ser His Pro Gln Phe Glu Lys Gly Gly Gly Ser Gly Gly Gly Ser
1               5                   10                  15

Gly Gly Ser Ala Trp Ser His Pro Gln Phe Glu Lys
            20                  25

<210> SEQ ID NO 20
<211> LENGTH: 127
<212> TYPE: PRT
<213> ORGANISM: Artificial Sequence
<220> FEATURE:
<223> OTHER INFORMATION: Streptavidin mutein

<400> SEQUENCE: 20

Met Glu Ala Gly Ile Thr Gly Thr Trp Tyr Asn Gln Leu Gly Ser Thr
1               5                   10                  15

Phe Ile Val Thr Ala Gly Ala Asp Gly Ala Leu Thr Gly Thr Tyr Glu
                20                  25                  30

Ser Ala Val Gly Asn Ala Glu Ser Arg Tyr Val Leu Thr Gly Arg Tyr
            35                  40                  45

Asp Ser Ala Pro Ala Thr Asp Gly Ser Gly Thr Ala Leu Gly Trp Thr
        50                  55                  60

Val Ala Trp Lys Asn Asn Tyr Arg Asn Ala His Ser Ala Thr Thr Trp
 65                  70                  75                  80

Ser Gly Gln Tyr Val Gly Gly Ala Glu Ala Arg Ile Asn Thr Gln Trp
                85                  90                  95

Leu Leu Thr Ser Gly Thr Thr Glu Ala Asn Ala Trp Lys Ser Thr Leu
                100                 105                 110

Val Gly His Asp Thr Phe Thr Lys Val Lys Pro Ser Ala Ala Ser
            115                 120                 125

<210> SEQ ID NO 21
<211> LENGTH: 127
<212> TYPE: PRT
<213> ORGANISM: Artificial Sequence
<220> FEATURE:
<223> OTHER INFORMATION: Streptavidin mutein

<400> SEQUENCE: 21

Met Glu Ala Gly Ile Thr Gly Thr Trp Tyr Asn Gln Leu Gly Ser Thr
 1               5                  10                  15

Phe Ile Val Thr Ala Gly Ala Asp Gly Ala Leu Thr Gly Thr Tyr Val
                20                  25                  30

Thr Ala Arg Gly Asn Ala Glu Ser Arg Tyr Val Leu Thr Gly Arg Tyr
            35                  40                  45

Asp Ser Ala Pro Ala Thr Asp Gly Ser Gly Thr Ala Leu Gly Trp Thr
        50                  55                  60

Val Ala Trp Lys Asn Asn Tyr Arg Asn Ala His Ser Ala Thr Thr Trp
 65                  70                  75                  80

Ser Gly Gln Tyr Val Gly Gly Ala Glu Ala Arg Ile Asn Thr Gln Trp
                85                  90                  95

Leu Leu Thr Ser Gly Thr Thr Glu Ala Asn Ala Trp Lys Ser Thr Leu
                100                 105                 110

Val Gly His Asp Thr Phe Thr Lys Val Lys Pro Ser Ala Ala Ser
            115                 120                 125

<210> SEQ ID NO 22
<211> LENGTH: 127
<212> TYPE: PRT
<213> ORGANISM: Artificial Sequence
<220> FEATURE:
<223> OTHER INFORMATION: Streptavidin mutein

<400> SEQUENCE: 22

Met Glu Ala Gly Ile Thr Gly Thr Trp Tyr Asn Gln Leu Gly Ser Thr
 1               5                  10                  15

Phe Ile Val Thr Ala Gly Ala Asp Gly Ala Leu Thr Gly Thr Tyr Ile
                20                  25                  30

Gly Ala Arg Gly Asn Ala Glu Ser Arg Tyr Val Leu Thr Gly Arg Tyr
            35                  40                  45

Asp Ser Ala Pro Ala Thr Asp Gly Ser Gly Thr Ala Leu Gly Trp Thr
        50                  55                  60

Val Ala Trp Lys Asn Asn Tyr Arg Asn Ala His Ser Ala Thr Thr Trp
 65                  70                  75                  80

Ser Gly Gln Tyr Val Gly Gly Ala Glu Ala Arg Ile Asn Thr Gln Trp
                85                  90                  95

Leu Leu Thr Ser Gly Thr Thr Glu Ala Asn Ala Trp Lys Ser Thr Leu
                100                 105                 110

Val Gly His Asp Thr Phe Thr Lys Val Lys Pro Ser Ala Ala Ser
            115                 120                 125

<210> SEQ ID NO 23
<211> LENGTH: 357
<212> TYPE: PRT
<213> ORGANISM: Artificial Sequence
<220> FEATURE:
<223> OTHER INFORMATION: tEGFR

<400> SEQUENCE: 23

Met Leu Leu Leu Val Thr Ser Leu Leu Cys Glu Leu Pro His Pro
1               5                   10                  15

Ala Phe Leu Leu Ile Pro Arg Lys Val Cys Asn Gly Ile Gly Ile
            20                  25                  30

Glu Phe Lys Asp Ser Leu Ser Ile Asn Ala Thr Asn Ile Lys His Phe
            35                  40                  45

Lys Asn Cys Thr Ser Ile Ser Gly Asp Leu His Ile Leu Pro Val Ala
        50                  55                  60

Phe Arg Gly Asp Ser Phe Thr His Thr Pro Pro Leu Asp Pro Gln Glu
65                  70                  75                  80

Leu Asp Ile Leu Lys Thr Val Lys Glu Ile Thr Gly Phe Leu Leu Ile
                85                  90                  95

Gln Ala Trp Pro Glu Asn Arg Thr Asp Leu His Ala Phe Glu Asn Leu
            100                 105                 110

Glu Ile Ile Arg Gly Arg Thr Lys Gln His Gly Gln Phe Ser Leu Ala
        115                 120                 125

Val Val Ser Leu Asn Ile Thr Ser Leu Gly Leu Arg Ser Leu Lys Glu
    130                 135                 140

Ile Ser Asp Gly Asp Val Ile Ile Ser Gly Asn Lys Asn Leu Cys Tyr
145                 150                 155                 160

Ala Asn Thr Ile Asn Trp Lys Lys Leu Phe Gly Thr Ser Gly Gln Lys
                165                 170                 175

Thr Lys Ile Ile Ser Asn Arg Gly Glu Asn Ser Cys Lys Ala Thr Gly
            180                 185                 190

Gln Val Cys His Ala Leu Cys Ser Pro Glu Gly Cys Trp Gly Pro Glu
        195                 200                 205

Pro Arg Asp Cys Val Ser Cys Arg Asn Val Ser Arg Gly Arg Glu Cys
    210                 215                 220

Val Asp Lys Cys Asn Leu Leu Glu Gly Glu Pro Arg Glu Phe Val Glu
225                 230                 235                 240

Asn Ser Glu Cys Ile Gln Cys His Pro Glu Cys Leu Pro Gln Ala Met
                245                 250                 255

Asn Ile Thr Cys Thr Gly Arg Gly Pro Asp Asn Cys Ile Gln Cys Ala
            260                 265                 270

His Tyr Ile Asp Gly Pro His Cys Val Lys Thr Cys Pro Ala Gly Val
        275                 280                 285

Met Gly Glu Asn Asn Thr Leu Val Trp Lys Tyr Ala Asp Ala Gly His
    290                 295                 300

Val Cys His Leu Cys His Pro Asn Cys Thr Tyr Gly Cys Thr Gly Pro
305                 310                 315                 320

Gly Leu Glu Gly Cys Pro Thr Asn Gly Pro Lys Ile Pro Ser Ile Ala
                325                 330                 335

Thr Gly Met Val Gly Ala Leu Leu Leu Leu Val Val Ala Leu Gly
            340                 345                 350

```
Ile Gly Leu Phe Met
        355

<210> SEQ ID NO 24
<211> LENGTH: 335
<212> TYPE: PRT
<213> ORGANISM: Artificial Sequence
<220> FEATURE:
<223> OTHER INFORMATION: tEGFR

<400> SEQUENCE: 24

Arg Lys Val Cys Asn Gly Ile Gly Ile Gly Glu Phe Lys Asp Ser Leu
1               5                   10                  15

Ser Ile Asn Ala Thr Asn Ile Lys His Phe Lys Asn Cys Thr Ser Ile
            20                  25                  30

Ser Gly Asp Leu His Ile Leu Pro Val Ala Phe Arg Gly Asp Ser Phe
        35                  40                  45

Thr His Thr Pro Pro Leu Asp Pro Gln Glu Leu Asp Ile Leu Lys Thr
    50                  55                  60

Val Lys Glu Ile Thr Gly Phe Leu Leu Ile Gln Ala Trp Pro Glu Asn
65                  70                  75                  80

Arg Thr Asp Leu His Ala Phe Glu Asn Leu Glu Ile Ile Arg Gly Arg
                85                  90                  95

Thr Lys Gln His Gly Gln Phe Ser Leu Ala Val Val Ser Leu Asn Ile
            100                 105                 110

Thr Ser Leu Gly Leu Arg Ser Leu Lys Glu Ile Ser Asp Gly Asp Val
        115                 120                 125

Ile Ile Ser Gly Asn Lys Asn Leu Cys Tyr Ala Asn Thr Ile Asn Trp
    130                 135                 140

Lys Lys Leu Phe Gly Thr Ser Gly Gln Lys Thr Lys Ile Ile Ser Asn
145                 150                 155                 160

Arg Gly Glu Asn Ser Cys Lys Ala Thr Gly Gln Val Cys His Ala Leu
                165                 170                 175

Cys Ser Pro Glu Gly Cys Trp Gly Pro Glu Pro Arg Asp Cys Val Ser
            180                 185                 190

Cys Arg Asn Val Ser Arg Gly Arg Glu Cys Val Asp Lys Cys Asn Leu
        195                 200                 205

Leu Glu Gly Glu Pro Arg Glu Phe Val Glu Asn Ser Glu Cys Ile Gln
    210                 215                 220

Cys His Pro Glu Cys Leu Pro Gln Ala Met Asn Ile Thr Cys Thr Gly
225                 230                 235                 240

Arg Gly Pro Asp Asn Cys Ile Gln Cys Ala His Tyr Ile Asp Gly Pro
                245                 250                 255

His Cys Val Lys Thr Cys Pro Ala Gly Val Met Gly Glu Asn Asn Thr
            260                 265                 270

Leu Val Trp Lys Tyr Ala Asp Ala Gly His Val Cys His Leu Cys His
        275                 280                 285

Pro Asn Cys Thr Tyr Gly Cys Thr Gly Pro Gly Leu Glu Gly Cys Pro
    290                 295                 300

Thr Asn Gly Pro Lys Ile Pro Ser Ile Ala Thr Gly Met Val Gly Ala
305                 310                 315                 320

Leu Leu Leu Leu Leu Val Val Ala Leu Gly Ile Gly Leu Phe Met
                325                 330                 335
```